US012528826B2

(12) United States Patent
Bellenie et al.

(10) Patent No.: US 12,528,826 B2
(45) Date of Patent: *Jan. 20, 2026

(54) [1,4]OXAZEPINO[2,3-C]QUINOLINONE DERIVATIVES AS BCL6 INHIBITORS

(71) Applicants: Cancer Research Technology Limited, London (GB); The Institute of Cancer Research: Royal Cancer Hospital, London (GB)

(72) Inventors: Benjamin Richard Bellenie, London (GB); Alfie Brennan, London (GB); Kwai Ming Jack Cheung, London (GB); Owen Alexander Davis, London (GB); Alice Claire Harnden, London (GB); Swen Hoelder, London (GB); Rosemary Huckvale, London (GB)

(73) Assignees: Cancer Research Technology Limited, London (GB); The Institute of Cancer Research: Royal Cancer Hospital, London (GB)

( * ) Notice: Subject to any disclaimer, the term of this patent is extended or adjusted under 35 U.S.C. 154(b) by 524 days.

This patent is subject to a terminal disclaimer.

(21) Appl. No.: 17/768,174

(22) PCT Filed: Oct. 14, 2020

(86) PCT No.: PCT/GB2020/052588
§ 371 (c)(1),
(2) Date: Apr. 11, 2022

(87) PCT Pub. No.: WO2021/074620
PCT Pub. Date: Apr. 22, 2021

(65) Prior Publication Data
US 2024/0217987 A1 Jul. 4, 2024

(30) Foreign Application Priority Data
Oct. 14, 2019 (GB) .................. 1914860

(51) Int. Cl.
*C07D 498/04* (2006.01)
*A61K 31/553* (2006.01)
(Continued)

(52) U.S. Cl.
CPC .......... *C07D 498/04* (2013.01); *A61K 31/553* (2013.01); *A61K 45/06* (2013.01); *C07D 519/00* (2013.01)

(58) Field of Classification Search
None
See application file for complete search history.

(56) References Cited

U.S. PATENT DOCUMENTS 8,338,464 B2 12/2012 Melnick et al.
8,815,891 B2 8/2014 Kim et al.
(Continued)

FOREIGN PATENT DOCUMENTS

CN 105017159 A 11/2015
EA 202092290 A1 3/2021
(Continued)

OTHER PUBLICATIONS

Ciapetti et al., The Practice of Medicinal Chemistry, Academic Press, 2008, Chapter 8—Molecular Variations Based on Isosteric Replacements, p. 181-241 (Year: 2008).*
(Continued)

*Primary Examiner* — Jeffrey S Lundgren
*Assistant Examiner* — Anthony Joseph Seitz
(74) *Attorney, Agent, or Firm* — Goodwin Procter LLP

(57) ABSTRACT

The present invention relates to compounds that function as inhibitors of BCL6 (B-cell lymphoma 6) activity. The present invention also relates to processes for the preparation of these compounds, to pharmaceutical compositions comprising them, and to their use in the treatment of proliferative (Continued)

disorders, such as cancer, as well as other diseases or conditions in which BCL6 activity is implicated.

10 Claims, 3 Drawing Sheets

(51) Int. Cl.
*A61K 45/06* (2006.01)
*C07D 519/00* (2006.01)

(56) References Cited

U.S. PATENT DOCUMENTS

| | | | |
|---|---|---|---|
| 11,161,839 B2 | 11/2021 | Bellenie et al. | |
| 11,512,095 B2* | 11/2022 | Bellenie | A61P 35/00 |
| 12,110,286 B2 | 10/2024 | Bellenie et al. | |
| 2005/0256157 A1 | 11/2005 | Gesner et al. | |
| 2005/0261307 A1 | 11/2005 | Cai et al. | |
| 2010/0190770 A1 | 7/2010 | Li et al. | |
| 2010/0329978 A1 | 12/2010 | McCurdy et al. | |
| 2016/0060260 A1 | 3/2016 | Palmer et al. | |
| 2021/0147382 A1 | 5/2021 | Bellenie et al. | |
| 2021/0163497 A1 | 6/2021 | Bellenie et al. | |
| 2021/0206756 A1 | 7/2021 | Bellenie et al. | |
| 2023/0287003 A1* | 9/2023 | Bellenie | C07D 471/04 |
| 2024/0417388 A1 | 12/2024 | Bellenie et al. | |

FOREIGN PATENT DOCUMENTS

| | | |
|---|---|---|
| EP | 2049503 A1 | 4/2009 |
| EP | 2364983 A2 | 9/2011 |
| EP | 2565193 A1 | 3/2013 |
| EP | 2964642 B1 | 11/2017 |
| EP | 3774817 B1 | 12/2022 |
| IL | 277778 A | 11/2020 |
| JP | H02 59572 A | 2/1990 |
| JP | 2012-508273 A | 4/2012 |
| JP | 2012-515793 A | 7/2012 |
| JP | 2013-517273 A | 5/2013 |
| JP | 2014-520767 A | 8/2014 |
| JP | 2015-526395 A | 9/2015 |
| JP | 2017-536409 A | 12/2017 |
| JP | 7202315 B2 | 1/2023 |
| WO | WO-1997/022596 A1 | 6/1997 |
| WO | WO-1997/032856 A1 | 9/1997 |
| WO | WO-1998/013354 A1 | 4/1998 |
| WO | WO-1999/002166 A1 | 1/1999 |
| WO | 2000/034248 A1 | 6/2000 |
| WO | WO-2000/040529 A1 | 7/2000 |
| WO | WO-2000/041669 A2 | 7/2000 |
| WO | WO-2000/047212 A1 | 8/2000 |
| WO | 2001/005770 A1 | 1/2001 |
| WO | 2001/094311 A1 | 12/2001 |
| WO | 2001/094341 A1 | 12/2001 |
| WO | WO-2002/004434 A1 | 1/2002 |
| WO | WO-2002/008213 A1 | 1/2002 |
| WO | WO-2002/094203 A2 | 11/2002 |
| WO | 2004/046118 A2 | 6/2004 |
| WO | 2008/066887 A3 | 11/2008 |
| WO | 2009/063240 A1 | 5/2009 |
| WO | WO-2009097578 A1 | 8/2009 |
| WO | 2010056038 A2 | 5/2010 |
| WO | 2010/085684 A1 | 7/2010 |
| WO | 2011088027 A1 | 7/2011 |
| WO | 2014/204859 A2 | 12/2014 |
| WO | 2016/033100 A1 | 3/2016 |
| WO | 2016/033416 A1 | 3/2016 |
| WO | 2016090382 A1 | 6/2016 |
| WO | 2017/007658 A1 | 1/2017 |
| WO | 2018108704 | 6/2018 |
| WO | 2018/215801 A1 | 11/2018 |
| WO | 2018215798 | 11/2018 |
| WO | 2019197842 | 10/2019 |
| WO | WO-2021074620 | 4/2021 |
| WO | WO-2001/092224 A1 | 12/2021 |
| WO | WO-1997030035 A1 | 8/2025 |

OTHER PUBLICATIONS

International Search Report and Written Opinion for PCT/GB2020/052588 dated Dec. 11, 2020.
Journal of Medicinal Chemistry, 2017, vol. 60(10), p. 4358-4368 (Hanan et al., "Discovery of Selective and Noncovalent Diaminopyrimidine-Based Inhibitors of Epidermal Growth Factor Receptor Containing the T790M Resistance Mutation", Journal of Medicinal Chemistry, 2017, vol. 60(10), p. 4358-4368).
Journal of Medicinal Chemistry, 2014, vol. 57(23), p. 10176-10191 (Kamada et al., "Discovery of a B-Cell Lymphoma 6 Protein—Protein Interaction Inhibitor by a Biophysics-Driven Fragment-Based Approach", Journal of Medicinal Chemistry, 2014, vol. 57(23), p. 10176-10191).
International Search Report for PCT/GB2018/051447 dated Feb. 8, 2018.
International Search Report for PCT/GB2018/051444 dated Aug. 13, 2018.
Yogesh S. S. et al., Journal of Heterocyclic Chemistry, published in 1993, vol. 30(5), pp. 1341-1349.
Bellenie et al., "Achieving In Vivo Target Depletion through the Discovery and Optimization of Benzimidazolone BCL6 Degraders", J. Med. Chem. 63:4047-4068 (2020).
International Preliminary Report on Patentability for International Application No. PCT/GB2019/051058 dated Oct. 13, 2020.
International Search Report and Written Opinion for International Application No. PCT/GB2019/051058 dated Jul. 29, 2019.
Kerres et al. "Chemically Induced Degradation of the Oncogenic Transcription Factor BCL6", Cell reports, vol. 20, pp. 2860-2875, 2017.
Search Report for GB Application No. 1819136.1 dated Feb. 20, 2019.
Ashara Motoki et al: "Effective C—N bond formation on the 1-methyl-2-quinolin skeleton" ARKIVOC, vol. 2005, No. 1, Oct. 25, 2004 (Oct. 25, 2004), pp. 1-6.
Hao et al: "Direct amino-halogenation and aziridination of the 2-quinoline framework by sequential treatment of 3-nitro-2-quinolone with amine and N-halosuccinimide—ScienceDirect", Tetrahedron, vol. 73, No. 9, Mar. 1, 2017 (Mar. 1, 2017), pp. 1255-1264.
Chemical Abstracts Registry No. 1436344-98-7, indexed in the Registry file on Jun. 9, 2013 (year 2013).
Ahmad et al., "Mechanism of SMRT Corepressor Recruitment by the BCL6 BTB Domain" Molecular Cell, 12:1551-1564 (2003).
Cai et al., "BCL6 Inhibitor—Mediated Downregulation of Phosphorylated SAMHD1 and T Cell Activation Are Associated with Decreased HIV Infection and Reactivation" *Journal of Virology*, 93(2), pp. e01073, pp. 1-18.
Cardenas et al., "The Expanding Role of the BCL6 Oncoprotein as a Cancer Therapeutic Target" Clinical Cancer Research, 23(4): 885-893 (2017).
Cerchietti et al., "A Small-Molecule Inhibitor of BCL6 Kills DLBCL Cells In Vitro and In Vivo" Cancer Cell, 17:400-411 (2010).
Coppola et al., "4-Hydroxy-2-quinolinone-3-carboxylic Acids" Synthesis, pp. 391-392 (1981).
Cortes et al., "The curious origins of Angioimmunoblastic T-Cell Lymphoma" Current Opinion in Hematology, 23:434-443 (2016).
Crotty, Shane., "T Follicular Helper Cell Differentiation, Function, and Roles in Disease" Immunity, 41:529-542 (2014).
Deb et al., 'Combination Therapy Targeting BCL6 and Phospho-STAT3 Defeats Intratumor Heterogeneity in a Subset of Non-Small Cell Lung Cancers Cancer Research, 77 (11): 3070-3081 (2017).
Dent et al., "Control of Inflammation, Cytokine Expression, and Germinal Center Formation by BCL-6" Science, 276: 589-592 (1997).
Duy et al., "BCL6 enables Ph+ acute lymphoblastic leukemia cells to survive BCR-ABL1 kinase inhibition" Nature, 473:384-388 (2011).

(56) References Cited

OTHER PUBLICATIONS

Fabre et al., "The oncogene BCL6 is up-regulated in glioblastoma in response to DNA damage, and drives survival after therapy" PLOS ONE, demo15(4), e0231470 (2020).

Ghetu et al., "Structure of a BCOR Corepressor Peptide in Complex with the BCL6 BTB Domain Dimer" Molecular Cell, 29:384-391 (2008).

Hatzi et al., "BCL6 orchestrates Tfh cell differentiation via multiple distinct mechanisms" Journal of Experimental Medicine, 212(4):539-553 (2015).

Hatzi, Melnick., "Breaking bad in the germinal center: how deregulation of BCL6 contributes to lymphomagenesis" Trends in Molecular Medicine, 20(6):343-352 (2014).

Kakeya, N. et al., "Studies on Prodrugs of Cephalosporins. I. Synthesis and Biological Properties of Glycyloxybenzoyloxymethyl and Glycylaminobenzoyloxymethyl Esters of 7B-[2-(2-Aminothiazol-4-yl)-(Z)-2-methoxyiminoacetamido]-3-methyl-3-cephem-4-carboxylic Acid" Chemical & Pharmaceutical Bulletin, (32) 692-698 (1984).

Lintermann et al., "Follicular helper T cells are required for systemic autoimmunity" Journal of Experimental Medicine, 206(3):561-576 (2008).

Marullo et al., "Abstract 1271: The transcription factor BCL6 is a rationaltarget in non-small cell lung cancer (NSCLC)" Proceedings of the 107th Annual Meeting AACR, 2016.

Naik et al., "4-Aminoquinolone Piperidine Amides: Noncovalent Inhibitors of DprE1 with Long Residence Time and Potent Antimycobacterial Activity" Journal of Medicinal Chemistry, 57:5419 (2014).

Ohashi et al., "Discovery of pyrrolo[3,2-c]quinoline-4-one derivatives as novel hedgehog signaling inhibitors" Bioorganic & Medicinal Chemistry, 5496-5506 (2012).

Paz et al., "Small-molecule BCL6 inhibitor effectively treats mice with nonsclerodermatous chronic graft-versus-host disease" Blood, 133, 94-99 (2019).

Polo et al., "Specific peptide interference reveals BCL6 transcriptional and oncogenic mechanisms in B-cell lymphoma cells" Nature Medicine, 10:1329-1335 (2004).

Rautio, J. et al., "The expanding role of prodrugs in contemporary drug design and development" Nature Reviews Drug Discovery, 17:559-587 (2018).

Sommars et al., "Dynamic repression by BCL6 controls the genome-wide liver response to fasting and steatosis" eLife, e43922, pp. 1-25 (2019).

Stadlbauer et al., Ring closure and rearrangement reactions of 4-azido-2-oxoquinoline-3-carboxylates and 4-azidocoumarin-3-carboxylates Journal of Heterocyclic Chemistry, pp. 627-636 (1998).

Stern et al., "Overview of monoclonal antibodies in cancer therapy: present and promise" Critical Reviews in Oncology/Hematology, 54:11-29 (2005).

Tomassoli et al., "Synthesis, biological assessment and molecular modeling of new dihydroquinoline-3-carboxamides and dihydroquinoline-3-carbohydrazide derivatives as cholinesterase inhibitors, and Ca channel antagonists" European Journal of Medicinal Chemistry, (46):1-10 (2011).

Tomassoli et al., "Synthesis, regioselectivity, and DFT analysis of new antioxidant pyrazolo[4,3-c]quinoline-3,4-diones" Monatshefte für Chemie, 147:1069-1079 (2016).

Wagner et al., "The role of BCL6 in lymphomas and routes to therapy" British Journal of Haematology, (152):3-12 (2010).

Walker et al., "The transcriptional modulator BCL6 as a molecular target for breast cancer therapy" Oncogene, 34:1073-1082 (2015).

Xu et al., "BCL6 promotes glioma and serves as a therapeutic target" Proceedings of the National Academy of Sciences USA, 114(15), 3981-3986 (2017).

Zhang et al., "BCL6 inhibitor FX1 attenuates inflammatory responses in murine sepsis through strengthening BCL6 binding affinity to downstream target gene promoters" International Immunopharmacology, 105789, 75:1-12 (2019).

Lombardo et al., "Discovery of N-(2-Chloro-6-methyl- phenyl)-2-(6-(4-(2-hydroxyethyl)- piperazin-1-yl)-2-methylpyrimidin-4-ylamino)thiazole-5-carboxamide (BMS-354825), a Dual Src/Abl Kinase Inhibitor with Potent Antitumor Activity in Preclinical Assays" J. Med. Chem., 2004, 47, 6658-6661.

A Textbook of Drug Design and Development, edited by Krogsgaard-Larsen (Stromgaard, Kristian, Povl Krogsgaard-Larsen, and Ulf Madsen. Textbook of drug design and discovery. CRC press, 2017).

Chikada et al., "Liver-specific knockout of B cell lymphoma 6 suppresses progression of non-alcoholic steatohepatitis in mice" Sci. Rep., 10:9704, pp. 1-14 (2020).

Van Oeveren et al., "Novel selective androgen receptor modulators: SAR studies on 6-bisalkylamino-2-quinolinones" Bioorganic & medicinal chemistry letters, 17(6), pp. 1527-1531 (2007).

Hurtz et al., "BCL6-mediated repression of p53 is critical for leukemia stem cell survival in chronic myeloid leukemia" J. Exp. Med., 208(11):2163-2174 (2011).

Chemical Abstracts Registry No. 1821048-93-4, indexed in the Registry file on Nov. 20, 2015. (Year:2015).

\* cited by examiner

ര
[1,4]OXAZEPINO[2,3-C]QUINOLINONE DERIVATIVES AS BCL6 INHIBITORS

CROSS REFERENCE TO RELATED APPLICATIONS

This application is a U.S. national stage application under 35 U.S.C. § 371 (b) of International Application No. PCT/GB2020/052588 filed Oct. 14, 2020, which claims priority to the United Kingdom Patent Application No. 1914860.0 filed on Oct. 14, 2019, the disclosures of both of which are hereby expressly incorporated by reference in their entirety.

INTRODUCTION

The present invention relates to certain compounds that function as inhibitors of BCL6 (B-cell lymphoma 6) activity. The present invention also relates to processes for the preparation of these compounds, to pharmaceutical compositions comprising them, and to their use in the treatment of proliferative disorders, such as cancer, as well as other diseases or conditions in which BCL6 activity is implicated.

BACKGROUND OF THE INVENTION

BCL6 is a zinc finger transcription repressor that plays a key role in the formation and development of germinal centres, in which B cells undergo somatic hypermutation and recombination of the immunoglobulin genes, in order to generate diversity in antibodies against a variety of foreign antigens (Dent et al., *Science*, 1997, 276, 589-592). BCL6 allows the proliferation of antibody producing B cells by repressing genes involved in DNA damage response, cell cycle arrest and apoptosis. BCL6 mediates this repression by recruiting the corepressor proteins SMRT, NCoR and BCoR to an extended groove motif that forms along the dimer interface of the BCL6 BTB (BR-C, Ttk and Bab) domain (Ahmad et al., *Mol Cell*, 2003, 12, 1551-1564; Ghetu et al., *Mol Cell*, 2008, 29, 384-391). Genetic upregulation of the BCL6 gene, as seen in many lymphomas, leads to malignant B cell proliferation (Hatzi & Melnick, *Trends Mol Med*, 2014, 20, 343-352). Therefore, there exists a need to develop agents that inhibit the tumourigenic effects of BCL6, either by selectively binding to the BTB domain and preventing corepressor recruitment, or by binding to the BTB domain and inducing protein degradation (Kerres et al. *Cell Rep.*, 2017, 20, 2860-2875; Bellenie et al., *J. Med. Chem*, 2020, 63, 4047-4068).

SUMMARY OF THE INVENTION

According to a first aspect of the present invention, there is provided a compound, or a pharmaceutically acceptable salt, hydrate or solvate thereof, as defined herein.

According to a further aspect of the present invention, there is provided a pharmaceutical composition comprising a compound as defined herein, or a pharmaceutically acceptable salt, hydrate or solvate thereof, in admixture with a pharmaceutically acceptable diluent or carrier.

According to a further aspect of the present invention, there is provided a method of inhibiting BCL6 activity, in vitro or in vivo, said method comprising contacting a cell with an effective amount of a compound or a pharmaceutically acceptable salt, hydrate or solvate thereof as defined herein.

According to a further aspect of the present invention, there is provided a method of inhibiting cell proliferation, in vitro or in vivo, said method comprising contacting a cell with an effective amount of a compound or a pharmaceutically acceptable salt, hydrate or solvate thereof as defined herein, or a pharmaceutical composition as defined herein.

According to a further aspect of the present invention, there is provided a method of treating a disease or disorder in which BCL6 activity is implicated in a patient in need of such treatment, said method comprising administering to said patient a therapeutically effective amount of a compound or a pharmaceutically acceptable salt, hydrate or solvate thereof as defined herein, or a pharmaceutical composition as defined herein.

According to a further aspect of the present invention, there is provided a method of treating a proliferative disorder in a patient in need of such treatment, said method comprising administering to said patient a therapeutically effective amount of a compound or a pharmaceutically acceptable salt, hydrate or solvate thereof as defined herein, or a pharmaceutical composition as defined herein.

According to a further aspect of the present invention, there is provided a method of treating cancer in a patient in need of such treatment, said method comprising administering to said patient a therapeutically effective amount of a compound or a pharmaceutically acceptable salt, hydrate or solvate thereof as defined herein, or a pharmaceutical composition as defined herein.

According to a further aspect of the present invention, there is provided a compound, or a pharmaceutically acceptable salt, hydrate or solvate thereof, or a pharmaceutical composition as defined herein for use in therapy.

According to a further aspect of the present invention, there is provided a compound or a pharmaceutically acceptable salt, hydrate or solvate thereof as defined herein, or a pharmaceutical composition as defined herein, for use in the treatment of a proliferative condition.

According to a further aspect of the present invention, there is provided a compound, or a pharmaceutically acceptable salt, hydrate or solvate thereof, or a pharmaceutical composition as defined herein for use in the treatment of cancer, HIV, sepsis, graft-versus-host disease, non-alcoholic fatty liver disease, non-alcoholic steatohepatitis or auto-immune diseases. In a particular embodiment, the cancer is human cancer.

According to a further aspect of the present invention, there is provided a compound, or a pharmaceutically acceptable salt, hydrate or solvate thereof, as defined herein for use in the inhibition of BCL6 activity.

According to a further aspect of the present invention, there is provided a compound, or a pharmaceutically acceptable salt, hydrate or solvate thereof, as defined herein for use in the treatment of a disease or disorder in which BCL6 activity is implicated (such as cancer, HIV, sepsis, graft-versus-host disease, non-alcoholic fatty liver disease, non-alcoholic steatohepatitis or auto-immune diseases).

According to a further aspect of the present invention, there is provided the use of a compound, or a pharmaceutically acceptable salt, hydrate or solvate thereof, as defined herein in the manufacture of a medicament for the treatment of a proliferative condition.

Suitably, the proliferative disorder is cancer, suitably a human cancer (for example haematological cancers such as lymphomas (including diffuse large B-cell lymphoma (DLBCL), follicular lymphoma (FL), Burkitt lymphoma (BL) and angioimmunoblastic T-cell lymphoma (AITL)), leukaemias (including acute lymphoblastic leukaemia (ALL), acute myeloid leukaemia (AML) and chronic myeloid leukaemia (CML)) and multiple myeloma, and solid tumours (including glioma, breast cancer, non-small cell lung cancer (NSCLC) and squamous cell carcinomas (SCC) (including SCC of the head and neck, oesophagus, lung and ovary)).

According to a further aspect of the present invention, there is provided the use of a compound, or a pharmaceutically acceptable salt, hydrate or solvate thereof, as defined herein in the manufacture of a medicament for the treatment of cancer.

According to a further aspect of the present invention, there is provided a use of a compound, or a pharmaceutically acceptable salt, hydrate or solvate thereof, as defined herein in the manufacture of a medicament for the inhibition of BCL6 activity.

According to a further aspect of the present invention, there is provided a use of a compound, or a pharmaceutically acceptable salt, hydrate or solvate thereof, as defined herein in the manufacture of a medicament for the treatment of a disease or disorder in which BCL6 activity is implicated.

According to a further aspect of the present invention, there is provided a process for preparing a compound, or a pharmaceutically acceptable salt, hydrate or solvate thereof, as defined herein.

According to a further aspect of the present invention, there is provided a compound, or a pharmaceutically acceptable salt, hydrate or solvate thereof, obtainable by, or obtained by, or directly obtained by a process of preparing a compound as defined herein.

According to a further aspect of the present invention, there are provided novel intermediates as defined herein which are suitable for use in any one of the synthetic methods set out herein.

DETAILED DESCRIPTION OF THE INVENTION

Definitions

Unless otherwise stated, the following terms used in the specification and claims have the following meanings set out below.

It is to be appreciated that references to "treating" or "treatment" include prophylaxis as well as the alleviation of established symptoms of a condition. "Treating" or "treatment" of a state, disorder or condition therefore includes: (1) preventing or delaying the appearance of clinical symptoms of the state, disorder or condition developing in a human that may be afflicted with or predisposed to the state, disorder or condition but does not yet experience or display clinical or subclinical symptoms of the state, disorder or condition, (2) inhibiting the state, disorder or condition, i.e., arresting, reducing or delaying the development of the disease or a relapse thereof (in case of maintenance treatment) or at least one clinical or subclinical symptom thereof, or (3) relieving or attenuating the disease, i.e., causing regression of the state, disorder or condition or at least one of its clinical or subclinical symptoms.

A "therapeutically effective amount" means the amount of a compound that, when administered to a mammal for treating a disease, is sufficient to effect such treatment for the disease. The "therapeutically effective amount" will vary depending on the compound, the disease and its severity and the age, weight, etc., of the mammal to be treated.

Compounds of the Invention

In one aspect, the present invention relates to compounds, or pharmaceutically acceptable salts, hydrates or solvates thereof, selected from the following compounds:

(S)-10-((5-chloro-2-(3,3-difluoroazetidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 1a);

(S)-10-((5-chloro-2-(4-cyclopropyl-3-oxopiperazin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 1b);

(S)-10-((5-chloro-2-((S)-3,4-dimethyl-5-oxopiperazin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 1c);

(S)-10-((5-chloro-2-((2-hydroxy-2-methylpropyl)amino)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 1d);

(S)-10-((2-((1R,4R)-2-oxa-5-azabicyclo[2.2.1]heptan-5-yl)-5-chloropyrimidin-4-yl)amino)-2-cyclopropyl-3,3-difluoro-7-methyl-1,2,3,4-tetrahydro-[1,4]oxazepino[2,3-c]quinolin-6(7H)-one (Example 1e);

N-((3S,5R)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)-5-methylpiperidin-3-yl)acetamide (Example 1f);

N-((3R,5S)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)-5-methylpiperidin-3-yl)acetamide (Example 1g);

(S)-10-((5-chloro-2-((3S,5R)-3-(dimethylamino)-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 1h);

(S)-10-((5-chloro-2-((S)-3-hydroxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 1i);

(S)-10-((5-chloro-2-((R)-3-hydroxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 1j);

(S)-10-((5-chloro-2-((S)-3-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 1k);

(S)-10-((5-chloro-2-((R)-3-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 1l);

(S)-10-((5-chloro-2-(3-fluoro-3-methylazetidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 1m);

(S)-10-((5-chloro-2-(3-hydroxy-3-methylazetidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 1n);

(S)-2-cyclopropyl-3,3-difluoro-10-((5-fluoro-2-((3R,5S)-3-hydroxy-5-methylpiperidin-1-yl)pyrimidin-4-yl)amino)-7-methyl-1,2,3,4-tetrahydro-[1,4]oxazepino[2,3-c]quinolin-6(7H)-one (Example 2a);

(S)-2-cyclopropyl-10-((2-(4,4-difluoropiperidin-1-yl)-5-fluoropyrimidin-4-yl)amino)-3,3-difluoro-7-methyl-1,2,3,4-tetrahydro-[1,4]oxazepino[2,3-c]quinolin-6(7H)-one (Example 2b);

(S)-10-((2-(3-oxa-8-azabicyclo[3.2.1]octan-8-yl)-5-chloropyrimidin-4-yl)amino)-2-cyclopropyl-3,3-difluoro-7-

(methyl-d3)-1,2,3,4-tetrahydro-[1,4]oxazepino[2,3-c][1,8]naphthyridin-6(7H)-one (Example 3a);

(S)-10-((5-chloro-2-(3-methyl-1,2,4-oxadiazol-5-yl)pyridin-4-yl)amino)-2-cyclopropyl-3,3-difluoro-7-methyl-1,2,3,4-tetrahydro-[1,4]oxazepino[2,3-c]quinolin-6(7H)-one (Example 4a);

(S)-10-((3-chloro-2-fluoropyridin-4-yl)amino)-2-cyclopropyl-3,3-difluoro-7-methyl-1,2,3,4-tetrahydro-[1,4]oxazepino[2,3-c]quinolin-6(7H)-one (Example 4b);

(S)-2-cyclopropyl-10-((2,3-dichloropyridin-4-yl)amino)-3,3-difluoro-7-methyl-1,2,3,4-tetrahydro-[1,4]oxazepino[2,3-c]quinolin-6(7H)-one (Example 4c);

(S)-10-((2-chloro-3-fluoropyridin-4-yl)amino)-2-cyclopropyl-3,3-difluoro-7-methyl-1,2,3,4-tetrahydro-[1,4]oxazepino[2,3-c]quinolin-6(7H)-one (Example 4d);

(S)-10-((3-chloro-2-methylpyridin-4-yl)amino)-2-cyclopropyl-3,3-difluoro-7-methyl-1,2,3,4-tetrahydro-[1,4]oxazepino[2,3-c]quinolin-6(7H)-one (Example 4e);

(S)-2-cyclopropyl-3,3-difluoro-10-((5-fluoro-2-((1R,5S,7R)-7-hydroxy-3-oxa-9-azabicyclo[3.3.1]nonan-9-yl)pyrimidin-4-yl)amino)-7-methyl-1,2,3,4-tetrahydro-[1,4]oxazepino[2,3-c]quinolin-6(7H)-one (Example 5a);

(S)-10-((5-chloropyrimidin-4-yl)amino)-2-cyclopropyl-3,3-difluoro-7-methyl-1,2,3,4-tetrahydro-[1,4]oxazepino[2,3-c]quinolin-6(7H)-one (Example 6a);

(2S)-10-((2-(3-acetyl-3,8-diazabicyclo[3.2.1]octan-8-yl)-5-chloropyrimidin-4-yl)amino)-2-cyclopropyl-3,3-difluoro-7-methyl-1,2,3,4-tetrahydro-[1,4]oxazepino[2,3-c]quinolin-6(7H)-one (Example 7a);

(2S)-10-((2-(8-acetyl-3,8-diazabicyclo[3.2.1]octan-3-yl)-5-chloropyrimidin-4-yl)amino)-2-cyclopropyl-3,3-difluoro-7-methyl-1,2,3,4-tetrahydro-[1,4]oxazepino[2,3-c]quinolin-6(7H)-one (Example 7b);

(S)-10-((5-chloro-2-(dimethylamino)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 8a);

(S)-10-((5-chloro-2-((3S,5R)-3-fluoro-5-hydroxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9a);

(S)-10-((5-chloro-2-((3R,5S)-3-fluoro-5-hydroxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9a);

(S)-10-((5-chloro-2-((S)-3-((dimethylamino)methyl)piperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9b);

(3R,5S)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)-N-ethyl-5-methylpiperidine-3-carboxamide (Example 9c);

(3S,5R)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)-N-ethyl-5-methylpiperidine-3-carboxamide (Example 9c);

(S)-10-((5-chloro-2-((3R,5S)-3-(hydroxymethyl)-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9d);

(S)-10-((5-chloro-2-((3S,5R)-3-(hydroxymethyl)-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9d);

(S)-10-((5-chloro-2-((R)-4,4-difluoro-3-hydroxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9e);

(S)-10-((5-chloro-2-((S)-4,4-difluoro-3-hydroxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9e);

(S)-10-((5-chloro-2-((R)-3-(fluoromethyl)piperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9f);

(S)-10-((5-chloro-2-((S)-3-(fluoromethyl)piperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9f);

2-((R)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)piperidin-3-yl)acetamide (Example 9g);

2-((S)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)piperidin-3-yl)acetamide (Example 9g);

(S)-10-((5-chloro-2-((S)-3-(dimethylamino)piperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9h);

(S)-10-((5-chloro-2-((R)-3-(dimethylamino)piperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9i);

(R)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)-N-ethyl-4,4-difluoropiperidine-3-carboxamide (Example 9j);

(S)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)-N-ethyl-4,4-difluoropiperidine-3-carboxamide (Example 9j);

N-(((R)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)-4,4-difluoropiperidin-3-yl)methyl)-N-ethylacetamide (Example 9k);

N-(((S)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)-4,4-difluoropiperidin-3-yl)methyl)-N-ethylacetamide (Example 9k);

(S)-10-((5-chloro-2-((1R,4R)-5,5-difluoro-2-azabicyclo[2.2.1]heptan-2-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9l);

(S)-10-((5-chloro-2-((1S,4S)-5,5-difluoro-2-azabicyclo[2.2.1]heptan-2-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9l);

N-((R)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)-4,4-difluoropiperidin-3-yl)-N-methylacetamide (Example 9m);

N-((S)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)-4,4-difluoropiperidin-3-yl)-N-methylacetamide (Example 9n);

(S)-10-((5-chloro-2-(4-fluoro-4-(hydroxymethyl)piperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9o);

(S)-10-((5-chloro-2-((R)-3-(hydroxymethyl)piperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9p);

(S)-10-((5-chloro-2-((S)-3-(hydroxymethyl)piperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9q);

(S)-10-((5-chloro-2-((1S,5R)-3-ethyl-2-oxo-3,8-diazabicyclo[3.2.1]octan-8-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9r);

(S)-10-((5-chloro-2-((1R,5S)-3-ethyl-2-oxo-3,8-diazabicyclo[3.2.1]octan-8-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9r);

(S)-10-((5-chloro-2-((3S,5R)-3,5-difluoropiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9s);

(S)-10-((2-(6-acetyl-2,6-diazaspiro[3.3]heptan-2-yl)-5-chloropyrimidin-4-yl)amino)-2-cyclopropyl-3,3-difluoro-7-methyl-1,2,3,4-tetrahydro-[1,4]oxazepino[2,3-c]quinolin-6(7H)-one (Example 9t);

(S)-10-((5-chloro-2-((2-hydroxy-2-methylpropyl)(methyl)amino)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9u);

(S)-10-((5-chloro-2-((3-hydroxy-3-methylbutyl)(methyl)amino)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9v);

(S)-10-((5-chloro-2-(6-(cyclopropylmethyl)-2,6-diazaspiro[3.3]heptan-2-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9w);

(2S)-10-((5-chloro-2-(6-((2,2-difluorocyclopropyl)methyl)-2,6-diazaspiro[3.3]heptan-2-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9x);

(2S)-10-((5-chloro-2-(8-(cyclopropylmethyl)-3,8-diazabicyclo[3.2.1]octan-3-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9y);

(2S)-10-((5-chloro-2-(8-((2,2-difluorocyclopropyl)methyl)-3,8-diazabicyclo[3.2.1]octan-3-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9za);

(S)-10-((5-chloro-2-((3R,5R)-3-hydroxy-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9zb);

(S)-10-((5-chloro-2-((3S,4R)-3,4-difluoropiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 10a);

(S)-10-((5-chloro-2-((3R,4S)-3,4-difluoropiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 10a);

(S)-10-((5-chloro-2-((3S,4S)-3,4-difluoropiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 10b);

(S)-10-((5-chloro-2-((3R,4R)-3,4-difluoropiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 10b);

(S)-10-((5-chloro-2-((R)-3-methoxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 10c);

(S)-10-((5-chloro-2-((S)-3-methoxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 10c);

(S)-10-((5-fluoro-2-((3S,4R)-3,4-difluoropiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 10d);

(S)-10-((5-fluoro-2-((3R,4S)-3,4-difluoropiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 10d);

(2S)-10-[[5-chloro-2-(4-methyl-1,4-diazepan-1-yl)pyrimidin-4-yl]amino]-2-cyclopropyl-3,3-difluoro-7-methyl-2,4-dihydro-1H-[1,4]oxazepino[2,3-c]quinolin-6-one (Example 11a);

(S)-10-((5-chloro-2-((R)-3-ethylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11b);

(S)-10-((5-chloro-2-((S)-3-ethylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11b);

(S)-10-((5-chloro-2-((R)-3-methylazepan-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11c);

(S)-10-((5-chloro-2-((S)-3-methylazepan-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11c);

(S)-10-((5-chloro-2-((R)-4-methylazepan-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11d);

(S)-10-((5-chloro-2-((S)-4-methylazepan-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11d);

(S)-10-((5-chloro-2-((3R,5S)-3,5-dihydroxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11e);

(S)-10-((5-chloro-2-((1R,5R)-1-(hydroxymethyl)-5-methyl-3-azabicyclo[3.1.0]hexan-3-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11f);

(S)-10-((5-chloro-2-((1S,5S)-1-(hydroxymethyl)-5-methyl-3-azabicyclo[3.1.0]hexan-3-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11f);

(S)-10-((5-chloro-2-((3R,5R)-3-fluoro-5-hydroxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11g);

(S)-10-((5-chloro-2-((3S,5S)-3-fluoro-5-hydroxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11g);

(S)-10-((5-chloro-2-((R)-7-hydroxy-5-azaspiro[2.5]octan-5-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11h);

(S)-10-((5-chloro-2-((S)-7-hydroxy-5-azaspiro[2.5]octan-5-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11h);

(S)-10-((5-chloro-2-(methyl(propyl)amino)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11i);

(S)-10-((5-chloro-2-((3R,4S)-3-(hydroxymethyl)-4-methylpyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11j);

(S)-10-((5-chloro-2-((3S,4R)-3-(hydroxymethyl)-4-methylpyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11j);

(S)-10-((5-chloro-2-((2-hydroxyethyl)(propyl)amino)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11k);

(S)-10-((5-chloro-2-(5-azaspiro[2.5]octan-5-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11l);

(S)-10-((5-chloro-2-(((R)-3-methoxy-2-methylpropyl)amino)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11m);

(S)-10-((5-chloro-2-(((S)-3-methoxy-2-methylpropyl)amino)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11m);

(S)-10-((5-chloro-2-(3,3-dimethylazetidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11n);

(S)-10-((5-chloro-2-(3-methylazetidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11o);

(S)-1-(5-chloro-4-((2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)azetidine-3-carbonitrile (Example 11p);

(S)-10-((5-chloro-2-(3-fluoroazetidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11q);

(S)-10-((5-chloro-2-((R)-3-(difluoromethyl)piperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11r);

(S)-10-((5-chloro-2-((S)-3-(difluoromethyl)piperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11r);

(S)-1-(5-chloro-4-((2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)-3-methylazetidine-3-carbonitrile (Example 11s);

(S)-2-(1-(5-chloro-4-((2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)azetidin-3-yl)acetonitrile (Example 11t);

(S)-10-((5-chloro-2-(3-(difluoromethyl)azetidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11u);

(S)-10-((2-(azetidin-1-yl)-5-chloropyrimidin-4-yl)amino)-2-cyclopropyl-3,3-difluoro-7-methyl-1,2,3,4-tetrahydro-[1,4]oxazepino[2,3-c]quinolin-6(7H)-one (Example 11v);

(S)-10-((5-chloro-2-(3-methoxyazetidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11w);

(S)-10-((5-chloro-2-(3-methoxy-3-methylazetidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11x);

(S)-10-((5-chloro-2-((R)-3-ethylpyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11y);

(S)-10-((5-chloro-2-((S)-3-ethylpyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11y);

(S)-10-((5-chloro-2-((R)-3-fluoro-3-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11z);

(S)-10-((5-chloro-2-((S)-3-fluoro-3-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11z);

(S)-10-((5-chloro-2-((R)-3-hydroxy-3-methylpyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12a);

(S)-10-((5-chloro-2-((S)-3-hydroxy-3-methylpyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12a);

(S)-10-((2-((3S,5R)-3-amino-5-methylpiperidin-1-yl)-5-chloropyrimidin-4-yl)amino)-2-cyclopropyl-3,3-difluoro-7-methyl-1,2,3,4-tetrahydro-[1,4]oxazepino[2,3-c]quinolin-6(7H)-one (Example 12b);

(S)-10-((2-((3R,5S)-3-amino-5-methylpiperidin-1-yl)-5-chloropyrimidin-4-yl)amino)-2-cyclopropyl-3,3-difluoro-7-methyl-1,2,3,4-tetrahydro-[1,4]oxazepino[2,3-c]quinolin-6(7H)-one (Example 12c);

(2S)-10-((2-(6-oxa-3-azabicyclo[3.1.1]heptan-3-yl)-5-chloropyrimidin-4-yl)amino)-2-cyclopropyl-3,3-difluoro-7-methyl-1,2,3,4-tetrahydro-[1,4]oxazepino[2,3-c]quinolin-6(7H)-one (Example 12d);

(S)-10-((5-chloro-2-((R)-3,3-difluoro-5-hydroxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12e);

(S)-10-((5-chloro-2-((S)-3,3-difluoro-5-hydroxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12e);

(S)-10-((5-chloro-2-((R)-2-methylthiomorpholino)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12f);

(S)-10-((5-chloro-2-((S)-2-methylthiomorpholino)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12f);

(S)-10-((5-chloro-2-((R)-4,6-dimethyl-1,4-diazepan-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12g);

(S)-10-((5-chloro-2-((S)-4,6-dimethyl-1,4-diazepan-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12g);

(S)-10-((5-chloro-2-((S)-hexahydropyrrolo[1,2-a]pyrazin-2(1H)-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12h);

(S)-10-((5-chloro-2-((R)-hexahydropyrrolo[1,2-a]pyrazin-2(1H)-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12h);

(S)-10-((5-chloro-2-((R)-6-oxohexahydropyrrolo[1,2-a]pyrazin-2(1H)-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12i);

(S)-10-((5-chloro-2-((S)-6-oxohexahydropyrrolo[1,2-a]pyrazin-2(1H)-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12i);

(S)-10-((5-chloro-2-((R)-8-hydroxy-6-azaspiro[3.5]nonan-6-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12j);

(S)-10-((5-chloro-2-((S)-8-hydroxy-6-azaspiro[3.5]nonan-6-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12j);

(S)-10-((5-chloro-2-((3R,5S)-3-hydroxy-5-methylpiperidin-1-yl)pyridin-4-yl)amino)-2-cyclopropyl-3,3-difluoro-7-methyl-1,2,3,4-tetrahydro-[1,4]oxazepino[2,3-c]quinolin-6(7H)-one (Example 13a);

((S)-10-((5-chloro-2-(4,4-difluoropiperidin-1-yl)pyridin-4-yl)amino)-2-cyclopropyl-3,3-difluoro-7-methyl-1,2,3,4-tetrahydro-[1,4]oxazepino[2,3-c]quinolin-6(7H)-one (Example 13b);

(S)-10-((5-chloro-2-((S)-4,4-difluoro-3-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 14a);

(S)-10-((5-chloro-2-((R)-4,4-difluoro-3-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 14a);

(S)-10-((5-chloro-2-((R)-4,4-difluoro-3-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 14b);

(S)-10-((5-chloro-2-((S)-4,4-difluoro-3-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 14b);

(S)-10-((5-chloro-2-((S)-3-methylpyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x01);

(S)-10-((5-chloro-2-((R)-3-methylpyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x02);

(S)-10-((5-chloro-2-((3R,5S)-3-fluoro-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x03);

(S)-10-((5-chloro-2-((3S,5R)-3-fluoro-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x04);

(S)-10-((5-chloro-2-((3R,5S)-3-methoxy-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x05);

(2S)-10-((5-chloro-2-(2,6-dimethylthiomorpholino)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x06);

(2S)-10-((5-chloro-2-(3,4-dimethylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x07);

(2S)-10-((5-chloro-2-(2,3-dimethylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x08);

(2S)-10-((5-chloro-2-(2,6-dimethyl-1-oxidothiomorpholino)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x09);

(S)-10-((5-chloro-2-((2R,5S)-2-(hydroxymethyl)-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x10);

(2S)-10-((5-chloro-2-(2,6-dimethyl-1,1-dioxidothiomorpholino)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x11);

(2S)-10-((5-chloro-2-(2,5-dimethylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x12);

(S)-10-((5-chloro-2-((3S,5S)-3-hydroxy-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x13);

(2S)-10-((5-chloro-2-(6-hydroxy-1,4-diazepan-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x14);

(2S)-10-((5-chloro-2-(6-hydroxy-4-methyl-1,4-diazepan-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x15);

(2S)-10-((5-chloro-2-(6-hydroxy-4-(methyl-$d_3$)-1,4-diazepan-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x15-d3);

(2S)-10-((2-(3-(2-(azetidin-1-yl)-2-oxoethyl)-5-methylpiperidin-1-yl)-5-chloropyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x16);

(2S)-10-((2-((3S,5R)-3-(2-(azetidin-1-yl)-2-oxoethyl)-5-methylpiperidin-1-yl)-5-chloropyrimidin-4-yl)amino)-2- cyclopropyl-3,3-difluoro-7-methyl-1,2,3,4-tetrahydro-[1,4]oxazepino[2,3-c]quinolin-6(7H)-one (Example 12x16a/b);

(2S)-10-((2-((3R,5S)-3-(2-(azetidin-1-yl)-2-oxoethyl)-5-methylpiperidin-1-yl)-5-chloropyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x16a/b);

(2S)-10-((5-chloro-2-(3-(2-(3,3-difluoroazetidin-1-yl)-2-oxoethyl)-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x17);

(2S)-10-((5-chloro-2-((3R,5S)-3-(2-(3,3-difluoroazetidin-1-yl)-2-oxoethyl)-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x17a/b);

(2S)-10-((5-chloro-2-((3S,5R)-3-(2-(3,3-difluoroazetidin-1-yl)-2-oxoethyl)-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x17a/b);

(2S)-10-((2-(3-(azetidine-1-carbonyl)-4,4-difluoropiperidin-1-yl)-5-chloropyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x18);

(2S)-10-((5-chloro-2-(3-(3,3-difluoroazetidine-1-carbonyl)-4,4-difluoropiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x19);

(2S)-10-((5-chloro-2-(3-(2-(3,3-difluoroazetidin-1-yl)-2-oxoethyl)-4,4-difluoropiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x20);

(2S)-10-((2-(3-(2-(azetidin-1-yl)-2-oxoethyl)-4,4-difluoropiperidin-1-yl)-5-chloropyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x21);

(2S)-10-((5-chloro-2-(3-ethynylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x22);

1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)piperidine-3-carbonitrile (Example 12x23);

(S)-10-((5-chloro-2-((4,4-difluorocyclohexyl)amino)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x24);

(2S)-10-((2-(2-azabicyclo[4.1.0]heptan-2-yl)-5-chloropyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x25);

(2S)-10-((5-chloro-2-(3-(difluoromethyl)piperazin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x26);

(2S)-10-((5-chloro-2-(3-methyl-5-oxopiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x27);

(S)-10-((5-chloro-2-((3R,5S)-3-(2-(dimethylamino)ethoxy)-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x28);

(S)-10-((5-chloro-2-((3R,5S)-3-(3-(dimethylamino)propoxy)-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x29);

(2S)-10-((2-(3-(azetidine-1-carbonyl)-5-methylpiperidin-1-yl)-5-chloropyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x30);

(2S)-10-((5-chloro-2-(3-(3,3-difluoroazetidine-1-carbonyl)-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x31);

(S)-10-((5-chloro-2-(3-(hydroxymethyl)azetidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x32);

(2S)-10-((5-chloro-2-(2-(hydroxymethyl)azetidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x33);

(S)-10-((5-chloro-2-((S)-2-(hydroxymethyl)azetidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x33a);

(S)-10-((5-chloro-2-((R)-2-(hydroxymethyl)azetidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x33b);

(2S)-10-((5-chloro-2-(2-(fluoromethyl)azetidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x34);

(S)-10-((5-chloro-2-(3-(fluoromethyl)azetidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x35);

(2S)-10-((5-chloro-2-(2-methylazetidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x36);

(2S)-10-((5-chloro-2-(4,4-difluoro-3-methoxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x37);

(S)-1-(5-chloro-4-((2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)piperidine-4-carbonitrile (Example 12x38);

1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)-5-fluoro-N,N-dimethylpiperidine-3-carboxamide (Example 12x39);

(2S)-10-((5-chloro-2-(3-fluoropiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x40);

(2S)-10-((5-chloro-2-(4,4-difluoro-3-hydroxy-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x41);

(S)-10-((5-chloro-2-(4-fluoropiperidin-1-yl)pyrimidin-4-yl) amino)-2-cyclopropyl-3,3-difluoro-7-methyl-1,2,3,4-tetrahydro-[1,4]oxazepino[2,3-c]quinolin-6(7H)-one (Example 12x42);

(S)-10-((5-chloro-2-((S)-2-(hydroxymethyl)pyrrolidin-1-yl) pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x44);

(2S)-10-((5-chloro-2-(2-(methoxymethyl) pyrrolidin-1-yl) pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x45);

(S)-10-((5-chloro-2-((S)-2-(methoxymethyl) pyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x45a);

(S)-10-((5-chloro-2-((R)-2-(methoxymethyl) pyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x45b);

(2S)-10-((5-chloro-2-(2-(hydroxymethyl)-3-methylpiperidin-1-yl)pyrimidin-4-yl)amino)-2-cyclopropyl-3,3-difluoro-7-methyl-1,2,3,4-tetrahydro-[1,4]oxazepino[2,3-c] quinolin-6(7H)-one (Example 12x46);

(S)-10-((5-chloro-2-((S)-4,4-difluoro-2-(hydroxymethyl) pyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x47);

(2S)-10-((5-chloro-2-(4-fluoro-2-(hydroxymethyl)pyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x48);

(S)-10-((5-chloro-2-((2S,4S)-4-fluoro-2-(hydroxymethyl) pyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x48a);

(S)-10-((5-chloro-2-((2S,4R)-4-fluoro-2-(hydroxymethyl) pyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x48b);

(2S)-10-((5-chloro-2-(2-(hydroxymethyl)-3-methylpyrrolidin-1-yl)pyrimidin-4-yl)amino)-2-cyclopropyl-3,3-difluoro-7-methyl-1,2,3,4-tetrahydro-[1,4]oxazepino[2,3-c] quinolin-6(7H)-one (Example 12x49);

(2S)-10-((5-chloro-2-(4,4-difluoro-2-(hydroxymethyl)piperidin-1-yl)pyrimidin-4-yl)amino)-2-cyclopropyl-3,3-difluoro-7-methyl-1,2,3,4-tetrahydro-[1,4]oxazepino[2,3-c] quinolin-6(7H)-one (Example 12x50);

(2S)-2-cyclopropyl-10-((2-(4,4-difluoro-3,5-dimethylpiperidin-1-yl)-5-fluoropyrimidin-4-yl)amino)-3,3-difluoro-7-methyl-1,2,3,4-tetrahydro-[1,4]oxazepino[2,3-c]quinolin-6(7H)-one (Example 13p01);

(2S)-2-cyclopropyl-10-((2-(4,4-difluoro-3-methylpiperidin-1-yl)-5-fluoropyrimidin-4-yl)amino)-3,3-difluoro-7-methyl-1,2,3,4-tetrahydro-[1,4]oxazepino[2,3-c]quinolin-6(7H)-one (Example 13p02);

(S)-2-cyclopropyl-3,3-difluoro-10-((5-fluoro-2-morpholinopyrimidin-4-yl)amino)-7-methyl-1,2,3,4-tetrahydro-[1,4]oxazepino[2,3-c]quinolin-6(7H)-one (Example 13p06);

(S)-2-cyclopropyl-3,3-difluoro-10-((5-fluoro-2-((R)-2-methylmorpholino)pyrimidin-4-yl)amino)-7-methyl-1,2,3,4-tetrahydro-[1,4]oxazepino[2,3-c]quinolin-6(7H)-one (Example 13p07);

(S)-2-cyclopropyl-3,3-difluoro-10-((5-fluoro-2-((S)-2-methylmorpholino)pyrimidin-4-yl)amino)-7-methyl-1,2,3,4-tetrahydro-[1,4]oxazepino[2,3-c]quinolin-6(7H)-one (Example 13p08);

(2S)-10-((2-(6-oxa-3-azabicyclo[3.1.1]heptan-3-yl)-5-fluoropyrimidin-4-yl)amino)-2-cyclopropyl-3,3-difluoro-7-methyl-1,2,3,4-tetrahydro-[1,4]oxazepino[2,3-c]quinolin-6(7H)-one (Example 13p09);

(S)-10-((2-((1R,5S)-8-oxa-3-azabicyclo[3.2.1]octan-3-yl)-5-fluoropyrimidin-4-yl)amino)-2-cyclopropyl-3,3-difluoro-7-methyl-1,2,3,4-tetrahydro-[1,4]oxazepino[2,3-c]quinolin-6(7H)-one (Example 13p11);

(S)-2-cyclopropyl-10-((2-(dimethylamino)-5-fluoropyrimidin-4-yl)amino)-3,3-difluoro-7-methyl-1,2,3,4-tetrahydro-[1,4]oxazepino[2,3-c]quinolin-6(7H)-one (Example 13p12);

(2S)-2-cyclopropyl-10-((2-(4,4-difluoro-3-(hydroxymethyl) piperidin-1-yl)-5-fluoropyrimidin-4-yl)amino)-3,3-difluoro-7-methyl-1,2,3,4-tetrahydro-[1,4]oxazepino[2,3-c] quinolin-6(7H)-one (Example 13p13);

(2S)-2-cyclopropyl-10-((2-(4,4-difluoro-3,5-dimethylpiperidin-1-yl)-5-chloropyridin-4-yl)amino)-3,3-difluoro-7-methyl-1,2,3,4-tetrahydro-[1,4]oxazepino[2,3-c]quinolin-6(7H)-one (Example 13c01);

(2S)-2-cyclopropyl-10-((2-(4,4-difluoro-3-methylpiperidin-1-yl)-5-chloropyridin-4-yl)amino)-3,3-difluoro-7-methyl-1,2,3,4-tetrahydro-[1,4]oxazepino[2,3-c]quinolin-6(7H)-one (Example 13c02);

(2S)-2-cyclopropyl-10-((2-(3,4-difluoropiperidin-1-yl)-5-chloropyridin-4-yl)amino)-3,3-difluoro-7-methyl-1,2,3,4-tetrahydro-[1,4]oxazepino[2,3-c]quinolin-6(7H)-one (Example 13c03);

(S)-2-cyclopropyl-3,3-difluoro-10-((5-chloro-2-morpholinopyridin-4-yl)amino)-7-methyl-1,2,3,4-tetrahydro-[1,4]oxazepino[2,3-c]quinolin-6(7H)-one (Example 13c06);

(S)-2-cyclopropyl-3,3-difluoro-10-((5-chloro-2-((R)-2-methylmorpholino)pyridin-4-yl)amino)-7-methyl-1,2,3,4-tetrahydro-[1,4]oxazepino[2,3-c]quinolin-6(7H)-one (Example 13c07);

(S)-2-cyclopropyl-3,3-difluoro-10-((5-chloro-2-((S)-methylmorpholino)pyridin-4-yl)amino)-7-methyl-1,2,3,4-tetrahydro-[1,4]oxazepino[2,3-c]quinolin-6(7H)-one (Example 13c08);

(2S)-10-((2-(6-oxa-3-azabicyclo[3.1.1]heptan-3-yl)-5-chloropyridin-4-yl)amino)-2-cyclopropyl-3,3-difluoro-7-methyl-1,2,3,4-tetrahydro-[1,4]oxazepino[2,3-c]quinolin-6(7H)-one (Example 13c09);

(S)-10-((2-((1R,5S)-3-oxa-8-azabicyclo[3.2.1]octan-8-yl)-5-chloropyridin-4-yl)amino)-2-cyclopropyl-3,3-difluoro-7-methyl-1,2,3,4-tetrahydro-[1,4]oxazepino[2,3-c]quinolin-6(7H)-one (Example 13c10);

(S)-10-((2-((1R,5S)-8-oxa-3-azabicyclo[3.2.1]octan-3-yl)-5-chloropyridin-4-yl)amino)-2-cyclopropyl-3,3-difluoro-7-methyl-1,2,3,4-tetrahydro-[1,4]oxazepino[2,3-c]quinolin-6(7H)-one (Example 13c11);

(S)-2-cyclopropyl-10-((2-(dimethylamino)-5-chloropyridin-4-yl)amino)-3,3-difluoro-7-methyl-1,2,3,4-tetrahydro-[1,4]oxazepino[2,3-c]quinolin-6(7H)-one (Example 13c12);

(2S)-2-cyclopropyl-10-((2-(4,4-difluoro-3-(hydroxymethyl) piperidin-1-yl)-5-chloropyridin-4-yl)amino)-3,3-difluoro-7-methyl-1,2,3,4-tetrahydro-[1,4]oxazepino[2,3-c] quinolin-6(7H)-one (Example 13c13);

(2S)-2-cyclopropyl-10-((2-(4,4-difluoro-3,5-dimethylpiperidin-1-yl)-5-fluoropyridin-4-yl)amino)-3,3-difluoro-7-methyl-1,2,3,4-tetrahydro-[1,4]oxazepino[2,3-c]quinolin-6(7H)-one (Example 13f01);

(2S)-2-cyclopropyl-10-((2-(4,4-difluoro-3-methylpiperidin-1-yl)-5-fluoropyridin-4-yl)amino)-3,3-difluoro-7-methyl-1,2,3,4-tetrahydro-[1,4]oxazepino[2,3-c]quinolin-6(7H)-one (Example 13f02);

(2S)-2-cyclopropyl-10-((2-(3,4-difluoropiperidin-1-yl)-5-fluoropyridin-4-yl)amino)-3,3-difluoro-7-methyl-1,2,3,4-tetrahydro-[1,4]oxazepino[2,3-c]quinolin-6(7H)-one (Example 13f03);

(S)-2-cyclopropyl-10-((2-(4,4-difluoropiperidin-1-yl)-5-fluoropyridin-4-yl)amino)-3,3-difluoro-7-methyl-1,2,3,4-tetrahydro-[1,4]oxazepino[2,3-c]quinolin-6(7H)-one (Example 13f04);

(S)-2-cyclopropyl-3,3-difluoro-10-((5-fluoro-2-((3R,5S)-3-hydroxy-5-methylpiperidin-1-yl)pyridin-4-yl)amino)-7-methyl-1,2,3,4-tetrahydro-[1,4]oxazepino[2,3-c]quinolin-6(7H)-one (Example 13f05);

(S)-2-cyclopropyl-3,3-difluoro-10-((5-fluoro-2-morpholinopyridin-4-yl)amino)-7-methyl-1,2,3,4-tetrahydro-[1,4]oxazepino[2,3-c]quinolin-6(7H)-one (Example 13f06);

(S)-2-cyclopropyl-3,3-difluoro-10-((5-fluoro-2-((R)-2-methylmorpholino)pyridin-4-yl)amino)-7-methyl-1,2,3,4-tetrahydro-[1,4]oxazepino[2,3-c]quinolin-6(7H)-one (Example 13f07);

(S)-2-cyclopropyl-3,3-difluoro-10-((5-fluoro-2-((S)-2-methylmorpholino)pyridin-4-yl)amino)-7-methyl-1,2,3,4-tetrahydro-[1,4]oxazepino[2,3-c]quinolin-6(7H)-one (Example 13f08);

(2S)-10-((2-(6-oxa-3-azabicyclo[3.1.1]heptan-3-yl)-5-fluoropyridin-4-yl)amino)-2-cyclopropyl-3,3-difluoro-7-methyl-1,2,3,4-tetrahydro-[1,4]oxazepino[2,3-c]quinolin-6(7H)-one (Example 13f09);

(S)-10-((2-((1R,5S)-3-oxa-8-azabicyclo[3.2.1]octan-8-yl)-5-fluoropyridin-4-yl)amino)-2-cyclopropyl-3,3-difluoro-7-methyl-1,2,3,4-tetrahydro-[1,4]oxazepino[2,3-c]quinolin-6(7H)-one (Example 13f10);

(S)-10-((2-((1R,5S)-8-oxa-3-azabicyclo[3.2.1]octan-3-yl)-5-fluoropyridin-4-yl)amino)-2-cyclopropyl-3,3-difluoro-7-methyl-1,2,3,4-tetrahydro-[1,4]oxazepino[2,3-c]quinolin-6(7H)-one (Example 13f11);

(S)-2-cyclopropyl-10-((2-(dimethylamino)-5-fluoropyridin-4-yl)amino)-3,3-difluoro-7-methyl-1,2,3,4-tetrahydro-[1,4]oxazepino[2,3-c]quinolin-6(7H)-one (Example 13f12); and (2S)-2-cyclopropyl-10-((2-(4,4-difluoro-3-(hydroxymethyl)piperidin-1-yl)-5-fluoropyridin-4-yl)amino)-3,3-difluoro-7-methyl-1,2,3,4-tetrahydro-[1,4]oxazepino[2,3-c]quinolin-6(7H)-one (Example 13f13).

Particular compounds of the present invention include any of the following compounds, or a pharmaceutically acceptable salt or solvate thereof:

(S)-10-((5-chloro-2-(3,3-difluoroazetidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 1a);

(S)-10-((5-chloro-2-(4-cyclopropyl-3-oxopiperazin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 1b);

(S)-10-((5-chloro-2-((S)-3,4-dimethyl-5-oxopiperazin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 1c);

(S)-10-((5-chloro-2-((2-hydroxy-2-methylpropyl)amino)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 1d);

(S)-10-((2-((1R,4R)-2-oxa-5-azabicyclo[2.2.1]heptan-5-yl)-5-chloropyrimidin-4-yl)amino)-2-cyclopropyl-3,3-difluoro-7-methyl-1,2,3,4-tetrahydro-[1,4]oxazepino[2,3-c]quinolin-6(7H)-one (Example 1e);

N-((3S,5R)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)-5-methylpiperidin-3-yl)acetamide (Example 1f);

N-((3R,5S)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)-5-methylpiperidin-3-yl)acetamide (Example 1g);

(S)-10-((5-chloro-2-((3S,5R)-3-(dimethylamino)-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 1h);

(S)-10-((5-chloro-2-((S)-3-hydroxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 1i);

(S)-10-((5-chloro-2-((R)-3-hydroxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 1j);

(S)-10-((5-chloro-2-((S)-3-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 1k);

(S)-10-((5-chloro-2-((R)-3-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 1l);

(S)-10-((5-chloro-2-(3-fluoro-3-methylazetidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 1m);

(S)-10-((5-chloro-2-(3-hydroxy-3-methylazetidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 1n);

(S)-2-cyclopropyl-3,3-difluoro-10-((5-fluoro-2-((3R,5S)-3-hydroxy-5-methylpiperidin-1-yl)pyrimidin-4-yl)amino)-7-methyl-1,2,3,4-tetrahydro-[1,4]oxazepino[2,3-c]quinolin-6(7H)-one (Example 2a);

(S)-2-cyclopropyl-10-((2-(4,4-difluoropiperidin-1-yl)-5-fluoropyrimidin-4-yl)amino)-3,3-difluoro-7-methyl-1,2,3,4-tetrahydro-[1,4]oxazepino[2,3-c]quinolin-6(7H)-one (Example 2b);

(S)-10-((2-(3-oxa-8-azabicyclo[3.2.1]octan-8-yl)-5-chloropyrimidin-4-yl)amino)-2-cyclopropyl-3,3-difluoro-7-(methyl-d3)-1,2,3,4-tetrahydro-[1,4]oxazepino[2,3-c][1,8]naphthyridin-6(7H)-one (Example 3a);

(S)-10-((5-chloro-2-(3-methyl-1,2,4-oxadiazol-5-yl)pyridin-4-yl)amino)-2-cyclopropyl-3,3-difluoro-7-methyl-1,2,3,4-tetrahydro-[1,4]oxazepino[2,3-c]quinolin-6(7H)-one (Example 4a);

(S)-10-((3-chloro-2-fluoropyridin-4-yl)amino)-2-cyclopropyl-3,3-difluoro-7-methyl-1,2,3,4-tetrahydro-[1,4]oxazepino[2,3-c]quinolin-6(7H)-one (Example 4b);

(S)-2-cyclopropyl-10-((2,3-dichloropyridin-4-yl)amino)-3,3-difluoro-7-methyl-1,2,3,4-tetrahydro-[1,4]oxazepino[2,3-c]quinolin-6(7H)-one (Example 4c);

(S)-10-((2-chloro-3-fluoropyridin-4-yl)amino)-2-cyclopropyl-3,3-difluoro-7-methyl-1,2,3,4-tetrahydro-[1,4]oxazepino[2,3-c]quinolin-6(7H)-one (Example 4d);

(S)-10-((3-chloro-2-methylpyridin-4-yl)amino)-2-cyclopropyl-3,3-difluoro-7-methyl-1,2,3,4-tetrahydro-[1,4]oxazepino[2,3-c]quinolin-6(7H)-one (Example 4e);

(S)-2-cyclopropyl-3,3-difluoro-10-((5-fluoro-2-((1R,5S,7R)-7-hydroxy-3-oxa-9-azabicyclo[3.3.1]nonan-9-yl)pyrimidin-4-yl)amino)-7-methyl-1,2,3,4-tetrahydro-[1,4]oxazepino[2,3-c]quinolin-6(7H)-one (Example 5a);

(S)-10-((5-chloropyrimidin-4-yl)amino)-2-cyclopropyl-3,3-difluoro-7-methyl-1,2,3,4-tetrahydro-[1,4]oxazepino[2,3-c]quinolin-6(7H)-one (Example 6a);

(2S)-10-((2-(3-acetyl-3,8-diazabicyclo[3.2.1]octan-8-yl)-5-chloropyrimidin-4-yl)amino)-2-cyclopropyl-3,3-difluoro-7-methyl-1,2,3,4-tetrahydro-[1,4]oxazepino[2,3-c]quinolin-6(7H)-one (Example 7a);

(2S)-10-((2-(8-acetyl-3,8-diazabicyclo[3.2.1]octan-3-yl)-5-chloropyrimidin-4-yl)amino)-2-cyclopropyl-3,3-difluoro-7-methyl-1,2,3,4-tetrahydro-[1,4]oxazepino[2,3-c]quinolin-6(7H)-one (Example 7b);

(S)-10-((5-chloro-2-(dimethylamino)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 8a);

(S)-10-((5-chloro-2-((3S,5R)-3-fluoro-5-hydroxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9a);

(S)-10-((5-chloro-2-((3R,5S)-3-fluoro-5-hydroxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9a);

(S)-10-((5-chloro-2-((S)-3-((dimethylamino)methyl)piperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9b);

(3R,5S)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)-N-ethyl-5-methylpiperidine-3-carboxamide (Example 9c);

(3S,5R)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)-N-ethyl-5-methylpiperidine-3-carboxamide (Example 9c);

(S)-10-((5-chloro-2-((3R,5S)-3-(hydroxymethyl)-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9d);

(S)-10-((5-chloro-2-((3S,5R)-3-(hydroxymethyl)-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9d);

(S)-10-((5-chloro-2-((R)-4,4-difluoro-3-hydroxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9e);

(S)-10-((5-chloro-2-((S)-4,4-difluoro-3-hydroxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9e);

(S)-10-((5-chloro-2-((R)-3-(fluoromethyl)piperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9f);

(S)-10-((5-chloro-2-((S)-3-(fluoromethyl)piperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9f);

2-((R)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)piperidin-3-yl)acetamide (Example 9g);

2-((S)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)piperidin-3-yl)acetamide (Example 9g);

(S)-10-((5-chloro-2-((S)-3-(dimethylamino)piperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9h);

(S)-10-((5-chloro-2-((R)-3-(dimethylamino)piperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9i);

(R)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)-N-ethyl-4,4-difluoropiperidine-3-carboxamide (Example 9j);

(S)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)-N-ethyl-4,4-difluoropiperidine-3-carboxamide (Example 9j);

N-(((R)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)-4,4-difluoropiperidin-3-yl)methyl)-N-ethylacetamide (Example 9k);

N-(((S)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)-4,4-difluoropiperidin-3-yl)methyl)-N-ethylacetamide (Example 9k);

(S)-10-((5-chloro-2-((1R,4R)-5,5-difluoro-2-azabicyclo[2.2.1]heptan-2-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9l);

(S)-10-((5-chloro-2-((1S,4S)-5,5-difluoro-2-azabicyclo[2.2.1]heptan-2-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9l);

N-((R)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)-4,4-difluoropiperidin-3-yl)-N-methylacetamide (Example 9m);

N-((S)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)-4,4-difluoropiperidin-3-yl)-N-methylacetamide (Example 9n);

(S)-10-((5-chloro-2-(4-fluoro-4-(hydroxymethyl)piperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9o);

(S)-10-((5-chloro-2-((R)-3-(hydroxymethyl)piperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9p);

(S)-10-((5-chloro-2-((S)-3-(hydroxymethyl)piperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9q);

(S)-10-((5-chloro-2-((1S,5R)-3-ethyl-2-oxo-3,8-diazabicyclo[3.2.1]octan-8-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9r);

(S)-10-((5-chloro-2-((1R,5S)-3-ethyl-2-oxo-3,8-diazabicyclo[3.2.1]octan-8-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9r);
(S)-10-((5-chloro-2-((3S,5R)-3,5-difluoropiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9s);
(S)-10-((2-(6-acetyl-2,6-diazaspiro[3.3]heptan-2-yl)-5-chloropyrimidin-4-yl)amino)-2-cyclopropyl-3,3-difluoro-7-methyl-1,2,3,4-tetrahydro-[1,4]oxazepino[2,3-c]quinolin-6(7H)-one (Example 9t);
(S)-10-((5-chloro-2-((2-hydroxy-2-methylpropyl)(methyl)amino)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9u);
(S)-10-((5-chloro-2-((3-hydroxy-3-methylbutyl)(methyl)amino)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9v);
(S)-10-((5-chloro-2-(6-(cyclopropylmethyl)-2,6-diazaspiro[3.3]heptan-2-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9w);
(2S)-10-((5-chloro-2-(6-((2,2-difluorocyclopropyl)methyl)-2,6-diazaspiro[3.3]heptan-2-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9x);
(2S)-10-((5-chloro-2-(8-(cyclopropylmethyl)-3,8-diazabicyclo[3.2.1]octan-3-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9y);
(2S)-10-((5-chloro-2-(8-((2,2-difluorocyclopropyl)methyl)-3,8-diazabicyclo[3.2.1]octan-3-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9za);
(S)-10-((5-chloro-2-((3R,5R)-3-hydroxy-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9zb);
(S)-10-((5-chloro-2-((3S,4R)-3,4-difluoropiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 10a);
(S)-10-((5-chloro-2-((3R,4S)-3,4-difluoropiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 10a);
(S)-10-((5-chloro-2-((3S,4S)-3,4-difluoropiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 10b);
(S)-10-((5-chloro-2-((3R,4R)-3,4-difluoropiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 10b);
(S)-10-((5-chloro-2-((R)-3-methoxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 10c);
(S)-10-((5-chloro-2-((S)-3-methoxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 10c);
(S)-10-((5-fluoro-2-((3S,4R)-3,4-difluoropiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 10d);
(S)-10-((5-fluoro-2-((3R,4S)-3,4-difluoropiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 10d);
(2S)-10-[[5-chloro-2-(4-methyl-1,4-diazepan-1-yl)pyrimidin-4-yl]amino]-2-cyclopropyl-3,3-difluoro-7-methyl-2,4-dihydro-1H-[1,4]oxazepino[2,3-c]quinolin-6-one (Example 11a);
(S)-10-((5-chloro-2-((R)-3-ethylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11b);
(S)-10-((5-chloro-2-((S)-3-ethylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11b);
(S)-10-((5-chloro-2-((R)-3-methylazepan-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11c);
(S)-10-((5-chloro-2-((S)-3-methylazepan-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11c);
(S)-10-((5-chloro-2-((R)-4-methylazepan-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11d);
(S)-10-((5-chloro-2-((S)-4-methylazepan-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11d);
(S)-10-((5-chloro-2-((3R,5S)-3,5-dihydroxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11e);
(S)-10-((5-chloro-2-((1R,5R)-1-(hydroxymethyl)-5-methyl-3-azabicyclo[3.1.0]hexan-3-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11f);
(S)-10-((5-chloro-2-((1S,5S)-1-(hydroxymethyl)-5-methyl-3-azabicyclo[3.1.0]hexan-3-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11f);
(S)-10-((5-chloro-2-((3R,5R)-3-fluoro-5-hydroxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11g);
(S)-10-((5-chloro-2-((3S,5S)-3-fluoro-5-hydroxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11g);
(S)-10-((5-chloro-2-((R)-7-hydroxy-5-azaspiro[2.5]octan-5-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11h);
(S)-10-((5-chloro-2-((S)-7-hydroxy-5-azaspiro[2.5]octan-5-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11h);
(S)-10-((5-chloro-2-(methyl(propyl)amino)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11i);
(S)-10-((5-chloro-2-((3R,4S)-3-(hydroxymethyl)-4-methylpyrrolidin-1-yl)pyrimidin-4-yl)amino)-2-cyclopropyl- 3,3-difluoro-7-methyl-1,2,3,4-tetrahydro-[1,4]oxazepino [2,3-c]quinolin-6(7H)-one (Example 11j);

(S)-10-((5-chloro-2-((3S,4R)-3-(hydroxymethyl)-4-methylpyrrolidin-1-yl)pyrimidin-4-yl)amino)-2-cyclopropyl-3,3-difluoro-7-methyl-1,2,3,4-tetrahydro-[1,4]oxazepino [2,3-c]quinolin-6(7H)-one (Example 11j);

(S)-10-((5-chloro-2-((2-hydroxyethyl)(propyl)amino)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11k);

(S)-10-((5-chloro-2-(5-azaspiro[2.5]octan-5-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11l);

(S)-10-((5-chloro-2-(((R)-3-methoxy-2-methylpropyl) amino)pyrimidin-4-yl)amino)-2-cyclopropyl-3,3-difluoro-7-methyl-1,2,3,4-tetrahydro-[1,4]oxazepino[2,3-c] quinolin-6(7H)-one (Example 11m);

(S)-10-((5-chloro-2-(((S)-3-methoxy-2-methylpropyl) amino)pyrimidin-4-yl)amino)-2-cyclopropyl-3,3-difluoro-7-methyl-1,2,3,4-tetrahydro-[1,4]oxazepino[2,3-c] quinolin-6(7H)-one (Example 11m);

(S)-10-((5-chloro-2-(3,3-dimethylazetidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11n);

(S)-10-((5-chloro-2-(3-methylazetidin-1-yl)pyrimidin-4-yl) amino)-2-cyclopropyl-3,3-difluoro-7-methyl-1,2,3,4-tetrahydro-[1,4]oxazepino[2,3-c]quinolin-6(7H)-one (Example 11o);

(S)-1-(5-chloro-4-((2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)azetidine-3-carbonitrile (Example 11p);

(S)-10-((5-chloro-2-(3-fluoroazetidin-1-yl)pyrimidin-4-yl) amino)-2-cyclopropyl-3,3-difluoro-7-methyl-1,2,3,4-tetrahydro-[1,4]oxazepino[2,3-c]quinolin-6(7H)-one (Example 11q);

(S)-10-((5-chloro-2-((R)-3-(difluoromethyl)piperidin-1-yl) pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11r);

(S)-10-((5-chloro-2-((S)-3-(difluoromethyl)piperidin-1-yl) pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11r);

(S)-1-(5-chloro-4-((2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)-3-methylazetidine-3-carbonitrile (Example 11s);

(S)-2-(1-(5-chloro-4-((2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)azetidin-3-yl)acetonitrile (Example 11t);

(S)-10-((5-chloro-2-(3-(difluoromethyl)azetidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11u);

(S)-10-((2-(azetidin-1-yl)-5-chloropyrimidin-4-yl)amino)-2-cyclopropyl-3,3-difluoro-7-methyl-1,2,3,4-tetrahydro-[1,4]oxazepino[2,3-c]quinolin-6(7H)-one (Example 11v);

(S)-10-((5-chloro-2-(3-methoxyazetidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11w);

(S)-10-((5-chloro-2-(3-methoxy-3-methylazetidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11x);

(S)-10-((5-chloro-2-((R)-3-ethylpyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11y);

(S)-10-((5-chloro-2-((S)-3-ethylpyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11y);

(S)-10-((5-chloro-2-((R)-3-fluoro-3-methylpiperidin-1-yl) pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11z);

(S)-10-((5-chloro-2-((S)-3-fluoro-3-methylpiperidin-1-yl) pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11z);

(S)-10-((5-chloro-2-((R)-3-hydroxy-3-methylpyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12a);

(S)-10-((5-chloro-2-((S)-3-hydroxy-3-methylpyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12a);

(S)-10-((2-((3S,5R)-3-amino-5-methylpiperidin-1-yl)-5-chloropyrimidin-4-yl)amino)-2-cyclopropyl-3,3-difluoro-7-methyl-1,2,3,4-tetrahydro-[1,4]oxazepino[2,3-c] quinolin-6(7H)-one (Example 12b);

(S)-10-((2-((3R,5S)-3-amino-5-methylpiperidin-1-yl)-5-chloropyrimidin-4-yl)amino)-2-cyclopropyl-3,3-difluoro-7-methyl-1,2,3,4-tetrahydro-[1,4]oxazepino[2,3-c] quinolin-6(7H)-one (Example 12c);

(2S)-10-((2-(6-oxa-3-azabicyclo[3.1.1]heptan-3-yl)-5-chloropyrimidin-4-yl)amino)-2-cyclopropyl-3,3-difluoro-7-methyl-1,2,3,4-tetrahydro-[1,4]oxazepino[2,3-c]quinolin-6(7H)-one (Example 12d);

(S)-10-((5-chloro-2-((R)-3,3-difluoro-5-hydroxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12e);

(S)-10-((5-chloro-2-((S)-3,3-difluoro-5-hydroxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12e);

(S)-10-((5-chloro-2-((R)-2-methylthiomorpholino)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12f);

(S)-10-((5-chloro-2-((S)-2-methylthiomorpholino)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12f);

(S)-10-((5-chloro-2-((R)-4,6-dimethyl-1,4-diazepan-1-yl) pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12g);

(S)-10-((5-chloro-2-((S)-4,6-dimethyl-1,4-diazepan-1-yl) pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12g);

(S)-10-((5-chloro-2-((S)-hexahydropyrrolo[1,2-a]pyrazin-2 (1H)-yl)pyrimidin-4-yl)amino)-2-cyclopropyl-3,3-difluoro-7-methyl-1,2,3,4-tetrahydro-[1,4]oxazepino[2,3-c] quinolin-6(7H)-one (Example 12h);

(S)-10-((5-chloro-2-((R)-hexahydropyrrolo[1,2-a]pyrazin-2(1H)-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12h);

(S)-10-((5-chloro-2-((R)-6-oxohexahydropyrrolo[1,2-a]pyrazin-2(1H)-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12i);

(S)-10-((5-chloro-2-((S)-6-oxohexahydropyrrolo[1,2-a]pyrazin-2(1H)-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12i);

(S)-10-((5-chloro-2-((R)-8-hydroxy-6-azaspiro[3.5]nonan-6-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12j);

(S)-10-((5-chloro-2-((S)-8-hydroxy-6-azaspiro[3.5]nonan-6-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12j);

(S)-10-((5-chloro-2-((3R,5S)-3-hydroxy-5-methylpiperidin-1-yl)pyridin-4-yl)amino)-2-cyclopropyl-3,3-difluoro-7-methyl-1,2,3,4-tetrahydro-[1,4]oxazepino[2,3-c]quinolin-6(7H)-one (Example 13a);

((S)-10-((5-chloro-2-(4,4-difluoropiperidin-1-yl)pyridin-4-yl)amino)-2-cyclopropyl-3,3-difluoro-7-methyl-1,2,3,4-tetrahydro-[1,4]oxazepino[2,3-c]quinolin-6(7H)-one (Example 13b);

(S)-10-((5-chloro-2-((S)-4,4-difluoro-3-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 14a);

(S)-10-((5-chloro-2-((R)-4,4-difluoro-3-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 14a);

(S)-10-((5-chloro-2-((R)-4,4-difluoro-3-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 14b);

(S)-10-((5-chloro-2-((S)-4,4-difluoro-3-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 14b);

(S)-10-((5-chloro-2-((S)-3-methylpyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x01);

(S)-10-((5-chloro-2-((R)-3-methylpyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x02);

(S)-10-((5-chloro-2-((3R,5S)-3-fluoro-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x03);

(S)-10-((5-chloro-2-((3R,5S)-3-methoxy-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x05);

(2S)-10-((5-chloro-2-(2,6-dimethylthiomorpholino)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x06);

(2S)-10-((5-chloro-2-(3,4-dimethylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x07);

(2S)-10-((5-chloro-2-(2,3-dimethylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x08);

(2S)-10-((5-chloro-2-(2,6-dimethyl-1-oxidothiomorpholino)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x09);

(S)-10-((5-chloro-2-((2R,5S)-2-(hydroxymethyl)-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x10);

(2S)-10-((5-chloro-2-(2,6-dimethyl-1,1-dioxidothiomorpholino)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x11);

(2S)-10-((5-chloro-2-(2,5-dimethylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x12);

(S)-10-((5-chloro-2-((3S,5S)-3-hydroxy-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x13);

(2S)-10-((5-chloro-2-(6-hydroxy-1,4-diazepan-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x14);

(2S)-10-((5-chloro-2-(6-hydroxy-4-(methyl-$d_3$)-1,4-diazepan-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x15-d3);

(2S)-10-((2-(3-(2-(azetidin-1-yl)-2-oxoethyl)-5-methylpiperidin-1-yl)-5-chloropyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x16);

(2S)-10-((2-((3S,5R)-3-(2-(azetidin-1-yl)-2-oxoethyl)-5-methylpiperidin-1-yl)-5-chloropyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x16a/b);

(2S)-10-((2-((3R,5S)-3-(2-(azetidin-1-yl)-2-oxoethyl)-5-methylpiperidin-1-yl)-5-chloropyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x16a/b);

(2S)-10-((5-chloro-2-(3-(2-(3,3-difluoroazetidin-1-yl)-2-oxoethyl)-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x17);

(2S)-10-((5-chloro-2-((3R,5S)-3-(2-(3,3-difluoroazetidin-1-yl)-2-oxoethyl)-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x17a/b);

(2S)-10-((5-chloro-2-((3S,5R)-3-(2-(3,3-difluoroazetidin-1-yl)-2-oxoethyl)-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x17a/b);

(2S)-10-((2-(3-(azetidine-1-carbonyl)-4,4-difluoropiperidin-1-yl)-5-chloropyrimidin-4-yl)amino)-2-cyclopropyl- 3,3-difluoro-7-methyl-1,2,3,4-tetrahydro-[1,4]oxazepino[2,3-c]quinolin-6(7H)-one (Example 12x18);

(2S)-10-((5-chloro-2-(3-(3,3-difluoroazetidine-1-carbonyl)-4,4-difluoropiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x19);

(2S)-10-((5-chloro-2-(3-(2-(3,3-difluoroazetidin-1-yl)-2-oxoethyl)-4,4-difluoropiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x20);

(2S)-10-((2-(3-(2-(azetidin-1-yl)-2-oxoethyl)-4,4-difluoropiperidin-1-yl)-5-chloropyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x21);

(2S)-10-((5-chloro-2-(3-ethynylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x22);

1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)piperidine-3-carbonitrile (Example 12x23);

(S)-10-((5-chloro-2-((4,4-difluorocyclohexyl)amino)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x24);

(2S)-10-((2-(2-azabicyclo[4.1.0]heptan-2-yl)-5-chloropyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x25);

(2S)-10-((5-chloro-2-(3-(difluoromethyl)piperazin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x26);

(S)-10-((5-chloro-2-((3R,5S)-3-(2-(dimethylamino)ethoxy)-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x28);

(2S)-10-((2-(3-(azetidine-1-carbonyl)-5-methylpiperidin-1-yl)-5-chloropyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x30);

(2S)-10-((5-chloro-2-(3-(3,3-difluoroazetidine-1-carbonyl)-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x31);

(S)-10-((5-chloro-2-(3-(hydroxymethyl)azetidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x32);

(2S)-10-((5-chloro-2-(2-(hydroxymethyl)azetidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x33);

(S)-10-((5-chloro-2-((S)-2-(hydroxymethyl)azetidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x33a);

(S)-10-((5-chloro-2-((R)-2-(hydroxymethyl)azetidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x33b);

(S)-10-((5-chloro-2-(3-(fluoromethyl)azetidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x35);

(2S)-10-((5-chloro-2-(2-methylazetidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x36);

(S)-1-(5-chloro-4-((2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)piperidine-4-carbonitrile (Example 12x38);

1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)-5-fluoro-N,N-dimethylpiperidine-3-carboxamide (Example 12x39);

(2S)-10-((5-chloro-2-(3-fluoropiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x40);

(S)-10-((5-chloro-2-(4-fluoropiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x42);

(S)-10-((5-chloro-2-((S)-2-(hydroxymethyl)pyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x44);

(2S)-10-((5-chloro-2-(2-(methoxymethyl)pyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x45);

(S)-10-((5-chloro-2-((S)-2-(methoxymethyl)pyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x45a);

(S)-10-((5-chloro-2-((R)-2-(methoxymethyl)pyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x45b);

(2S)-10-((5-chloro-2-(2-(hydroxymethyl)-3-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x46);

(S)-10-((5-chloro-2-((S)-4,4-difluoro-2-(hydroxymethyl)pyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x47);

(2S)-10-((5-chloro-2-(4-fluoro-2-(hydroxymethyl)pyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x48);

(S)-10-((5-chloro-2-((2S,4S)-4-fluoro-2-(hydroxymethyl)pyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x48a);

(S)-10-((5-chloro-2-((2S,4R)-4-fluoro-2-(hydroxymethyl)pyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x48b);

(2S)-10-((5-chloro-2-(2-(hydroxymethyl)-3-methylpyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x49);

(2S)-10-((5-chloro-2-(4,4-difluoro-2-(hydroxymethyl)piperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x50);
(2S)-2-cyclopropyl-10-((2-(4,4-difluoro-3,5-dimethylpiperidin-1-yl)-5-fluoropyrimidin-4-yl)amino)-3,3-difluoro-7-methyl-1,2,3,4-tetrahydro-[1,4]oxazepino[2,3-c]quinolin-6(7H)-one (Example 13p01);
(S)-2-cyclopropyl-3,3-difluoro-10-((5-fluoro-2-morpholinopyrimidin-4-yl)amino)-7-methyl-1,2,3,4-tetrahydro-[1,4]oxazepino[2,3-c]quinolin-6(7H)-one (Example 13p06);
(S)-2-cyclopropyl-3,3-difluoro-10-((5-fluoro-2-((S)-2-methylmorpholino)pyrimidin-4-yl)amino)-7-methyl-1,2,3,4-tetrahydro-[1,4]oxazepino[2,3-c]quinolin-6(7H)-one (Example 13p08);
(S)-10-((2-((1R,5S)-8-oxa-3-azabicyclo[3.2.1]octan-3-yl)-5-fluoropyrimidin-4-yl)amino)-2-cyclopropyl-3,3-difluoro-7-methyl-1,2,3,4-tetrahydro-[1,4]oxazepino[2,3-c]quinolin-6(7H)-one (Example 13p11);
(S)-2-cyclopropyl-10-((2-(dimethylamino)-5-fluoropyrimidin-4-yl)amino)-3,3-difluoro-7-methyl-1,2,3,4-tetrahydro-[1,4]oxazepino[2,3-c]quinolin-6(7H)-one (Example 13p12);
(S)-2-cyclopropyl-3,3-difluoro-10-((5-chloro-2-morpholinopyridin-4-yl)amino)-7-methyl-1,2,3,4-tetrahydro-[1,4]oxazepino[2,3-c]quinolin-6(7H)-one (Example 13c06);
(S)-2-cyclopropyl-3,3-difluoro-10-((5-chloro-2-((S)-methylmorpholino)pyridin-4-yl)amino)-7-methyl-1,2,3,4-tetrahydro-[1,4]oxazepino[2,3-c]quinolin-6(7H)-one (Example 13c08);
(S)-2-cyclopropyl-10-((2-(dimethylamino)-5-chloropyridin-4-yl)amino)-3,3-difluoro-7-methyl-1,2,3,4-tetrahydro-[1,4]oxazepino[2,3-c]quinolin-6(7H)-one (Example 13c12);
(S)-2-cyclopropyl-10-((2-(4,4-difluoropiperidin-1-yl)-5-fluoropyridin-4-yl)amino)-3,3-difluoro-7-methyl-1,2,3,4-tetrahydro-[1,4]oxazepino[2,3-c]quinolin-6(7H)-one (Example 13f04); and
(S)-2-cyclopropyl-3,3-difluoro-10-((5-fluoro-2-((3R,5S)-3-hydroxy-5-methylpiperidin-1-yl)pyridin-4-yl)amino)-7-methyl-1,2,3,4-tetrahydro-[1,4]oxazepino[2,3-c]quinolin-6(7H)-one (Example 13f05).

Particular compounds of the present invention include any of the following compounds, or a pharmaceutically acceptable salt or solvate thereof:
(S)-10-((5-chloro-2-(4-cyclopropyl-3-oxopiperazin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 1b);
(S)-10-((5-chloro-2-((S)-3,4-dimethyl-5-oxopiperazin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 1c);
(S)-10-((5-chloro-2-((2-hydroxy-2-methylpropyl)amino)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 1d);
(S)-10-((2-((1R,4R)-2-oxa-5-azabicyclo[2.2.1]heptan-5-yl)-5-chloropyrimidin-4-yl)amino)-2-cyclopropyl-3,3-difluoro-7-methyl-1,2,3,4-tetrahydro-[1,4]oxazepino[2,3-c]quinolin-6(7H)-one (Example 1e);
N-((3S,5R)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)-5-methylpiperidin-3-yl)acetamide (Example 1f);
N-((3R,5S)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)-5-methylpiperidin-3-yl)acetamide (Example 1g);
(S)-10-((5-chloro-2-((3S,5R)-3-(dimethylamino)-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 1h);
(S)-10-((5-chloro-2-((S)-3-hydroxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 1i);
(S)-10-((5-chloro-2-((R)-3-hydroxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 1j);
(S)-10-((5-chloro-2-(3-fluoro-3-methylazetidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 1m);
(S)-2-cyclopropyl-3,3-difluoro-10-((5-fluoro-2-((3R,5S)-3-hydroxy-5-methylpiperidin-1-yl)pyrimidin-4-yl)amino)-7-methyl-1,2,3,4-tetrahydro-[1,4]oxazepino[2,3-c]quinolin-6(7H)-one (Example 2a);
(S)-10-((2-(3-oxa-8-azabicyclo[3.2.1]octan-8-yl)-5-chloropyrimidin-4-yl)amino)-2-cyclopropyl-3,3-difluoro-7-(methyl-d3)-1,2,3,4-tetrahydro-[1,4]oxazepino[2,3-c][1,8]naphthyridin-6(7H)-one (Example 3a);
(S)-10-((5-chloro-2-(3-methyl-1,2,4-oxadiazol-5-yl)pyridin-4-yl)amino)-2-cyclopropyl-3,3-difluoro-7-methyl-1,2,3,4-tetrahydro-[1,4]oxazepino[2,3-c]quinolin-6(7H)-one (Example 4a);
(S)-10-((3-chloro-2-fluoropyridin-4-yl)amino)-2-cyclopropyl-3,3-difluoro-7-methyl-1,2,3,4-tetrahydro-[1,4]oxazepino[2,3-c]quinolin-6(7H)-one (Example 4b);
(S)-2-cyclopropyl-3,3-difluoro-10-((5-fluoro-2-((1R,5S,7R)-7-hydroxy-3-oxa-9-azabicyclo[3.3.1]nonan-9-yl)pyrimidin-4-yl)amino)-7-methyl-1,2,3,4-tetrahydro-[1,4]oxazepino[2,3-c]quinolin-6(7H)-one (Example 5a);
(2S)-10-((2-(3-acetyl-3,8-diazabicyclo[3.2.1]octan-8-yl)-5-chloropyrimidin-4-yl)amino)-2-cyclopropyl-3,3-difluoro-7-methyl-1,2,3,4-tetrahydro-[1,4]oxazepino[2,3-c]quinolin-6(7H)-one (Example 7a);
(2S)-10-((2-(8-acetyl-3,8-diazabicyclo[3.2.1]octan-3-yl)-5-chloropyrimidin-4-yl)amino)-2-cyclopropyl-3,3-difluoro-7-methyl-1,2,3,4-tetrahydro-[1,4]oxazepino[2,3-c]quinolin-6(7H)-one (Example 7b);
(S)-10-((5-chloro-2-((3S,5R)-3-fluoro-5-hydroxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9a);
(S)-10-((5-chloro-2-((3R,5S)-3-fluoro-5-hydroxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9a);
(S)-10-((5-chloro-2-((S)-3-((dimethylamino)methyl)piperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9b);
(3R,5S)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)-N-ethyl-5-methylpiperidine-3-carboxamide (Example 9c);
(3S,5R)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)-N-ethyl-5-methylpiperidine-3-carboxamide (Example 9c);
(S)-10-((5-chloro-2-((3R,5S)-3-(hydroxymethyl)-5-methylpiperidin-1-yl)pyrimidin-4-yl)amino)-2-cyclopropyl-3, 3-difluoro-7-methyl-1,2,3,4-tetrahydro-[1,4]oxazepino[2,3-c]quinolin-6(7H)-one (Example 9d);

(S)-10-((5-chloro-2-((3S,5R)-3-(hydroxymethyl)-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9d);

(S)-10-((5-chloro-2-((R)-4,4-difluoro-3-hydroxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9e);

(S)-10-((5-chloro-2-((S)-4,4-difluoro-3-hydroxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9e);

2-((R)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)piperidin-3-yl)acetamide (Example 9g);

2-((S)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)piperidin-3-yl)acetamide (Example 9g);

(S)-10-((5-chloro-2-((S)-3-(dimethylamino)piperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9h);

(S)-10-((5-chloro-2-((R)-3-(dimethylamino)piperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9i);

(R)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)-N-ethyl-4,4-difluoropiperidine-3-carboxamide (Example 9j);

(S)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)-N-ethyl-4,4-difluoropiperidine-3-carboxamide (Example 9j);

N-(((R)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)-4,4-difluoropiperidin-3-yl)methyl)-N-ethylacetamide (Example 9k);

N-(((S)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)-4,4-difluoropiperidin-3-yl)methyl)-N-ethylacetamide (Example 9k);

N-((R)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)-4,4-difluoropiperidin-3-yl)-N-methylacetamide (Example 9m);

N-((S)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)-4,4-difluoropiperidin-3-yl)-N-methylacetamide (Example 9n);

(S)-10-((5-chloro-2-(4-fluoro-4-(hydroxymethyl)piperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9o);

(S)-10-((5-chloro-2-((R)-3-(hydroxymethyl)piperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9p);

(S)-10-((5-chloro-2-((S)-3-(hydroxymethyl)piperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9q);

(S)-10-((5-chloro-2-((1S,5R)-3-ethyl-2-oxo-3,8-diazabicyclo[3.2.1]octan-8-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9r);

(S)-10-((5-chloro-2-((1R,5S)-3-ethyl-2-oxo-3,8-diazabicyclo[3.2.1]octan-8-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9r);

(S)-10-((2-(6-acetyl-2,6-diazaspiro[3.3]heptan-2-yl)-5-chloropyrimidin-4-yl)amino)-2-cyclopropyl-3,3-difluoro-7-methyl-1,2,3,4-tetrahydro-[1,4]oxazepino[2,3-c]quinolin-6(7H)-one (Example 9t);

(S)-10-((5-chloro-2-((2-hydroxy-2-methylpropyl)(methyl)amino)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9u);

(S)-10-((5-chloro-2-((3-hydroxy-3-methylbutyl)(methyl)amino)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9v);

(S)-10-((5-chloro-2-(6-(cyclopropylmethyl)-2,6-diazaspiro[3.3]heptan-2-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9w);

(2S)-10-((5-chloro-2-(6-((2,2-difluorocyclopropyl)methyl)-2,6-diazaspiro[3.3]heptan-2-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9x);

(2S)-10-((5-chloro-2-(8-(cyclopropylmethyl)-3,8-diazabicyclo[3.2.1]octan-3-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9y);

(2S)-10-((5-chloro-2-(8-((2,2-difluorocyclopropyl)methyl)-3,8-diazabicyclo[3.2.1]octan-3-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9za);

(S)-10-((5-chloro-2-((3R,5R)-3-hydroxy-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9zb);

(S)-10-((5-chloro-2-((R)-3-methoxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 10c);

(S)-10-((5-chloro-2-((S)-3-methoxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 10c);

(S)-10-((5-chloro-2-((3R,5S)-3,5-dihydroxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11e);

(S)-10-((5-chloro-2-((1R,5R)-1-(hydroxymethyl)-5-methyl-3-azabicyclo[3.1.0]hexan-3-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11f);

(S)-10-((5-chloro-2-((1S,5S)-1-(hydroxymethyl)-5-methyl-3-azabicyclo[3.1.0]hexan-3-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11f);

(S)-10-((5-chloro-2-((3R,5R)-3-fluoro-5-hydroxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11g);

(S)-10-((5-chloro-2-((3S,5S)-3-fluoro-5-hydroxypiperidin-1-yl)pyrimidin-4-yl)amino)-2-cyclopropyl-3,3-difluoro- 7-methyl-1,2,3,4-tetrahydro-[1,4]oxazepino[2,3-c]quinolin-6(7H)-one (Example 11g);

(S)-10-((5-chloro-2-((R)-7-hydroxy-5-azaspiro[2.5]octan-5-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11h);

(S)-10-((5-chloro-2-((S)-7-hydroxy-5-azaspiro[2.5]octan-5-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11h);

(S)-10-((5-chloro-2-((3R,4S)-3-(hydroxymethyl)-4-methylpyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11j);

(S)-10-((5-chloro-2-((3S,4R)-3-(hydroxymethyl)-4-methylpyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11j);

(S)-10-((5-chloro-2-((2-hydroxyethyl)(propyl)amino)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11k);

(S)-10-((5-chloro-2-(((R)-3-methoxy-2-methylpropyl)amino)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11m);

(S)-10-((5-chloro-2-(((S)-3-methoxy-2-methylpropyl)amino)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11m);

(S)-10-((5-chloro-2-(3-methylazetidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11O);

(S)-1-(5-chloro-4-((2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)azetidine-3-carbonitrile (Example 11p);

(S)-10-((5-chloro-2-(3-fluoroazetidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11q);

(S)-1-(5-chloro-4-((2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)-3-methylazetidine-3-carbonitrile (Example 11s);

(S)-2-(1-(5-chloro-4-((2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)azetidin-3-yl)acetonitrile (Example 11t);

(S)-10-((2-(azetidin-1-yl)-5-chloropyrimidin-4-yl)amino)-2-cyclopropyl-3,3-difluoro-7-methyl-1,2,3,4-tetrahydro-[1,4]oxazepino[2,3-c]quinolin-6(7H)-one (Example 11v);

(S)-10-((5-chloro-2-(3-methoxyazetidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11w);

(S)-10-((5-chloro-2-(3-methoxy-3-methylazetidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11x);

(S)-10-((5-chloro-2-((R)-3-hydroxy-3-methylpyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12a);

(S)-10-((5-chloro-2-((S)-3-hydroxy-3-methylpyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12a);

(S)-10-((2-((3S,5R)-3-amino-5-methylpiperidin-1-yl)-5-chloropyrimidin-4-yl)amino)-2-cyclopropyl-3,3-difluoro-7-methyl-1,2,3,4-tetrahydro-[1,4]oxazepino[2,3-c]quinolin-6(7H)-one (Example 12b);

(S)-10-((2-((3R,5S)-3-amino-5-methylpiperidin-1-yl)-5-chloropyrimidin-4-yl)amino)-2-cyclopropyl-3,3-difluoro-7-methyl-1,2,3,4-tetrahydro-[1,4]oxazepino[2,3-c]quinolin-6(7H)-one (Example 12c);

(2S)-10-((2-(6-oxa-3-azabicyclo[3.1.1]heptan-3-yl)-5-chloropyrimidin-4-yl)amino)-2-cyclopropyl-3,3-difluoro-7-methyl-1,2,3,4-tetrahydro-[1,4]oxazepino[2,3-c]quinolin-6(7H)-one (Example 12d);

(S)-10-((5-chloro-2-((R)-3,3-difluoro-5-hydroxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12e);

(S)-10-((5-chloro-2-((S)-3,3-difluoro-5-hydroxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12e);

(S)-10-((5-chloro-2-((R)-2-methylthiomorpholino)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12f);

(S)-10-((5-chloro-2-((S)-2-methylthiomorpholino)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12f);

(S)-10-((5-chloro-2-((R)-4,6-dimethyl-1,4-diazepan-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12g);

(S)-10-((5-chloro-2-((S)-4,6-dimethyl-1,4-diazepan-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12g);

(S)-10-((5-chloro-2-((S)-hexahydropyrrolo[1,2-a]pyrazin-2(1H)-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12h);

(S)-10-((5-chloro-2-((R)-hexahydropyrrolo[1,2-a]pyrazin-2(1H)-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12h);

(S)-10-((5-chloro-2-((R)-6-oxohexahydropyrrolo[1,2-a]pyrazin-2(1H)-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12i);

(S)-10-((5-chloro-2-((S)-6-oxohexahydropyrrolo[1,2-a]pyrazin-2(1H)-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12i);

(S)-10-((5-chloro-2-((R)-8-hydroxy-6-azaspiro[3.5]nonan-6-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12j);

(S)-10-((5-chloro-2-((S)-8-hydroxy-6-azaspiro[3.5]nonan-6-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12j);

(S)-10-((5-chloro-2-((3R,5S)-3-hydroxy-5-methylpiperidin-1-yl)pyridin-4-yl)amino)-2-cyclopropyl-3,3-difluoro-7-methyl-1,2,3,4-tetrahydro-[1,4]oxazepino[2,3-c]quinolin-6(7H)-one (Example 13a);

(S)-10-((5-chloro-2-((3R,5S)-3-methoxy-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x05);

(2S)-10-((5-chloro-2-(2,6-dimethyl-1-oxidothiomorpholino)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x09);

(2S)-10-((5-chloro-2-(2,6-dimethyl-1,1-dioxidothiomorpholino)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x11);

(S)-10-((5-chloro-2-((3S,5S)-3-hydroxy-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x13);

(2S)-10-((5-chloro-2-(6-hydroxy-1,4-diazepan-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x14);

(2S)-10-((5-chloro-2-(6-hydroxy-4-methyl-1,4-diazepan-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x15);

(2S)-10-((5-chloro-2-(6-hydroxy-4-(methyl-d$_3$)-1,4-diazepan-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x15-d3);

(2S)-10-((2-(3-(2-(azetidin-1-yl)-2-oxoethyl)-5-methylpiperidin-1-yl)-5-chloropyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x16);

(2S)-10-((2-((3S,5R)-3-(2-(azetidin-1-yl)-2-oxoethyl)-5-methylpiperidin-1-yl)-5-chloropyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x16a/b);

(2S)-10-((2-((3R,5S)-3-(2-(azetidin-1-yl)-2-oxoethyl)-5-methylpiperidin-1-yl)-5-chloropyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x16a/b);

(2S)-10-((5-chloro-2-(3-(2-(3,3-difluoroazetidin-1-yl)-2-oxoethyl)-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x17);

(2S)-10-((5-chloro-2-((3R,5S)-3-(2-(3,3-difluoroazetidin-1-yl)-2-oxoethyl)-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x17a/b);

(2S)-10-((5-chloro-2-((3S,5R)-3-(2-(3,3-difluoroazetidin-1-yl)-2-oxoethyl)-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x17a/b);

(2S)-10-((2-(3-(azetidine-1-carbonyl)-4,4-difluoropiperidin-1-yl)-5-chloropyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x18);

(2S)-10-((5-chloro-2-(3-(3,3-difluoroazetidine-1-carbonyl)-4,4-difluoropiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x19);

(2S)-10-((5-chloro-2-(3-(2-(3,3-difluoroazetidin-1-yl)-2-oxoethyl)-4,4-difluoropiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x20);

(2S)-10-((2-(3-(2-(azetidin-1-yl)-2-oxoethyl)-4,4-difluoropiperidin-1-yl)-5-chloropyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x21);

1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)piperidine-3-carbonitrile (Example 12x23);

(2S)-10-((5-chloro-2-(3-(difluoromethyl) piperazin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x26);

(S)-10-((5-chloro-2-((3R,5S)-3-(2-(dimethylamino)ethoxy)-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x28);

(2S)-10-((2-(3-(azetidine-1-carbonyl)-5-methylpiperidin-1-yl)-5-chloropyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x30);

(2S)-10-((5-chloro-2-(3-(3,3-difluoroazetidine-1-carbonyl)-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x31);

(S)-10-((5-chloro-2-(3-(hydroxymethyl)azetidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x32);

(2S)-10-((5-chloro-2-(2-(hydroxymethyl)azetidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x33);

(S)-10-((5-chloro-2-((S)-2-(hydroxymethyl)azetidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x33a);

(S)-10-((5-chloro-2-((R)-2-(hydroxymethyl)azetidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x33b);

(S)-10-((5-chloro-2-(3-(fluoromethyl)azetidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x35);

(2S)-10-((5-chloro-2-(2-methylazetidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x36);

(S)-1-(5-chloro-4-((2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)piperidine-4-carbonitrile (Example 12x38);

1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)-5-fluoro-N,N-dimethylpiperidine-3-carboxamide (Example 12x39);

(S)-10-((5-chloro-2-(4-fluoropiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x42);

(S)-10-((5-chloro-2-((S)-2-(hydroxymethyl)pyrrolidin-1-yl)pyrimidin-4-yl)amino)-2-cyclopropyl-3,3-difluoro-7- methyl-1,2,3,4-tetrahydro-[1,4]oxazepino[2,3-c]quinolin-6(7H)-one (Example 12x44);

(S)-10-((5-chloro-2-((R)-2-(methoxymethyl) pyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x45b);

(S)-10-((5-chloro-2-((S)-4,4-difluoro-2-(hydroxymethyl) pyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x47);

(S)-10-((5-chloro-2-((2S,4S)-4-fluoro-2-(hydroxymethyl) pyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x48a);

(2S)-10-((5-chloro-2-(2-(hydroxymethyl)-3-methylpyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x49);

(2S)-10-((5-chloro-2-(4,4-difluoro-2-(hydroxymethyl)piperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x50);

(S)-2-cyclopropyl-3,3-difluoro-10-((5-fluoro-2-((3R,5S)-3-hydroxy-5-methylpiperidin-1-yl)pyridin-4-yl)amino)-7-methyl-1,2,3,4-tetrahydro-[1,4]oxazepino[2,3-c]quinolin-6(7H)-one (Example 13f05); and (S)-10-((2-((1R,5S)-8-oxa-3-azabicyclo[3.2.1]octan-3-yl)-5-fluoropyrimidin-4-yl)amino)-2-cyclopropyl-3,3-difluoro-7-methyl-1,2,3,4-tetrahydro-[1,4]oxazepino[2,3-c]quinolin-6(7H)-one (Example 13p11).

Particular compounds of the present invention include any of the following compounds, or a pharmaceutically acceptable salt or solvate thereof:

(S)-10-((5-chloro-2-(4-cyclopropyl-3-oxopiperazin-1-yl) pyrimidin-4-yl)amino)-2-cyclopropyl-3,3-difluoro-7-methyl-1,2,3,4-tetrahydro-[1,4]oxazepino[2,3-c]quinolin-6(7H)-one (Example 1b);

(S)-10-((5-chloro-2-((S)-3,4-dimethyl-5-oxopiperazin-1-yl) pyrimidin-4-yl)amino)-2-cyclopropyl-3,3-difluoro-7-methyl-1,2,3,4-tetrahydro-[1,4]oxazepino[2,3-c]quinolin-6(7H)-one (Example 1c);

N-((3S,5R)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)-5-methylpiperidin-3-yl)acetamide (Example 1f);

N-((3R,5S)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)-5-methylpiperidin-3-yl)acetamide (Example 1g);

(S)-10-((5-chloro-2-((S)-3-hydroxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 1i);

(S)-10-((5-chloro-2-((R)-3-hydroxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 1j);

(S)-2-cyclopropyl-3,3-difluoro-10-((5-fluoro-2-((3R,5S)-3-hydroxy-5-methylpiperidin-1-yl)pyrimidin-4-yl)amino)-7-methyl-1,2,3,4-tetrahydro-[1,4]oxazepino[2,3-c]quinolin-6(7H)-one (Example 2a);

(S)-10-((2-(3-oxa-8-azabicyclo[3.2.1]octan-8-yl)-5-chloropyrimidin-4-yl)amino)-2-cyclopropyl-3,3-difluoro-7-(methyl-d3)-1,2,3,4-tetrahydro-[1,4]oxazepino[2,3-c][1,8]naphthyridin-6(7H)-one (Example 3a);

(S)-2-cyclopropyl-3,3-difluoro-10-((5-fluoro-2-((1R,5S,7R)-7-hydroxy-3-oxa-9-azabicyclo[3.3.1]nonan-9-yl)pyrimidin-4-yl)amino)-7-methyl-1,2,3,4-tetrahydro-[1,4]oxazepino[2,3-c]quinolin-6(7H)-one (Example 5a);

(2S)-10-((2-(3-acetyl-3,8-diazabicyclo[3.2.1]octan-8-yl)-5-chloropyrimidin-4-yl)amino)-2-cyclopropyl-3,3-difluoro-7-methyl-1,2,3,4-tetrahydro-[1,4]oxazepino[2,3-c]quinolin-6(7H)-one (Example 7a);

(2S)-10-((2-(8-acetyl-3,8-diazabicyclo[3.2.1]octan-3-yl)-5-chloropyrimidin-4-yl)amino)-2-cyclopropyl-3,3-difluoro-7-methyl-1,2,3,4-tetrahydro-[1,4]oxazepino[2,3-c]quinolin-6(7H)-one (Example 7b);

(S)-10-((5-chloro-2-((3S,5R)-3-fluoro-5-hydroxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9a);

(S)-10-((5-chloro-2-((3R,5S)-3-fluoro-5-hydroxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9a);

(S)-10-((5-chloro-2-((S)-3-((dimethylamino)methyl)piperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9b);

2-((R)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)piperidin-3-yl)acetamide (Example 9g);

2-((S)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)piperidin-3-yl)acetamide (Example 9g);

(S)-10-((5-chloro-2-((R)-3-(dimethylamino)piperidin-1-yl) pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9i);

N-((R)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)-4,4-difluoropiperidin-3-yl)-N-methylacetamide (Example 9m);

(S)-10-((5-chloro-2-((R)-3-(hydroxymethyl)piperidin-1-yl) pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9p);

(S)-10-((5-chloro-2-(6-(cyclopropylmethyl)-2,6-diazaspiro[3.3]heptan-2-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9w);

(2S)-10-((5-chloro-2-(6-((2,2-difluorocyclopropyl)methyl)-2,6-diazaspiro[3.3]heptan-2-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9x);

(2S)-10-((5-chloro-2-(8-(cyclopropylmethyl)-3,8-diazabicyclo[3.2.1]octan-3-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9y);

(S)-10-((5-chloro-2-((3R,5S)-3,5-dihydroxypiperidin-1-yl) pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11e);

(S)-10-((2-((3S,5R)-3-amino-5-methylpiperidin-1-yl)-5-chloropyrimidin-4-yl)amino)-2-cyclopropyl-3,3-difluoro-7-methyl-1,2,3,4-tetrahydro-[1,4]oxazepino[2,3-c]quinolin-6(7H)-one (Example 12b);

(S)-10-((5-chloro-2-((R)-4,6-dimethyl-1,4-diazepan-1-yl) pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12g);

(S)-10-((5-chloro-2-((S)-4,6-dimethyl-1,4-diazepan-1-yl)
pyrimidin-4-yl)amino)-2-cyclopropyl-3,3-difluoro-7-
methyl-1,2,3,4-tetrahydro-[1,4]oxazepino[2,3-c]quino-
lin-6(7H)-one (Example 12g);

(S)-10-((5-chloro-2-((S)-hexahydropyrrolo[1,2-a]pyrazin-2
(1H)-yl)pyrimidin-4-yl)amino)-2-cyclopropyl-3,3-dif-
luoro-7-methyl-1,2,3,4-tetrahydro-[1,4]oxazepino[2,3-c]
quinolin-6(7H)-one (Example 12h);

(S)-10-((5-chloro-2-((R)-hexahydropyrrolo[1,2-a]pyrazin-2
(1H)-yl)pyrimidin-4-yl)amino)-2-cyclopropyl-3,3-dif-
luoro-7-methyl-1,2,3,4-tetrahydro-[1,4]oxazepino[2,3-c]
quinolin-6(7H)-one (Example 12h);

(S)-10-((5-chloro-2-((R)-6-oxohexahydropyrrolo[1,2-a]
pyrazin-2(1H)-yl)pyrimidin-4-yl)amino)-2-cyclopropyl-
3,3-difluoro-7-methyl-1,2,3,4-tetrahydro-[1,4]oxazepino
[2,3-c]quinolin-6(7H)-one (Example 12i);

(S)-10-((5-chloro-2-((S)-6-oxohexahydropyrrolo[1,2-a]
pyrazin-2(1H)-yl)pyrimidin-4-yl)amino)-2-cyclopropyl-
3,3-difluoro-7-methyl-1,2,3,4-tetrahydro-[1,4]oxazepino
[2,3-c]quinolin-6(7H)-one (Example 12i);

(S)-10-((5-chloro-2-((R)-8-hydroxy-6-azaspiro[3.5]nonan-
6-yl)pyrimidin-4-yl)amino)-2-cyclopropyl-3,3-difluoro-
7-methyl-1,2,3,4-tetrahydro-[1,4]oxazepino[2,3-c]quino-
lin-6(7H)-one (Example 12j);

(S)-10-((5-chloro-2-((S)-8-hydroxy-6-azaspiro[3.5]nonan-
6-yl)pyrimidin-4-yl)amino)-2-cyclopropyl-3,3-difluoro-
7-methyl-1,2,3,4-tetrahydro-[1,4]oxazepino[2,3-c]quino-
lin-6(7H)-one (Example 12j);

(2S)-10-((5-chloro-2-(2,6-dimethyl-1-oxidothiomor-
pholino)pyrimidin-4-yl)amino)-2-cyclopropyl-3,3-dif-
luoro-7-methyl-1,2,3,4-tetrahydro-[1,4]oxazepino[2,3-c]
quinolin-6(7H)-one (Example 12x09);

(2S)-10-((5-chloro-2-(2,6-dimethyl-1,1-dioxidothiomor-
pholino)pyrimidin-4-yl)amino)-2-cyclopropyl-3,3-dif-
luoro-7-methyl-1,2,3,4-tetrahydro-[1,4]oxazepino[2,3-c]
quinolin-6(7H)-one (Example 12x11);

(2S)-10-((5-chloro-2-(6-hydroxy-4-(methyl-d$_3$)-1,4-diaz-
epan-1-yl)pyrimidin-4-yl)amino)-2-cyclopropyl-3,3-dif-
luoro-7-methyl-1,2,3,4-tetrahydro-[1,4]oxazepino[2,3-c]
quinolin-6(7H)-one (Example 12x15-d3);

(2S)-10-((2-((3S,5R)-3-(2-(azetidin-1-yl)-2-oxoethyl)-5-
methylpiperidin-1-yl)-5-chloropyrimidin-4-yl)amino)-2-
cyclopropyl-3,3-difluoro-7-methyl-1,2,3,4-tetrahydro-[1,
4]oxazepino[2,3-c]quinolin-6(7H)-one (Example 12x16a/
b);

(2S)-10-((2-((3R,5S)-3-(2-(azetidin-1-yl)-2-oxoethyl)-5-
methylpiperidin-1-yl)-5-chloropyrimidin-4-yl)amino)-2-
cyclopropyl-3,3-difluoro-7-methyl-1,2,3,4-tetrahydro-[1,
4]oxazepino[2,3-c]quinolin-6(7H)-one (Example 12x16a/
b);

(2S)-10-((5-chloro-2-(3-(difluoromethyl)piperazin-1-yl)py-
rimidin-4-yl)amino)-2-cyclopropyl-3,3-difluoro-7-
methyl-1,2,3,4-tetrahydro-[1,4]oxazepino[2,3-c]quino-
lin-6(7H)-one (Example 12x26);

(S)-10-((5-chloro-2-((3R,5S)-3-(2-(dimethylamino)
ethoxy)-5-methylpiperidin-1-yl)pyrimidin-4-yl)amino)-
2-cyclopropyl-3,3-difluoro-7-methyl-1,2,3,4-tetrahydro-
[1,4]oxazepino[2,3-c]quinolin-6(7H)-one (Example
12x28);

(2S)-10-((2-(3-(azetidine-1-carbonyl)-5-methylpiperidin-1-
yl)-5-chloropyrimidin-4-yl)amino)-2-cyclopropyl-3,3-di-
fluoro-7-methyl-1,2,3,4-tetrahydro-[1,4]oxazepino[2,3-c]
quinolin-6(7H)-one (Example 12x30);

(S)-10-((5-chloro-2-((S)-2-(hydroxymethyl)azetidin-1-yl)
pyrimidin-4-yl)amino)-2-cyclopropyl-3,3-difluoro-7-
methyl-1,2,3,4-tetrahydro-[1,4]oxazepino[2,3-c]quino-
lin-6(7H)-one (Example 12x33a);

and 1-(5-chloro-4-(((S)-2-cyclopropyl-3,3-difluoro-7-methyl-6-
oxo-1,2,3,4,6,7-hexahydro-[1,4]oxazepino[2,3-c]quino-
lin-10-yl)amino)pyrimidin-2-yl)-5-fluoro-N,N-dimeth-
ylpiperidine-3-carboxamide (Example 12x39).

Particular compounds of the present invention include any
of the following compounds, or a pharmaceutically accept-
able salt or solvate thereof:

N-((3R,5S)-1-(5-chloro-4-(((S)-2-cyclopropyl-3,3-difluoro-
7-methyl-6-oxo-1,2,3,4,6,7-hexahydro-[1,4]oxazepino[2,
3-c]quinolin-10-yl)amino)pyrimidin-2-yl)-5-methylpip-
eridin-3-yl)acetamide (Example 1g);

(S)-10-((5-chloro-2-((S)-3-methylpiperidin-1-yl)pyrimidin-
4-yl)amino)-2-cyclopropyl-3,3-difluoro-7-methyl-1,2,3,
4-tetrahydro-[1,4]oxazepino[2,3-c]quinolin-6(7H)-one
(Example 1k);

(S)-10-((5-chloro-2-((R)-3-methylpiperidin-1-yl)pyrimidin-
4-yl)amino)-2-cyclopropyl-3,3-difluoro-7-methyl-1,2,3,
4-tetrahydro-[1,4]oxazepino[2,3-c]quinolin-6(7H)-one
(Example 1l);

(S)-2-cyclopropyl-3,3-difluoro-10-((5-fluoro-2-((3R,5S)-3-
hydroxy-5-methylpiperidin-1-yl)pyrimidin-4-yl)amino)-
7-methyl-1,2,3,4-tetrahydro-[1,4]oxazepino[2,3-c]quino-
lin-6(7H)-one (Example 2a);

(S)-2-cyclopropyl-10-((2-(4,4-difluoropiperidin-1-yl)-5-
fluoropyrimidin-4-yl)amino)-3,3-difluoro-7-methyl-1,2,
3,4-tetrahydro-[1,4]oxazepino[2,3-c]quinolin-6(7H)-one
(Example 2b);

(S)-10-((5-chloro-2-((3S,5R)-3-fluoro-5-hydroxypiperidin-
1-yl)pyrimidin-4-yl)amino)-2-cyclopropyl-3,3-difluoro-
7-methyl-1,2,3,4-tetrahydro-[1,4]oxazepino[2,3-c]quino-
lin-6(7H)-one (Example 9a);

(S)-10-((5-chloro-2-((3R,5S)-3-fluoro-5-hydroxypiperidin-
1-yl)pyrimidin-4-yl)amino)-2-cyclopropyl-3,3-difluoro-
7-methyl-1,2,3,4-tetrahydro-[1,4]oxazepino[2,3-c]quino-
lin-6(7H)-one (Example 9a);

(3R,5S)-1-(5-chloro-4-(((S)-2-cyclopropyl-3,3-difluoro-7-
methyl-6-oxo-1,2,3,4,6,7-hexahydro-[1,4]oxazepino[2,3-
c]quinolin-10-yl)amino)pyrimidin-2-yl)-N-ethyl-5-meth-
ylpiperidine-3-carboxamide (Example 9c);

(3S,5R)-1-(5-chloro-4-(((S)-2-cyclopropyl-3,3-difluoro-7-
methyl-6-oxo-1,2,3,4,6,7-hexahydro-[1,4]oxazepino[2,3-
c]quinolin-10-yl)amino)pyrimidin-2-yl)-N-ethyl-5-meth-
ylpiperidine-3-carboxamide (Example 9c);

(S)-10-((5-chloro-2-((3R,5S)-3-(hydroxymethyl)-5-meth-
ylpiperidin-1-yl)pyrimidin-4-yl)amino)-2-cyclopropyl-3,
3-difluoro-7-methyl-1,2,3,4-tetrahydro-[1,4]oxazepino[2,
3-c]quinolin-6(7H)-one (Example 9d);

(S)-10-((5-chloro-2-((3S,5R)-3-(hydroxymethyl)-5-meth-
ylpiperidin-1-yl)pyrimidin-4-yl)amino)-2-cyclopropyl-3,
3-difluoro-7-methyl-1,2,3,4-tetrahydro-[1,4]oxazepino[2,
3-c]quinolin-6(7H)-one (Example 9d);

(S)-10-((5-chloro-2-((R)-4,4-difluoro-3-hydroxypiperidin-
1-yl)pyrimidin-4-yl)amino)-2-cyclopropyl-3,3-difluoro-
7-methyl-1,2,3,4-tetrahydro-[1,4]oxazepino[2,3-c]quino-
lin-6(7H)-one (Example 9e);

(S)-10-((5-chloro-2-((S)-4,4-difluoro-3-hydroxypiperidin-
1-yl)pyrimidin-4-yl)amino)-2-cyclopropyl-3,3-difluoro-
7-methyl-1,2,3,4-tetrahydro-[1,4]oxazepino[2,3-c]quino-
lin-6(7H)-one (Example 9e);

(S)-10-((5-chloro-2-((R)-3-(fluoromethyl)piperidin-1-yl)
pyrimidin-4-yl)amino)-2-cyclopropyl-3,3-difluoro-7-
methyl-1,2,3,4-tetrahydro-[1,4]oxazepino[2,3-c]quino-
lin-6(7H)-one (Example 9f);

(S)-10-((5-chloro-2-((S)-3-(fluoromethyl)piperidin-1-yl)py-
rimidin-4-yl)amino)-2-cyclopropyl-3,3-difluoro-7- methyl-1,2,3,4-tetrahydro-[1,4]oxazepino[2,3-c]quinolin-6(7H)-one (Example 9f);

2-((R)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)piperidin-3-yl)acetamide (Example 9g);

2-((S)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)piperidin-3-yl)acetamide (Example 9g);

(R)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)-N-ethyl-4,4-difluoropiperidine-3-carboxamide (Example 9j);

(S)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)-N-ethyl-4,4-difluoropiperidine-3-carboxamide (Example 9j);

(S)-10-((5-chloro-2-((3S,4R)-3,4-difluoropiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 10a);

(S)-10-((5-chloro-2-((3R,4S)-3,4-difluoropiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 10a);

(S)-10-((5-chloro-2-((3S,4S)-3,4-difluoropiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 10b);

(S)-10-((5-chloro-2-((3R,4R)-3,4-difluoropiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 10b);

(S)-10-((5-fluoro-2-((3S,4R)-3,4-difluoropiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 10d);

(S)-10-((5-fluoro-2-((3R,4S)-3,4-difluoropiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 10d);

(S)-10-((5-chloro-2-((R)-3-ethylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11b);

(S)-10-((5-chloro-2-((S)-3-ethylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11b);

(S)-10-((5-chloro-2-((R)-3-methylazepan-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11c);

(S)-10-((5-chloro-2-((S)-3-methylazepan-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11c);

(S)-10-((5-chloro-2-((R)-4-methylazepan-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11d);

(S)-10-((5-chloro-2-((S)-4-methylazepan-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11d);

(S)-10-((5-chloro-2-((R)-3-(difluoromethyl)piperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11r);

(S)-10-((5-chloro-2-((S)-3-(difluoromethyl)piperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11r);

(S)-10-((2-((3R,5S)-3-amino-5-methylpiperidin-1-yl)-5-chloropyrimidin-4-yl)amino)-2-cyclopropyl-3,3-difluoro-7-methyl-1,2,3,4-tetrahydro-[1,4]oxazepino[2,3-c]quinolin-6(7H)-one (Example 12c);

(S)-10-((5-chloro-2-((R)-2-methylthiomorpholino)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12f);

(S)-10-((5-chloro-2-((S)-2-methylthiomorpholino)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12f);

(S)-10-((5-chloro-2-((3R,5S)-3-hydroxy-5-methylpiperidin-1-yl)pyridin-4-yl)amino)-2-cyclopropyl-3,3-difluoro-7-methyl-1,2,3,4-tetrahydro-[1,4]oxazepino[2,3-c]quinolin-6(7H)-one (Example 13a);

((S)-10-((5-chloro-2-(4,4-difluoropiperidin-1-yl)pyridin-4-yl)amino)-2-cyclopropyl-3,3-difluoro-7-methyl-1,2,3,4-tetrahydro-[1,4]oxazepino[2,3-c]quinolin-6(7H)-one (Example 13b);

(S)-10-((5-chloro-2-((S)-4,4-difluoro-3-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 14a);

(S)-10-((5-chloro-2-((R)-4,4-difluoro-3-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 14a);

(S)-10-((5-chloro-2-((R)-4,4-difluoro-3-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 14b);

(S)-10-((5-chloro-2-((S)-4,4-difluoro-3-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 14b);

(S)-10-((5-chloro-2-((3R,5S)-3-fluoro-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x03);

(S)-10-((5-chloro-2-((3R,5S)-3-methoxy-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x05);

(2S)-10-((5-chloro-2-(2,6-dimethylthiomorpholino)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x06);

(2S)-10-((2-(3-(2-(azetidin-1-yl)-2-oxoethyl)-5-methylpiperidin-1-yl)-5-chloropyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x16);

(S)-10-((5-chloro-2-((3R,5S)-3-(2-(dimethylamino)ethoxy)-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x28);

(2S)-10-((2-(3-(azetidine-1-carbonyl)-5-methylpiperidin-1-yl)-5-chloropyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x30);

(2S)-10-((5-chloro-2-(3-(3,3-difluoroazetidine-1-carbonyl)-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x31);

(S)-10-((5-chloro-2-(4-fluoropiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x42);

(S)-10-((5-chloro-2-((S)-4,4-difluoro-2-(hydroxymethyl)pyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x47);

(2S)-2-cyclopropyl-10-((2-(4,4-difluoro-3,5-dimethylpiperidin-1-yl)-5-fluoropyrimidin-4-yl)amino)-3,3-difluoro-7-methyl-1,2,3,4-tetrahydro-[1,4]oxazepino[2,3-c]quinolin-6(7H)-one (Example 13p01);

(S)-2-cyclopropyl-10-((2-(4,4-difluoropiperidin-1-yl)-5-fluoropyridin-4-yl)amino)-3,3-difluoro-7-methyl-1,2,3,4-tetrahydro-[1,4]oxazepino[2,3-c]quinolin-6(7H)-one (Example 13f04); and (S)-2-cyclopropyl-3,3-difluoro-10-((5-fluoro-2-((3R,5S)-3-hydroxy-5-methylpiperidin-1-yl)pyridin-4-yl)amino)-7-methyl-1,2,3,4-tetrahydro-[1,4]oxazepino[2,3-c]quinolin-6(7H)-one (Example 13f05).

Particular compounds of the present invention include any of the following compounds, or a pharmaceutically acceptable salt or solvate thereof:

N-((3R,5S)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)-5-methylpiperidin-3-yl)acetamide (Example 1g);

(S)-2-cyclopropyl-3,3-difluoro-10-((5-fluoro-2-((3R,5S)-3-hydroxy-5-methylpiperidin-1-yl)pyrimidin-4-yl)amino)-7-methyl-1,2,3,4-tetrahydro-[1,4]oxazepino[2,3-c]quinolin-6(7H)-one (Example 2a);

(S)-10-((5-chloro-2-((3S,5R)-3-fluoro-5-hydroxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9a);

(S)-10-((5-chloro-2-((3R,5S)-3-fluoro-5-hydroxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9a);

(3R,5S)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)-N-ethyl-5-methylpiperidine-3-carboxamide (Example 9c);

(3S,5R)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)-N-ethyl-5-methylpiperidine-3-carboxamide (Example 9c);

(S)-10-((5-chloro-2-((3R,5S)-3-(hydroxymethyl)-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9d);

(S)-10-((5-chloro-2-((3S,5R)-3-(hydroxymethyl)-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9d);

(S)-10-((5-chloro-2-((R)-4,4-difluoro-3-hydroxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9e);

(S)-10-((5-chloro-2-((S)-4,4-difluoro-3-hydroxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9e);

2-((R)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)piperidin-3-yl)acetamide (Example 9g);

2-((S)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)piperidin-3-yl)acetamide (Example 9g);

(S)-10-((5-chloro-2-((3S,4R)-3,4-difluoropiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 10a);

(S)-10-((5-chloro-2-((3R,4S)-3,4-difluoropiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 10a);

(S)-10-((2-((3R,5S)-3-amino-5-methylpiperidin-1-yl)-5-chloropyrimidin-4-yl)amino)-2-cyclopropyl-3,3-difluoro-7-methyl-1,2,3,4-tetrahydro-[1,4]oxazepino[2,3-c]quinolin-6(7H)-one (Example 12c);

(S)-10-((5-chloro-2-((S)-2-methylthiomorpholino)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12f);

(S)-10-((5-chloro-2-((3R,5S)-3-hydroxy-5-methylpiperidin-1-yl)pyridin-4-yl)amino)-2-cyclopropyl-3,3-difluoro-7-methyl-1,2,3,4-tetrahydro-[1,4]oxazepino[2,3-c]quinolin-6(7H)-one (Example 13a);

(S)-10-((5-chloro-2-((3R,5S)-3-fluoro-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x03);

(S)-10-((5-chloro-2-((3R,5S)-3-methoxy-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x05);

(2S)-10-((2-(3-(2-(azetidin-1-yl)-2-oxoethyl)-5-methylpiperidin-1-yl)-5-chloropyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x16);

(2S)-10-((2-(3-(azetidine-1-carbonyl)-5-methylpiperidin-1-yl)-5-chloropyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x30);

(2S)-10-((5-chloro-2-(3-(3,3-difluoroazetidine-1-carbonyl)-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x31);

(S)-10-((5-chloro-2-((S)-4,4-difluoro-2-(hydroxymethyl)pyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x47); and (S)-2-cyclopropyl-3,3-difluoro-10-((5-fluoro-2-((3R,5S)-3-hydroxy-5-methylpiperidin-1-yl)pyridin-4-yl)amino)-7-methyl-1,2,3,4-tetrahydro-[1,4]oxazepino[2,3-c]quinolin-6(7H)-one (Example 13f05).

Particular compounds of the present invention include any of the following compounds, or a pharmaceutically acceptable salt or solvate thereof:

(S)-10-((5-chloro-2-(3,3-difluoroazetidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 1a);

(S)-2-cyclopropyl-3,3-difluoro-10-((5-fluoro-2-((3R,5S)-3-hydroxy-5-methylpiperidin-1-yl)pyrimidin-4-yl)amino)-

7-methyl-1,2,3,4-tetrahydro-[1,4]oxazepino[2,3-c]quinolin-6(7H)-one (Example 2a);

(S)-2-cyclopropyl-10-((2-(4,4-difluoropiperidin-1-yl)-5-fluoropyrimidin-4-yl)amino)-3,3-difluoro-7-methyl-1,2,3,4-tetrahydro-[1,4]oxazepino[2,3-c]quinolin-6(7H)-one (Example 2b);

(S)-10-((2-(3-oxa-8-azabicyclo[3.2.1]octan-8-yl)-5-chloropyrimidin-4-yl)amino)-2-cyclopropyl-3,3-difluoro-7-(methyl-d3)-1,2,3,4-tetrahydro-[1,4]oxazepino[2,3-c][1,8]naphthyridin-6(7H)-one (Example 3a);

(S)-10-((3-chloro-2-fluoropyridin-4-yl)amino)-2-cyclopropyl-3,3-difluoro-7-methyl-1,2,3,4-tetrahydro-[1,4]oxazepino[2,3-c]quinolin-6(7H)-one (Example 4b);

(S)-2-cyclopropyl-10-((2,3-dichloropyridin-4-yl)amino)-3,3-difluoro-7-methyl-1,2,3,4-tetrahydro-[1,4]oxazepino[2,3-c]quinolin-6(7H)-one (Example 4c);

(S)-10-((2-chloro-3-fluoropyridin-4-yl)amino)-2-cyclopropyl-3,3-difluoro-7-methyl-1,2,3,4-tetrahydro-[1,4]oxazepino[2,3-c]quinolin-6(7H)-one (Example 4d);

(S)-10-((3-chloro-2-methylpyridin-4-yl)amino)-2-cyclopropyl-3,3-difluoro-7-methyl-1,2,3,4-tetrahydro-[1,4]oxazepino[2,3-c]quinolin-6(7H)-one (Example 4e);

(S)-10-((5-chloro-2-(dimethylamino)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 8a);

(S)-10-((5-chloro-2-((3S,5R)-3-fluoro-5-hydroxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9a);

(S)-10-((5-chloro-2-((3R,5S)-3-fluoro-5-hydroxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 9a);

(S)-10-((5-chloro-2-((3R,4S)-3,4-difluoropiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 10a);

(S)-10-((5-chloro-2-(3-fluoroazetidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11q);

(S)-10-((2-(azetidin-1-yl)-5-chloropyrimidin-4-yl)amino)-2-cyclopropyl-3,3-difluoro-7-methyl-1,2,3,4-tetrahydro-[1,4]oxazepino[2,3-c]quinolin-6(7H)-one (Example 11v);

(S)-10-((5-chloro-2-(3-methoxyazetidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 11w);

(S)-10-((5-chloro-2-((3R,5S)-3-methoxy-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x05);

(2S)-10-((5-chloro-2-(2-(hydroxymethyl)azetidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x33); and (S)-10-((5-chloro-2-((S)-4,4-difluoro-2-(hydroxymethyl)pyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (Example 12x47).

A suitable pharmaceutically acceptable salt of a compound of the invention is, for example, an acid-addition salt of a compound of the invention which is sufficiently basic, for example, an acid-addition salt with, for example, an inorganic or organic acid, for example hydrochloric, hydrobromic, sulfuric, phosphoric, trifluoroacetic, formic, citric, methane sulfonate or maleic acid. In addition, a suitable pharmaceutically acceptable salt of a compound of the invention which is sufficiently acidic is an alkali metal salt, for example a sodium or potassium salt, an alkaline earth metal salt, for example a calcium or magnesium salt, an ammonium salt or a salt with an organic base which affords a pharmaceutically acceptable cation, for example a salt with methylamine, dimethylamine, trimethylamine, piperidine, morpholine or tris-(2-hydroxyethyl)amine.

Compounds that have the same molecular formula but differ in the nature or sequence of bonding of their atoms or the arrangement of their atoms in space are termed "isomers". Isomers that differ in the arrangement of their atoms in space are termed "stereoisomers". Stereoisomers that are not mirror images of one another are termed "diastereomers" and those that are non-superimposable mirror images of each other are termed "enantiomers". When a compound has an asymmetric center, for example, it is bonded to four different groups, a pair of enantiomers is possible. An enantiomer can be characterized by the absolute configuration of its asymmetric center and is described by the R- and S-sequencing rules of Cahn and Prelog, or by the manner in which the molecule rotates the plane of polarized light and designated as dextrorotatory or levorotatory (i.e., as (+) or (−)-isomers respectively). A chiral compound can exist as either individual enantiomer or as a mixture thereof. A mixture containing equal proportions of the enantiomers is called a "racemic mixture".

The compounds of this invention may possess one or more asymmetric centers; such compounds can therefore be produced as individual (R)- or (S)-stereoisomers or as mixtures thereof. Unless indicated otherwise, the description or naming of a particular compound in the specification and claims is intended to include both individual enantiomers and mixtures, racemic or otherwise, thereof. The methods for the determination of stereochemistry and the separation of stereoisomers are well-known in the art (see discussion in Chapter 4 of "Advanced Organic Chemistry", 4th edition J. March, John Wiley and Sons, New York, 2001), for example by synthesis from optically active starting materials or by resolution of a racemic form. Some of the compounds of the invention may have geometric isomeric centres (E- and Z-isomers). It is to be understood that the present invention encompasses all optical, diastereoisomers and geometric isomers and mixtures thereof that possess antiproliferative activity.

The present invention also encompasses compounds of the invention as defined herein which comprise one or more isotopic substitutions. For example, H may be in any isotopic form, including 1H, 2H (D), and 3H (T); C may be in any isotopic form, including 12C, 13C, and 14C; and O may be in any isotopic form, including 16O and 18O; and the like.

It is also to be understood that certain compounds of the invention may exist in solvated as well as unsolvated forms such as, for example, hydrated forms. It is to be understood that the invention encompasses all such solvated forms that possess antiproliferative activity.

It is also to be understood that certain compounds of the invention may exhibit polymorphism, and that the invention encompasses all such forms that possess antiproliferative activity.

Compounds of the invention may exist in a number of different tautomeric forms and references to compounds of the invention include all such forms. For the avoidance of doubt, where a compound can exist in one of several tautomeric forms, and only one is specifically described or shown, all others are nevertheless embraced by the invention. Examples of tautomeric forms include keto-, enol-, and enolate-forms, as in, for example, the following tautomeric pairs: keto/enol (illustrated below), imine/enamine, amide/imino alcohol, amidine/amidine, nitroso/oxime, thioketone/enethiol, and nitro/aci-nitro.

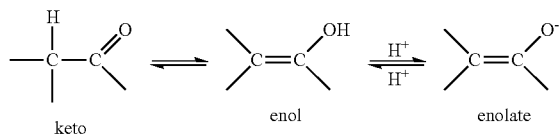

The compounds of the invention may be administered in the form of a pro-drug which is broken down in the human or animal body to release a compound of the invention. A pro-drug may be used to alter the physical properties and/or the pharmacokinetic properties of a compound of the invention. A pro-drug can be formed when the compound of the invention contains a suitable group or substituent to which a property-modifying group can be attached. Examples of pro-drugs include in vivo cleavable ester derivatives that may be formed at a carboxy group or a hydroxy group in a compound of invention, and in-vivo cleavable amide derivatives that may be formed at a carboxy group or an amino group in a compound of the invention.

Accordingly, the present invention includes those compounds of the invention, as defined hereinbefore, when made available by organic synthesis and when made available within the human or animal body by way of cleavage of a pro-drug thereof. Accordingly, the present invention includes those compounds of the invention that are produced by organic synthetic means and also such compounds that are produced in the human or animal body by way of metabolism of a precursor compound, that is a compound of the invention may be a synthetically-produced compound or a metabolically-produced compound.

A suitable pharmaceutically acceptable pro-drug of a compound of the invention is one that is based on reasonable medical judgement as being suitable for administration to the human or animal body without undesirable pharmacological activities and without undue toxicity.

Various forms of pro-drug have been described, for example in the following documents:—
 a) Methods in Enzymology, Vol. 42, p. 309-396, edited by K. Widder, et al. (Academic Press, 1985);
 b) Design of Pro-drugs, edited by H. Bundgaard, (Elsevier, 1985);
 c) A Textbook of Drug Design and Development, edited by Krogsgaard-Larsen and H. Bundgaard, Chapter 5 "Design and Application of Pro-drugs", by H. Bundgaard p. 113-191 (1991);
 d) H. Bundgaard, Advanced Drug Delivery Reviews, 8, 1-38 (1992);
 e) H. Bundgaard, et al., Journal of Pharmaceutical Sciences, 77, 285 (1988);
 f) N. Kakeya, et al., Chem. Pharm. Bull., 32, 692 (1984);
 g) T. Higuchi and V. Stella, "Pro-Drugs as Novel Delivery Systems", A.C.S. Symposium Series, Volume 14;
 h) E. Roche (editor), "Bioreversible Carriers in Drug Design", Pergamon Press, 1987; and
 i) J. Rautio, et al., Nature Reviews Drug Discov., 17, 559-587 (2018).

A suitable pharmaceutically acceptable pro-drug of a compound of the invention that possesses a carboxy group is, for example, an in vivo cleavable ester thereof. An in vivo cleavable ester of a compound of the invention containing a carboxy group is, for example, a pharmaceutically acceptable ester which is cleaved in the human or animal body to produce the parent acid. Suitable pharmaceutically acceptable esters for carboxy include (1-6C)alkyl esters such as methyl, ethyl and tert-butyl, (1-6C)alkoxymethyl esters such as methoxymethyl esters, (1-6C)alkanoyloxymethyl esters such as pivaloyloxymethyl esters, 3-phthalidyl esters, (3-8C)cycloalkylcarbonyloxy-(1-6C)alkyl esters such as cyclopentylcarbonyloxymethyl and 1-cyclohexylcarbonyloxyethyl esters, 2-oxo-1,3-dioxolenylmethyl esters such as 5-methyl-2-oxo-1,3-dioxolen-4-ylmethyl esters and (1-6C)alkoxycarbonyloxy-(1-6C)alkyl esters such as methoxycarbonyloxymethyl and 1-methoxycarbonyloxyethyl esters.

A suitable pharmaceutically acceptable pro-drug of a compound of the invention that possesses a hydroxy group is, for example, an in vivo cleavable ester or ether thereof. An in vivo cleavable ester or ether of a compound of the invention containing a hydroxy group is, for example, a pharmaceutically acceptable ester or ether which is cleaved in the human or animal body to produce the parent hydroxy compound. Suitable pharmaceutically acceptable ester forming groups for a hydroxy group include inorganic esters such as phosphate esters (including phosphoramidic cyclic esters). Further suitable pharmaceutically acceptable ester forming groups for a hydroxy group include (1-10C)alkanoyl groups such as acetyl, benzoyl, phenylacetyl and substituted benzoyl and phenylacetyl groups, (1-10C) alkoxycarbonyl groups such as ethoxycarbonyl, N,N-(1-6C)$_2$carbamoyl, 2-dialkylaminoacetyl and 2-carboxyacetyl groups. Examples of ring substituents on the phenylacetyl and benzoyl groups include aminomethyl, N-alkylaminomethyl, N,N-dialkylaminomethyl, morpholinomethyl, piperazin-1-ylmethyl and 4-(1-4C)alkylpiperazin-1-ylmethyl. Suitable pharmaceutically acceptable ether forming groups for a hydroxy group include α-acyloxyalkyl groups such as acetoxymethyl and pivaloyloxymethyl groups.

A suitable pharmaceutically acceptable pro-drug of a compound of the invention that possesses a carboxy group is, for example, an in vivo cleavable amide thereof, for example an amide formed with an amine such as ammonia, a (1-4C)alkylamine such as methylamine, a [(1-4C)alkyl]$_2$amine such as dimethylamine, N-ethyl-N-methylamine or diethylamine, a (1-4C)alkoxy-(2-4C)alkylamine such as 2-methoxyethylamine, a phenyl-(1-4C)alkylamine such as benzylamine and amino acids such as glycine or an ester thereof.

A suitable pharmaceutically acceptable pro-drug of a compound of the invention that possesses an amino group is, for example, an in vivo cleavable amide derivative thereof. Suitable pharmaceutically acceptable amides from an amino group include, for example an amide formed with (1-10C) alkanoyl groups such as an acetyl, benzoyl, phenylacetyl and substituted benzoyl and phenylacetyl groups. Examples of ring substituents on the phenylacetyl and benzoyl groups include aminomethyl, N-alkylaminomethyl, N,N-dialkylaminomethyl, morpholinomethyl, piperazin-1-ylmethyl and 4-(1-4C)alkyl)piperazin-1-ylmethyl.

The in vivo effects of a compound of the invention may be exerted in part by one or more metabolites that are formed within the human or animal body after administration of a compound of the invention. As stated hereinbefore, the in vivo effects of a compound of the invention may also be exerted by way of metabolism of a precursor compound (a pro-drug).

Synthesis

The compounds of the present invention can be prepared by any suitable technique known in the art. Particular processes for the preparation of these compounds are described further in the accompanying examples.

In the description of the synthetic methods described herein and in any referenced synthetic methods that are used to prepare the starting materials, it is to be understood that all proposed reaction conditions, including choice of solvent, reaction atmosphere, reaction temperature, duration of the experiment and workup procedures, can be selected by a person skilled in the art.

It is understood by one skilled in the art of organic synthesis that the functionality present on various portions of the molecule must be compatible with the reagents and reaction conditions utilised.

It will be appreciated that during the synthesis of the compounds of the invention in the processes defined herein, or during the synthesis of certain starting materials, it may be desirable to protect certain substituent groups to prevent their undesired reaction. The skilled chemist will appreciate when such protection is required, and how such protecting groups may be put in place, and later removed.

For examples of protecting groups see one of the many general texts on the subject, for example, 'Protective Groups in Organic Synthesis' by Theodora Green (publisher: John Wiley & Sons). Protecting groups may be removed by any convenient method described in the literature or known to the skilled chemist as appropriate for the removal of the protecting group in question, such methods being chosen so as to effect removal of the protecting group with the minimum disturbance of groups elsewhere in the molecule.

Thus, if reactants include, for example, groups such as amino, carboxy or hydroxy it may be desirable to protect the group in some of the reactions mentioned herein.

By way of example, a suitable protecting group for an amino or alkylamino group is, for example, an acyl group, for example an alkanoyl group such as acetyl, an alkoxycarbonyl group, for example a methoxycarbonyl, ethoxycarbonyl or t-butoxycarbonyl group, an arylmethoxycarbonyl group, for example benzyloxycarbonyl, or an aroyl group, for example benzoyl. The deprotection conditions for the above protecting groups necessarily vary with the choice of protecting group. Thus, for example, an acyl group such as an alkanoyl or alkoxycarbonyl group or an aroyl group may be removed by, for example, hydrolysis with a suitable base such as an alkali metal hydroxide, for example lithium or sodium hydroxide. Alternatively an acyl group such as a tert-butoxycarbonyl group may be removed, for example, by treatment with a suitable acid as hydrochloric, sulfuric or phosphoric acid or trifluoroacetic acid and an arylmethoxycarbonyl group such as a benzyloxycarbonyl group may be removed, for example, by hydrogenation over a catalyst such as palladium-on-carbon, or by treatment with a Lewis acid for example boron tris(trifluoroacetate). A suitable alternative protecting group for a primary amino group is, for example, a phthaloyl group which may be removed by treatment with an alkylamine, for example dimethylaminopropylamine, or with hydrazine.

A suitable protecting group for a hydroxy group is, for example, an acyl group, for example an alkanoyl group such as acetyl, an aroyl group, for example benzoyl, or an arylmethyl group, for example benzyl. The deprotection conditions for the above protecting groups will necessarily vary with the choice of protecting group. Thus, for example, an acyl group such as an alkanoyl or an aroyl group may be removed, for example, by hydrolysis with a suitable base such as an alkali metal hydroxide, for example lithium, sodium hydroxide or ammonia. Alternatively an arylmethyl group such as a benzyl group may be removed, for example, by hydrogenation over a catalyst such as palladium-on-carbon.

A suitable protecting group for a carboxy group is, for example, an esterifying group, for example a methyl or an ethyl group which may be removed, for example, by hydrolysis with a base such as sodium hydroxide, or for example a t-butyl group which may be removed, for example, by treatment with an acid, for example an organic acid such as trifluoroacetic acid, or for example a benzyl group which may be removed, for example, by hydrogenation over a catalyst such as palladium-on-carbon. Resins may also be used as a protecting group.

Biological Activity

The biological assays described in the Examples section herein may be used to measure the pharmacological effects of the compounds of the present invention.

Although the pharmacological properties of the compounds of the invention vary with structural change, as expected, the compounds of the invention were found to be active in the HTRF in vitro assay, and in some cases also in the OCI-LY1 degradation assay described in the Examples section.

In general, as illustrated by the Example compound data in Table 1, the compounds of the invention demonstrate a $pIC_{50}$ of 7.0 or more, in the HTRF assay described in the Examples section. Preferred compounds of the invention demonstrate a $pIC_{50}$ of 7.5 or more. The more preferred compounds of the invention demonstrate a $pIC_{50}$ of 8.0 or more. The most preferred compounds of the invention demonstrate a $pIC_{50}$ of 8.5 or more.

In the OCI-LY1 degradation assay described herein in the Examples section, as illustrated by the Example compound data in Table 2, the compounds of Formula I may also demonstrate a $pDC_5$ of 7.0 or more (preferably 8.0 or more).

The following data were generated for the Examples:

TABLE 1

| Example | HTRF avg $pIC_{50}$ |
| --- | --- |
| 1a | 7.99 |
| 1b | 8.71 |
| 1c | 8.63 |
| 1d | 8.44 |
| 1e | 8.49 |
| 1f | 8.60 |
| 1g | 8.50 |
| 1h | 8.44 |
| 1i | 8.51 |
| 1j | 8.53 |
| 1k | 7.42 |
| 1l | 7.59 |
| 1m | 8.03 |
| 1n | 7.86 |
| 2a | 8.62 |
| 2b | 7.65 |
| 3a | 8.79 |
| 4a | 8.46 |
| 4b | 8.20 |
| 4c | 7.86 |
| 4d | 7.78 |
| 4e | 7.73 |
| 5a | 8.82 |
| 6a | 7.85 |
| 7a | 9.11 |
| 7b | 8.79 |
| 8a | 7.97 |
| 9a | 8.60 |

TABLE 1-continued

| Example | HTRF avg pIC$_{50}$ |
|---|---|
| 9a-1 | 8.74 |
| 9a-2 | 8.53 |
| 9b | 8.51 |
| 9c | 8.46 |
| 9d | 8.38 |
| 9e | 8.43 |
| 9f | 7.99 |
| 9g | 8.64 |
| 9h | 8.47 |
| 9i | 8.57 |
| 9j | 8.38 |
| 9k | 8.37 |
| 9l | 7.93 |
| 9m | 8.60 |
| 9n | 8.31 |
| 9o | 8.03 |
| 9p | 8.54 |
| 9q | 8.37 |
| 9r | 8.44 |
| 9s | 7.71 |
| 9t | 8.37 |
| 9u | 8.38 |
| 9v | 8.33 |
| 9w | 8.56 |
| 9x | 8.46 |
| 9y | 8.56 |
| 9za | 8.12 |
| 9zb | 8.01 |
| 10a | 7.91 |
| 10b | 7.80 |
| 10c | 8.30 |
| 10d | 7.68 |
| 11a | 8.56 |
| 11b | 7.48 |
| 11c | 7.26 |
| 11d | 7.19 |
| 11e | 9.06 |
| 11f | 8.26 |
| 11g | 8.28 |
| 11h | 8.25 |
| 11i | 7.51 |
| 11j | 8.22 |
| 11k | 8.01 |
| 11l | 7.35 |
| 11m | 8.41 |
| 11n | 7.83 |
| 11o | 8.12 |
| 11p | 8.39 |
| 11q | 8.32 |
| 11r | 8.00 |
| 11s | 8.41 |
| 11t | 8.46 |
| 11u | 7.94 |
| 11v | 8.27 |
| 11w | 8.43 |
| 11x | 8.45 |
| 11y | 7.33 |
| 11z | 7.88 |
| 12a | 8.20 |
| 12b | 8.60 |
| 12c | 8.53 |
| 12d | 8.31 |
| 12e | 8.32 |
| 12f | 8.02 |
| 12g | 8.58 |
| 12h | 8.69 |
| 12i | 8.89 |
| 12j | 8.58 |
| 12x01 | 7.57 |
| 12x02 | 7.67 |
| 12x03 | 7.81 |
| 12x05 | 8.43 |
| 12x06 | 7.52 |
| 12x07 | 7.33 |
| 12x08 | 7.23 |
| 12x09 | 8.77 |
| 12x10 | 7.93 |
| 12x11 | 8.79 |
| 12x12 | 7.25 |
| 12x13 | 8.25 |
| 12x14 | 8.46 |
| 12x15-d3 | 8.75 |
| 12x16a | 8.69 |
| 12x16b | 8.27 |
| 12x17a | 8.4 |
| 12x17b | 7.88 |
| 12x18 | 8.26 |
| 12x19 | 8.23 |
| 12x20 | 8.43 |
| 12x21 | 8.45 |
| 12x22 | 7.64 |
| 12x23 | 8.29 |
| 12x24 | 7.84 |
| 12x25 | 7.8 |
| 12x26 | 8.72 |
| 12x28 | 8.5 |
| 12x30 | 8.7 |
| 12x31 | 8.42 |
| 12x32 | 8.43 |
| 12x33a | 8.67 |
| 12x33b | 8.11 |
| 12x35 | 8.27 |
| 12x36 | 8.11 |
| 12x38 | 8.43 |
| 12x39 | 8.6 |
| 12x40 | 7.97 |
| 12x42 | 8.21 |
| 12x44 | 8.3 |
| 12x45a | 7.95 |
| 12x45b | 8.32 |
| 12x46 | 7.95 |
| 12x47 | 8.08 |
| 12x48a | 8.37 |
| 12x48b | 7.73 |
| 12x49 | 8.2 |
| 12x50 | 8.15 |
| 13a | 8.17 |
| 13b | 7.51 |
| 13c12 | 7.71 |
| 13p01 | 7.07 |
| 13p06 | 7.93 |
| 13p08 | 7.98 |
| 13p11 | 8.14 |
| 13p12 | 7.72 |
| 13f04 | 7.23 |
| 13f05 | 8.18 |
| 14a | 7.81 |
| 14b | 7.33 |

TABLE 2

| Example | OCI-LY1 avg |
|---|---|
| 1g | 8.76 |
| 1k | 7.8 |
| 1l | 7.56 |
| 2a | 8.86 |
| 2b | 7.87 |
| 9a | 8.42 |
| 9a-1 | 8.61 |
| 9c | 8.79 |
| 9d | 8.13 |
| 9e | 8.3 |
| 9f | 7.72 |
| 9g | 8.16 |
| 9j | 7.99 |
| 9p | 8.33 |
| 10a | 8.46 |
| 10b | 7.23 |
| 10d | 7.54 |

TABLE 2-continued

| Example | OCI-LY1 avg |
|---|---|
| 11b | 7.22 |
| 11c | 7.33 |
| 11d | 7.04 |
| 11r | 7.57 |
| 12c | 8.44 |
| 12f | 8.1 |
| 13a | 8.49 |
| 13b | 7.39 |
| 14a | 7.8 |
| 14b | 7.41 |
| 12x03 | 8.21 |
| 12x05 | 8.47 |
| 12x06 | 7.51 |
| 12x16a | 8.4 |
| 12x28 | 6.43 |
| 12x30 | 8.2 |
| 12x31 | 8.27 |
| 12x42 | 7.02 |
| 12x47 | 8.08 |
| 13p01 | 7.95 |
| 13f04 | 7.5 |
| 13f05 | 8.53 |

Pharmaceutical Compositions

According to a further aspect of the invention there is provided a pharmaceutical composition which comprises a compound of the invention as defined hereinbefore, or a pharmaceutically acceptable salt, hydrate or solvate thereof, in association with a pharmaceutically acceptable diluent or carrier.

The compositions of the invention may be in a form suitable for oral use (for example as tablets, lozenges, hard or soft capsules, aqueous or oily suspensions, emulsions, dispersible powders or granules, syrups or elixirs), for topical use (for example as creams, ointments, gels, or aqueous or oily solutions or suspensions), for administration by inhalation (for example as a finely divided powder or a liquid aerosol), for administration by insufflation (for example as a finely divided powder) or for parenteral administration (for example as a sterile aqueous or oily solution for intravenous, subcutaneous, intramuscular, intraperitoneal or intramuscular dosing or as a suppository for rectal dosing).

The compositions of the invention may be obtained by conventional procedures using conventional pharmaceutical excipients, well known in the art. Thus, compositions intended for oral use may contain, for example, one or more colouring, sweetening, flavouring and/or preservative agents.

An effective amount of a compound of the present invention for use in therapy is an amount sufficient to treat or prevent a proliferative condition referred to herein, slow its progression and/or reduce the symptoms associated with the condition.

The amount of active ingredient that is combined with one or more excipients to produce a single dosage form will necessarily vary depending upon the individual treated and the particular route of administration. For example, a formulation intended for oral administration to humans will generally contain, for example, from 0.5 mg to 0.5 g of active agent (more suitably from 0.5 to 100 mg, for example from 1 to 30 mg) compounded with an appropriate and convenient amount of excipients which may vary from about 5 to about 98 percent by weight of the total composition.

The size of the dose for therapeutic or prophylactic purposes of a compound of the formula I will naturally vary according to the nature and severity of the conditions, the age and sex of the animal or patient and the route of administration, according to well-known principles of medicine.

In using a compound of the invention for therapeutic or prophylactic purposes it will generally be administered so that a daily dose in the range, for example, 0.1 mg/kg to 75 mg/kg body weight is received, given if required in divided doses. In general lower doses will be administered when a parenteral route is employed. Thus, for example, for intravenous or intraperitoneal administration, a dose in the range, for example, 0.1 mg/kg to 30 mg/kg body weight will generally be used. Similarly, for administration by inhalation, a dose in the range, for example, 0.05 mg/kg to 25 mg/kg body weight will be used. Oral administration may also be suitable, particularly in tablet form. Typically, unit dosage forms will contain about 0.5 mg to 0.5 g of a compound of this invention.

Therapeutic Uses and Applications

The present invention provides compounds that function as inhibitors of BCL6 activity.

The present invention therefore provides a method of inhibiting BCL6 activity in vitro or in vivo, said method comprising contacting a cell with an effective amount of a compound, or a pharmaceutically acceptable salt, hydrate or solvate thereof, as defined herein.

The present invention also provides a method of treating a disease or disorder in which BCL6 activity is implicated in a patient in need of such treatment, said method comprising administering to said patient a therapeutically effective amount of a compound, or a pharmaceutically acceptable salt, hydrate or solvate thereof, or a pharmaceutical composition as defined herein.

The present invention provides a method of inhibiting cell proliferation, in vitro or in vivo, said method comprising contacting a cell with an effective amount of a compound, or a pharmaceutically acceptable salt, hydrate or solvate thereof, as defined herein.

The present invention provides a method of treating a proliferative disorder in a patient in need of such treatment, said method comprising administering to said patient a therapeutically effective amount of a compound, or a pharmaceutically acceptable salt, hydrate or solvate thereof, or a pharmaceutical composition as defined herein.

The present invention provides a method of treating cancer in a patient in need of such treatment, said method comprising administering to said patient a therapeutically effective amount of a compound, or a pharmaceutically acceptable salt, hydrate or solvate thereof, or a pharmaceutical composition as defined herein.

The present invention provides a compound, or a pharmaceutically acceptable salt, hydrate or solvate thereof, or a pharmaceutical composition as defined herein for use in therapy.

The present invention provides a compound, or a pharmaceutically acceptable salt, hydrate or solvate thereof, or a pharmaceutical composition as defined herein for use in the treatment of a proliferative condition.

The present invention provides a compound, or a pharmaceutically acceptable salt, hydrate or solvate thereof, or a pharmaceutical composition as defined herein for use in the treatment of cancer. In a particular embodiment, the cancer is human cancer.

The present invention provides a compound, or a pharmaceutically acceptable salt, hydrate or solvate thereof, as defined herein for use in the inhibition of BCL6 activity (i.e. in the inhibition of BCL6 transcriptional repression and/or co-repressor binding).

Certain compounds of the present invention have been found to bind to BCL6 and initiated the degradation of BCL6. Thus, the present invention also provides a compound, or a pharmaceutically acceptable salt, hydrate or solvate thereof, as defined herein for use in the degradation of BCL6.

The present invention provides a compound, or a pharmaceutically acceptable salt, hydrate or solvate thereof, as defined herein for use in the treatment of a disease or disorder in which BCL6 activity is implicated.

The present invention provides a use of a compound, or a pharmaceutically acceptable salt, hydrate or solvate thereof, as defined herein in the manufacture of a medicament for the treatment of a proliferative condition.

The present invention provides a use of a compound, or a pharmaceutically acceptable salt, hydrate or solvate thereof, as defined herein in the manufacture of a medicament for the treatment of cancer. Suitably, the medicament is for use in the treatment of human cancers.

The present invention provides a use of a compound, or a pharmaceutically acceptable salt, hydrate or solvate thereof, as defined herein in the manufacture of a medicament for the inhibition of BCL6 activity (i.e. in the inhibition of BCL6 transcriptional repression and/or co-repressor binding).

The present invention provides a use of a compound, or a pharmaceutically acceptable salt, hydrate or solvate thereof, as defined herein in the manufacture of a medicament for the degradation of BCL6.

The present invention provides a use of a compound, or a pharmaceutically acceptable salt, hydrate or solvate thereof, as defined herein in the manufacture of a medicament for the treatment of a disease or disorder in which BCL6 activity is implicated.

The term "proliferative disorder" and "proliferative condition" are used interchangeably herein and pertain to an unwanted or uncontrolled cellular proliferation of excessive or abnormal cells which is undesired, such as, neoplastic or hyperplastic growth, whether in vitro or in vivo.

Examples of proliferative conditions include, but are not limited to, pre-malignant and malignant cellular proliferation, including but not limited to, malignant neoplasms and tumours, cancers (including breast cancer, non-small cell lung cancer (NSCLC) and squamous cell carcinomas (SCC) (including SCC of the head and neck, oesophagus, lung and ovary), leukemias (including acute lymphoblastic leukaemia (ALL) and chronic myeloid leukaemia (CML)), lymphomas (including acute lymphoblastic leukaemia (ALL) and chronic myeloid leukaemia (CML)), psoriasis, bone diseases, fibroproliferative disorders (e.g., of connective tissues), and atherosclerosis. Any type of cell may be treated, including but not limited to, lymphatic, blood, lung, colon, breast, ovarian, prostate, liver, pancreas, brain, and skin.

The anti-cancer effect may arise through one or more mechanisms, including but not limited to, the regulation of cell proliferation, the inhibition of angiogenesis (the formation of new blood vessels), the inhibition of metastasis (the spread of a tumour from its origin), the inhibition of invasion (the spread of tumour cells into neighbouring normal structures), or the promotion of apoptosis (programmed cell death).

The compounds disclosed herein, or pharmaceutically acceptable salts thereof, being inhibitors of BCL6, have potential therapeutic uses in a variety of BCL6-mediated disease states. BCL6 expression has been linked to a variety of lymphomas (Wagner et al., *British J Haematology*, 2010, 152, 3-12). BCL6 is involved in chromosomal translocations in diffuse large B-cell lymphoma (DLBCL) and inhibitors of BCL6 have been reported to kill DLBCL cells (Cerchietti et al., *Cancer Cell*, 2010, 17, 400-411), primary low grade follicular lymphoma cells (Cardenas et al., *Clin Cancer Res*, 2017, 23(4), 885-893) and Burkitt lymphoma cells (Polo et al., *Nat. Med.*, 2004, 10, 1329-1335). BCL6 is required for the formation of follicular helper T cells (Hatzi et al., *J Exp. Med.*, 2015, 212(4), 539-553), which raises the possibility that BCL6 inhibitors may be used to treat angioimmunoblastic T-cell lymphoma (AITL), in which BCL6 is strongly expressed (Cortes & Palomero, *Curr Opin Hematol*, 2016, 23, 434-443).

BCL6 has also been implicated in leukaemia cells which have acquired resistance to tyrosine kinase inhibitors (TKIs). TKIs typically fail to eradicate leukaemia-initiating cells, which may often cause recurrence of leukaemia after initial treatment. BCL6 has been identified as an important component of the TKI drug-resistance pathway in both Ph+ acute lymphoblastic leukaemia (ALL) (Duy et al., *Nature*, 2011, 473, 384-388) and Ph+ chronic myeloid leukaemia (CML) (Hurtz et al., *J Exp Med*, 2011, 208(11), 2163-2174). Inhibitors of BCL6 may therefore be used to treat ALL and CML in combination with a TKI.

Further non-haematological, solid tumours may be treated with an inhibitor of BCL6. BCL6 is amplified in approximately 50% of breast tumours and is expressed in many breast cancer cell lines, including triple negative breast cancer cell lines (Walker et al., Oncogene, 2015, 34, 1073-1082). BCL6 is also important for the survival and proliferation of non-small cell lung cancer (NSCLC) cells, primarily due to repression of genes involved in DNA damage repair (Marullo et al., *Proc 107$^{th}$ Annual Meeting AACR*, 2016, Abstract nr 1271 and Deb et al., Cancer Res., 2017 Apr. 4, doi: 10.1158/0008-5472.CAN-15-3052). BCL6 amplification may also be prevalent in squamous cell carcinomas (SCC) (including SCC of the head & neck, oesophagus, lung and ovary). Furthermore, inhibition of BCL6 has recently been reported to be a suitable therapeutic target for glioma and glioblastoma (Xu et al., *Proc. Natl. Acad. Sci. U.S.A*, 2017, 114(15), 3981-3986; Fabre et al., *PLoS One*, 2020, 15(4): e0231470).

According to a further aspect of the specification there is provided a compound, or a pharmaceutically acceptable salt thereof, as defined herein for use in the treatment of haematological cancers such as lymphomas (including diffuse large B-cell lymphoma (DLBCL), follicular lymphoma (FL), Burkitt lymphoma (BL) and angioimmunoblastic T-cell lymphoma (AITL)), leukaemias (including acute lymphoblastic leukaemia (ALL), acute myeloid leukaemia (AML), and chronic myeloid leukaemia (CML)) and multiple myeloma, and of solid tumours (including glioma, breast cancer, non-small cell lung cancer (NSCLC) and squamous cell carcinomas (SCC) (including SCC of the head and neck, oesophagus, lung and ovary)).

According to a further feature of this aspect of the specification there is provided a compound, or a pharmaceutically acceptable salt thereof, as defined herein for use in the treatment of lymphomas, including DLBCL, FL, BL and AITL.

According to a further feature of this aspect of the specification there is provided a compound, or a pharmaceutically acceptable salt thereof, as defined herein for use in the treatment of DLBCL and FL.

According to a further feature of this aspect of the specification there is provided a compound, or a pharmaceutically acceptable salt thereof, as defined herein for use in the treatment of leukaemias, including ALL, AML and CML.

According to a further feature of this aspect of the specification there is provided a compound, or a pharmaceutically acceptable salt thereof, as defined herein for use in the treatment of solid tumours, including glioma, breast cancer, NSCLC and SCC.

According to a further feature of this aspect of the specification there is provided a method for treating haematological cancers such as lymphomas (including DLBCL, FL, BL and AITL), leukaemias (including ALL, AML and CML) and multiple myeloma, and of solid tumours (including glioma, breast cancer, NSCLC and SCC (including SCC of the head and neck, oesophagus, lung and ovary)) in a warm-blooded animal such as man that is in need of such treatment, which comprises administering an effective amount of a compound, or a pharmaceutically acceptable salt thereof, as defined herein.

According to a further feature of this aspect of the specification there is provided a method for treating lymphomas, including DLBCL, FL, BL and AITL, in a warm-blooded animal such as man that is in need of such treatment, which comprises administering an effective amount of a compound, or a pharmaceutically acceptable salt thereof, as defined herein.

According to a further feature of this aspect of the specification there is provided a method for treating DLBCL and FL, in a warm-blooded animal such as man that is in need of such treatment, which comprises administering an effective amount of a compound, or a pharmaceutically acceptable salt thereof, as defined herein.

According to a further feature of this aspect of the specification there is provided a method for treating leukaemias, including ALL, AML and CML, in a warm-blooded animal such as man that is in need of such treatment, which comprises administering an effective amount of a compound, or a pharmaceutically acceptable salt thereof, as defined herein.

According to a further feature of this aspect of the specification there is provided a method for treating solid tumours (including glioma, breast cancer, NSCLC and SCC (including SCC of the head and neck, oesophagus, lung and ovary)), in a warm-blooded animal such as man that is in need of such treatment, which comprises administering an effective amount of a compound, or a pharmaceutically acceptable salt thereof, as defined herein.

According to a further feature of this aspect of the specification there is provided the use of a compound, or a pharmaceutically acceptable salt thereof, as defined herein in the manufacture of a medicament for use in the treatment of haematological cancers such as lymphomas (including DLBCL, FL, BL and AITL), leukaemias (including ALL, AML and CML) and multiple myeloma, and of solid tumours (including glioma, breast cancer, NSCLC and SCC (including SCC of the head and neck, oesophagus, lung and ovary)).

According to a further feature of this aspect of the specification there is provided the use of a compound, or a pharmaceutically acceptable salt thereof, as defined herein in the manufacture of a medicament for use in the treatment of lymphomas, including DLBCL, FL, BL and AITL.

According to a further feature of this aspect of the specification there is provided the use of a compound, or a pharmaceutically acceptable salt thereof, as defined herein in the manufacture of a medicament for use in the treatment of DLBCL and FL.

According to a further feature of this aspect of the specification there is provided the use of a compound, or a pharmaceutically acceptable salt thereof, as defined herein in the manufacture of a medicament for use in the treatment of leukaemias, including ALL, AML and CML.

According to a further feature of this aspect of the specification there is provided the use of a compound, or a pharmaceutically acceptable salt thereof, as defined herein in the manufacture of a medicament for use in the treatment of solid tumours (including glioma, breast cancer, NSCLC and SCC (including SCC of the head and neck, oesophagus, lung and ovary)).

BCL6 has also been linked to other disease states outside the cancer field. These include HIV (Cai et al, *J. Virol.*, 2019, 93, e01073/1-e01073/15), sepsis (Zhang et al., *Int. Immunopharmacol.*, 2019, 75, 105789), graft-versus-host disease (Paz et al. *Blood*, 2019, 133, 94-99), non-alcoholic fatty liver disease including non-alcoholic steatohepatitis (Sommars et al., *eLife*, 2019, 8, e43922/1-e43922/25; Chikada et al., *Sci. Rep.*, 2020, 10, 9704) and auto-immune diseases (Crotty, *Immunity*, 2014, 41, 529-542; Lintermann et al., *J. Exp. Med. Vol.*, 2008, 206(3), 561-576). Examples of auto-immune diseases or conditions include rheumatoid arthritis, systemic lupus erythematosis, Graves' disease, autoimmune haemolytic anaemia, multiple sclerosis, Type 1 diabetes, Goodpasture's syndrome, Hashimoto's thyroiditis, Guillain-Barre syndrome, immune thrombocytic purpura, atherosclerosis, Crohn's disease, ulcerative colitis, inflammatory bowel disease, ankylosing spondylitis, seronegative spondylarthropathies, autoimmune thyroiditis, Sjogren's syndrome, Hughes' syndrome, psoriasis, psoriatic arthritis, myasthenia gravis, thrombocytopenic purpura, Addison's disease, primary biliary cirrhosis, diffuse scleroderma, polymyositis, dermatomyositis, autoimmune hepatitis, autoimmune sclerosing cholangitis, limited scleroderma, autoimmune uveitis, acquired haemophilia, pernicious anaemia, pemphigus, pemphigoid and vitiligo.

In an embodiment, the present invention provides a compound, or a pharmaceutically acceptable salt, hydrate or solvate thereof, or a pharmaceutical composition as defined herein for use in the treatment of auto-immune diseases (such as rheumatoid arthritis, systemic lupus erythematosis, Graves' disease, autoimmune haemolytic anaemia, multiple sclerosis, Type 1 diabetes, Goodpasture's syndrome, Hashimoto's thyroiditis, Guillain-Barre syndrome, immune thrombocytic purpura, atherosclerosis, Crohn's disease, ulcerative colitis, inflammatory bowel disease, ankylosing spondylitis, seronegative spondylarthropathies, autoimmune thyroiditis, Sjogren's syndrome, Hughes' syndrome, psoriasis, psoriatic arthritis, myasthenia gravis, thrombocytopenic purpura, Addison's disease, primary biliary cirrhosis, diffuse scleroderma, polymyositis, dermatomyositis, autoimmune hepatitis, autoimmune sclerosing cholangitis, limited scleroderma, autoimmune uveitis, acquired haemophilia, pernicious anaemia, pemphigus, pemphigoid or vitiligo), HIV, sepsis, graft-versus-host disease, non-alcoholic fatty liver disease or non-alcoholic steatohepatitis.

In an embodiment, there is provided the use of a compound, or a pharmaceutically acceptable salt, hydrate or solvate thereof, or a pharmaceutical composition as defined herein in the manufacture of a medicament for use in the treatment of auto-immune diseases (such as rheumatoid arthritis, systemic lupus erythematosis, Graves' disease, autoimmune haemolytic anaemia, multiple sclerosis, Type 1 diabetes, Goodpasture's syndrome, Hashimoto's thyroiditis, Guillain-Barre syndrome, immune thrombocytic purpura, atherosclerosis, Crohn's disease, ulcerative colitis, inflammatory bowel disease, ankylosing spondylitis, seronegative spondylarthropathies, autoimmune thyroiditis, Sjogren's syndrome, Hughes' syndrome, psoriasis, psoriatic arthritis, myasthenia gravis, thrombocytopenic purpura, Addison's disease, primary biliary cirrhosis, diffuse scleroderma, polymyositis, dermatomyositis, autoimmune hepatitis, autoimmune sclerosing cholangitis, limited scleroderma, autoimmune uveitis, acquired haemophilia, pernicious anaemia, pemphigus, pemphigoid or vitiligo), HIV, sepsis, graft-versus-host disease, non-alcoholic fatty liver disease or non-alcoholic steatohepatitis.

In an embodiment, there is provided a method of treating auto-immune diseases (such as rheumatoid arthritis, systemic lupus erythematosis, Graves' disease, autoimmune haemolytic anaemia, multiple sclerosis, Type 1 diabetes, Goodpasture's syndrome, Hashimoto's thyroiditis, Guillain-Barre syndrome, immune thrombocytic purpura, atherosclerosis, Crohn's disease, ulcerative colitis, inflammatory bowel disease, ankylosing spondylitis, seronegative spondylarthropathies, autoimmune thyroiditis, Sjogren's syndrome, Hughes' syndrome, psoriasis, psoriatic arthritis, myasthenia gravis, thrombocytopenic purpura, Addison's disease, primary biliary cirrhosis, diffuse scleroderma, polymyositis, dermatomyositis, autoimmune hepatitis, autoimmune sclerosing cholangitis, limited scleroderma, autoimmune uveitis, acquired haemophilia, pernicious anaemia, pemphigus, pemphigoid or vitiligo), HIV, sepsis, graft-versus-host disease, non-alcoholic fatty liver disease or non-alcoholic steatohepatitis, in a warm-blooded animal such as man that is in need of such treatment, which comprises administering an effective amount of a compound, or a pharmaceutically acceptable salt thereof, as defined herein.

Routes of Administration

The compounds of the invention or pharmaceutical compositions comprising these compounds may be administered to a subject by any convenient route of administration, whether systemically, peripherally or topically (i.e., at the site of desired action).

Routes of administration include, but are not limited to, oral (e.g, by ingestion); buccal; sublingual; transdermal (including, e.g., by a patch, plaster, etc.); transmucosal (including, e.g., by a patch, plaster, etc.); intranasal (e.g., by nasal spray); ocular (e.g., by eye drops); pulmonary (e.g., by inhalation or insufflation therapy using, e.g., via an aerosol, e.g., through the mouth or nose); rectal (e.g., by suppository or enema); vaginal (e.g., by pessary); parenteral, for example, by injection, including subcutaneous, intradermal, intramuscular, intravenous, intra-arterial, intracardiac, intrathecal, intraspinal, intracapsular, subcapsular, intraorbital, intraperitoneal, intratracheal, subcuticular, intraarticular, subarachnoid, and intrasternal; by implant of a depot or reservoir, for example, subcutaneously or intramuscularly.

Combination Therapies

The antiproliferative treatment defined hereinbefore may be applied as a sole therapy or may involve, in addition to the compound of the invention, conventional surgery or radiotherapy or chemotherapy. Such chemotherapy may include one or more of the following categories of anti-tumour agents:—

(i) other antiproliferative/antineoplastic drugs and combinations thereof, as used in medical oncology, such as alkylating agents (for example cis-platin, oxaliplatin, carboplatin, cyclophosphamide, nitrogen mustard, melphalan, chlorambucil, busulphan, temozolamide and nitrosoureas); antimetabolites (for example cytarabine, gemcitabine and antifolates such as fluoropyrimidines like 5-fluorouracil and tegafur, raltitrexed, methotrexate, cytosine arabinoside, and hydroxyurea); antitumour antibiotics (for example anthracyclines like adriamycin, bleomycin, doxorubicin, daunomycin, epirubicin, idarubicin, mitomycin-C, dactinomycin and mithramycin); antimitotic agents (for example *vinca* alkaloids like vincristine, vinblastine, vindesine and vinorelbine and taxoids like taxol and taxotere and polokinase inhibitors); and topoisomerase inhibitors (for example epipodophyllotoxins like etoposide and teniposide, amsacrine, topotecan and camptothecin);

(ii) cytostatic agents such as antioestrogens (for example tamoxifen, fulvestrant, toremifene, raloxifene, droloxifene and iodoxyfene), antiandrogens (for example bicalutamide, flutamide, nilutamide and cyproterone acetate), LHRH antagonists or LHRH agonists (for example goserelin, leuprorelin and buserelin), steroid hormones, including progestogens (for example megestrol acetate) and corticosteroids (for example dexamethasone, prednisone and prednisolone), aromatase inhibitors (for example as anastrozole, letrozole, vorazole and exemestane) and inhibitors of 5α-reductase such as finasteride;

(iii) anti-invasion agents [for example c-Src kinase family inhibitors like 4-(6-chloro-2,3-methylenedioxyanilino)-7-[2-(4-methylpiperazin-1-yl)ethoxy]-5-tetrahydropyran-4-yloxyquin-azoline (AZD0530; International Patent Application WO 01/94341), N-(2-chloro-6-methylphenyl)-2-{6-[4-(2-hydroxyethyl)piperazin-1-yl]-2-methylpyrimidin-4-ylamino}thiazole-5-carboxamide (dasatinib, BMS-354825; *J. Med. Chem.*, 2004, 47, 6658-6661) and bosutinib (SKI-606), and metalloproteinase inhibitors like marimastat, inhibitors of urokinase plasminogen activator receptor function or antibodies to Heparanase];

(iv) inhibitors of growth factor function: for example such inhibitors include growth factor antibodies and growth factor receptor antibodies (for example the anti-erbB2 antibody trastuzumab [Herceptin™], the anti-EGFR antibody panitumumab, the anti-erbB1 antibody cetuximab [Erbitux, C225] and any growth factor or growth factor receptor antibodies disclosed by Stern et al. (Critical reviews in oncology/haematology, 2005, Vol. 54, pp 11-29); such inhibitors also include tyrosine kinase inhibitors, for example inhibitors of the epidermal growth factor family (for example EGFR family tyrosine kinase inhibitors such as N-(3-chloro-4-fluorophenyl)-7-methoxy-6-(3-morpholinopropoxy)quinazolin-4-amine (gefitinib, ZD1839), N-(3-ethynylphenyl)-6,7-bis(2-methoxyethoxy)quinazolin-4-amine (erlotinib, OSI-774) and 6-acrylamido-N-(3-chloro-4-fluorophenyl)-7-(3-morpholinopropoxy)-quinazolin-4-amine (CI 1033), erbB2 tyrosine kinase inhibitors such as lapatinib); inhibitors of the hepatocyte growth factor family; inhibitors of the insulin growth factor family; inhibitors of the platelet-derived growth factor family such as imatinib and/or nilotinib (AMN107); inhibitors of serine/threonine kinases (for example Ras/Raf signalling inhibitors such as farnesyl transferase inhibitors, for example sorafenib (BAY 43-9006), tipifarnib (R115777) and lonafarnib (SCH66336)), inhibitors of cell signalling through MEK and/or AKT kinases, c-kit inhibitors, abl kinase inhibitors, PI3 kinase inhibitors, Plt3 kinase inhibitors, CSF-1R kinase inhibitors, IGF receptor (insulin-like growth factor) kinase inhibitors; aurora kinase inhibitors (for example AZD1152, PH739358, VX-680, MLN8054, R763, MP235, MP529, VX-528 AND AX39459) and cyclin dependent kinase inhibitors such as CDK2 and/or CDK4 inhibitors;

(v) antiangiogenic agents such as those which inhibit the effects of vascular endothelial growth factor, [for example the anti-vascular endothelial cell growth factor antibody bevacizumab (Avastin™) and for example, a VEGF receptor tyrosine kinase inhibitor such as vandetanib (ZD6474), vatalanib (PTK787), sunitinib (SU11248), axitinib (AG-013736), pazopanib (GW 786034) and 4-(4-fluoro-2-methylindol-5-yloxy)-6-methoxy-7-(3-pyrrolidin-1-ylpropoxy)quinazoline (AZD2171; Example 240 within WO 00/47212), compounds such as those disclosed in International Patent Applications WO97/22596, WO 97/30035, WO 97/32856 and WO 98/13354 and compounds that work by other mechanisms (for example linomide, inhibitors of integrin αvβ3 function and angiostatin)];

(vi) vascular damaging agents such as Combretastatin A4 and compounds disclosed in International Patent Applications WO 99/02166, WO 00/40529, WO 00/41669, WO 01/92224, WO 02/04434 and WO 02/08213;

(vii) an endothelin receptor antagonist, for example zibotentan (ZD4054) or atrasentan; (viii) inhibitors of DNA damage response (DDR) pathways, for example inhibitors of ATM (such as KU-60019, M3541, AZD0156 or AZD1390) and ATR (such as M6620, AZD6738 or BAY1895344);

(ix) antisense therapies, for example those which are directed to the targets listed above, such as ISIS 2503, an anti-ras antisense;

(x) gene therapy approaches, including for example approaches to replace aberrant genes such as aberrant p53 or aberrant BRCA1 or BRCA2, GDEPT (gene-directed enzyme pro-drug therapy) approaches such as those using cytosine deaminase, thymidine kinase or a bacterial nitroreductase enzyme and approaches to increase patient tolerance to chemotherapy or radiotherapy such as multi-drug resistance gene therapy; and (xi) immunotherapy approaches, including for example ex-vivo and in-vivo approaches to increase the immunogenicity of patient tumour cells, such as transfection with cytokines such as interleukin 2, interleukin 4 or granulocyte-macrophage colony stimulating factor, approaches to decrease T-cell anergy, approaches using transfected immune cells such as cytokine-transfected dendritic cells, approaches using cytokine-transfected tumour cell lines, approaches using anti-idiotypic antibodies and approaches using checkpoint inhibitors (such as inhibitors targeting CTLA-4 (e.g. ipilimumab), PD-1 (e.g. nivolumab, pembrolizumab or cemiplimab) or PD-L1 (e.g. atezolizumab, avelumab or durvalumab)).

In a particular embodiment, the antiproliferative treatment defined hereinbefore may involve, in addition to the compound of the invention, conventional surgery or radiotherapy or chemotherapy, wherein the chemotherapy may include one or more anti-tumour agents selected from procarbazine, carmustine, cytarabine, lomustine, irinotecan, temozolomide, cisplatin, carboplatin, doxorubicin, methotrexate, etoposide, cyclophosphamide, ifosfamide, and vincristine.

In another particular embodiment, the antiproliferative treatment defined hereinbefore may involve, in addition to the compound of the invention, conventional surgery or radiotherapy or chemotherapy, wherein the chemotherapy may include one or more chemotherapeutic agents selected from a BCL-2 family inhibitor (e.g. Venetoclax and/or navitoclax), a BTK inhibitor (e.g. Ibrutinib, Acalabrutinib, Tirabrutinib (ONO/GS-4059), BGB-3111 or Spebrutinib (CC-292), a TNF inhibitor (e.g. Lenalidomide), an EZH2 inhibitor (e.g. Tazemetostat, CPI-0209, CPI-1205, DS-3201, HH2853 PF-06821497, GSK126, GSK343, SHR2554 or EPZ011989), a corticosteroid (e.g. dexamethasone, prednisone or prednisolone), a HDAC inhibitor (e.g. panobinostat, entinostat, romidepsin, belinostat or vorinostat), an ATR or ATM kinase inhibitor and an EGFR tyrosine kinase inhibitor.

Such conjoint treatment may be achieved by way of the simultaneous, sequential or separate dosing of the individual components of the treatment. Such combination products employ the compounds of this invention within the dosage range described hereinbefore and the other pharmaceutically-active agent within its approved dosage range.

According to this aspect of the invention there is provided a combination for use in the treatment of a cancer (for example a cancer involving a solid tumour) comprising a compound of the invention as defined hereinbefore, or a pharmaceutically acceptable salt, hydrate or solvate thereof, and another anti-tumour agent.

According to this aspect of the invention there is provided a combination for use in the treatment of a proliferative condition, such as cancer (for example a cancer involving a solid tumour), comprising a compound of the invention as defined hereinbefore, or a pharmaceutically acceptable salt, hydrate or solvate thereof, and any one of the anti-tumour agents listed herein above.

According to this aspect of the invention there is provided a combination for use in the treatment of a cancer comprising a compound of the invention as defined hereinbefore, or a pharmaceutically acceptable salt, hydrate or solvate thereof, and a tyrosine kinase inhibitor.

According to this aspect of the invention there is provided a combination for use in the treatment of leukaemia (such as ALL or CML) comprising a compound of the invention as defined hereinbefore, or a pharmaceutically acceptable salt, hydrate or solvate thereof, and a tyrosine kinase inhibitor.

According to this aspect of the invention there is provided a combination for use in the treatment of lymphomas comprising a compound of the invention as defined hereinbefore, or a pharmaceutically acceptable salt, hydrate or solvate thereof, and an EZH2 inhibitor.

According to this aspect of the invention there is further provided a combination for use in the treatment of cancer comprising a compound of the invention as defined hereinbefore, or a pharmaceutically acceptable salt, hydrate or solvate thereof, and a corticosteroid.

In a further aspect of the invention there is provided a compound of the invention or a pharmaceutically acceptable salt, hydrate or solvate thereof, for use in the treatment of cancer in combination with another anti-tumour agent, optionally selected from one listed herein above.

In a further aspect of the invention there is provided a compound of the invention or a pharmaceutically acceptable salt, hydrate or solvate thereof, for use in the treatment of cancer in combination with a tyrosine kinase inhibitor, optionally selected from one listed herein above.

In a further aspect of the invention there is provided a compound of the invention or a pharmaceutically acceptable salt, hydrate or solvate thereof, for use in the treatment of leukaemia (such as ALL or CML) in combination with a tyrosine kinase inhibitor, optionally selected from one listed herein above.

In a further aspect of the invention there is provided a compound of the invention or a pharmaceutically acceptable salt, hydrate or solvate thereof, for use in the treatment of cancer in combination with an EZH2 inhibitor, optionally selected from one listed herein above.

In a further aspect of the invention there is provided a compound of the invention or a pharmaceutically acceptable salt, hydrate or solvate thereof, for use in the treatment of lymphomas in combination with an EZH2 inhibitor, optionally selected from one listed herein above.

Herein, where the term "combination" is used it is to be understood that this refers to simultaneous, separate or sequential administration. In one aspect of the invention "combination" refers to simultaneous administration. In another aspect of the invention "combination" refers to separate administration. In a further aspect of the invention "combination" refers to sequential administration. Where the administration is sequential or separate, the delay in administering the second component should not be such as to lose the beneficial effect of the combination.

According to a further aspect of the invention there is provided a pharmaceutical composition which comprises a compound of the invention, or a pharmaceutically acceptable salt, hydrate or solvate thereof, in combination with an anti-tumour agent (optionally selected from one listed herein above), in association with a pharmaceutically acceptable diluent or carrier.

EXAMPLES

Particular embodiments of the invention are further described hereinafter, with reference to the accompanying drawings, in which:

FIG. 1 shows the flow cytometry splenocyte hierarchical gating strategy: GC B cells were gated according to the following hierarchical gating strategy: viable→single cell (doublet exclusion)→lymphocytes→CD19+CD20+ →GL7+CD95+(light squares); non-GC B cells were gated according to the following hierarchical gating strategy: viable→single cell (doublet exclusion)→lymphocytes→CD19+CD20+→GL7-CD95− (dark squares).

FIG. 2 shows the flow cytometry expression levels of BCL6 (geometric mean fluorescence intensity—GeoMFI) in non-GC B cells, without (vehicle) or with Example 4b at various concentrations. Stimulated and unstimulated B cell BCL6 expression is indicated with the upper and middle dashed lines respectively, while the lower dashed line represents the biological background expression for CD4 stimulated T cells.

ABBREVIATIONS

Figure 1:
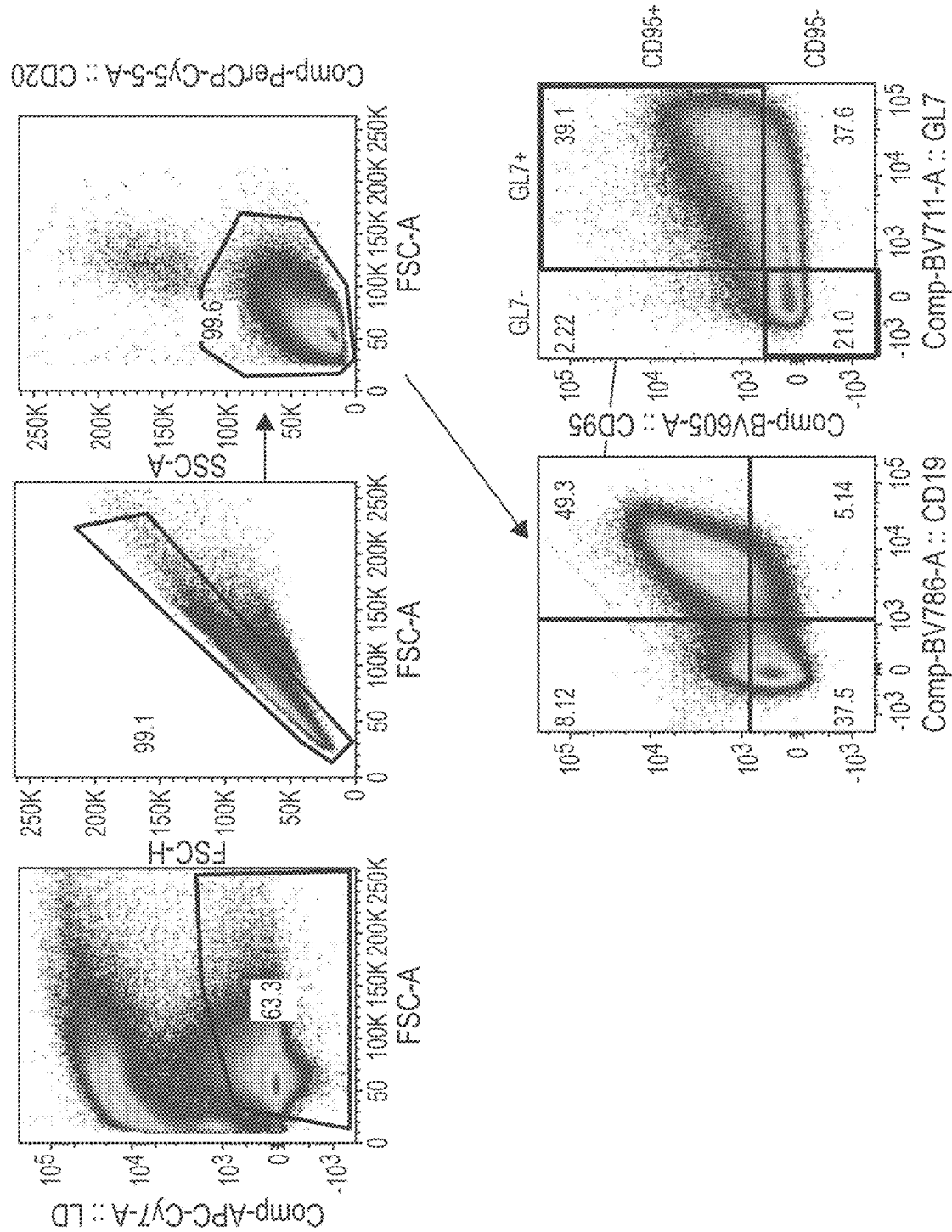

APCI Atmospheric pressure chemical ionization
aq. Aqueous
Ar Argon
Boc t-butyloxycarbonyl protecting group
br broad (in NMR spectrum)
conc. concentrated
d doublet (in NMR spectrum)
DCM dichloromethane
DIPEA N,N-diisopropylethylamine
DMF N,N-dimethylformamide
DMSO dimethylsulfoxide
ESI electrospray ionisation
EtOAc ethyl acetate
EtOH ethanol
FID free induction decay
h hour(s)
HATU N-[(Dimethylamino)-1H-1,2,3-triazolo-[4,5-b] pyridin-1-ylmethylene]-N-methylmethanaminium hexafluorophosphate N-oxide
HPLC High Performance Liquid Chromatography
HRMS high resolution mass spectrometry
Josiphos ligand for Pd catalysed reactions: (R)-1-[(S)-2-(Dicyclohexylphosphino)ferrocenyl]ethyl-tert-butylphosphine KP-Sil Biotage KP-Sil (50 uM irregular silica)
LCMS liquid chromatography and mass spectrometry
MeOH methanol
MeCN acetonitrile
MS mass spectrometry
Ms mesyl (methanesulfonyl)
m multiplet (in NMR spectrum)
MHz megahertz
min minute(s)
mins minute(s)
mL milliliter(s)
m/z mass to charge ratio
NMP N-methylpyrrolidinone
NMR nuclear magnetic resonance
Pd/C palladium on activated charcoal
ppm parts per million
q quartet (in NMR spectrum)
QToF Quadrupole Time-of-flight
quin. quintet (in NMR spectrum)
Rt, RT retention time (in LCMS)
rt room temperature
s singlet (in NMR spectrum)
SCX-2 strong cation exchange (e.g. Isolute® SCX-2 columns)
t triplet (in NMR spectrum)
Tf triflate (trifluoromethane sulfonate)
TFA trifluoroacetic acid THF tetrahydrofuran
T3P propylphosphonic anhydride
uL microliters
UPLC Ultra-Performance Liquid Chromatography
Xantphos 4,5-Bis(diphenylphosphino)-9,9-dimethylxanthene Analytical Methods: LCMS Method T2

LC/MS and HRMS analysis was performed on an Agilent 1200 series HPLC and diode array detector coupled to a 6210 time of flight mass spectrometer with dual multimode APCI/ESI source. Analytical separation was carried out at 40° C. on a Merck Chromolith Flash column (RP-18e, 25×2 mm) using a flow rate of 1.5 mL/min in a 2 minute gradient elution with detection at 254 nm. The mobile phase was a mixture of methanol (solvent A) and water (solvent B), both containing formic acid at 0.1%. Gradient elution was as follows: 5:95 (A/B) to 100:0 (A/B) over 1.25 min, 100:0 (A/B) for 0.5 min, and then reversion back to 5:95 (A/B) over 0.05 min, finally 5:95 (A/B) for 0.2 min.

Method T4

As for method T2 except at 30° C., using a flow rate of 0.75 mL/min in a 4 minute gradient elution as follows: 5:95 (A/B) to 100:0 (A/B) over 2.5 min, 100:0 (A/B) for 1 min, and then reversion back to 5:95 (A/B) over 0.1 min, finally 5:95 (A/B) for 0.4 min.

Method X2

LC/MS and HRMS analysis was performed on a Waters Acquity UPLC and diode array detector coupled to a Waters G2 QToF mass spectrometer fitted with a multimode ESI/APCI source. Analytical separation was carried out at 30° C. on a Phenomenex Kinetex C18 column (30×2.1 mm, 2.6u, 100 A) using a flow rate of 0.5 mL/min in a 2 minute gradient elution with detection at 254 nm. The mobile phase was a mixture of methanol (solvent A) and water (solvent B), both containing formic acid at 0.1%. Gradient elution was as follows: 10:90 (A/B) to 90:10 (A/B) over 1.25 min, 90:10 (A/B) for 0.5 min, and then reversion back to 10:90 (A/B) over 0.15 min, finally 10:90 (A/B) for 0.1 min.

Method X4

As for method X2, except using a flow rate of 0.3 mL/min in a 4 minute gradient elution as follows: 10:90 (A/B) to 90:10 (A/B) over 3 min, 90:10 (A/B) for 0.5 min, and then reversion back to 10:90 (A/B) over 0.3 min, finally 10:90 (A/B) for 0.2 min.

Analytical Methods: NMR

NMR data was collected on a Bruker Avance 500 spectrometer equipped with a 5 mm BBO/QNP probe, or on a Bruker Avance Neo 600 spectrometer equipped with a 5 mm TCI Cryo-Probe. The $^1$H and $^{13}$C spectra were referenced to the internal deuterated solvent. All NMR data were acquired at the temperature of 298 K. All data were acquired and processed using Bruker Topspin 2.1 or Bruker Topspin 4.

The $^1$H NMR spectra were acquired using a Bruker standard 1D zg30 pulse sequence with 16 scans. The sweep width was 20.5 ppm, and the FID contained 64k time-domain data points.

Purification Methods

Unless otherwise described in the text, preparative HPLC purification was carried out on an Agilent 6120 MS-Prep LC using an ACE 5 C18-PFP 250×21.2 mm (or 30 mm) column using a 15 min gradient of water:methanol (both modified with 0.1% formic acid)—for example 90:10 to 0:100 or 60:40 to 0:100—at a flow rate of 20 mLmin$^{-1}$ (or 40 mLmin$^{-1}$ for the 30 mm column).

Flash column chromatography was carried out using prepacked Biotage SNAP KP-Sil columns. Reverse phase chromatography was carried out using a Biotage SNAP Ultra C-18 12 g and 30 g columns as required.

EXAMPLE COMPOUNDS

Example 1a: (S)-10-((5-chloro-2-(3,3-difluoroazetidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one

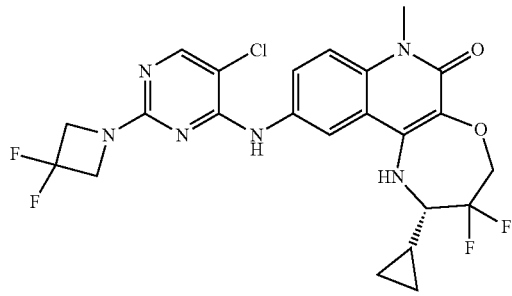 [SMILES: Cn1c(=O)c2c(c3cc(Nc4nc(N5CC(F)(F)C5)ncc4Cl)ccc31)N[C@@H](C1CC1)C(F)(F)CO2]

A mixture of (S)-2-cyclopropyl-10-((2,5-dichloropyrimidin-4-yl)amino)-3,3-difluoro-7-methyl-1,2,3,4-tetrahydro-[1,4]oxazepino[2,3-c]quinolin-6(7H)-one (Intermediate A1, 11.5 mg, 0.025 mmol), 3,3-difluoroazetidine hydrochloride (8 mg, 0.062 mmol) and DIPEA (80 μL, 0.46 mmol) in acetonitrile (0.6 mL) under argon was heated to 80° C. for 1 hour, then further heated under microwave irradiation to 120° C. for 19 h. The crude product was concentrated under reduced pressure, dissolved in DMSO (1 mL) and purified by reverse-phase chromatography (12 g Biotage Ultra C18, 10-60-90-100% methanol in water, 0.1% formic acid modifier). Fractions containing product were combined and passed through an SCX-2 (2 g) column, washing with methanol (10 mL) and eluting with 2M methanolic ammonia (25 mL). The ammonia fractions were combined and evaporated under reduced pressure to give the title compound as an off-white solid (4.3 mg, 0.008 mmol). $^1$H NMR (600 MHz, Methanol-d$_4$) δ 8.14 (d, J=2.1 Hz, 1H), 8.02 (s, 1H), 7.95 (dd, J=9.1, 2.1 Hz, 1H), 7.55 (d, J=9.1 Hz, 1H), 4.52-4.34 (m, 6H), 3.72 (s, 3H), 3.36-3.29 (m, 1H), 1.44-1.37 (m, 1H), 0.83-0.76 (m, 1H), 0.71-0.65 (m, 1H), 0.65-0.59 (m, 1H), 0.39-0.33 (m, 1H); HRMS (Method X4) RT=3.19 min; m/z calcd for $C_{23}H_{22}ClF_4N_6O_2^+$[M+H]$^+$: 525.1429, Found: 525.1412.

The following tabulated examples were prepared by a method analogous to that used for the preparation of Example 1a, using the appropriate amine (as free base or as hydrochloride salt). For examples 1b-1e, the reaction mixtures were heated to 140° C. for 1-2 h using microwave irradiation. For examples 1f-1l, the reaction mixtures were heated to 80° C. for 1.5-3 h. Purification was carried out by reverse-phase chromatography, and in some cases products were desalted using an SCX-2 column.

| Example | Data and comments | Amine used |
|---|---|---|
| Example 1b: (S)-10-((5-chloro-2-(4-cyclopropyl-3-oxopiperazin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one | $^1$H NMR (600 MHz, Methanol-$d_4$) δ 8.04 (d, J = 2.2 Hz, 1H), 8.00 (s, 1H), 7.92 (dd, J = 9.1, 2.2 Hz, 1H), 7.56 (d, J = 9.1 Hz, 1H), 4.53-4.38 (m, 2H), 4.22 (d, J = 18.3 Hz, 1H), 4.16 (d, J = 18.3 Hz, 1H), 3.92-3.87 (m, 1H), 3.86-3.81 (m, 1H), 3.72 (s, 3H), 3.40 (t, J = 5.4 Hz, 2H), 3.35-3.28 (m, 1H), 2.78-2.73 (m, 1H), 1.45-1.36 (m, 1H), 0.83-0.76 (m, 3H), 0.71-0.67 (m, 2H), 0.66-0.58 (m, 2H), 0.37-0.31 (m, 1H); HRMS m/z calcd for $C_{27}H_{29}ClF_2N_7O_3^+$ [M + H]$^+$: 572.1989, Found: 572.1987. | 1-cyclopropyl-piperazin-2-one |
| Example 1c: (S)-10-((5-chloro-2-((S)-3,4-dimethyl-5-oxopiperazin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one | $^1$H NMR (600 MHz, Methanol-$d_4$) δ 8.02-7.99 (m, 2H), 7.96 (dd, J = 9.1, 2.3 Hz, 1H), 7.57 (d, J = 9.1 Hz, 1H), 4.53-4.38 (m, 3H), 4.26 (dd, J = 13.4, 2.7 Hz, 1H), 3.93 (d, J = 18.5 Hz, 1H), 3.72 (s, 3H), 3.62-3.57 (m, 1H), 3.51 (dd, J = 13.4, 3.6 Hz, 1H), 3.35-3.28 (m, 1H), 2.97 (s, 3H), 1.43-1.36 (m, 1H), 1.21 (d, J = 6.4 Hz, 3H), 0.81-0.75 (m, 1H), 0.68-0.57 (m, 2H), 0.38-0.33 (m, 1H); HRMS m/z calcd for $C_{26}H_{29}ClF_2N_7O_3$+ [M + H]$^+$: 560.1989, Found: 560.1982. | (S)-1,6-dimethylpiperazin-2-one hydrochloride |
| Example 1d: (S)-10-((5-chloro-2-((2-hydroxy-2-methylpropyl)amino)pyrimidin-4-yl)amino)-2-cyclopropyl-3,3-difluoro-7-methyl-1,2,3,4-tetrahydro-[1,4]oxazepino[2,3-c]quinolin-6(7H)-one:formic acid (1:1) | $^1$H NMR (600 MHz, Methanol-$d_4$) δ 8.24 (s, 1H), 8.11 (s, 1H), 7.94 (dd, J = 9.0, 2.4 Hz, 1H), 7.92 (s, 1H), 7.57 (d, J = 9.1 Hz, 1H), 4.51 (ddd, J = 15.8, 13.2, 2.4 Hz, 1H), 4.43 (ddd, J = 23.9, 13.3, 7.2 Hz, 1H), 3.74 (s, 3H), 3.37 (s, 2H), 3.32-3.30 (m, 1H), 1.47-1.40 (m, 1H), 1.15 (s, 6H), 0.84-0.76 (m, 1H), 0.72-0.65 (m, 1H), 0.65-0.59 (m, 1H), 0.40-0.34 (m, 1H). HRMS m/z calcd for $C_{24}H_{28}ClF_2N_6O_3$ [M + H]$^+$: 521.1874, found 521.1841. | 1-amino-2-methylpropan-2-ol |
| Example 1e: (S)-10-((2-((1R,4R)-2-oxa-5-azabicyclo[2.2.1]heptan-5-yl)-5-chloropyrimidin-4-yl)amino)-2-cyclopropyl-3,3-difluoro-7-methyl-1,2,3,4-tetrahydro-[1,4]oxazepino[2,3-c]quinolin-6(7H)-one | $^1$H NMR (600 MHz, Methanol-$d_4$) δ 8.11 (s, 1H), 8.02-7.95 (m, 2H), 7.57 (d, J = 9.1 Hz, 1H), 4.85-4.79(m, 1H), 4.66 (s, 1H), 4.55-4.37 (m, 2H), 3.86-3.79 (m, 2H), 3.74 (s, 3H), 3.52-3.44 (m, 2H), 3.37 (s, 1H), 2.00-1.89 (m, 2H), 1.46-1.37 (m, 1H), 0.85-0.78 (m, 1H), 0.74-0.67 (m, 1H), 0.65-0.60 (m, 1H), 0.41-0.34 (m, 1H). HRMS m/z calcd for $C_{25}H_{26}ClF_2N_6O_3$ [M + H]+: 531.1717; found 531.1725 | (1R,4R)-2-oxa-5-azabicyclo[2.2.1]heptane |

-continued

| Example | Data and comments | Amine used |
|---|---|---|
| Example 1f: N-((3S,5R)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)-5-methylpiperidin-3-yl)acetamide | $^1$H NMR (600 MHz, Methanol-$d_4$) δ 8.08 (d, J = 9.1 Hz, 1H), 7.97-7.92 (m, 2H), 7.54 (d, J = 9.1 Hz, 1H), 4.78-4.67 (m, 1H), 4.57-4.34 (m, 3H), 3.80-3.73 (m, 1H), 3.73 (s, 3H), 3.40-3.26 (m, 1H), 2.43 (dd, J = 12.6, 11.2 Hz, 1H), 2.31 (dd, J = 13.1, 11.4 Hz, 1H), 1.97 (m, 4H), 1.66 (m, 1H), 1.46-1.36 (m, 1H), 1.14-1.05 (m, 1H), 0.94 (d, J = 6.5 Hz, 3H), 0.83-0.77 (m, 1H), 0.72-0.65 (m, 1H), 0.65-0.59 (m, 1H), 0.41-0.35 (m, 1H). HRMS: m/z calcd for $C_{28}H_{33}ClF_2N_7O_3$ [M + H]$^+$: 588.2302, Found: 588.2307. | N-((3S,5R)-5-methylpiperidin-3-yl)acetamide [Prepared from tert-butyl (3S,5R)-3-amino-5-methylpiperidine-1-carboxylate by acylation with acetic anhydride followed by Boc deprotection.] |
| Example 1g: N-((3R,5S)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)-5-methylpiperidin-3-yl)acetamide | $^1$H NMR (600 MHz, Methanol-$d_4$) δ 8.08 (d, J = 9.1 Hz, 1H), 7.96 (s, 1H), 7.94 (s, 1H), 7.54 (d, J = 9.1 Hz, 1H), 4.76-4.71 (m, 1H), 4.56-4.37 (m, 3H), 3.79-3.74 (m, 1H), 3.73 (s, 3H), 3.38-3.27 (m, 1H), 2.44 (dd, J = 12.6, 11.1 Hz, 1H), 2.32 (dd, J = 13.1, 11.4 Hz, 1H), 2.03-1.98 (m, 1H), 1.96 (s, 3H), 1.71-1.61 (m, 1H), 1.45-1.38 (m, 1H), 1.10 (q, J = 12.1 Hz, 1H), 0.94 (d, J = 6.6 Hz, 3H), 0.84-0.78 (m, 1H), 0.72-0.65 (m, 1H), 0.65-0.58 (m, 1H), 0.41-0.33 (m, 1H). HRMS: m/z calcd for $C_{28}H_{33}ClF_2N_7O_3$ [M + H]$^+$: 588.2302, Found: 588.2302. | N-((3R,5S)-5-methylpiperidin-3-yl)acetamide [Prepared from tert-butyl (3R,5S)-3-amino-5-methylpiperidine-1-carboxylate by acylation with acetic anhydride followed by Boc deprotection.] |
| Example 1h: (S)-10-((5-chloro-2-((3S,5R)-3-(dimethylamino)-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one | $^1$H NMR (600 MHz, DMSO-$d_6$) δ 8.85 (s, 1H), 8.09 (s, 1H), 8.02 (s, 1H), 7.72 (dd, J = 9.1, 2.2 Hz, 1H), 7.40 (d, J = 9.0 Hz, 1H), 6.25 (s, 1H), 4.65 (s, 1H), 4.55-4.25 (m, 3H), 3.55 (s, 3H), 3.26-3.17 (m, 1H), 2.36-2.11 (m, 9H), 1.97-1.86 (m, 1H), 1.51-1.42 (m, 1H), 1.35-1.27 (m, 1H), 1.10-0.98 (m, 1H), 0.84 (d, J = 5.5 Hz, 3H), 0.74-0.69 (m, 1H), 0.55-0.46 (m, 2H), 0.39-0.25 (m, 1H). HRMS: m/z calcd for $C_{28}H_{35}ClF_2N_7O_2$ [M + H]$^+$: 574.2509, Found: 574.2503. | (3S,5R)-N,N,5-trimethylpiperidin-3-amine [prepared from tert-butyl (3S,5R)-3-amino-5-methylpiperidine-1-carboxylate by reductive amination with formaldehyde, followed by boc deprotection] |
| Example 1i: (S)-10-((5-chloro-2-((S)-3-hydroxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one | $^1$H NMR (600 MHz, Methanol-$d_4$) δ 8.05 (d, J = 2.3 Hz, 1H), 7.97 (dd, J = 9.1, 2.3 Hz, 1H), 7.94 (s, 1H), 7.56 (d, J = 9.1 Hz, 1H), 4.54-4.35 (m, 2H), 4.28-4.20 (m, 1H), 4.11-4.02 (m, 1H), 3.72 (s, 3H), 3.67-3.59 (m, 1H), 3.39-3.26 (m, 1H), 3.20-3.12 (m, 1H), 3.08 (dd, 1H), 2.03-1.93 (m, 1H), 1.83-1.74 (m, 1H), 1.57-1.37 (m, 3H), 0.86-0.75 (m, 1H), 0.72-0.65 (m, 1H), 0.65-0.58 (m, 1H), 0.42-0.32 (m, 1H). HRMS: m/z calcd for $C_{25}H_{28}ClF_2N_6O_3$ [M + H]$^+$: 533.1874, Found: 533.1880 | (S)-piperidin-3-ol hydrochloride |

-continued

| Example | Data and comments | Amine used |
| --- | --- | --- |
| Example 1j: (S)-10-((5-chloro-2-((R)-3-hydroxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one | $^1$H NMR (600 MHz, Methanol-$d_4$) δ 8.06 (d, J = 2.4 Hz, 1H), 7.98 (dd, J = 9.1, 2.3 Hz, 1H), 7.95 (s, 1H), 7.56 (d, J = 9.1 Hz, 1H), 4.58-4.36 (m, 2H), 4.31-4.20 (m, 1H), 4.11-4.00 (m, 1H), 3.73 (s, 3H), 3.66-3.55 (m, 1H), 3.38-3.26 (m, 1H), 3.21-3.14 (m, 1H), 3.09 (dd, J = 12.9, 8.3 Hz, 1H), 2.02-1.90 (m, 1H), 1.86-1.73 (m, 1H), 1.59-1.34 (m, 3H), 0.87-0.76 (m, 1H), 0.73-0.64 (m, 1H), 0.64-0.56 (m, 1H), 0.44-0.33 (m, 1H). HRMS: m/z calcd for $C_{25}H_{28}ClF_2N_6O_3$ [M + H]$^+$: 533.1874, Found: 533.1882 | (R)-piperidin-3-ol hydrochloride |
| Example 1k: (S)-10-((5-chloro-2-((S)-3-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one | $^1$H NMR (600 MHz, Methanol-$d_4$) δ 8.07 (d, J = 2.3 Hz, 1H), 7.96 (dd, J = 9.1, 2.3 Hz, 1H), 7.93 (s, 1H), 7.54 (d, J = 9.2 Hz, 1H), 4.59-4.29 (m, 4H), 3.73 (s, 3H), 3.39-3.27 (m, 1H), 2.83 (td, J = 12.7, 3.0 Hz, 1H), 2.51 (dd, J = 12.8, 10.6 Hz, 1H), 1.88-1.79 (m, 1H), 1.73-1.62 (m, 1H), 1.60-1.52 (m, 1H), 1.51-1.37 (m, 2H), 1.22-1.13 (m, 1H), 0.90 (d, J = 6.6 Hz, 3H), 0.83-0.76 (m, 1H), 0.71-0.64 (m, 1H), 0.65-0.58 (m, 1H), 0.41-0.31 (m, 1H). HRMS: m/z calcd for $C_{26}H_{30}ClF_2N_6O_2$ [M + H]$^+$: 531.2081, Found: 531.2076 | (S)-3-methylpiperidine hydrochloride |
| Example 1l: (S)-10-((5-chloro-2-((R)-3-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one | $^1$H NMR (600 MHz, Methanol-$d_4$) δ 8.05 (d, J = 2.3 Hz, 1H), 7.98 (dd, J = 9.1, 2.3 Hz, 1H), 7.93 (s, 1H), 7.54 (d, J = 9.1 Hz, 1H), 4.53-4.35 (m, 5H), 3.72 (s, 3H), 2.84 (ddd, J = 13.1, 11.9, 3.0 Hz, 1H), 2.51 (dd, J = 13.0, 10.6 Hz, 1H), 1.87-1.78 (m, 1H), 1.72-1.65 (m, 1H), 1.62-1.37 (m, 3H), 1.22-1.12 (m, 1H), 0.90 (d, J = 6.7 Hz, 3H), 0.85-0.77 (m, 1H), 0.70-0.65 (m, 1H), 0.64-0.59 (m, 1H), 0.41-0.33 (m, 1H). HRMS: m/z calcd for $C_{26}H_{30}ClF_2N_6O_2$ [M + H]$^+$: 531.2081, Found: 531.2084 | (R)-3-methylpiperidine hydrochloride |
| Example 1m: (S)-10-((5-chloro-2-(3-fluoro-3-methylazetidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one | $^1$H NMR (500 MHz, DMSO-$d_6$) δ 8.89 (s, 1H), 8.26 (d, J = 2.3 Hz, 1H), 8.07 (s, 1H), 7.77 (dd, J = 9.1, 2.2 Hz, 1H), 7.43 (d, J = 9.1 Hz, 1H), 6.21 (s, 1H), 4.55-4.27 (m, 2H), 4.16-3.93 (m, 4H), 3.56 (s, 3H), 3.29-3.18 (m, 1H), 1.56 (d, J = 22.1 Hz, 3H), 1.37-1.27 (m, 1H), 0.75-0.67 (m, 1H), 0.60-0.48 (m, 2H), 0.43-0.26 (m, 1H). HRMS: m/z calcd for $C_{24}H_{25}ClF_3N_6O_2$ [M + H]$^+$: 521.1680, Found: 521.1675 | 3-fluoro-3-methylazetidine hydrochloride |

-continued

| Example | Data and comments | Amine used |
|---|---|---|
| Example 1n: (S)-10-((5-chloro-2-(3-hydroxy-3-methylazetidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one | $^1$H NMR (600 MHz, Methanol-d$_4$) δ 8.21 (d, J = 2.3 Hz, 1H), 8.04 (dd, J = 9.1, 2.3 Hz, 1H), 7.94 (s, 1H), 7.54 (d, J = 9.2 Hz, 1H), 4.56-4.35 (m, 2H), 4.04-3.89 (m, 4H), 3.72 (s, 3H), 3.41-3.25 (m, 1H), 1.51 (s, 3H), 1.47-1.36 (m, 1H), 0.83-0.77 (m, 1H), 0.77-0.69 (m, 1H), 0.68-0.61 (m, 1H), 0.49-0.31 (m, 1H). HRMS: m/z calcd for C$_{24}$H$_{26}$ClF$_2$N$_6$O$_3$ [M + H]$^+$: 519.1723, Found: 519.1720 | 3-methylazetidin-3-ol hydrochloride |

Example 2a: (S)-2-cyclopropyl-3,3-difluoro-10-((5-fluoro-2-((3R,5S)-3-hydroxy-5-methylpiperidin-1-yl)pyrimidin-4-yl)amino)-7-methyl-1,2,3,4-tetrahydro-[1,4]oxazepino[2,3-c]quinolin-6(7H)-one

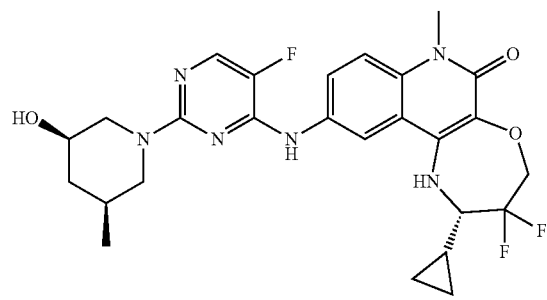 [SMILES: C[C@H]1C[C@@H](O)CN(c2ncc(F)c(Nc3ccc4c(c3)c3c(c(=O)n4C)OCC(F)(F)[C@H](C4CC4)N3)n2)C1]

Example 2b: (S)-2-cyclopropyl-10-((2-(4,4-difluoropiperidin-1-yl)-5-fluoropyrimidin-4-yl)amino)-3,3-difluoro-7-methyl-1,2,3,4-tetrahydro-[1,4]oxazepino[2,3-c]quinolin-6(7H)-one

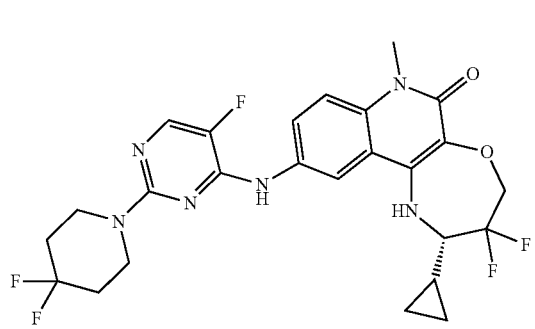 [SMILES: Cn1c(=O)c2c(c3cc(Nc4nc(N5CCC(F)(F)CC5)ncc4F)ccc31)N[C@@H](C1CC1)C(F)(F)CO2]

A mixture of (S)-10-((2-chloro-5-fluoropyrimidin-4-yl)amino)-2-cyclopropyl-3,3-difluoro-7-methyl-1,2,3,4-tetrahydro-[1,4]oxazepino[2,3-c]quinolin-6(7H)-one (Intermediate A2, 12.6 mg, 0.028 mmol), (3R,5S)-5-methylpiperidin-3-ol (Intermediate M2a, 6.4 mg, 0.0556 mmol) and DIPEA (20.00 uL, 0.1159 mmol) in NMP (0.6 mL) was heated at 140° C. for 12 h, then diluted with DMSO (0.8 mL) and purified by reverse-phase chromatography (Biotage 12 g Ultra C-18 column; 10-30-70-100% methanol in water (0.1% formic acid modifier)). Fractions containing product were combined and passed through an SCX-2 (2 g) column, washing with methanol (20 mL) and eluting with 2M methanolic ammonia (25 mL). The ammonia fractions were combined and evaporated under reduced pressure to give the title compound as an off-white solid (7.5 mg, 0.014 mmol). $^1$H NMR (600 MHz, Methanol-d$_4$) δ 8.03 (dd, J=9.1, 2.1 Hz, 1H), 7.98 (d, J=2.1 Hz, 1H), 7.84 (d, J$_{HF}$=3.7 Hz, 1H), 7.54 (d, J=9.1 Hz, 1H), 4.72-4.66 (m, 1H), 4.53-4.35 (m, 3H), 3.70 (s, 3H), 3.54-3.48 (m, 1H), 3.34-3.29 (m, 1H), 2.46 (dd, J=12.2, 10.7 Hz, 1H), 2.29 (app. t, J=12.2 Hz, 1H), 2.09-2.02 (m, 1H), 1.66-1.56 (m, 1H), 1.45-1.37 (m, 1H), 1.06 (q, J=11.7 Hz, 1H), 0.94 (d, J=6.6 Hz, 3H)), 0.82-0.76 (m, 1H), 0.69-0.57 (m, 2H), 0.43-0.34 (m, 1H); HRMS (Method X4) RT=2.56 min; m/z calcd for C$_{26}$H$_{30}$F$_3$N$_6$O$_3^+$ [M+H]$^+$: 531.2332, Found: 531.2316.

4,4-Difluoropiperidine hydrochloride (19 mg, 0.12 mmol), DIPEA (35 uL, 0.20 mmol) and (S)-10-((2-chloro-5-fluoropyrimidin-4-yl)amino)-2-cyclopropyl-3,3-difluoro-7-methyl-1,2,3,4-tetrahydro-[1,4]oxazepino[2,3-c]quinolin-6(7H)-one (Intermediate A2, 23 mg, 0.05 mmol) were combined in NMP (0.40 mL) in a microwave vial. The vessel was sealed and heated at 140° C. for 24 h. The resulting mixture was purified by reverse-phase flash chromatography (40%-85% methanol in water (0.1% formic acid)). Fractions containing product were loaded onto an Isolute SCX-2 column (1 g), and the column was washed with methanol and then eluted with 20% 1.4 M methanolic ammonia. The product was further purified by flash column chromatography (3-10% methanol in DCM), and the fractions containing product were combined, the solvent removed under reduced pressure to yield the title compound (18.5 mg). $^1$H NMR (600 MHz, Methanol-d$_4$) δ 8.06 (br s, 1H), 7.93 (dd, J=9.1, 2.3 Hz, 1H), 7.89 (d, J=2.3 Hz, 1H), 7.54 (br d, J=9.1 Hz, 1H), 4.55-4.35 (m, 2H), 3.82 (m, 4H), 3.70 (s, 3H), 3.37-3.23 (m, 1H), 2.00-1.86 (m, 4H), 1.48-

1.33 (m, 1H), 0.83-0.76 (m, 1H), 0.68-0.58 (m, 2H), 0.39-0.33 (m, 1H). LCMS (Method T4): Rt 2.91 min, m/z calcd for $C_{25}H_{26}F_5N_6O_2^+$ [M+H]$^+$: 537.2032, Found: 537.2036.

Example 3a: (S)-10-((2-(3-oxa-8-azabicyclo[3.2.1]octan-8-yl)-5-chloropyrimidin-4-yl)amino)-2-cyclopropyl-3,3-difluoro-7-(methyl-d3)-1,2,3,4-tetrahydro-[1,4]oxazepino[2,3-c][1,8]naphthyridin-6(7H)-one

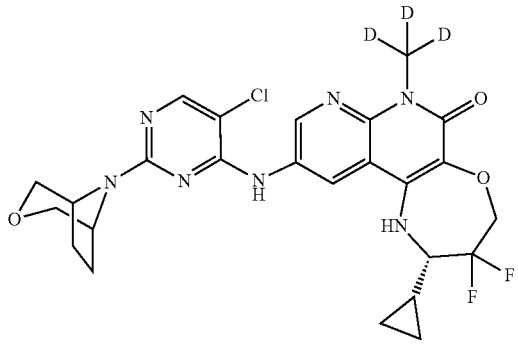 [SMILES: [2H]C([2H])([2H])n1c(=O)c2c(c3cc(Nc4nc(N5C6CCC5COC6)ncc4Cl)cnc31)N[C@@H](C1CC1)C(F)(F)CO2]

A mixture of 3-oxa-8-azabicyclo[3.2.1]octane hydrochloride (13.4 mg, 0.09 mmol), DIPEA (23 μL, 0.13 mmol) and (S)-2-cyclopropyl-10-((2,5-dichloropyrimidin-4-yl)amino)-3,3-difluoro-7-(methyl-d3)-1,2,3,4-tetrahydro-[1,4]oxazepino[2,3-c][1,8]naphthay-ridin-6(7H)-one (Intermediate A3, 9 mg, 0.019 mmol) in NMP (0.8 mL) under argon was heated at 140° C. in a heating block for 10 h. The crude product was diluted with DMSO (1 mL) and purified by reverse-phase chromatography (12 g Biotage Ultra C18, 10-60-90-100% methanol in water, 0.1% formic acid modifier). Fractions containing product were combined and passed through an SCX-2 (2 g) column, washing with methanol (15 mL) and eluting with 2M methanolic ammonia (30 mL). The ammonia fractions were combined and evaporated under reduced pressure to give the title compound as an off-white solid (8 mg, 0.015 mmol). $^1$H NMR (600 MHz, Methanol-d$_4$) δ 8.85 (d, J=2.3 Hz, 1H), 8.46 (d, J=2.3 Hz, 1H), 8.00 (s, 1H), 4.54-4.38 (m, 4H), 3.71 (d, J=10.8 Hz, 2H), 3.55 (d, J=10.8 Hz, 2H), 3.35-3.28 (m, 1H), 2.04-1.91 (m, 4H), 1.41-1.34 (m, 1H), 0.82-0.75 (m, 1H), 0.68-0.56 (m, 2H), 0.40-0.32 (m, 1H); HRMS (Method T4) RT=2.96 min; m/z calcd for $C_{25}H_{24}D_3ClF_2N_7O_3^+$ [M+H]$^+$: 549.2015, Found: 549.2015.

Example 4a: (S)-10-((5-chloro-2-(3-methyl-1,2,4-oxadiazol-5-yl)pyridin-4-yl)amino)-2-cyclopropyl-3,3-difluoro-7-methyl-1,2,3,4-tetrahydro-[1,4]oxazepino[2,3-c]quinolin-6(7H)-one

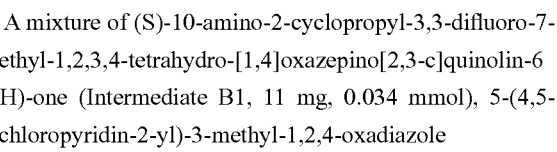

A mixture of (S)-10-amino-2-cyclopropyl-3,3-difluoro-7-methyl-1,2,3,4-tetrahydro-[1,4]oxazepino[2,3-c]quinolin-6(7H)-one (Intermediate B1, 11 mg, 0.034 mmol), 5-(4,5-dichloropyridin-2-yl)-3-methyl-1,2,4-oxadiazole (Intermediate C1, 9.8 mg, 0.043 mmol, cesium carbonate (90.8 mg, 0.28 mmol), Tris(dibenzylideneacetone)dipalladium(0) (3 mg, 0.003 mmol), palladium (II) acetate (3.2 mg), and Xantphos (11.9 mg, 0.021 mmol) in DMF (0.35 mL) and toluene (0.35 mL) under argon was heated to 100° C. for 90 min. The reaction mixture was cooled to rt. Water (10 mL) was added and the aqueous mixture was extracted with EtOAc (5×10 mL). The organic extracts were combined, washed with brine (10 mL), dried (Na$_2$SO$_4$) and concentrated under reduced pressure. The crude product was dissolved in DMSO (1.0 mL) and directly purified by reverse-phase chromatography (Biotage 12 g Ultra C-18 column; 10-60-80-100% methanol in water (0.1% formic acid modifier)) affording the title compound (1.7 mg, 0.003 mmol) as a pale yellow solid. $^1$H NMR (600 MHz, CDCl$_3$) δ 8.57 (s, 1H), 7.61 (s, 1H), 7.50-7.46 (m, 2H), 7.45-7.43 (m, 1H), 6.75 (s, 1H), 4.65 (dd, J=16.2, 13.3 Hz, 1H), 4.44 (ddd, J=26.8, 13.3, 6.1 Hz, 1H), 4.21 (br s, 1H), 3.77 (s, 3H), 3.38-3.31 (m, 1H), 2.46 (s, 3H), 1.34-1.28 (m, 1H), 0.87-0.82 (m, 1H), 0.72-0.67 (m, 1H), 0.66-0.60 (m, 1H), 0.33-0.28 (m, 1H); HRMS (Method X4) RT=2.93 min; m/z calcd for $C_{24}H_{22}ClF_2N_6O_3^+$ [M+H]$^+$: 515.1404, Found: 515.1397.

Example 4b: (S)-10-((3-chloro-2-fluoropyridin-4-yl)amino)-2-cyclopropyl-3,3-difluoro-7-methyl-1,2,3,4-tetrahydro-[1,4]oxazepino[2,3-c]quinolin-6(7H)-one

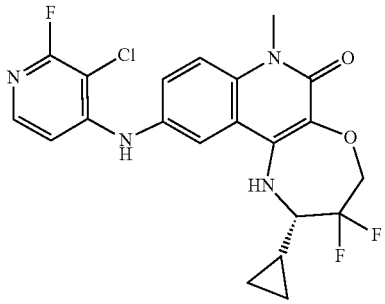 [SMILES: Cn1c(=O)c2c(c3cc(Nc4ccnc(F)c4Cl)ccc31)N[C@@H](C1CC1)C(F)(F)CO2]

A mixture of (S)-10-amino-2-cyclopropyl-3,3-difluoro-7-methyl-1,2,3,4-tetrahydro-[1,4]oxazepino[2,3-c]quinolin-6(7H)-one (Intermediate B1, 10 mg, 0.031 mmol), 4-bromo-3-chloro-2-fluoropyridine (8 mg, 0.038 mmol), cesium carbonate (81 mg, 0.25 mmol), tris(dibenzylideneacetone)dipalladium(0) (3.9 mg, 0.004 mmol) and Xantphos (11.6 mg, 0.020 mmol) in DMF (0.3 mL) and toluene (0.3 mL) under argon was heated at 80° C. for 90 min. Water (15 mL) was added and the aqueous mixture was extracted with $CH_2Cl_2$ (4×10 mL). The organic extracts were combined, washed with brine (10 mL), dried ($Na_2SO_4$), and stirred overnight in the presence of MP-TMT to remove residual Pd. The beads were filtered off, washed with $CH_2Cl_2$ and the filtrate was concentrated under reduced pressure. The crude product was dissolved in DMSO (1.0 mL) and purified by reverse-phase chromatography (Biotage 12 g Ultra C-18 column; 10%-60%-80%-100% methanol in water (0.1% formic acid modifier)) affording the title compound (5.8 mg, 0.013 mmol) as an off-white solid. $^1$H NMR (600 MHz, Methanol-$d_4$) δ 8.00 (d, J=2.3 Hz, 1H), 7.68 (d, J=5.9 Hz, 1H), 7.62 (d, J=9.0 Hz, 1H), 7.54 (dd, J=9.0, 2.3 Hz, 1H), 6.69 (d, J=5.9 Hz, 1H), 4.53-4.37 (m, 2H), 3.73 (s, 3H), 3.28 (ddd, J=18.8, 10.1, 5.1 Hz, 1H), 1.42-1.35 (m, 1H), 0.80-0.74 (m, 1H), 0.66-0.55 (m, 2H), 0.35-0.29 (m, 1H); HRMS (Method X4) RT=2.91 min; m/z calcd for $C_{21}H_{19}ClF_3N_4O_2^+$ [M+H]$^+$: 451.1143, Found: 451.1139.

Example 4b was also prepared by the following procedure; (S)-10-amino-2-cyclopropyl-3,3-difluoro-7-methyl-1,2,3,4-tetrahydro-[1,4]oxazepino[2,3-c]quinolin-6(7H)-one (Intermediate B1, 1.7 g, 5.3 mmol), 4-bromo-3-chloro-2-fluoropyridine (1.41 g, 6.7 mmol), palladium (II) acetate (0.143 g, 0.64 mmol), 4,5-bis(diphenylphosphino)-9,9-dimethylxanthene (0.456 g, 0.79 mmol) and cesium carbonate (2.7 g, 8.29 mmol) were combined under $N_2$ in 1,4-dioxane (50 mL) and the resulting mixture was heated at reflux for 2 h. The mixture was then cooled, and the volatiles were removed under reduced pressure. The residue was purified by flash column chromatography (DCM/Celite dry-loading, 0-100% EtOAc/n-heptane), giving the title compound (1.6 g) as a yellow/brown solid. This was further purified by trituration in diethyl ether:propan-2-ol (9:1), followed by lyophilisation from a MeCN/$H_2O$ suspension to give the title compound as a white solid. $^1$H NMR (400 MHz, DMSO-$d_6$): δ 8.84 (s, 1H), 8.08 (d, J=2.0 Hz, 1H), 7.71 (d, J=5.8 Hz, 1H), 7.50-7.57 (m, 1H), 7.43-7.50 (m, 1H), 6.53 (d, J=5.8 Hz, 1H), 6.31-6.45 (m, 1H), 4.32-4.52 (m, 2H), 3.58 (s, 3H), 3.15-3.28 (m, 1H), 1.23-1.34 (m, 1H), 0.64-0.76 (m, 1H), 0.44-0.56 (m, 2H), 0.25-0.37 (m, 1H). $^{19}$F NMR (376 MHz, DMSO-d6): δ −74.11 (s, 1F), −101.45 to −100.49 (m, 1F), −116.69 to −115.21 (m, 1F).

Example 4c: (S)-2-cyclopropyl-10-((2,3-dichloro-pyridin-4-yl)amino)-3,3-difluoro-7-methyl-1,2,3,4-tetrahydro-[1,4]oxazepino[2,3-c]quinolin-6(7H)-one

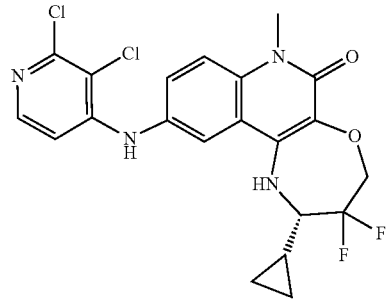 [SMILES: Cn1c(=O)c2c(c3cc(Nc4ccnc(Cl)c4Cl)ccc31)N[C@@H](C1CC1)C(F)(F)CO2]

To a mixture of (S)-10-amino-2-cyclopropyl-3,3-difluoro-7-methyl-1,2,3,4-tetrahydro-[1,4]oxazepino[2,3-c]quinolin-6(7H)-one (Intermediate 1, 10.2 mg, 0.032 mmol), 2,3-dichloro-4-iodopyridine (10.3 mg, 0.038 mmol), cesium carbonate (80 mg, 0.246 mmol), tris(dibenzylideneacetone)dipalladium(0) (3.6 mg, 0.004 mmol) and Xantphos (11.4 mg, 0.020 mmol) under argon was added DMF (0.3 mL) and toluene (0.3 mL). The resulting mixture was heated to 80° C. for 1 h, then cooled to rt. Water (15 mL) was added and the aqueous mixture was extracted with DCM (4×10 mL). The organic extracts were combined, washed with brine (10 mL), dried ($Na_2SO_4$), and stirred overnight with MP-TMT to remove residual Pd. The beads were removed by filtration, washing with DCM, and the combined filtrate was concentrated under reduced pressure. The crude product was dissolved in DMSO (1.0 mL) and directly purified by reverse-phase chromatography (12 g Ultra C-18; 10%-60%-80%-100% methanol in water (containing 0.1% formic acid)) affording the title compound (7.4 mg, 50%, 0.0158 mmol) as an off-white solid. $^1$H NMR (600 MHz, Methanol-$d_4$) δ 8.00 (d, J=2.3 Hz, 1H), 7.83 (d, J=5.8 Hz, 1H), 7.63 (d, J=9.0 Hz, 1H), 7.54 (dd, J=9.0, 2.3 Hz, 1H), 6.74 (d, J=5.8 Hz, 1H), 4.53-4.38 (m, 2H), 3.73 (s, 3H), 3.32-3.24 (m, 1H), 1.42-1.35 (m, 1H), 0.80-0.74 (m, 1H) 0.66-0.55 (m, 2H), 0.35-0.28 (m, 1H); HRMS (Method X4) RT=2.99 min; m/z calcd for $C_{21}H_{19}Cl_2F_2N_4O_2^+$ [M+H]$^+$: 467.0853, Found: 467.0853.

Example 4d: (S)-10-((2-chloro-3-fluoropyridin-4-yl)amino)-2-cyclopropyl-3,3-difluoro-7-methyl-1,2,3,4-tetrahydro-[1,4]oxazepino[2,3-c]quinolin-6(7H)-one

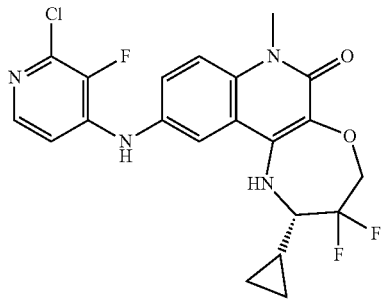 [SMILES: Cn1c(=O)c2c(c3cc(Nc4ccnc(Cl)c4F)ccc31)N[C@@H](C1CC1)C(F)(F)CO2]

Example 4d was prepared by a method analogous to that used for the synthesis of example 4b, using 2-chloro-3-fluoro-4-iodo-pyridine. $^1$H NMR (600 MHz, methanol-$d_4$) 7.95 (d, J=2.3 Hz, 1H), 7.78 (d, J=5.7 Hz, 1H), 7.60 (d, J=9.0 Hz, 1H), 7.52 (dd, J=9.0, 2.3 Hz, 1H), 6.94 (app. t, J=6.0 Hz, 1H), 4.53-4.37 (m, 2H), 3.72 (s, 3H), 3.28 (ddd, J=18.7, 10.1, 5.2 Hz, 1H), 1.43-1.35 (m, 1H), 0.81-0.74 (m, 1H), 0.66-0.55 (m, 2H), 0.36-0.30 (m, 1H); HRMS (Method X4) RT=2.90 min; m/z calcd for $C_{21}H_{19}ClF_3N_4O_2^+$ [M+H]$^+$: 451.1148, Found: 451.1144.

Example 4e: (S)-10-((3-chloro-2-methylpyridin-4-yl)amino)-2-cyclopropyl-3,3-difluoro-7-methyl-1,2,3,4-tetrahydro-[1,4]oxazepino[2,3-c]quinolin-6(7H)-one

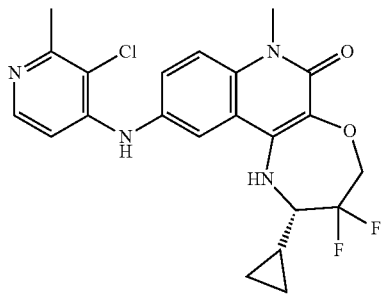 [SMILES: Cc1nccc(Nc2ccc3c(c2)c2c(c(=O)n3C)OCC(F)(F)[C@H](C3CC3)N2)c1Cl]

To a mixture of (S)-10-amino-2-cyclopropyl-3,3-difluoro-7-methyl-1,2,3,4-tetrahydro-[1,4]oxazepino[2,3-c]quinolin-6(7H)-one (Intermediate 1, 35 mg, 0.11 mmol), 3,4-dichloro-2-methylpyridine (26.5 mg, 0.16 mmol), tris(dibenzylideneacetone)dipalladium(0) (10 mg, 0.011 mmol), Xantphos (38 mg, 0.065 mmol) and cesium carbonate (284 mg, 0.87 mmol) under argon was added DMF (0.5 mL) and toluene (0.4 mL). The resulting mixture was heated at 140° C. under microwave irradiation for 90 min, then further heated at 100° C. for 6 h, then again at 140° C. for 3 hours. The reaction mixture was cooled to rt, concentrated under reduced pressure, redissolved in DCM (~20 mL) and washed with water (2×10 mL). The solvent was removed under reduced pressure and the reaction was purified by column chromatography (0% to 10% methanol in DCM) affording a dark orange oil. The product was loaded onto an Isolute SCX-2 column (2 g), and the column was washed with methanol and then eluted with 20% 1.4 M methanolic ammonia. The product was further purified by reverse phase column chromatography (C18 Sfar; 40-90% methanol in water (0.1% formic acid)) to afford the title compound as a white solid (25.2 mg). $^1$H NMR (600 MHz, Methanol-$d_4$) δ 7.98 (d, J=2.3 Hz, 1H), 7.91 (d, J=5.8 Hz, 1H), 7.62 (d, J=9.0 Hz, 1H), 7.55 (dd, J=9.0, 2.3 Hz, 1H), 6.72 (d, J=5.8 Hz, 1H), 4.54-4.37 (m, 2H), 3.74 (s, 3H), 3.33-3.15 (m, 1H), 2.56 (s, 3H), 1.43-1.35 (m, 1H), 0.81-0.73 (m, 1H), 0.67-0.55 (m, 2H), 0.36-0.29 (m, 1H); HRMS (Method X4) RT=1.93 min; m/z calcd for $C_{22}H_{22}ClF_2N_4O_2^+$ [M+H]$^+$: 447.1399, Found: 447.1384.

Example 5a: (S)-2-cyclopropyl-3,3-difluoro-10-((5-fluoro-2-((1R,5S,7R)-7-hydroxy-3-oxa-9-azabicyclo[3.3.1]nonan-9-yl)pyrimidin-4-yl)amino)-7-methyl-1,2,3,4-tetrahydro-[1,4]oxazepino[2,3-c]quinolin-6(7H)-one

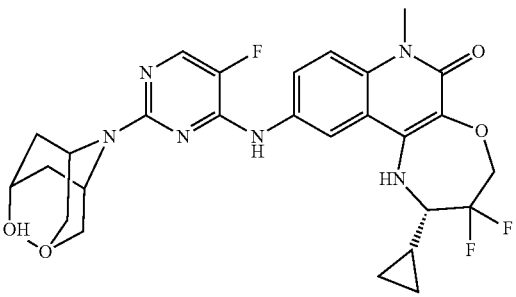

Step 1: 2-chloro-5-fluoro-4-(methylthio)pyrimidine

Sodium thiomethoxide (127 mg, 1.81 mmol) was added to a stirred solution of 2,4-dichloro-5-fluoropyrimidine (0.3 g, 1.8 mmol) in THF (2 mL) and water (2 mL) at 0° C. The resulting mixture was stirred at rt for 24 h, then water (20 mL) was added and the aqueous mixture was extracted with EtOAc (2×20 mL). The organic extracts were combined, washed with brine (20 mL), dried (Na$_2$SO$_4$) and concentrated in vacuo affording the title compound (228 mg, 71%) as a white solid which was used without further purification. $^1$H NMR (500 MHz, CDCl$_3$) δ 8.10 (d, J=1.4 Hz, 1H), 2.62 (s, 3H); LCMS (Method T2); RT 1.23 min; m/z 178.9987 [M+H]$^+$.

Step 2: (1R,5S,7s)-9-(5-fluoro-4-(methylthio)pyrimidin-2-yl)-3-oxa-9-azabicyclo[3.3.1]nonan-7-ol [endo isomer]

A sealed vial containing 2-chloro-5-fluoro-4-(methylthio)pyrimidine (0.23 g, 1.27 mmol), (1R,5S,7s)-3-oxa-9-azabicyclo[3.3.1]nonan-7-ol hydrochloride (0.25 g, 1.39 mmol) and DIPEA (0.89 mL, 5.11 mmol) in IPA (2.5 mL) was heated at 120° C. for 22 h, further heated at 140° C. for 5 days, then concentrated in vacuo. Purification by flash chromatography (10 g KP-sil; 0% to 70% EtOAc in cyclohexane) afforded the title compound (0.22 g, 60%) as a white solid which was used without further purification in the subsequent step. $^1$H NMR (500 MHz, CDCl$_3$) δ 7.89 (d, J=1.9 Hz, 1H), 5.64 (d, J=12.6 Hz, 1H), 4.69 (br s, 2H), 4.00-3.92 (m, 3H), 3.88-3.82 (m, 2H), 2.50 (s, 3H), 2.24-2.16 (m, 2H), 1.87 (dd, J=15.0, 1.1 Hz, 2H); LCMS (Method T2); RT 1.44 min; m/z 286.2016 [M+H]$^+$.

Step 3: (1R,5S,7s)-9-(5-fluoro-4-(methylsulfonyl) pyrimidin-2-yl)-3-oxa-9-azabicyclo[3.3.1]-nonan-7-ol[endo isomer]

3-Chloroperoxybenzoic acid (0.42 g, 1.88 mmol) was added portionwise to a stirred solution of (1R,5S,7s)-9-(5-fluoro-4-(methylthio)pyrimidin-2-yl)-3-oxa-9-azabicyclo [3.3.1]-nonan-7-ol (0.22 g, 0.76 mmol) in DCM (4 mL) and MeCN (4 mL) at 0° C. under Ar. The reaction mixture was stirred at 0° C. for 5 min, then warmed to rt and stirred for 2 h. Reaction mixture was diluted with DCM (30 mL) and the organic mixture was washed with 1 M sodium sulfite (30 mL) and sat. aq. NaHCO$_3$ (20 mL). The aq. washings were combined and extracted with DCM (20 mL). The organic extracts were combined, dried (Na$_2$SO$_4$) and concentrated in vacuo. Purification by flash chromatography (10 g KP-sil; 0% to 10% MeOH in DCM) afforded the title compound (0.25 g, 106%) as a sticky yellow solid, which was used without further purification in the subsequent steps. $^1$H NMR (500 MHz, MeOD-d$_4$) δ 8.63 (d, J=2.1 Hz, 1H), 4.81-4.64 (m, 2H), 4.00-3.96 (m, 2H), 3.93-3.88 (m, 1H), 3.86-3.80 (m, 2H), 3.32 (s, 3H), 2.29-2.15 (m, 2H), 1.88 (dd, J=14.9, 1.3 Hz, 2H). LCMS (Method X2) RT 1.06; m/z 300.0919 [M-H$_2$O+H]$^+$.

Step 4: (S)-2-cyclopropyl-3,3-difluoro-10-((5-fluoro-2-((1R,5S,7R)-7-hydroxy-3-oxa-9-azabicyclo [3.3.1]nonan-9-yl)pyrimidin-4-yl)amino)-7-methyl-1,2,3,4-tetrahydro-[1,4]oxazepino[2,3-c]quinolin-6(7H)-one To a mixture of (S)-10-amino-2-cyclopropyl-3,3-difluoro-7-methyl-1,2,3,4-tetrahydro-[1,4]oxazepino[2,3-c] quinolin-6(7H)-one (Intermediate 1, 29.1 mg, 0.091 mmol), (1R,5S,7s)-9-(5-fluoro-4-(methylsulfonyl)pyrimidin-2-yl)-3-oxa-9-azabicyclo[3.3.1]nonan-7-ol (from step 3, 32 mg, 0.10 mmol) in 2,2,2-trifluoroethanol (0.9 mL) was added trifluoroacetic acid (7.7 uL, 0.10 mmol). The resulting mixture was heated under argon to 70° C. for 16 h, then concentrated under reduced pressure. The residue was re-dissolved in DMSO (1 mL) and purified by reverse-phase chromatography (Biotage 12 g C-18 column; 10-75-85-100% methanol in water (0.1% formic acid modifier)). Fractions containing product were combined and passed through an SCX-2 (2 g) column, washing with methanol (30 mL) and eluting with 2M methanolic ammonia (30 mL). The ammonia fractions were combined and evaporated under reduced pressure to give a beige solid, which was triturated with methanol/diethyl ether to give the title compound (10 mg, 0.018 mmol) as an off-white solid. $^1$H NMR (600 MHz, DMSO-d$_6$) δ 9.39 (s, 1H), 8.17 (br s, 1H), 8.05 (d, J=3.6 Hz, 1H), 7.71 (app. d, J=8.5 Hz, 1H), 7.43 (d, J=9.1 Hz, 1H), 6.61 (br s, 1H), 5.16 (d, J=11.7 Hz, 1H), 4.64-4.21 (m, 4H), 3.80 (br s, 2H), 3.70-3.62 (m, 3H), 3.55 (s, 3H), 3.23-3.17 (m, 1H), 2.13-1.99 (m, 2H), 1.61 (app. d, J=14.3 Hz, 2H), 1.35-1.27 (m, 1H), 0.74-0.67 (m, 1H), 0.53-0.46 (m, 2H), 0.38-0.32 (m, 1H); HRMS (Method X4) RT 2.72 min; m/z calcd for C$_{27}$H$_{30}$F$_3$N$_6$O$_4$$^+$ [M+H]+: 559.2280, Found: 559.2290.

Example 6a: (S)-10-((5-chloropyrimidin-4-yl) amino)-2-cyclopropyl-3,3-difluoro-7-methyl-1,2,3,4-tetrahydro-[1,4]oxazepino[2,3-c]quinolin-6(7H)-one

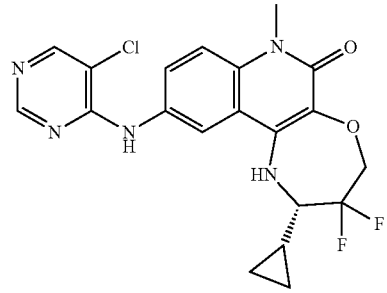 [SMILES: Cn1c(=O)c2c(c3cc(Nc4ncncc4Cl)ccc31)N[C@@H](C1CC1)C(F)(F)CO2]

A mixture of (S)-10-amino-2-cyclopropyl-3,3-difluoro-7-methyl-1,2,3,4-tetrahydro-[1,4]oxazepino[2,3-c]quinolin-6 (7H)-one (Intermediate 1, 9.2 mg, 0.029 mmol) and 4,5-Dichloropyrimidine (12 mg, 0.08 mmol) and DIPEA (30 μL, 0.17 mmol) in acetonitrile (0.6 mL) in a sealed tube under argon was heated to 140° C. for 18 h, then concentrated under reduced pressure. The residue was dissolved in DMSO (0.8 mL) and purified by reverse-phase chromatography (Biotage 12 g C-18 column; 10-55-80-100% methanol in water (0.1% formic acid modifier)). The resulting material was further purified using an SCX-2 (1 g) column, washing with methanol (10 mL) and eluting with 2M methanolic ammonia (10 mL). Fractions containing product were concentrated under reduced pressure to give the title compound (2.4 mg, 0.0055 mmol) as a yellow solid. $^1$H NMR (600 MHz, Methanol-d$_4$) δ 8.43 (s, 1H), 8.37 (s, 1H), 8.19 (d, J=2.3 Hz, 1H), 7.86 (dd, J=9.1, 2.3 Hz, 1H), 7.56 (d, J=9.1 Hz, 1H), 4.53-4.37 (m, 2H), 3.72 (s, 3H), 3.35-3.28 (m, 1H), 1.44-1.37 (m, 1H), 0.82-0.76 (m, 1H), 0.70-0.64 (m, 1H), 0.63-0.57 (m, 1H), 0.40-0.34 (m, 1H); HRMS (Method X4) RT=2.68 min; m/z calcd for C$_{20}$H$_{19}$ClF$_2$N$_5$O$_2$+[M+H]$^+$: 434.1195, Found: 434.1188.

Example 7a: (2S)-10-((2-(3-acetyl-3,8-diazabicyclo [3.2.1]octan-8-yl)-5-chloropyrimidin-4-yl)amino)-2-cyclopropyl-3,3-difluoro-7-methyl-1,2,3,4-tetrahydro-[1,4]oxazepino[2,3-c]quinolin-6(7H)-one

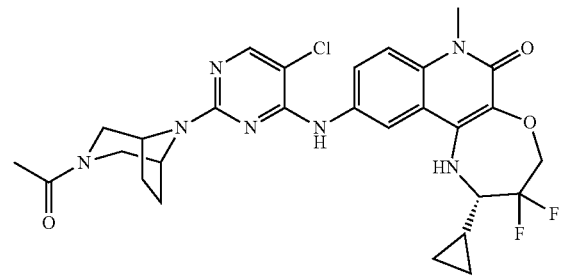 [SMILES: CC(=O)N1CC2CCC(C1)N2c1ncc(Cl)c(Nc2ccc3c(c2)c2c(c(=O)n3C)OCC(F)(F)[C@H](C3CC3)N2)n1]

Example 7b: (2S)-10-((2-(8-acetyl-3,8-diazabicyclo[3.2.1]octan-3-yl)-5-chloropyrimidin-4-yl)amino)-2-cyclopropyl-3,3-difluoro-7-methyl-1,2,3,4-tetrahydro-[1,4]oxazepino[2,3-c]quinolin-6(7H)-one

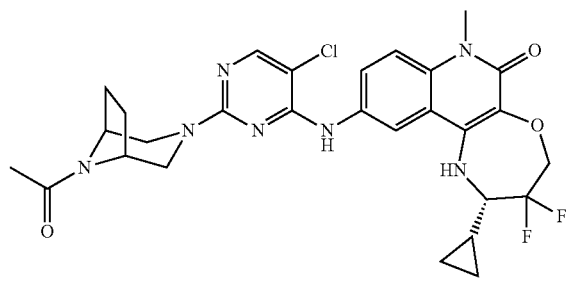 [SMILES: CC(=O)N1C2CCC1CN(c1ncc(Cl)c(Nc3ccc4c(c3)c3c(c(=O)n4C)OCC(F)(F)[C@H](C4CC4)N3)n1)C2]

Step 1: tert-butyl 3-acetyl-3,8-diazabicyclo[3.2.1]octane-8-carboxylate

Acetyl chloride (0.11 mL, 1.55 mmol) was added dropwise to a stirred solution of tert-butyl 3,8-diazabicyclo[3.2.1]octane-8-carboxylate (0.3 g, 1.41 mmol) and triethylamine (0.43 mL, 3.09 mmol) in anhydrous dichloromethane (4 mL) at 0° C. under argon. The reaction mixture was stirred at rt for 6 h, then concentrated in vacuo. The residue was re-dissolved in EtOAc (30 mL) and washed with 1 M HCl (2×15 mL), saturated aq. NaHCO$_3$ (30 mL) and brine (30 mL). The organic layer was dried (Na$_2$SO$_4$) and concentrated in vacuo affording the title compound (266 mg, 74%) as a yellow oil that was used without further purification. $^1$H NMR (500 MHz, CDCl$_3$) δ 4.36-4.16 (m, 3H), 3.50-3.45 (m, 1H), 3.40 (br s, 1H), 2.85 (br s, 1H), 2.09 (s, 3H), 2.00-1.86 (m, 2H), 1.73-1.60 (m, 2H), 1.48 (s, 9H).

Step 2: 1-(3,8-diazabicyclo[3.2.1]octan-3-yl)ethan-1-one hydrochloride

4 M HCl in 1,4-dioxane (3.50 mL, 14 mmol) was added dropwise to a solution of tert-butyl 3-acetyl-3,8-diazabicyclo[3.2.1]octane-8-carboxylate (from Step 1, 266 mg, 1.05 mmol) in DCM (5 mL) at 0° C. The reaction mixture was allowed to warm to rt and stirred for 15 h, then concentrated in vacuo and dried under vacuum affording the title compound (216 mg, 108%, 1.1328 mmol) as an off-white hygroscopic solid. $^1$H NMR (500 MHz, DMSO-d$_6$) δ 9.57-9.22 (m, 2H), 4.17 (app d, J=14.1 Hz, 1H), 4.00 (br s, 2H), 3.75-3.69 (m, 1H), 3.56-3.50 (m, 1H), 3.00 (app d, J=14.1 Hz, 1H), 2.03 (s, 3H), 1.95-1.79 (m, 3H), 1.65-1.53 (m, 1H)

Step 3: (2S)-10-((2-(8-acetyl-3,8-diazabicyclo[3.2.1]octan-3-yl)-5-chloropyrimidin-4-yl)amino)-2-cyclopropyl-3,3-difluoro-7-methyl-1,2,3,4-tetrahydro-[1,4]oxazepino[2,3-c]quinolin-6(7H)-one and (2S)-10-((2-(3-acetyl-3,8-diazabicyclo[3.2.1]octan-8-yl)-5-chloropyrimidin-4-yl)amino)-2-cyclopropyl-3,3-difluoro-7-methyl-1,2,3,4-tetrahydro-[1,4]oxazepino[2,3-c]quinolin-6(7H)-one A mixture of (S)-2-cyclopropyl-10-((2,5-dichloropyrimidin-4-yl)amino)-3,3-difluoro-7-methyl-1,2,3,4-tetrahydro-[1,4]oxazepino[2,3-c]quinolin-6(7H)-one (Intermediate A1, 14.80 mg, 0.0316 mmol), 1-(3,8-diazabicyclo[3.2.1]octan-3-yl)ethan-1-one hydrochloride (from Step 2, 12.8 mg, 0.067 mmol) and DIPEA (44 uL, 0.26 mmol) in NMP under argon was heated at 140° C. for 16 h. The reaction mixture was dissolved in DMSO (0.8 mL) and purified by reverse-phase chromatography (Biotage 12 g Ultra C-18 column; 10-60-80-100% methanol in water (0.1% formic acid modifier)). Fractions containing product were combined and passed through an SCX-2 (2 g) column, washing with methanol (10 mL) and eluting with 2M methanolic ammonia (30 mL). The ammonia fractions were combined and evaporated under reduced pressure to give a mixture of regioisomers. This was dissolved in a 1:1 mixture of DMSO/MeCN (1 mL) and purified by HPLC (2 injections; Phenomenex Gemini C18 110 A column (5 μM, 250×10 mm); 15 min gradient of 45:55 to 30:70 H$_2$O:MeOH (both modified with 0.1% formic acid); flow rate 5 mLmin$^{-1}$; 1260 Infinity IIMS-Prep LC). The earlier eluting major product, example 7a, was obtained as a white solid (6.2 mg, 0.011 mmol). The later eluting minor product, example 7b, presumably resulting from the acetyl group moving to the less hindered position in the starting material, was obtained as an off-white solid (2.5 mg, 0.004 mmol).

Example 7a: $^1$H NMR (600 MHz, methanol-d$_4$) δ 8.06-8.02 (m, 1H), 8.02-7.99 (m, 1H), 7.95 (ddd, J=9.1, 4.6, 2.3 Hz, 1H), 7.57 (d, J=9.1 Hz, 1H), 4.63-4.56 (m, 2H), 4.53-4.38 (m, 2H), 4.23-4.16 (m, 1H), 3.72 (s, 3H), 3.67-3.61 (m, 1H), 3.43 (d, J=12.5 Hz, 1H), 3.36-3.27 (m, 1H), 2.92 (d, J=13.0 Hz, 1H), 2.07 (s, 3H), 2.03-1.92 (m, 2H), 1.83-1.76 (m, 1H), 1.71-1.65 (m, 1H), 1.46-1.35 (m, 1H), 0.82-0.75 (m, 1H), 0.69-0.63 (m, 1H), 0.63-0.57 (m, 1H), 0.38-0.31 (m, 1H); HRMS (Method X4) RT=2.93 min; m/z calcd for C$_{28}$H$_{31}$ClF$_2$N$_7$O$_3$$^+$ [M+H]$^+$: 586.2139, Found: 586.2120.

Example 7b: $^1$H NMR (600 MHz, methanol-d$_4$) δ 8.07 (dd, J=7.4, 2.3 Hz, 1H), 7.98 (d, J=1.3 Hz, 1H), 7.92 (dd, J=9.1, 2.3 Hz, 1H), 7.57 (d, J=9.1 Hz, 1H), 4.71-4.63 (m, 1H), 4.54-4.38 (m, 2H), 4.36-4.24 (m, 3H), 3.73 (s, 3H), 3.36-3.27 (m, 1H), 3.08-2.98 (m, 2H), 2.11 (d, J=1.4 Hz, 3H), 2.03-1.95 (m, 1H), 1.89-1.81 (m, 1H), 1.81-1.75 (m, 1H), 1.74-1.68 (m, 1H), 1.47-1.35 (m, 1H), 0.83-0.76 (m, 1H), 0.69-0.58 (m, 2H), 0.38-0.32 (m, 1H); HRMS (Method X4) RT=2.97 min; m/z calcd for C$_{28}$H$_{31}$ClF$_2$N$_7$O$_3$$^+$ [M+H]$^+$: 586.2145, Found: 586.2132.

Example 8a: (S)-10-((5-chloro-2-(dimethylamino)pyrimidin-4-yl)amino)-2-cyclopropyl-3,3-difluoro-7-methyl-1,2,3,4-tetrahydro-[1,4]oxazepino[2,3-c]quinolin-6(7H)-one

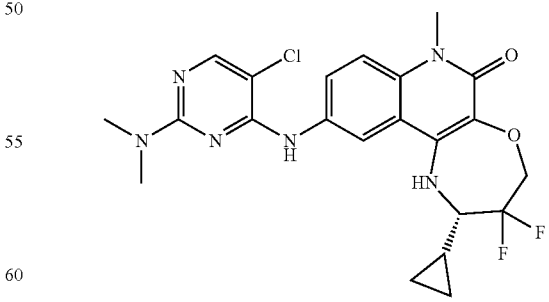

To a sealed tube containing (S)-2-cyclopropyl-10-((2,5-dichloropyrimidin-4-yl)amino)-3,3-difluoro-7-methyl-1,2,3,4-tetrahydro-[1,4]oxazepino[2,3-c]quinolin-6(7H)-one (Intermediate A1, 12.7 mg, 0.027 mmol) and DIPEA (20 uL, 0.12 mmol) in DMF (0.55 mL) under argon was added dimethylamine (2 M in THF, 0.11 mL, 0.2200 mmol). The resulting mixture was heated at 140° C. under microwave irradiation for 1 h, then diluted with DMSO (0.8 mL) and purified by reverse-phase chromatography (Biotage 12 g Ultra C-18 column; 10-50-70-100% methanol in water (0.1% formic acid modifier)). Fractions containing product were combined and passed through an SCX-2 (2 g) column, washing with methanol (10 mL) and eluting with 2M methanolic ammonia (25 mL). The ammonia fractions were combined and evaporated under reduced pressure to give the title compound (6.8 mg, 0.014 mmol) as an off-white solid. $^1$H NMR (600 MHz, Methanol-$d_4$) δ 8.12 (d, J=2.3 Hz, 1H), 8.02 (dd, J=9.1, 2.3 Hz, 1H), 7.93 (s, 1H), 7.53 (d, J=9.1 Hz, 1H), 4.53-4.34 (m, 2H), 3.71 (s, 3H), 3.36-3.28 (m, 1H), 3.09 (s, 6H), 1.43-1.36 (m, 1H), 0.83-0.76 (m, 1H), 0.70-0.64 (m, 1H), 0.64-0.57 (m, 1H), 0.39-0.32 (m, 1H); HRMS (Method X4) RT=2.47 min; m/z calcd for $C_{22}H_{24}ClF_2N_6O_2^+$ [M+H]$^+$: 477.1617, Found: 477.1596.

Example 9a: (S)-10-((5-chloro-2-((3S,5R)-3-fluoro-5-hydroxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one: (S)-10-((5-chloro-2-((3R,5S)-3-fluoro-5-hydroxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (1:1)

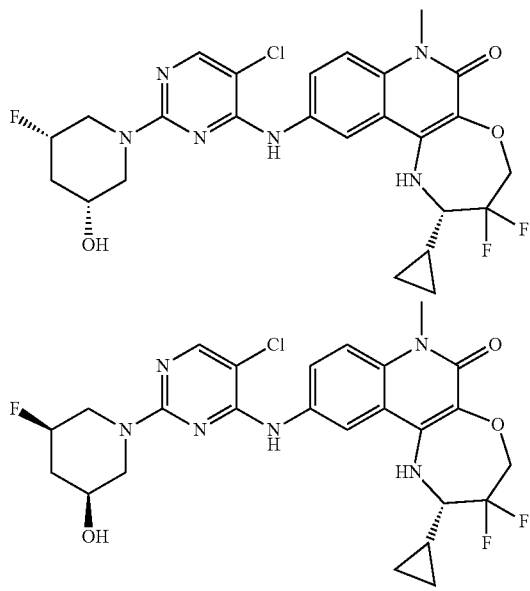

A mixture of (S)-2-cyclopropyl-10-((2,5-dichloropyrimidin-4-yl)amino)-3,3-difluoro-7-methyl-1,2,3,4-tetrahydro-[1,4]oxazepino[2,3-c]quinolin-6(7H)-one (Intermediate A1, 8 mg, 0.017 mmol), rac-(3R,5S)-5-fluoropiperidin-3-ol hydrochloride (8 mg, 0.051 mmol) and DIPEA (0.02 mL, 0.10 mmol) in NMP (0.68 mL) was heated under microwave irradiation at 140° C. for 1 h. The resulting mixture was purified by HPLC (1260 Infinity II Series Preparative HPLC (Agilent, Santa Clara, USA) using an Phenomenex Gemini C18 110 A column (250×21.2 mm) using a 15 min gradient elution of water:methanol from 60:40 to 0:100 (modified with 0.1% formic acid) at a flow rate of 20 mLmin$^{-1}$), and further by SCX-2 to give the title compound (mixture of diastereoisomers) as a beige solid (5 mg, 0.009 mmol). HRMS (Method X4) RT=2.81 min; m/z calcd for $C_{25}H_{27}ClF_3N_6O_3$+[M+H]$^+$: 551.1785, Found: 551.1785.

Example 9a-1: (S)-10-((5-chloro-2-((3S,5R)-3-fluoro-5-hydroxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one, and Example 9a-2: (S)-10-((5-chloro-2-((3R,5S)-3-fluoro-5-hydroxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one The preparation of example 9a was repeated on larger scale to provide a further 21 mg of this mixture of diastereoisomers, which was separated by preparative HPLC (column and conditions as above, over a 30 minute isocratic elution with 55% methanol in water (modified with 0.1% formic acid). Fractions containing only the earlier-running diastereoisomer were combined and evaporated to give example 9a-1 as a beige solid (6.5 mg). Fractions containing only the later-running diastereoisomer were combined and evaporated to give example 9a-2 as a beige solid (4.5 mg). Both compounds are cis-piperidine diastereoisomers, but absolute stereochemistry has not been unambiguously determined and is provisionally assigned as shown above.

Example 9a-1: $^1$H NMR (600 MHz, Methanol-d4) δ 8.05 (d, J=2.3 Hz, 1H), 7.98 (s, 1H), 7.95 (dd, J=9.1, 2.3 Hz, 1H), 7.56 (d, J=9.1 Hz, 1H), 4.61-4.39 (m, 4H), 4.37-4.30 (m, 1H), 3.72 (s, 3H), 3.70-3.62 (m, 1H), 3.37-3.28 (m, 1H), 3.23-3.16 (m, 1H), 3.02 (dd, J=12.9, 8.8 Hz, 1H), 2.46-2.34 (m, 1H), 1.70 (tt, J=11.8, 9.2 Hz, 1H), 1.49-1.39 (m, 1H), 0.86-0.75 (m, 1H), 0.72-0.64 (m, 1H), 0.64-0.57 (m, 1H), 0.44-0.32 (m, 1H). LCMS (method X4) Rt 2.97 min, m/z calculated for $C_{25}H_{27}ClF_3N_6O_3$ [M+H]$^+$: 551.1785, found 551.1779.

Example 9a-2: $^1$H NMR (600 MHz, Methanol-d4) δ 8.04 (d, J=2.3 Hz, 1H), 7.98 (s, 1H), 7.95 (dd, J=9.1, 2.3 Hz, 1H), 7.57 (d, J=9.1 Hz, 1H), 4.62-4.39 (m, 4H), 4.38-4.34 (m, 1H), 3.73 (s, 3H), 3.70-3.63 (m, 1H), 3.38-3.28 (m, 1H), 3.22-3.11 (m, 1H), 2.97 (dd, J=12.9, 9.0 Hz, 1H), 2.46-2.36 (m, 1H), 1.69 (tt, J=11.5, 9.3 Hz, 1H), 1.49-1.39 (m, 1H), 0.86-0.75 (m, 1H), 0.73-0.65 (m, 1H), 0.65-0.57 (m, 1H), 0.41-0.31 (m, 1H). LCMS (method X4) Rt 2.99 min. m/z calculated for $C_{25}H_{27}ClF_3N_6O_3$ [M+H]$^+$: 551.1785, found 551.1785.

The following tabulated examples were prepared by a method analogous to that used for the preparation of Example 9a, using the appropriate amine (as free base or as hydrochloride salt). Amines were obtained from commercial vendors, or prepared by common transformations from commercially available intermediates, as described in the table. For examples 9j-9n, example 9s, and examples 9y, 9za and 9zb, extended heating times of 3-8 h were required. Where racemic amines were used, two diastereoisomers were formed, as shown.

| Example | Data and comments | Amine used |
|---|---|---|
| Example 9b: (S)-10-((5-chloro-2-((S)-3-((dimethylamino)methyl)piperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one<br>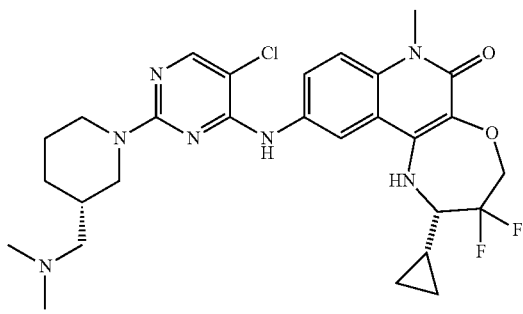 | LCMS (Method X2): Rt = 1.14, m/z = 574.3 HRMS (Method X4): m/z calcd for $C_{28}H_{35}ClF_2N_7O_2$ [M + H]⁺: 574.2509, Found: 574.2510 (Rt = 2.34 min) | N,N-dimethyl-1-[(3R)-3-piperidyl]methanamine dihydrochloride |
| Example 9c: (3R,5S)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)-N-ethyl-5-methylpiperidine-3-carboxamide:(3S,5R)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)-N-ethyl-5-methylpiperidine-3-carboxamide (1:1)<br>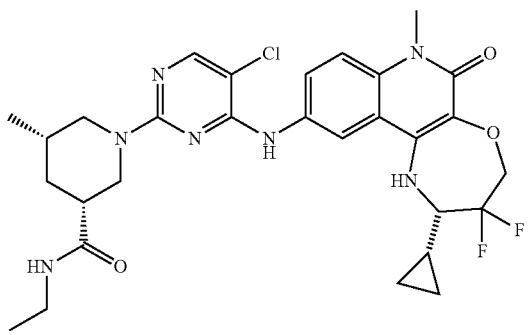<br>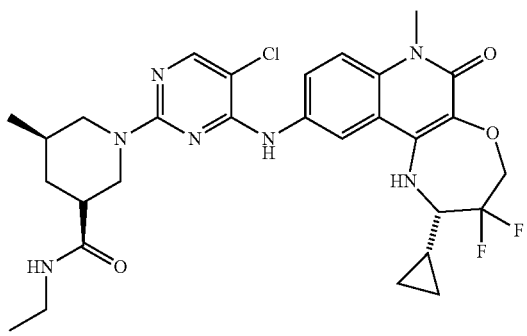 | LCMS (Method X2): Rt = 1.41, m/z = 602.2 HRMS (Method X4): m/z calcd for $C_{29}H_{35}ClF_2NO_3$ [M + H]+: 602.2458, Found: 602.2458 (Rt = 2.97 min) | rac-(3R,5S)-N-ethyl-5-methylpiperidine-3-carboxamide [prepared from rac-(3R,5S)-1-(tert-butoxycarbonyl)-5-methylpiperidine-3-carboxylic acid by HATU coupling followed by boc-deprotection] |

| Example | Data and comments | Amine used |
|---|---|---|
| Example 9d: (S)-10-((5-chloro-2-((3R,5S)-3-(hydroxymethyl)-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one:(S)-10-((5-chloro-2-((3S,5R)-3-(hydroxymethyl)-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (1:1) | LCMS (Method X2): Rt = 1.41, m/z = 561.2 HRMS (Method X4): m/z calcd for $C_{27}H_{32}ClF_2N_6O_3$ [M + H]+: 561.2192, Found: 561.2177 (Rt = 2.88 min) | Rac-cis-[(3R,5S)-5-methyl-3-piperidyl]-methanol [prepared from reduction of rac-cis-(3R,5S)-5-methyl-piperidine-3-carboxylicacid by borane tetrahydrofuran complex solution followed by boc-deprotection] |
| Example 9e: (S)-10-((5-chloro-2-((R)-4,4-difluoro-3-hydroxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one and (S)-10-((5-chloro-2-((S)-4,4-difluoro-3-hydroxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (1:1). | LCMS (Method X2): Rt = 1.42, m/z = 569.2 HRMS (Method X4): m/z calcd for $C_{25}H_{26}ClF_4N_6O_3$ [M + H]+: 569.1691, Found: 569.1684 (Rt = 2.99 min) | 4,4-difluoropiperidin-3-ol hydrochloride |

| Example | Data and comments | Amine used |
| --- | --- | --- |
| Example 9f: (S)-10-((5-chloro-2-((R)-3-(fluoromethyl)piperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one and (S)-10-((5-chloro-2-c]quinolin-6(7H)-one and (S)-10-((5-chloro-2-((S)-3-(fluoromethyl)piperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (1:1) | LCMS (Method X2): Rt = 1.48, m/z = 549.2 HRMS (Method X4): m/z calcd for $C_{26}H_{29}ClF_3N_6O_2$ [M + H]+: 549.1992, Found: 549.1992 (Rt = 3.14 min) | 3-(fluoromethyl)piperidine hydrochloride |
| Example 9g: 2-((R)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)piperidin-3-yl)acetamide and 2-((S)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)piperidin-3-yl)acetamide (1:1) | LCMS (Method X2): Rt = 1.43, m/z = 610.2 HRMS (Method X4): m/z calcd for $C_{27}H_{29}ClF_4N_7O_3$ [M + H]+: 610.1956, Found: 610.1957 (Rt = 3.06 min) | 2-(4,4-difluoropiperidin-3-yl)acetamide [prepared from 2-(1-tert-butoxycarbonyl-4,4-difluoro-3-piperidyl)acetic acid by amide coupling and boc deprotection] |
| Example 9h: (S)-10-((5-chloro-2-((S)-3-(dimethylamino)piperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one | LCMS (Method X2): Rt = 1.15, m/z = 560.2 HRMS (Method X4): m/z calcd for $C_{27}H_{33}ClF_2N_7O_2$ [M + H]+: 560.2352, Found: 560.2356 (Rt = 2.36 min) | (3S)-N,N-dimethylpiperidin-3-amine hydrochloride |

| Example | Data and comments | Amine used |
|---|---|---|
| Example 9i: (S)-10-((5-chloro-2-((R)-3-(dimethylamino)piperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one | LCMS (Method X2): Rt = 1.16, m/z = 560.2 HRMS (Method X4): m/z calcd for $C_{27}H_{33}ClF_2N_7O_2$ [M + H]+: 560.2352, Found: 560.2338 (Rt = 2.42 min) | (3R)-N,N-dimethylpiperidin-3-amine hydrochloride |
| Example 9j: (R)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)-N-ethyl-4,4-difluoropiperidine-3-carboxamide and (S)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)-N-ethyl-4,4-difluoropiperidine-3-carboxamide (1:1) | LCMS (Method X2): Rt = 1.41, m/z = 624.2 HRMS (Method X4): m/z calcd for $C_{28}H_{31}ClF_4N_7O_3$ [M + H]+: 624.2113, Found: 624.2101 (Rt = 2.97 min) | N-ethyl-4,4-difluoropiperidine-3-carboxamide [prepared by HATU coupling followed by benzyl deprotection of 1-benzyl-4,4-difluoro-piperidine-3-carboxylic acid] |
| Example 9k: N-(((R)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)-4,4-difluoropiperidin-3-yl)methyl)-N-ethylacetamide and N-(((S)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)-4,4-difluoropiperidin-3-yl)methyl)-N-ethylacetamide (1:1) | LCMS (Method X2): Rt = 1.50, m/z = 652.2 HRMS (Method X4): m/z calcd for $C_{30}H_{35}ClF_4N_7O_3$ [M + H]+: 652.2426, Found: 652.2422 (Rt = 3.23 min) | N-((4,4-difluoropiperidin-3-yl)methyl)-N-ethylacetamide [prepared by mesylation of (1-benzyl-4,4-difluoropiperidin-3-yl)methanol, followed by displacement of mesylate with ethylamine, acylation and benzyl deprotection] |

| Example | Data and comments | Amine used |
|---|---|---|
| Example 9l: (S)-10-((5-chloro-2-((1R,4R)-5,5-difluoro-2-azabicyclo[2.2.1]heptan-2-yl)pyrimidin-4-yl)amino)-2-cyclopropyl-3,3-difluoro-7-methyl-1,2,3,4-tetrahydro-[1,4]oxazepino[2,3-c]quinolin-6(7H)-one:(S)-10-((5-chloro-2-((1S,4S)-5,5-difluoro-2-azabicyclo[2.2.1]heptan-2-yl)pyrimidin-4-yl)amino)-2-cyclopropyl-3,3-difluoro-7-methyl-1,2,3,4-tetrahydro-[1,4]oxazepino[2,3-c]quinolin-6(7H)-one:formic acid (1:1:0.5) | LCMS (Method X2): Rt = 1.47, m/z = 565.2 HRMS (Method X4): m/z calcd for $C_{26}H_{26}ClF_4N_6O_2$ [M + H]+: 565.1742, Found: 565.1745 (Rt = 3.12 min) | 5,5-difluoro-2-azabicyclo[2.2.1]heptane hydrochloride |
| Example 9m: N-((R)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)-4,4-difluoropiperidin-3-yl)-N-methylacetamide | LCMS (Method X2): Rt = 1.45, m/z = 624.2 HRMS (Method X4): m/z calcd for $C_{28}H_{31}ClF_4N_7O_3$ [M + H]+: 624.2113, Found: 624.2104 (Rt = 3.08 min) | (R)-N-(4,4-difluoropiperidin-3-yl)-N-methylacetamide [prepared by sequential acylation, alkylation and boc-deprotection of tert-butyl (R)-3-amino-4,4-difluoropiperidine-1-carboxylate] |
| Example 9n: N-((S)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)-4,4-difluoropiperidin-3-yl)-N-methylacetamide | LCMS (Method X2): Rt = 1.46, m/z = 624.2 HRMS (Method X4): m/z calcd for $C_{28}H_{31}ClF_4N_7O_3$ [M + H]+: 624.2113, Found: 624.2112 (Rt = 3.11 min) | (S)-N-(4,4-difluoropiperidin-3-yl)-N-methylacetamide [prepared by sequential acylation, alkylation and boc-deprotection of tert-butyl (S)-3-amino-4,4-difluoropiperidine-1-carboxylate] |

| Example | Data and comments | Amine used |
| --- | --- | --- |
| Example 9o: (S)-10-((5-chloro-2-(4-fluoro-4-(hydroxymethyl)piperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one | LCMS (Method X2): Rt = 1.33, m/z = 565.2 HRMS (Method X4): m/z calcd for $C_{26}H_{29}ClF_3N_6O_3$ [M + H]+: 565.1942, Found: 565.1929 (Rt = 2.78 min) | (4-fluoropiperidin-4-yl)methanol hydrochloride |
| Example 9p: (S)-10-((5-chloro-2-((R)-3-(hydroxymethyl)piperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one | LCMS (Method T2): Rt = 1.38, m/z = 547.2 HRMS (Method X4): m/z calcd for $C_{26}H_{30}ClF_2N_6O_3$ [M + H]+: 547.2036, Found: 547.2032 (Rt = 2.81 min) | (R)-piperidin-3-ylmethanol |
| Example 9q: (S)-10-((5-chloro-2-((S)-3-(hydroxymethyl)piperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one | LCMS (Method T2): Rt = 1.38, m/z = 547.2 HRMS (Method X4): m/z calcd for $C_{26}H_{30}ClF_2N_6O_3$ [M + H]+: 547.2036, Found: 547.2027 (Rt = 2.80 min) | (S)-piperidin-3-ylmethanol |
| Example 9r: (S)-10-((5-chloro-2-((1S,5R)-3-ethyl-2-oxo-3,8-diazabicyclo[3.2.1]octan-8-yl)pyrimidin-4-yl)amino)-2-cyclopropyl-3,3-difluoro-7-methyl-1,2,3,4-tetrahydro-[1,4]oxazepino[2,3-c]quinolin-6(7H)-one:(S)-10-((5-chloro-2-((1R,5S)-3-ethyl-2-oxo-3,8-diazabicyclo[3.2.1]octan-8-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (1:1) | LCMS (Method X2): Rt = 1.57, m/z = 586.2 HRMS (Method X4): m/z calcd for $C_{28}H_{31}ClF_2N_7O_3$ [M + H]+: 586.2145, Found: 586.2133 (Rt = 3.37 min) | Rac-3-ethyl-3,8-diazabicyclo[3.2.1]octan-4-one [prepared from tert-butyl 2-oxo-3,8-diazabicyclo[3.2.1]octane-8-carboxylate by ethylation and boc-deprotection] |

| Example | Data and comments | Amine used |
|---|---|---|
| Example 9s: (S)-10-((5-chloro-2-((3S,5R)-3,5-difluoropiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one | LCMS (Method X2): Rt = 1.45, m/z = 553.2 HRMS (Method X4): m/z calcd for $C_{25}H_{26}ClF_4N_6O_2$ [M + H]+: 553.1742, Found: 553.1741 (Rt = 3.05 min) | (3S,5R)-3,5-difluoropiperidine hydrochloride |
| Example 9t: (S)-10-((2-(6-acetyl-2,6-diazaspiro[3.3]heptan-2-yl)-5-chloropyrimidin-4-yl)amino)-2-cyclopropyl-3,3-difluoro-7-methyl-1,2,3,4-tetrahydro-[1,4]oxazepino[2,3-c]quinolin-6(7H)-one | LCMS (Method X2): Rt = 1.34, m/z = 598.2 HRMS (Method X4): m/z calcd for $C_{29}H_{31}ClF_2N_7O_3$ [M + H]+: 598.2145, Found: 598.2135 (Rt = 2.77 min) | cyclopropyl (2,6-diazaspiro[3.3]heptan-2-yl)methanone [prepared from tert-butyl 2,6-diazaspiro[3.3]heptane-2-carboxylate by HATU coupling with cyclopropanecarboxylic acid followed by Boc deprotection] |
| Example 9u: (S)-10-((5-chloro-2-((2-hydroxy-2-methylpropyl)(methyl)amino)pyrimidin-4-yl)amino)-2-cyclopropyl-3,3-difluoro-7-methyl-1,2,3,4-tetrahydro-[1,4]oxazepino[2,3-c]quinolin-6(7H)-one | LCMS (Method X2): Rt = 1.29, m/z = 535.2 HRMS (Method X4): m/z calcd for $C_{25}H_{30}ClF_2N_6O_3$ [M + H]+: 535.2036, Found: 535.2054 (Rt = 2.65 min) | 2-methyl-1-(methylamino)propan-2-ol |

-continued

| Example | Data and comments | Amine used |
|---|---|---|
| Example 9v: (S)-10-((5-chloro-2-((3-hydroxy-3-methylbutyl)(methyl)amino)pyrimidin-4-yl)amino)-2-cyclopropyl-3,3-difluoro-7-methyl-1,2,3,4-tetrahydro-[1,4]oxazepino[2,3-c]quinolin-6(7H)-one | LCMS (Method X2): Rt = 1.28, m/z = 549.2 HRMS (Method X4): m/z calcd for $C_{26}H_{32}ClF_2N_6O_3$ [M + H]+: 549.2192, Found: 549.2175 (Rt = 2.63 min) | 2-methyl-4-(methylamino)butan-2-ol |
| Example 9w: (S)-10-((5-chloro-2-(6-(cyclopropylmethyl)-2,6-diazaspiro[3.3]heptan-2-yl)pyrimidin-4-yl)amino)-2-cyclopropyl-3,3-difluoro-7-methyl-1,2,3,4-tetrahydro-[1,4]oxazepino[2,3-c]quinolin-6(7H)-one | LCMS (Method X2): Rt = 1.16, m/z = 584.2 HRMS (Method T4): m/z calcd for $C_{29}H_{33}ClF_2N_7O_2$ [M + H]+: 584.2347, Found: 584.2343 (Rt = 2.32 min) | 2-(cyclopropylmethyl)-2,6-diazaspiro[3.3]heptane (made from tert-butyl 2,6-diazaspiro[3.3]heptane-2-carboxylate by alkylation and boc-deprotection) |
| Example 9x: (2S)-10-((5-chloro-2-(6-((2,2-difluorocyclopropyl)methyl)-2,6-diazaspiro[3.3]heptan-2-yl)pyrimidin-4-yl)amino)-2-cyclopropyl-3,3-difluoro-7-methyl-1,2,3,4-tetrahydro-[1,4]oxazepino[2,3-c]quinolin-6(7H)-one | LCMS (Method X2): Rt = 1.18, m/z = 620.2 HRMS (Method T4): m/z calcd for $C_{29}H_{31}ClF_4N_7O_2$ [M + H]+: 620.2158, Found: 620.2153 (Rt = 2.39 min) | 2-((2,2-difluorocyclopropyl)methyl)-2,6-diazaspiro[3.3]heptane [made from tert-butyl 2,6-diazaspiro[3.3]heptane-2-carboxylate by alkylation and boc-deprotection] |
| Example 9y: (2S)-10-((5-chloro-2-(8-(cyclopropylmethyl)-3,8-diazabicyclo[3.2.1]octan-3-yl)pyrimidin-4-yl)amino)-2-cyclopropyl-3,3-difluoro-7-methyl-1,2,3,4-tetrahydro-[1,4]oxazepino[2,3-c]quinolin-6(7H)-one | LCMS (Method T2): Rt = 1.32, m/z = 598.3 HRMS (Method T4): m/z calcd for $C_{30}H_{35}ClF_2N_7O_2$ [M + H]+: 598.2503, Found: 598.2499 (Rt = 2.50 min) | 8-(cyclopropylmethyl)-3,8-diazabicyclo[3.2.1]octane [made from tert-butyl 3,8-diazabicyclo[3.2.1]octane-3-carboxylate by alkylation and boc-deprotection] |

| Example | Data and comments | Amine used |
|---|---|---|
| Example 9za: (2S)-10-((5-chloro-2-(8-((2,2-difluorocyclopropyl)methyl)-3,8-diazabicyclo[3.2.1]octan-3-yl)pyrimidin-4-yl)amino)-2-cyclopropyl-3,3-difluoro-7-methyl-1,2,3,4-tetrahydro-[1,4]oxazepino[2,3-c]quinolin-6(7H)-one | LCMS (Method T2): Rt = 1.34, m/z = 634.2 HRMS (Method X4): m/z calcd for $C_{30}H_{33}ClF_4NO_2$ [M + H]+: 634.2321, Found: 634.2312 (Rt = 2.59 min) | 8-((2,2-difluorocyclopropyl)methyl)-3,8-diazabicyclo[3.2.1]octane [made from tert-butyl 3,8-diazabicyclo[3.2.1]octane-3-carboxylate by alkylation and boc-deprotection] |
| Example 9zb: (S)-10-((5-chloro-2-((3R,5R)-3-hydroxy-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one | LCMS (Method T4): RT = 2.64 min; m/z calcd for $C_{26}H_{30}ClF_2N_6O_3$ [M + H]+ 547.2030; found 547.2024 | (3R,5R)-5-methylpiperidin-3-ol [prepared by analogy to the procedure described in Pan et al, Bioorganic & Medicinal Chemistry Letters, 24 (8), 1983-1986; 2014.] |

The following tabulated examples were prepared by a method analogous to that used for the preparation of Example 9a. 1-1.5 eq of the appropriate amine (as free base or as hydrochloride salt) was used. Amines used were racemic, leading to a mixture of isomers as shown. Potassium carbonate (3-4 eq) was used in place of DIPEA, and acetonitrile was used as solvent. Heating times were 4-5 h at 140-150° C. in the microwave. Example 10d used (S)-10-((2-chloro-5-fluoropyrimidin-4-yl)amino)-2-cyclopropyl-3,3-difluoro-7-methyl-1,2,3,4-tetrahydro-[1,4]oxazepino[2,3-c]quinolin-6(7H)-one (Intermediate A2), and was heated to 1400° C. for 16 hours.

| Example | Data |
|---|---|
| Example 10a: (S)-10-((5-chloro-2-((3S,4R)-3,4-difluoropiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one:(S)-10-((5-chloro-2-((3R,4S)-3,4-difluoropiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (1:1) | HRMS (Method X4) m/z calc for $C_{25}H_{26}ClF_4N_6O_2$ [M + H]+ = 553.1742, found 553.1734. RT 3.28 mins |

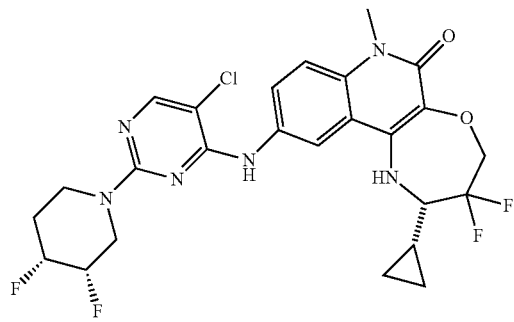

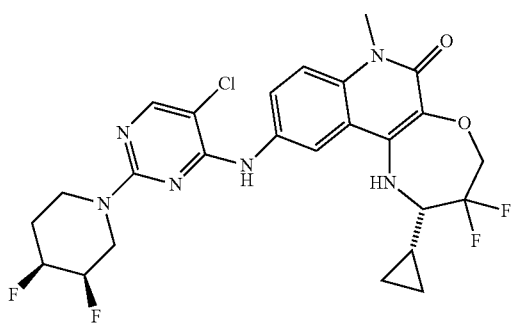

Example 10b: (S)-10-((5-chloro-2-((3S,4S)-3,4-difluoropiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one:(S)-10-((5-chloro-2-((3R,4R)-3,4-difluoropiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (1:1)

HRMS (Method T4) m/z calc for $C_{25}H_{26}ClF_4N_6O_2$ [M + H]+ = 553.1736, found 553.1751. RT 2.96 mins

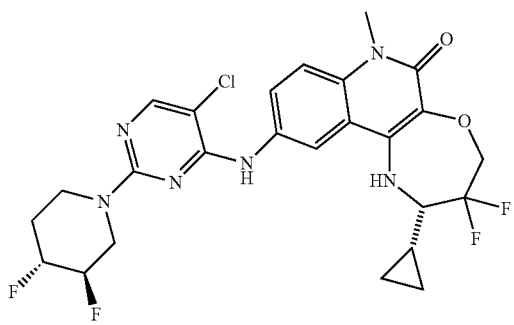

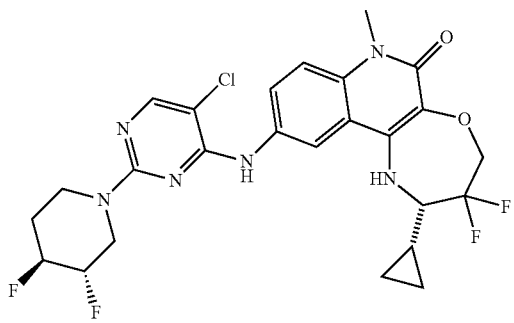 [SMILES: Cn1c(=O)c2c(c3cc(Nc4nc(N5CC[C@H](F)[C@@H](F)C5)ncc4Cl)ccc31)N[C@@H](C1CC1)C(F)(F)CO2]

Example 10c: (S)-10-((5-chloro-2-((R)-3-methoxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one:(S)-10-((5-chloro-2-((S)-3-methoxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (1:1)

HRMS (Method X4) m/z calc for $C_{26}H_{30}ClF_2N_6O_3$ [M + H]+ = 547.2036, found 547.2032. RT 3.11 mins

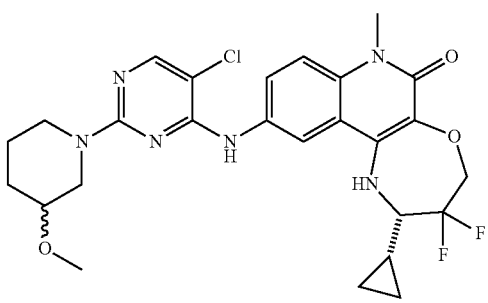

Example 10d: (S)-10-((5-fluoro-2-((3S,4R)-3,4-difluoropiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one:(S)-10-((5-fluoro-2-((3R,4S)-3,4-difluoropiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (1:1)

HRMS (Method X4) m/z calc for $C_{25}H_{26}F_5N_6O_2$ [M + H]+ = 537.2037, found 537.2032. RT = 3.18 mins

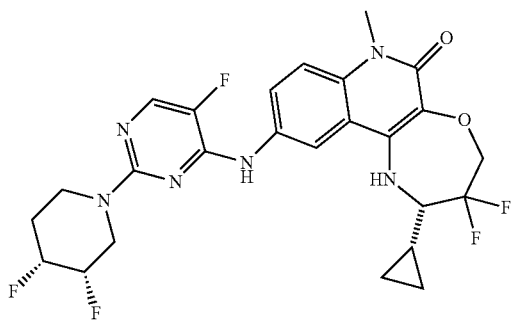

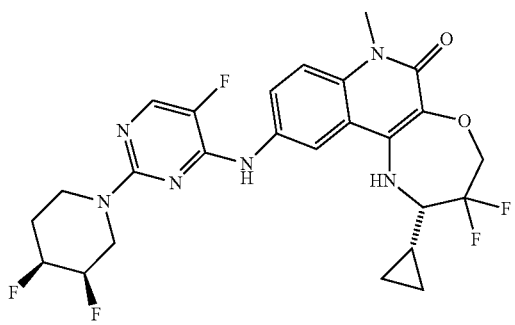 [SMILES: Cn1c(=O)c2c(c3cc(Nc4nc(N5CC[C@H](F)[C@H](F)C5)ncc4F)ccc31)N[C@@H](C1CC1)C(F)(F)CO2]

Example 11a: (2S)-10-[[5-chloro-2-(4-methyl-1,4-diazepan-1-yl)pyrimidin-4-yl]amino]-2-cyclopropyl-3,3-difluoro-7-methyl-2,4-dihydro-1H-[1,4]oxazepino[2,3-c]quinolin-6(7H)-one

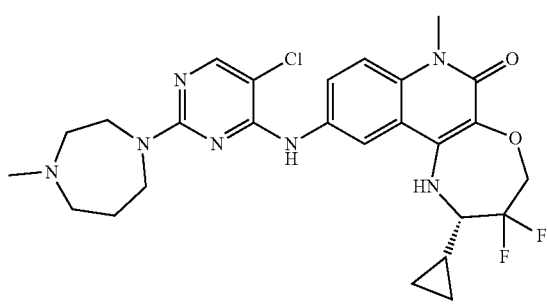 [SMILES: CN1CCCN(c2ncc(Cl)c(Nc3ccc4c(c3)c3c(c(=O)n4C)OCC(F)(F)[C@H](C4CC4)N3)n2)CC1]

1-methyl-1,4-diazepane (5 mg, 0.044 mmol)), (S)-2-cyclopropyl-10-((2,5-dichloropyrimidin-4-yl)amino)-3,3-difluoro-7-methyl-1,2,3,4-tetrahydro-[1,4]oxazepino[2,3-c]quinolin-6(7H)-one (Intermediate A1, 12 mg, 0.026 mmol) and DIPEA (22 µL, 0.13 mmol) were combined in acetonitrile (0.5 mL) and heated in a sealed vessel at 70° C. for 2 days. The resulting mixture was evaporated, dissolved in DMSO and purified using reverse phase flash chromatography (Biotage 12 g SNAP Ultra C18, 20-35-75-100% methanol in water, 0.1% formic acid modifier). Fractions containing product were loaded onto an SCX-2 (1 g) column which was washed with methanol and eluted with 20% (1.6M methanolic ammonia) in DCM to give the title compound (10.3 mg, 0.017 mmol) as a yellow solid after evaporation and drying. HRMS (Method X4) RT=2.38 min; m/z calcd for $C_{26}H_{31}ClF_2N_7O_2^+$ [M+H]+: 546.2190, found 546.2186.

The following tabulated examples were prepared by a method analogous to that used for the preparation of Example 11a. Amines were obtained from commercial vendors and used as free base or hydrochloride salt. Some amines were used as racemates, leading to a mixture of isomers as shown. For example 12a and 12d, the reactions were heated to 140° C. in the microwave. For reactions forming examples 12b and 12c, (3S,5R)-3-(Boc-amino)-5-methylpiperidine or (3R,5S)-3-(Boc-amino)-5-methylpiperidine were used. Boc groups were removed by treatment with TFA in DCM at room temperature to give the products shown. Example 12e was further heated to 160° C. in the microwave for 4 hours.

| Example | Structure | LCMS |
|---|---|---|
| Example 11b: (S)-10-((5-chloro-2-((R)-3-ethylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one:(S)-10-((5-chloro-2-((S)-3-ethylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (1:1) | 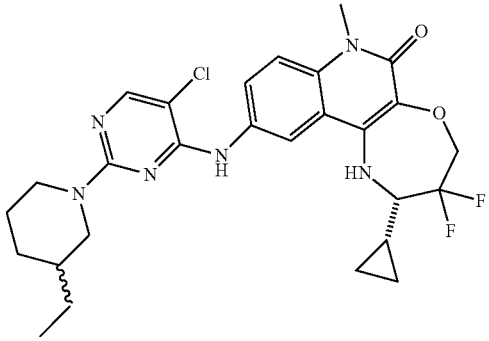 [SMILES: CCC1CCCN(c2ncc(Cl)c(Nc3ccc4c(c3)c3c(c(=O)n4C)OCC(F)(F)[C@H](C4CC4)N3)n2)C1] | LCMS (Method T4) RT 3.05 mins m/z calc for $C_{27}H_{32}ClF_2N_6O_2$ [M + H]+ = 545.2238, found 545.2233. |
| Example 11c: (S)-10-((5-chloro-2-((R)-3-methylazepan-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one:(S)-10-((5-chloro-2-((S)-3-methylazepan-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (1:1) | 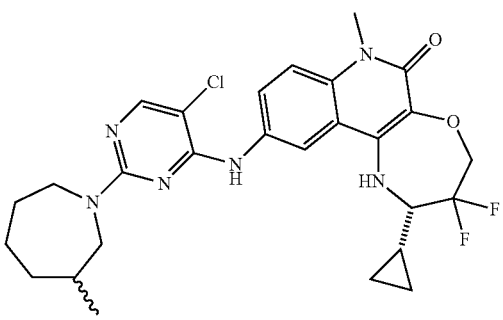 [SMILES: CC1CCCCN(c2ncc(Cl)c(Nc3ccc4c(c3)c3c(c(=O)n4C)OCC(F)(F)[C@H](C4CC4)N3)n2)C1] | LCMS (Method T4) RT 2.91 mins m/z calc for $C_{27}H_{32}ClF_2N_6O_2$ [M + H]+ = 545.2238, found 545.2240. |
| Example 11d: (S)-10-((5-chloro-2-((R)-4-methylazepan-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one:(S)-10-((5-chloro-2-((S)-4-methylazepan-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (1:1)) | 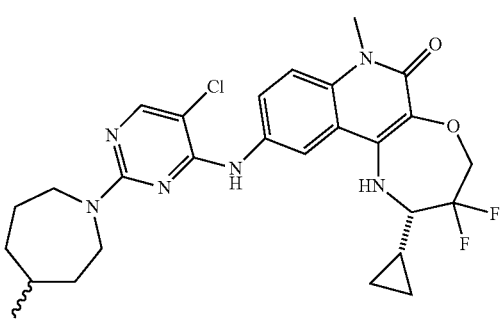 [SMILES: CC1CCCN(c2ncc(Cl)c(Nc3ccc4c(c3)c3c(c(=O)n4C)OCC(F)(F)[C@H](C4CC4)N3)n2)CC1] | LCMS (Method T4) RT 2.94 mins m/z calc for $C_{27}H_{32}ClF_2N_6O_2$ [M + H]+ = 545.2238, found 545.2248. |
| Example 11e: (S)-10-((5-chloro-2-((3R,5S)-3,5-dihydroxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one | 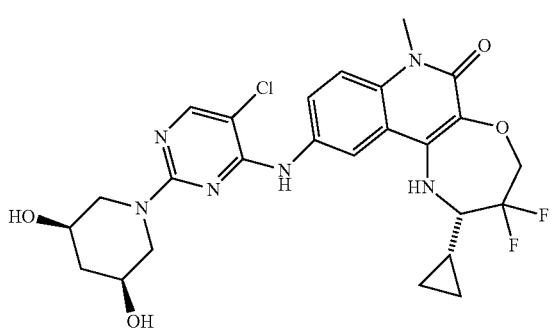 [SMILES: Cn1c(=O)c2c(c3cc(Nc4nc(N5C[C@H](O)C[C@H](O)C5)ncc4Cl)ccc31)N[C@@H](C1CC1)C(F)(F)CO2] | LCMS (Method T4) RT 3.05 mins m/z calc for $C_{25}H_{28}ClF_2N_6O_4$ [M + H]+ = 549.1823, found 549.1827. |

| Example | Structure | LCMS |
|---|---|---|
| Example 11f: (S)-10-((5-chloro-2-((1R,5R)-1-(hydroxymethyl)-5-methyl-3-azabicyclo[3.1.0]hexan-3-yl)pyrimidin-4-yl)amino)-2-cyclopropyl-3,3-difluoro-7-methyl-1,2,3,4-tetrahydro-[1,4]oxazepino[2,3-c]quinolin-6(7H)-one:(S)-10-((5-chloro-2-((1S,5S)-1-(hydroxymethyl)-5-methyl-3-azabicyclo[3.1.0]hexan-3-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (1:1) | 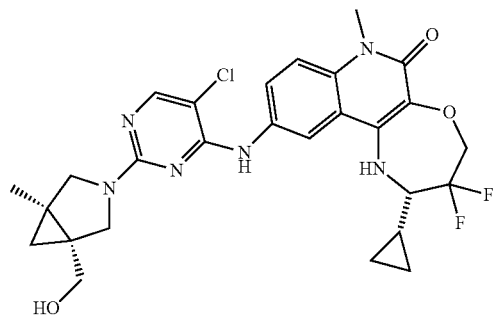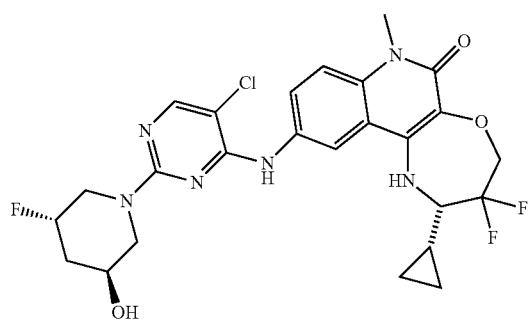 | LCMS (Method T4) RT 2.66 mins m/z calc for $C_{27}H_{30}ClF_2N_6O_3$ [M + H]+ = 559.2030, found 559.2026. |
| Example 11g: (S)-10-((5-chloro-2-((3R,5R)-3-fluoro-5-hydroxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one:(S)-10-((5-chloro-2-((3S,5S)-3-fluoro-5-hydroxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one(1:1) | 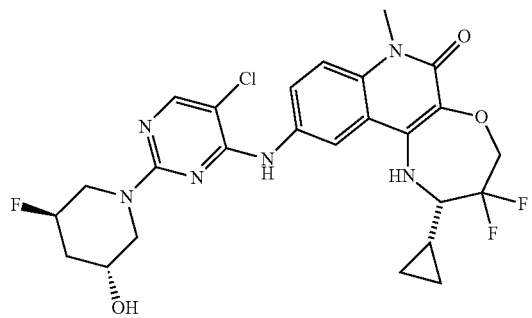 | LCMS (Method T4) RT 2.72 mins m/z calc for $C_{25}H_{27}ClF_3N_6O_3$ [M + H]+ = 551.1780, found 551.1785. |
| Example 11h: (S)-10-((5-chloro-2-((R)-7-hydroxy-5-azaspiro[2.5]octan-5-yl)pyrimidin-4-yl)amino)-2-cyclopropyl-3,3-difluoro-7-methyl-1,2,3,4-tetrahydro-[1,4]oxazepino[2,3-c]quinolin-6(7H)-one:(S)-10-((5-chloro-2-((S)-7-hydroxy-5-azaspiro[2.5]octan-5-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (1:1) | 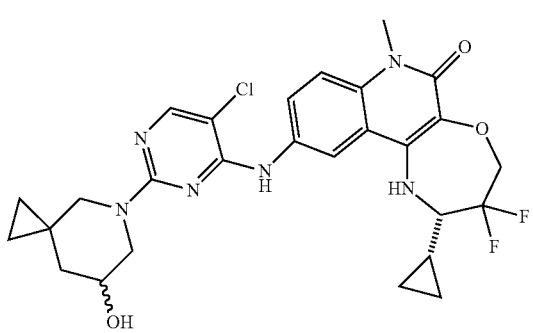 [SMILES: Cn1c(=O)c2c(c3cc(Nc4nc(N5CC(O)CC6(CC6)C5)ncc4Cl)ccc31)N[C@@H](C1CC1)C(F)(F)CO2] | LCMS (Method T4) RT 2.73 mins m/z calc for $C_{27}H_{30}ClF_2N_6O_3$ [M + H]+ = 559.2030, found 559.2023. |

| Example | Structure | LCMS |
|---|---|---|
| Example 11i: (S)-10-((5-chloro-2-(methyl (propyl)amino)pyrimidin-4-yl)amino)-2-cyclopropyl-3,3-difluoro-7-methyl-1,2,3,4-tetrahydro-[1,4]oxazepino[2,3-c]quinolin-6(7H)-one | 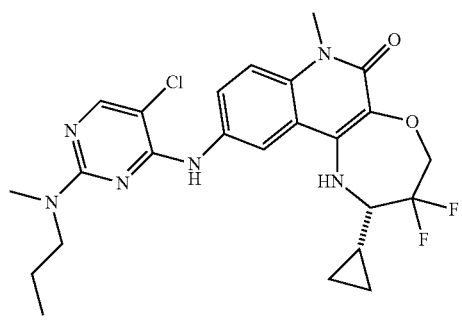 [SMILES: CCCN(C)c1ncc(Cl)c(Nc2ccc3c(c2)c2c(c(=O)n3C)OCC(F)(F)[C@H](C3CC3)N2)n1] | LCMS (Method T4) RT 2.68 mins m/z calc for $C_{24}H_{28}ClF_2N_6O_2$ [M + H]+ = 505.1925, found 505.1929. |
| Example 11j: (S)-10-((5-chloro-2-((3R,4S)-3-(hydroxymethyl)-4-methylpyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one:(S)-10-((5-chloro-2-((3S,4R)-3-(hydroxymethyl)-4-methylpyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (1:1) | 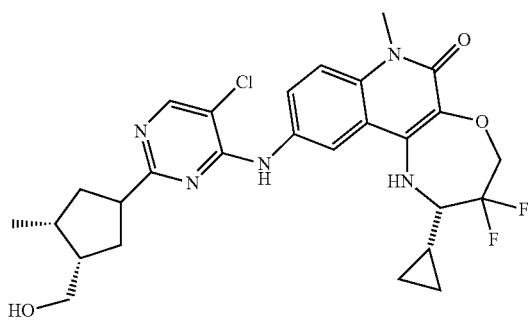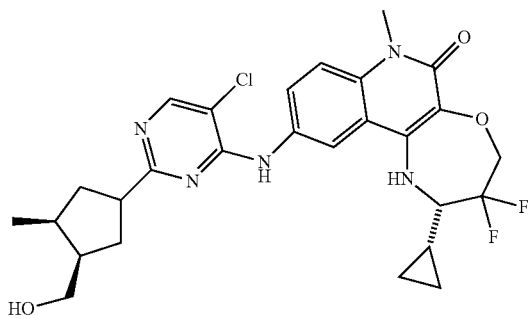 | LCMS (Method T4) RT 2.55 mins m/z calc for $C_{26}H_{30}ClF_2N_6O_3$ [M + H]+ = 547.2030, found 547.2033. |
| Example 11k: (S)-10-((5-chloro-2-((2-hydroxyethyl)(propyl)amino)pyrimidin-4-yl)amino)-2-cyclopropyl-3,3-difluoro-7-methyl-1,2,3,4-tetrahydro-[1,4]oxazepino[2,3-c]quinolin-6(7H)-one | 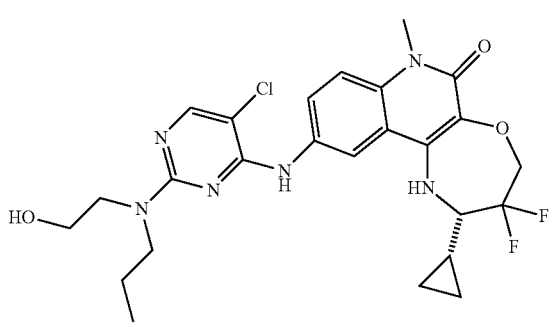 [SMILES: CCCN(CCO)c1ncc(Cl)c(Nc2ccc3c(c2)c2c(c(=O)n3C)OCC(F)(F)[C@H](C3CC3)N2)n1] | LCMS (Method T4) RT 2.60 mins m/z calc for $C_{25}H_{30}ClF_2N_6O_3$ [M + H]+ = 535.2030, found 535.2035. |
| Example 11l: (S)-10-((5-chloro-2-(5-azaspiro[2.5]octan-5-yl)pyrimidin-4-yl)amino)-2-cyclopropyl-3,3-difluoro-7-methyl-1,2,3,4-tetrahydro-[1,4]oxazepino[2,3-c]quinolin-6(7H)-one | 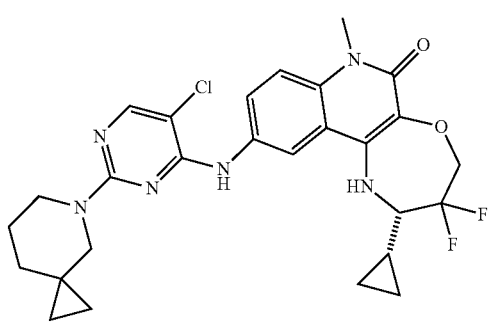 [SMILES: Cn1c(=O)c2c(c3cc(Nc4nc(N5CCCC6(CC6)C5)ncc4Cl)ccc31)N[C@@H](C1CC1)C(F)(F)CO2] | LCMS (Method T4) RT 2.95 mins m/z calc for $C_{27}H_{30}ClF_2N_6O_2$ [M + H]+ = 543.2081, found 543.2086. |

-continued

| Example 11m: (S)-10-((5-chloro-2-(((R)-3-methoxy-2-methylpropyl)amino)pyrimidin-4-yl)amino)-2-cyclopropyl-3,3-difluoro-7-methyl-1,2,3,4-tetrahydro-[1,4]oxazepino[2,3-c]quinolin-6(7H)-one:(S)-10-((5-chloro-2-(((S)-3-methoxy-2-methylpropyl)amino)pyrimidin-4-yl)amino)-2-cyclopropyl-3,3-difluoro-7-methyl-1,2,3,4-tetrahydro-[1,4]oxazepino[2,3-c]quinolin-6(7H)-one (1:1) | 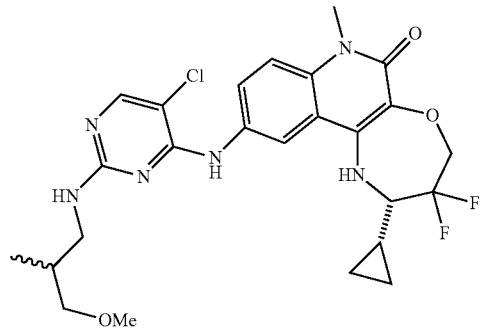 [SMILES: COCC(C)CNc1ncc(Cl)c(Nc2ccc3c(c2)c2c(c(=O)n3C)OCC(F)(F)[C@H](C3CC3)N2)n1] | LCMS (Method T4) RT 2.53 mins m/z calc for $C_{25}H_{30}ClF_2N_6O_3$ [M + H]+ = 535.2030, found 535.2033. |
|---|---|---|
| Example 11n: (S)-10-((5-chloro-2-(3,3-dimethylazetidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one | 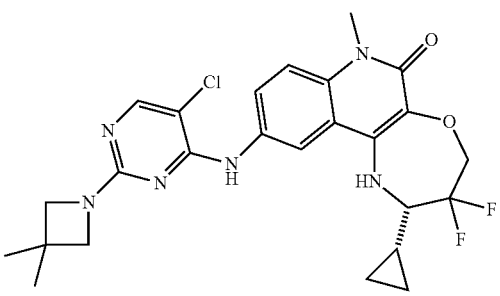 [SMILES: Cn1c(=O)c2c(c3cc(Nc4nc(N5CC(C)(C)C5)ncc4Cl)ccc31)N[C@@H](C1CC1)C(F)(F)CO2] | HRMS (Method T4) m/z calc for $C_{25}H_{28}ClF_2N_6O_2$ [M + H]+ =: 517.1925, Found: 517.1923 |
| Example 11o: (S)-10-((5-chloro-2-(3-methylazetidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one | 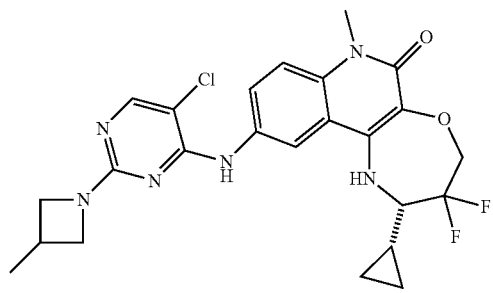 [SMILES: CC1CN(c2ncc(Cl)c(Nc3ccc4c(c3)c3c(c(=O)n4C)OCC(F)(F)[C@H](C4CC4)N3)n2)C1] | HRMS (Method T4) m/z calc for $C_{24}H_{26}ClF_2N_6O_2$ [M + H]$^+$ = 503.1769, Found: 503.1768 |
| Example 11p: (S)-1-(5-chloro-4-((2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)azetidine-3-carboxnitrile | 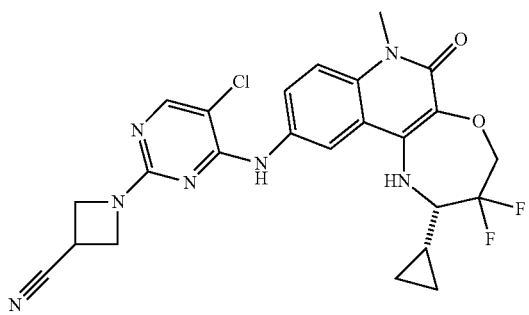 [SMILES: Cn1c(=O)c2c(c3cc(Nc4nc(N5CC(C#N)C5)ncc4Cl)ccc31)N[C@@H](C1CC1)C(F)(F)CO2] | HRMS (Method X4) m/z calcd for $C_{24}H_{23}ClF_2N_7O_2$ [M + H]$^+$: 514.1570, Found: 514.1570 |
| Example 11q: (S)-10-((5-chloro-2-(3-fluoroazetidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one | 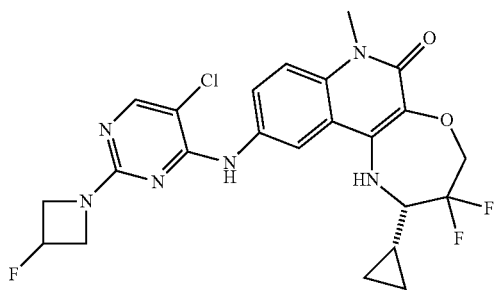 [SMILES: Cn1c(=O)c2c(c3cc(Nc4nc(N5CC(F)C5)ncc4Cl)ccc31)N[C@@H](C1CC1)C(F)(F)CO2] | HRMS (Method X4) m/z calcd for $C_{23}H_{23}ClF_3N_6O_2$ [M + H]$^+$: 507.1518, Found: 507.1519 |

¹H NMR (600 MHz, Methanol-d4) δ 8.16 (d, J = 2.3 Hz, 1H), 8.00 (dd, J = 9.1, 2.3 Hz, 1H), 7.97 (s, 1H), 7.54 (d, J = 9.2 Hz, 1H), 5.39 (dtt, J = 57.2, 6.1, 3.2 Hz, 1H), 4.54-4.29 (m, 4H), 4.16-4.05 (m, 2H), 3.72 (s, 3H), 3.42-3.25 (m, 1H), 1.48-1.36 (m, 1H), 0.85-0.77 (m, 1H), 0.74-0.66 (m, 1H), 0.66-0.58 (m, 1H), 0.45-0.32 (m, 1H).

Example 11r: (S)-10-((5-chloro-2-((R)-3-(difluoromethyl)piperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one:(S)-10-((5-chloro-2-((S)-3-(difluoromethyl)piperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (1:1)

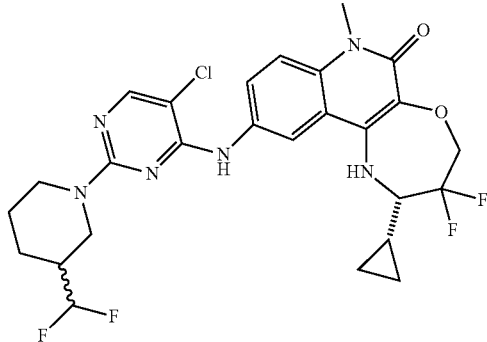 [SMILES: Cn1c(=O)c2c(c3cc(Nc4nc(N5CCCC(C(F)F)C5)ncc4Cl)ccc31)N[C@@H](C1CC1)C(F)(F)CO2]

HRMS (Method T4) RT 3.05 mins m/z calc for $C_{26}H_{28}ClF_4N_6O_2$ [M + H]+ = 567.1893, found 567.1900.

Example 11s: (S)-1-(5-chloro-4-((2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)-3-methylazetidine-3-carbonitrile

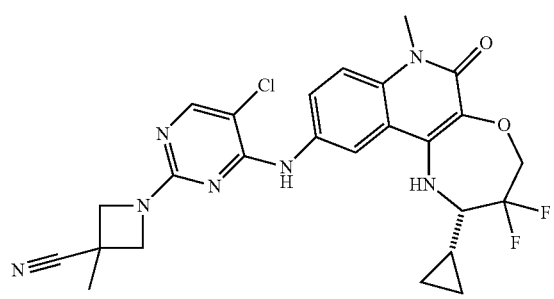 [SMILES: Cn1c(=O)c2c(c3cc(Nc4nc(N5CC(C)(C#N)C5)ncc4Cl)ccc31)N[C@@H](C1CC1)C(F)(F)CO2]

HRMS (Method T4) m/z calcd for $C_{25}H_{25}ClF_2N_7O_2$ [M + H]+: 528.1721, Found: 528.1721

Example 11t: (S)-2-(1-(5-chloro-4-((2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)azetidin-3-yl)acetonitrile

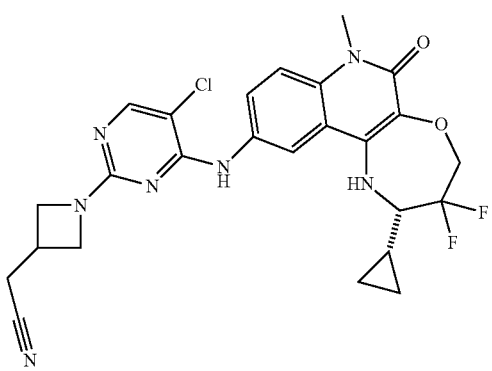 [SMILES: Cn1c(=O)c2c(c3cc(Nc4nc(N5CC(CC#N)C5)ncc4Cl)ccc31)N[C@@H](C1CC1)C(F)(F)CO2]

HRMS (Method T4) m/z calcd for $C_{25}H_{25}ClF_2N_7O_2$ [M + H]⁺: 528.1721, Found: 528.1726

Example 11u: (S)-10-((5-chloro-2-(3-(difluoromethyl)azetidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one

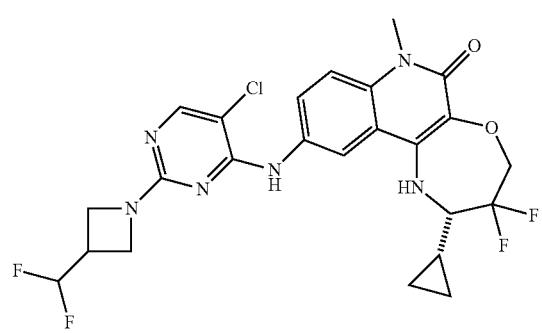 [SMILES: Cn1c(=O)c2c(c3cc(Nc4nc(N5CC(C(F)F)C5)ncc4Cl)ccc31)N[C@@H](C1CC1)C(F)(F)CO2]

HRMS (Method T4) m/z calcd for $C_{24}H_{24}ClF_4N_6O_2$ [M + H]⁺: 539.1580, Found: 539.1585

| | | |
|---|---|---|
| Example 11v: (S)-10-((2-(azetidin-1-yl)-5-chloropyrimidin-4-yl)amino)-2-cyclopropyl-3,3-difluoro-7-methyl-1,2,3,4-tetrahydro-[1,4]oxazepino[2,3-c]quinolin-6(7H)-one | 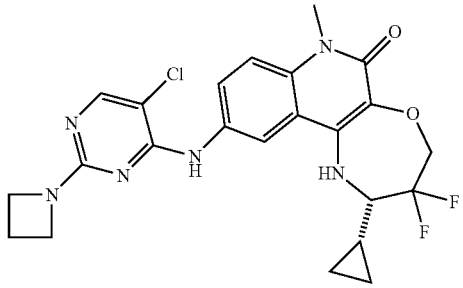 [SMILES: Cn1c(=O)c2c(c3cc(Nc4nc(N5CCC5)ncc4Cl)ccc31)N[C@@H](C1CC1)C(F)(F)CO2] | HRMS (Method T4) m/z calcd for $C_{23}H_{24}ClF_2N_6O_2^+$ [M + H]$^+$: 489.1617, Found: 489.1602. |

$^1$H NMR (600 MHz, MeOD-d4) δ 8.17 (d, J = 2.3 Hz, 1H), 8.02 (dd, J = 9.1, 2.3 Hz, 1H), 7.90 (s, 1H), 7.50 (d, J = 9.1 Hz, 1H), 4.54-4.34 (m, 2H), 4.10-4.03 (m, 4H), 3.69 (s, 3H), 3.37-3.28 (m, 1H), 2.32 (quin, J = 7.5 Hz, 2H), 1.42-1.34 (m, 1H), 0.83-0.77 (m, 1H), 0.71-0.64 (m, 1H), 0.61-0.58 (m, 1H), 0.40-0.33 (m, 1H).

| | | |
|---|---|---|
| Example 11w: (S)-10-((5-chloro-2-(3-methoxyazetidin-1-yl)pyrimidin-4-yl)amino)-2-cyclopropyl-3,3-difluoro-7-methyl-1,2,3,4-tetrahydro-[1,4]oxazepino [2,3-c]quinolin-6(7H)-one | 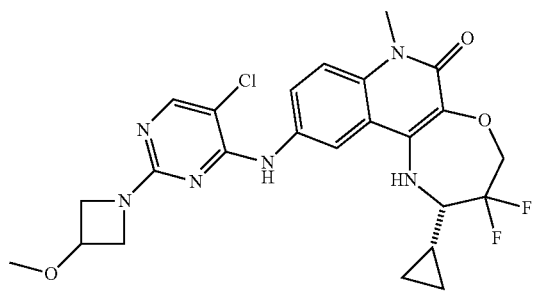 [SMILES: COC1CN(c2ncc(Cl)c(Nc3ccc4c(c3)c3c(c(=O)n4C)OCC(F)(F)[C@H](C4CC4)N3)n2)C1] | HRMS (Method T4) m/z calcd for $C_{24}H_{26}ClF_2N_6O_3$ [M + H]$^+$: 519.1723, Found: 519.1708. |

$^1$H NMR (600 MHz, MeOD-d4) δ 8.18 (d, J = 2.3 Hz, 1H), 8.00 (dd, J = 9.1, 2.3 Hz, 1H), 7.93 (s, 1H), 7.52 (d, J = 9.1 Hz, 1H), 4.52-4.37 (m, 2H), 4.31-4.26 (m, 1H), 4.25-4.19 (m, 2H), 3.90-3.86 (m, 2H), 3.71 (s, 3H), 3.36-3.28 (m, 4H), 1.43-1.35 (m, 1H), 0.83-0.76 (m, 1H), 0.72-0.66 (m, 1H), 0.64-0.59 (m, 1H), 0.40-0.34 (m, 1H)

| | | |
|---|---|---|
| Example 11x: (S)-10-((5-chloro-2-(3-methoxy-3-methylazetidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one | 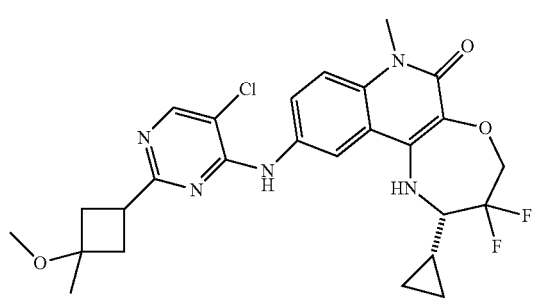 [SMILES: COC1(C)CC(c2ncc(Cl)c(Nc3ccc4c(c3)c3c(c(=O)n4C)OCC(F)(F)[C@H](C4CC4)N3)n2)C1] | HRMS (Method T4 m/z calcd for $C_{24}H_{28}ClF_2H_6O_3$ [M + H]$^+$: 533.1874, Found: 533.1884 |
| Example 11y: (S)-10-((5-chloro-2-((R)-3-ethylpyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one:(S)-10-((5-chloro-2-((S)-3-ethylpyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (1:1) | 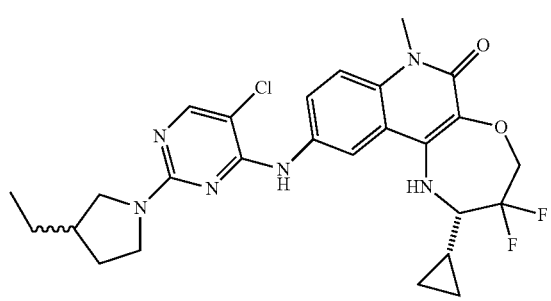 [SMILES: CCC1CCN(c2ncc(Cl)c(Nc3ccc4c(c3)c3c(c(=O)n4C)OCC(F)(F)[C@H](C4CC4)N3)n2)C1] | LCMS (Method X2) RT 1.63 min; m/z calcd for $C_{26}H_{30}ClF_2N_6O_2^+$ 531.2081 found 531.2085 |

| | | |
|---|---|---|
| Example 11z: (S)-10-((5-chloro-2-((R)-3-fluoro-3-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one:(S)-10-((5-chloro-2-((S)-3-fluoro-3-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (1:1) | 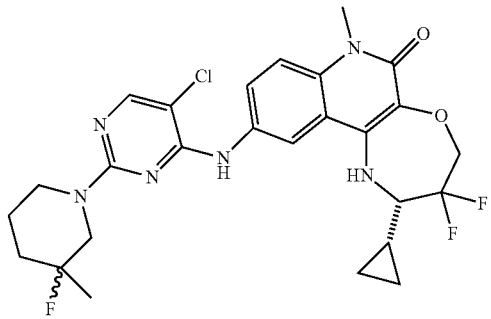 [SMILES: Cn1c(=O)c2c(c3cc(Nc4nc(N5CCCC(C)(F)C5)ncc4Cl)ccc31)N[C@@H](C1CC1)C(F)(F)CO2] | LCMS (Method X4) RT 3.29 min; m/z calcd for $C_{26}H_{29}ClF_3N_6O_2^+$ [M + H]+ 549.1992 found 549.1983 |
| Example 12a: (S)-10-((5-chloro-2-((R)-3-hydroxy-3-methylpyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one:(S)-10-((5-chloro-2-((S)-3-hydroxy-3-methylpyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (1:1) | 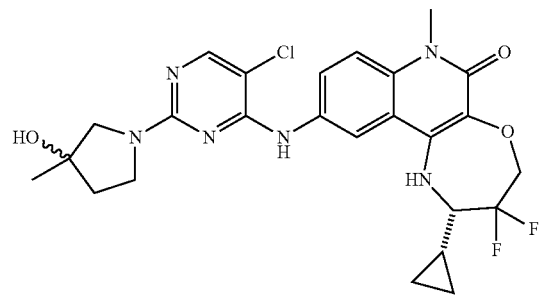 [SMILES: Cn1c(=O)c2c(c3cc(Nc4nc(N5CCC(C)(O)C5)ncc4Cl)ccc31)N[C@@H](C1CC1)C(F)(F)CO2] | LCMS (Method T4) RT 2.49 mins m/z calc for $C_{25}H_{28}ClF_2N_6O_3$ [M + H]+ = 533.1874, found 533.1873 |
| Example 12b: (S)-10-((2-((3S,5R)-3-amino-5-methylpiperidin-1-yl)-5-chloropyrimidin-4-yl)amino)-2-cyclopropyl-3,3-difluoro-7-methyl-1,2,3,4-tetrahydro-[1,4]oxazepino[2,3-c]quinolin-6(7H)-one | 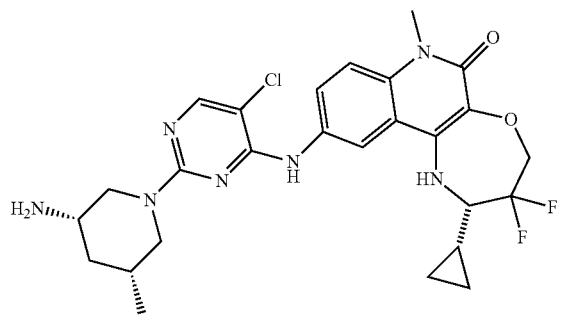 [SMILES: C[C@@H]1C[C@H](N)CN(c2ncc(Cl)c(Nc3ccc4c(c3)c3c(c(=O)n4C)OCC(F)(F)[C@H](C4CC4)N3)n2)C1] | HRMS (Method X4) m/z calcd for $C_{26}H_{31}ClF_2N_7O_2$ [M + H]+: 546.2195, Found: 546.2202. |
| Example 12c: (S)-10-((2-((3R,5S)-3-amino-5-methylpiperidin-1-yl)-5-chloropyrimidin-4-yl)amino)-2-cyclopropyl-3,3-difluoro-7-methyl-1,2,3,4-tetrahydro-[1,4]oxazepino[2,3-c]quinolin-6(7H)-one | 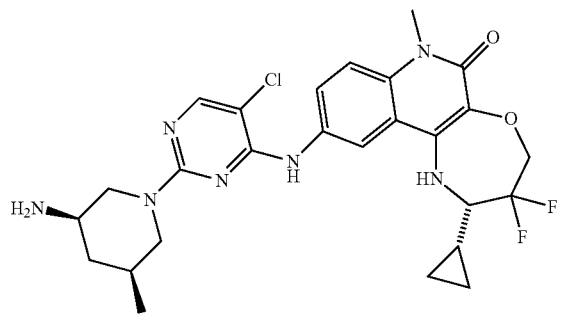 [SMILES: C[C@H]1C[C@@H](N)CN(c2ncc(Cl)c(Nc3ccc4c(c3)c3c(c(=O)n4C)OCC(F)(F)[C@H](C4CC4)N3)n2)C1] | HRMS (Method X4) m/z calcd for $C_{26}H_{31}ClF_2N_7O_2$ [M + H]+: 546.2195, Found: 546.2182. |
| Example 12d: (2S)-10-((2-(6-oxa-3-azabicyclo[3.1.1]heptan-3-yl)-5-chloropyrimidin-4-yl)amino)-2-cyclopropyl-3,3-difluoro-7-methyl-1,2,3,4-tetrahydro-[1,4]oxazepino[2,3-c]quinolin-6(7H)-one | 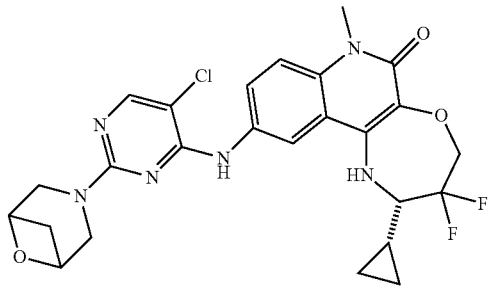 [SMILES: Cn1c(=O)c2c(c3cc(Nc4nc(N5CC6CC(C5)O6)ncc4Cl)ccc31)N[C@@H](C1CC1)C(F)(F)CO2] | LCMS (Method T4) RT 2.62 mins m/z calcd for $C_{25}H_{26}ClF_2N_6O_3$ ([M + H]+) 531.1717; found 531.1679 |

| Example | Structure | LCMS |
|---|---|---|
| Example 12e: (S)-10-((5-chloro-2-((R)-3,3-difluoro-5-hydroxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one:(S)-10-((5-chloro-2-((S)-3,3-difluoro-5-hydroxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (1:1) | 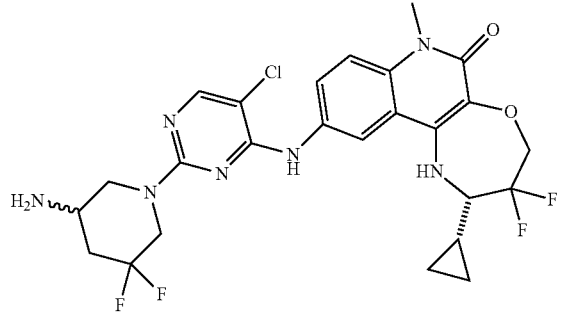 [SMILES: Cn1c(=O)c2c(c3cc(Nc4nc(N5CC(N)CC(F)(F)C5)ncc4Cl)ccc31)N[C@@H](C1CC1)C(F)(F)CO2] | LCMS (Method X4) RT 3.20 min; m/z calcd for $C_{25}H_{26}ClF_4N_6O_3^+$ [M + H]$^+$ 569.1691 found 569.1688 |
| Example 12f: (S)-10-((5-chloro-2-((R)-2-methylthiomorpholino)pyrimidin-4-yl)amino)-2-cyclopropyl-3,3-difluoro-7-methyl-1,2,3,4-tetrahydro-[1,4]oxazepino[2,3-c]quinolin-6(7H)-one:(S)-10-((5-chloro-2-((S)-2-methylthiomorpholino)pyrimidin-4-yl)amino)-2-cyclopropyl-3,3-difluoro-7-methyl-1,2,3,4-tetrahydro-[1,4]oxazepino[2,3-c]quinolin-6(7H)-one (1:1) | 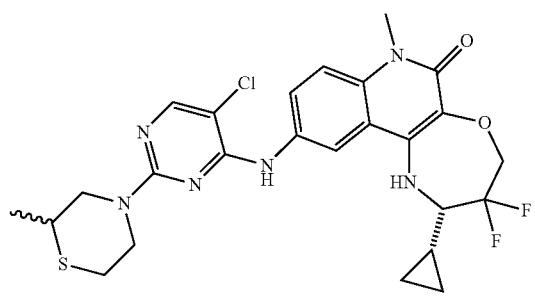 [SMILES: CC1CN(c2ncc(Cl)c(Nc3ccc4c(c3)c3c(c(=O)n4C)OCC(F)(F)[C@H](C4CC4)N3)n2)CCS1] | LCMS (Method X4) RT 3.63min m/z calcd for $C_{25}H_{28}ClF_2N_6O_2S^+$ [M + H]$^+$ 549.1646 found 549.1635 |
| Example 12g: (S)-10-((5-chloro-2-((R)-4,6-dimethyl-1,4-diazepan-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one:(S)-10-((5-chloro-2-((S)-4,6-dimethyl-1,4-diazepan-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (1:1) | 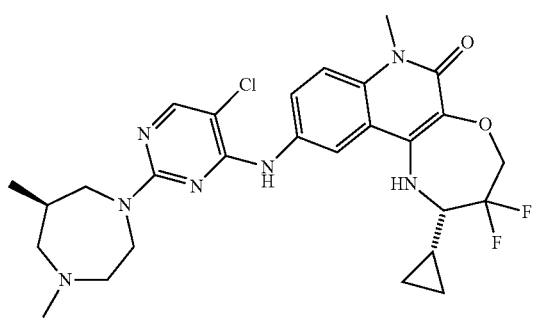 [SMILES: C[C@@H]1CN(C)CCN(c2ncc(Cl)c(Nc3ccc4c(c3)c3c(c(=O)n4C)OCC(F)(F)[C@H](C4CC4)N3)n2)C1] | LCMS (Method T4) RT 2.50 min m/z calcd for $C_{27}H_{33}ClF_2N_7O_2$ [M + H]$^+$ 560.2347 found 560.2351 |
| Example 12h: (S)-10-((5-chloro-2-((S)-hexahydropyrrolo[1,2-a]pyrazin-2(1H)-yl)pyrimidin-4-yl)amino)-2-cyclopropyl-3,3-difluoro-7-methyl-1,2,3,4-tetrahydro-[1,4]oxazepino[2,3-c]quinolin-6(7H)-one:(S)-10-((5-chloro-2-((R)-hexahydropyrrolo[1,2-a]pyrazin-2(1H)-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (1:1) | 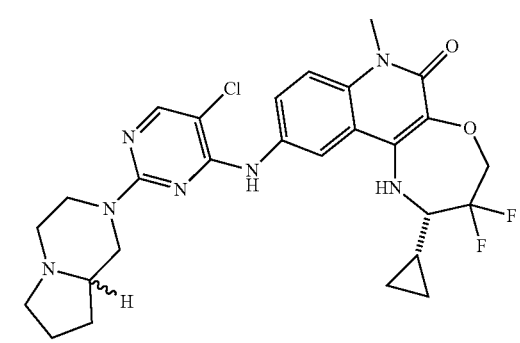 [SMILES: Cn1c(=O)c2c(c3cc(Nc4nc(N5CCN6CCCC6C5)ncc4Cl)ccc31)N[C@@H](C1CC1)C(F)(F)CO2] | LCMS (Method T4) RT 2.49 min; m/z calcd for $C_{27}H_{31}ClF_2N_7O_2$ [M + H]+ 558.2190 found 558.2188 |

| | | |
|---|---|---|
| Example 12i: (S)-10-((5-chloro-2-((R)-6-oxohexahydropyrrolo[1,2-a]pyrazin-2(1H)-yl)pyrimidin-4-yl)amino)-2-cyclopropyl-3,3-difluoro-7-methyl-1,2,3,4-tetrahydro-[1,4]oxazepino[2,3-c]quinolin-6(7H)-one:(S)-10-((5-chloro-2-((s)-6-oxohexahydropyrrolo[1,2-a]pyrazin-2(1H)-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (1:1) | 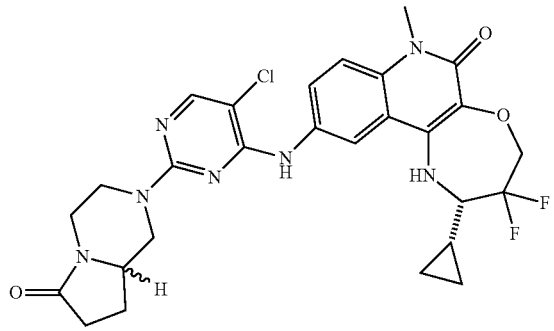 [SMILES: Cn1c(=O)c2c(c3cc(Nc4nc(N5CCN6C(=O)CCC6C5)ncc4Cl)ccc31)N[C@@H](C1CC1)C(F)(F)CO2] | LCMS (Method T4) Rt 2.81 min; m/z calcd for $C_{27}H_{29}ClF_2N_7O_3$ [M + H]+ 572.1983 found 572.1994 |
| Example 12j: (S)-10-((5-chloro-2-((R)-8-hydroxy-6-azaspiro[3.5]nonan-6-yl)pyrimidin-4-yl)amino)-2-cyclopropyl-3,3-difluoro-7-methyl-1,2,3,4-tetrahydro-[1,4]oxazepino[2,3-c]quinolin-6(7H)-one:(S)-10-((5-chloro-2-((S)-8-hydroxy-6-azaspiro[3.5]nonan-6-yl)pyrimidin-4-yl)amino)-2-cyclopropyl-3,3-difluoro-7-methyl-1,2,3,4-tetrahydro-[1,4]oxazepino[2,3-c]quinolin-6(7H)-one (1:1) | 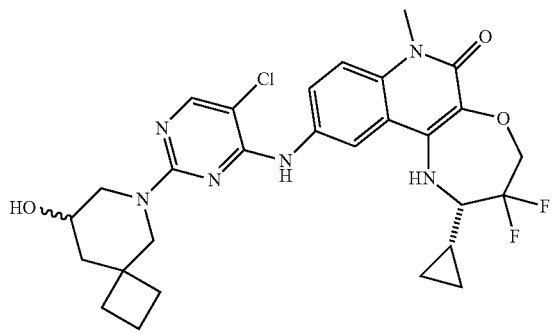 [SMILES: Cn1c(=O)c2c(c3cc(Nc4nc(N5CC(O)CC6(CCC6)C5)ncc4Cl)ccc31)N[C@@H](C1CC1)C(F)(F)CO2] | LCMS (Method X4) Rt 3.20 min; m/z calcd for $C_{28}H_{32}ClF_2N_6O_3$ [M + H]+ 573.2192 found 573.2183 |

The following examples 12x01-12x50 may be prepared by methods analogous to those previously described for examples 9a, 11a or 12a. Amines may be obtained from commercial vendors or prepared by known methods, and used as free base or hydrochloride salt. Some amines were used as racemates, leading to a mixture of isomers as shown. Protecting groups may be used to mask reactive functionality; for example in the preparation of example 12x14 tert-butyl 6-hydroxy-1,4-diazepane-1-carboxylate was used, and the Boc group was removed by treatment with TFA in DCM at room temperature. In the preparation of example 12x26, tert-butyl 2-(difluoromethyl)piperazine-1-carboxylate was used, and Boc deprotection occurred during the reaction.

| | |
|---|---|
| Example 12x 01: (S)-10-((5-chloro-2-((S)-3-methylpyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one 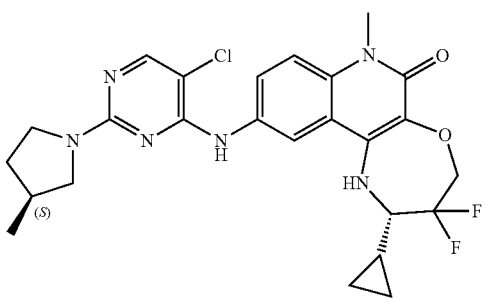 | Prepared using a method analogous to 11a. LCMS (Method X4) rt 2.75 min; m/z calculated for $C_{25}H_{28}ClF_2N_6O_2$ [M + H]+ 517.1925 found 517.1929 |
| Example 12x02: (S)-10-((5-chloro-2-((R)-3-methylpyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one | Prepared using a method analogous to 11a. LCMS (Method T4) rt 2.70 |

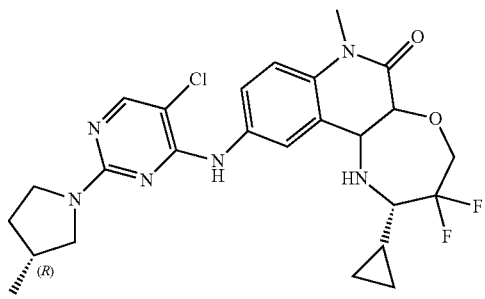

min; m/z calculated for
$C_{25}H_2ClF_2N_6O_2$ [M + H]+
517.1925 found 517.1894

Example 12x03: (S)-10-((5-chloro-2-((3R,5S)-3-fluoro-5-methyl-piperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one Prepared using a method analogous to 11a, heated to 120° C. for 18 h.
LCMS (Method X4) rt 2.84;

min m/z calculated for $C_{26}H_{29}ClF_3N6O_2$ [M + H]+ 549.1987; found 549.1973

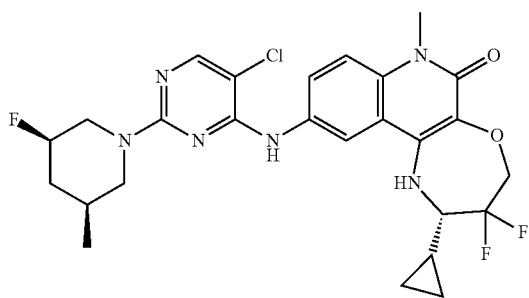 [SMILES: C[C@H]1C[C@@H](F)CN(c2ncc(Cl)c(Nc3ccc4c(c3)c3c(c(=O)n4C)OCC(F)(F)[C@H](C4CC4)N3)n2)C1]

Example 12x04: (S)-10-((5-chloro-2-((3R,5R)-3-fluoro-5-methyl-piperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one

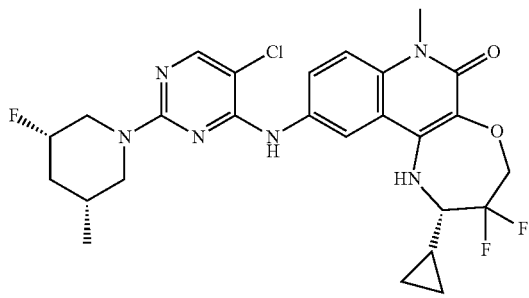 [SMILES: C[C@@H]1C[C@H](F)CN(c2ncc(Cl)c(Nc3ccc4c(c3)c3c(c(=O)n4C)OCC(F)(F)[C@H](C4CC4)N3)n2)C1]

Example 12x05: (S)-10-((5-chloro-2-((3R,5S)-3-methoxy-5-methyl-piperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one Prepared [(as 1:1 mixture with (3S,5R) isomer)] from rac-(3S,5R)-3-methoxy-5-methyl-piperidine: TFA using a method analogous to 11a
LCMS (Method T4) Rt 3.03 min; m/z calculated for $C_{27}H_{32}ClF_2N_6O_3$ [M + H]+ 561.2187 found 561.2188

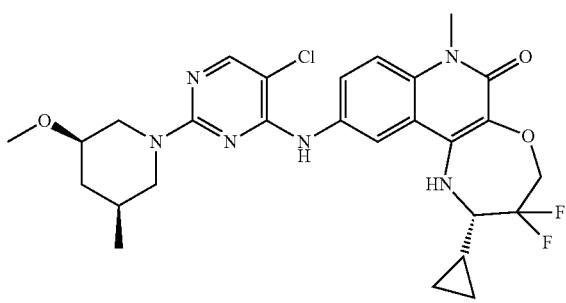 [SMILES: CO[C@@H]1C[C@H](C)CN(c2ncc(Cl)c(Nc3ccc4c(c3)c3c(c(=O)n4C)OCC(F)(F)[C@H](C4CC4)N3)n2)C1]

Example 12x06: (2S)-10-((5-chloro-2-(2,6-dimethyl-thiomorpholino)pyrimidin-4-yl)amino)-2-cyclo-propyl-3,3-difluoro-7-methyl-1,2,3,4-tetrahydro-[1,4]oxazepino[2,3-c]quinolin-6(7H)-one Prepared as mixture of diastereoisomers on thiomorpholine ring using a method analogous to 11a.

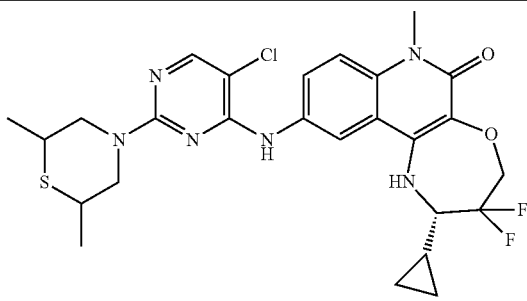

Example 12x07: (2S)-10-((5-chloro-2-(3,4-dimethylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one LCMS (method X4) 1:1 ratio of peaks with rt 3.54 min, m/z 563.1790 and rt 3.62 min, m/z 563.1786. Calculated m/z 563.1807 for $C_{26}H_{30}ClF_2N_6O_2S$ [M + H]$^+$ Prepared as mixture of diastereoisomers on piperidine ring using a method analogous to 11a.
LCMS (method X4) 2:1 ratio of rt 3.34 min, m/z 545.2227 and rt 3.42 min, m/z 545.2229. Calculated m/z 545.2243 for $C_{27}H_{32}ClF_2N_6O_2$ [M + H]$^+$

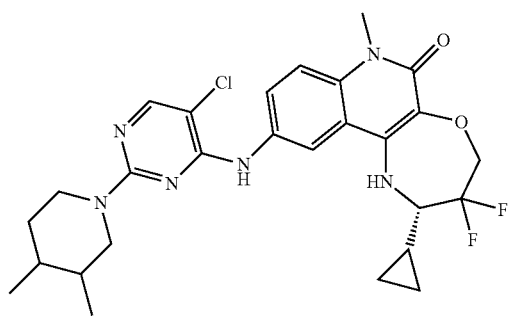 [SMILES: CC1CCN(c2ncc(Cl)c(Nc3ccc4c(c3)c3c(c(=O)n4C)OCC(F)(F)[C@H](C4CC4)N3)n2)CC1C]

Example 12x08: (2S)-10-((5-chloro-2-(2,3-dimethylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one Prepared as mixture of diastereoisomers on piperidine ring using a method analogous to 11a, heated additionally to 160° C. for 2 h in the microwave. LCMS (method X4) rt 3.27 min, 93% purity; m/z calculated 545.2243 for $C_{27}H_{32}ClF_2N_6O_2$ [M + H]$^+$, found 545.2237

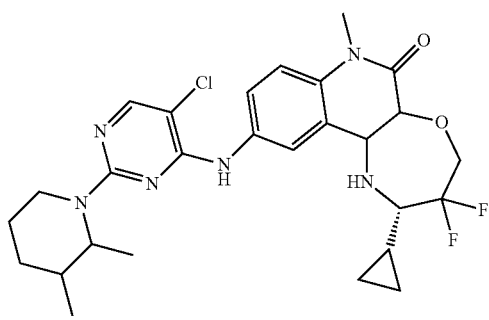 [SMILES: CC1CCCN(c2ncc(Cl)c(Nc3ccc4c(c3)C3N[C@@H](C5CC5)C(F)(F)COC3C(=O)N4C)n2)C1C]

Example 12x09: (2S)-10-((5-chloro-2-(2,6-dimethyl-1-oxidothiomorpholino)pyrimidin-4-yl)amino)-2-cyclopropyl-3,3-difluoro-7-methyl-1,2,3,4-tetrahydro-[1,4]oxazepino[2,3-c]quinolin-6(7H)-one Prepared as mixture of diastereoisomers on thiomorpholine ring using a method analogous to 11a, heated additionally to 160° C. for 5 h in the microwave. LCMS (method T4) rt 2.85 min; m/z calculated 579.1751 for $C_{26}H_{30}ClF_2N_6O_3S^+$ [M + H]$^+$, found 579.1752

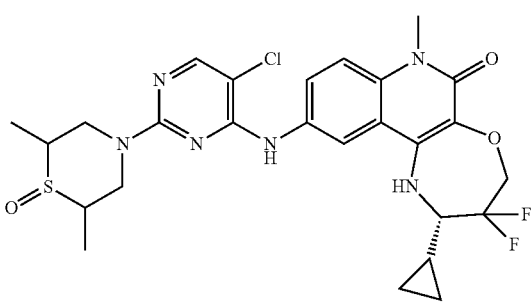 [SMILES: CC1CN(c2ncc(Cl)c(Nc3ccc4c(c3)c3c(c(=O)n4C)OCC(F)(F)[C@H](C4CC4)N3)n2)CC(C)S1=O]

Example 12x10: (2S)-10-((5-chloro-2-(2-(hydroxymethyl)-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one Prepared as a mixture of (2R,5S) and (2S,5R) piperidine diastereoisomers using a method analogous to 11a,

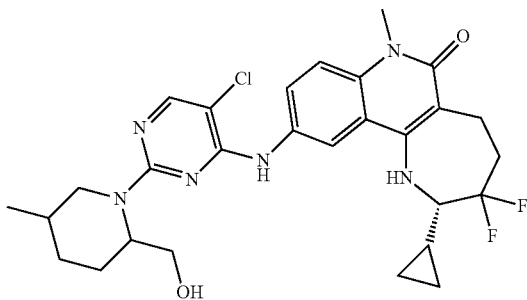 [SMILES: CC1CCC(CO)N(c2ncc(Cl)c(Nc3ccc4c(c3)c3c(c(=O)n4C)CCC(F)(F)[C@H](C4CC4)N3)n2)C1]

Example 12x11: (2S)-10-((5-chloro-2-(2,6-dimethyl-1,1-dioxidothiomorpholino)pyrimidin-4-yl)amino)-2-cyclopropyl-3,3-difluoro-7-methyl-1,2,3,4-tetrahydro-[1,4]oxazepino[2,3-c]quinolin-6(7H)-one additionally heated in a 1:1 mixture of acetonitrile and NMP at 160° C. for 16 h in the microwave.
LCMS (method X4) rt 2.86 min; m/z calculated 561.2192 for $C_{27}H_{32}ClF_2N_6O_3$ [M +H]$^+$, found 561.2199

Prepared as a mixture of diastereoisomers on thiomorpholine ring, using a method analogous to 11a, with

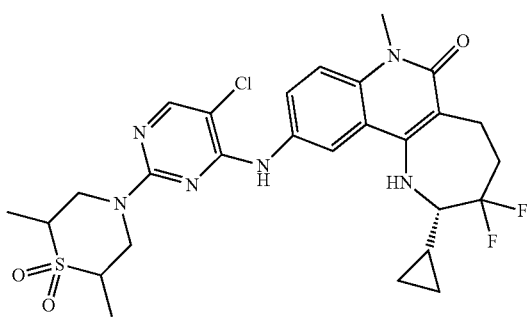 [SMILES: CC1CN(c2ncc(Cl)c(Nc3ccc4c(c3)c3c(c(=O)n4C)CCC(F)(F)[C@H](C4CC4)N3)n2)CC(C)S1(=O)=O]

additional heating in a 1:1 mixture of acetonitrile and NMP at 160° C. for 4 h in the microwave. Major diastereoisomer (~80%) is cis.
LCMS (Method T4) Rt 2.93 min; m/z calculated 595.1700 for $C_{26}H_{30}ClF_2N_6O_4S^+$ [M + H]$^+$, found 595.1700

Example 12x12: (2S)-10-((5-chloro-2-(2,5-dimethylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one Prepared as a 1:1 mixture of (2R,5R) and (2S,5S) piperidine diastereoisomers using a

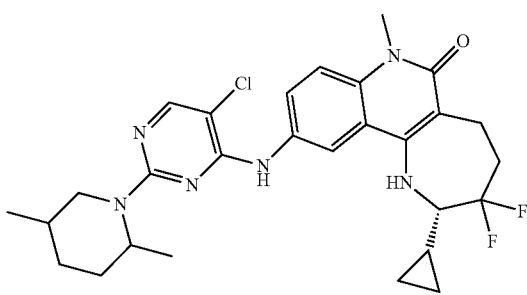 [SMILES: CC1CCC(C)N(c2ncc(Cl)c(Nc3ccc4c(c3)c3c(c(=O)n4C)CCC(F)(F)[C@H](C4CC4)N3)n2)C1]

method analogous to 9a, heated in a 1:1 mixture of acetonitrile and NMP at 160° C. for 8 h in the microwave.
LCMS (method X4) rt 3.20 min; m/z calculated 545.2243 for $C_{27}H_{32}ClF_2N_6O_2$ [M + H]$^+$, found 545.2235

Example 12x13: (S)-10-((5-chloro-2-((3S,5S)-3-hydroxy-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one Prepared as formic acid salt using a method analogous to 11a, heated to 140° C. for 22 h.
LCMS (Method X4) RT = 2.66 min; m/z calc 547.2036 for $C_{26}H_{30}ClF_2N_6O_3$ [M + H]$^+$; found 547.2020

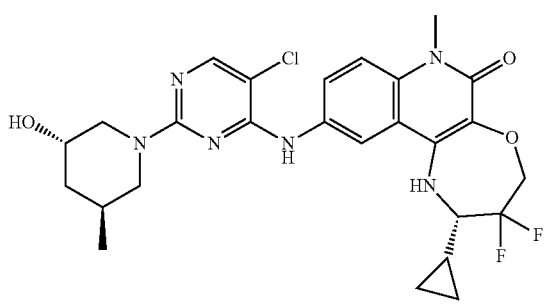 [SMILES: C[C@H]1C[C@H](O)CN(c2ncc(Cl)c(Nc3ccc4c(c3)c3c(c(=O)n4C)OCC(F)(F)[C@H](C4CC4)N3)n2)C1]

Example 12x14: (2S)-10-((5-chloro-2-(6-hydroxy-1,4-diazepan-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one Prepared as 1:1 mixture of R and S hydroxy epimers using a method analogous to 11a.
LCMS (method T4) rt 2.45 min,

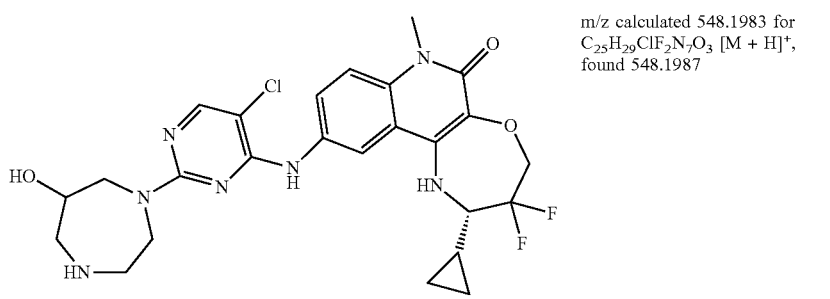

| | |
|---|---|
| | m/z calculated 548.1983 for $C_{25}H_{29}ClF_2N_7O_3$ [M + H]$^+$, found 548.1987 |
| Example 12x15: (2S)-10-((5-chloro-2-(6-hydroxy-4-methyl-1,4-diazepan-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one | Trideuteromethyl version was prepared-see below |
| Example 12x15-d3: (2S)-10-((5-chloro-2-(6-hydroxy-4-(methyl-d3)-1,4-diazepan-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one | Prepared as a 1:1 mixture of R and S hydroxy epimers using a method analogous to 11a. LCMS (method T4) Rt 2.22 |

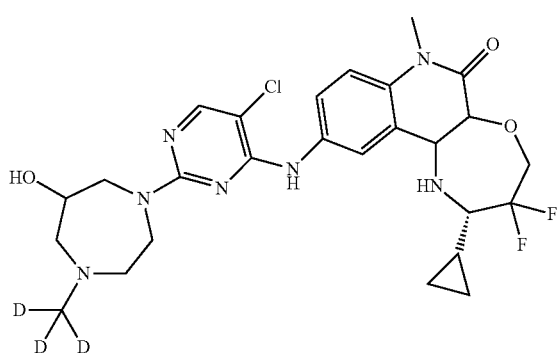 [SMILES: [2H]C([2H])([2H])N1CCN(c2ncc(Cl)c(Nc3ccc4c(c3)C3N[C@@H](C5CC5)C(F)(F)COC3C(=O)N4C)n2)CC(O)C1]

| | |
|---|---|
| | min; m/z calculated 565.2328 for $C_{26}H_{28}D_3ClF_2N_7O_3$ [M + H]$^+$ found 565.2330 |
| Example 12x16: (2S)-10-((2-(3-(2-(azetidin-1-yl)-2-oxoethyl)-5-methylpiperidin-1-yl)-5-chloropyrimidin-4-yl)amino)-2-cyclopropyl-3,3-difluoro-7-methyl-1,2,3,4-tetrahydro-[1,4]oxazepino[2,3-c]quinolin-6(7H)-one | Prepared using a method analogous to 9a. Obtained two peaks following HPLC purification containing different piperidine diastereoisomers. Example 12x16a: LCMS (method X4) rt 2.96min; m/z calculated 628.2614 for $C_{31}H_{37}ClF_2N_7O_3$ [M + H]$^+$, found 628.2601. Example 12x16b: LCMS (method X4) rt 3.06 and 3.09, approx. 1:1 ratio, m/z found 628.2614. |

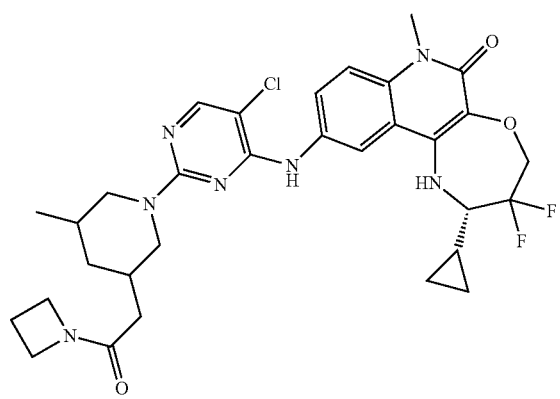 [SMILES: CC1CC(CC(=O)N2CCC2)CN(c2ncc(Cl)c(Nc3ccc4c(c3)c3c(c(=O)n4C)OCC(F)(F)[C@H](C4CC4)N3)n2)C1]

| | |
|---|---|
| Example 12x17: (2S)-10-((5-chloro-2-(3-(2-(3,3-difluoroazetidin-1-yl)-2-oxoethyl)-5-methylpiperidin-1-yl)-pyrimidin-4-yl)amino)-2-cyclopropyl-3,3-difluoro-7-methyl-1,2,3,4-tetrahydro-[1,4]oxazepino[2,3-c]quinolin-6(7H)-one | Prepared using a method analogous to 9. Obtained two peaks following HPLC purification containing different |

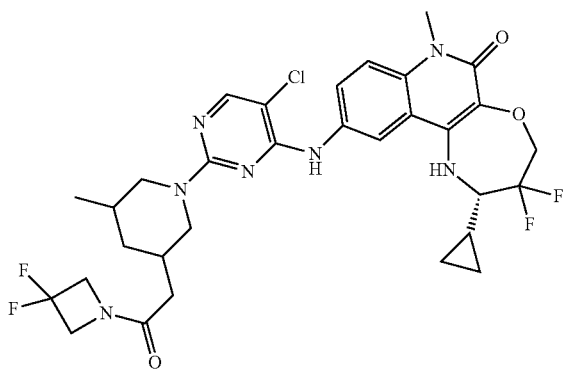 [SMILES: CC1CC(CC(=O)N2CC(F)(F)C2)CN(c2ncc(Cl)c(Nc3ccc4c(c3)c3c(c(=O)n4C)OCC(F)(F)[C@H](C4CC4)N3)n2)C1]

piperidine diastereoisomers
Example 12x17a: LCMS (method X4) rt 3.07min; m/z calculated 664.2426 for $C_{31}H_{35}ClF_4N_7O_3$ [M + H]$^+$, found 664.2413. Example 12x17b: LCMS (method X4) rt 3.18 and 3.20, approx. 1:1 ratio, m/z found 664.2410.

Example 12x18: (2S)-10-((2-(3-(azetidine-1-carbonyl)-4,4-difluoropiperidin-1-yl)-5-chloropyrimidin-4-yl)amino)-2-cyclopropyl-3,3-difluoro-7-methyl-1,2,3,4-tetrahydro-[1,4]oxazepino[2,3-c]quinolin-6(7H)-one Prepared as a mixture of epimers at the piperidine 3-position using a method analogous to 9a, with additional heating in the microwave at 160° C. for 8 h
LCMS (method X4) rt 2.99 min; m/z calculated 636.2113 for $C_{29}H_{31}ClF_4N_7O_3$ [M + H]$^+$, found 636.2112

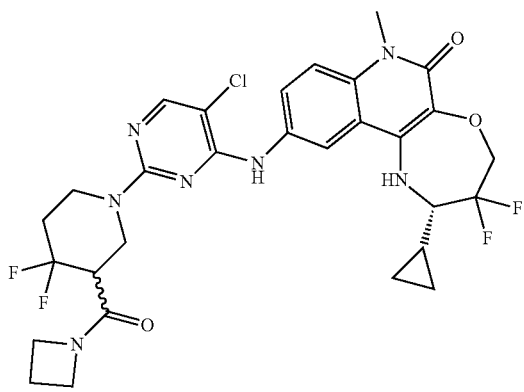 [SMILES: Cn1c(=O)c2c(c3cc(Nc4nc(N5CCC(F)(F)C(C(=O)N6CCC6)C5)ncc4Cl)ccc31)N[C@@H](C1CC1)C(F)(F)CO2]

Example 12x19: (2S)-10-((5-chloro-2-(3-(3,3-difluoroazetidine-1-carbonyl)-4,4-difluoropiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one Prepared as a mixture of epimers at the piperidine 3-position using a method analogous to 9a, heating in the microwave at 140° C. for 12 h
LCMS (method T4) rt 2.76 min; m/z calculated 672.1919 for $C_{29}H_{29}ClF_6N_7O_3{}^+$ [M + H]$^+$, found 672.1930

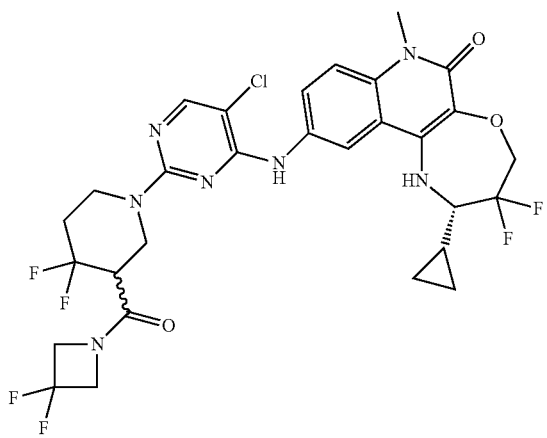 [SMILES: Cn1c(=O)c2c(c3cc(Nc4nc(N5CCC(F)(F)C(C(=O)N6CC(F)(F)C6)C5)ncc4Cl)ccc31)N[C@@H](C1CC1)C(F)(F)CO2]

Example 12x20: (2S)-10-((5-chloro-2-(3-(2-(3,3-difluoroazetidin-1-yl)-2-oxoethyl)-4,4-difluoropiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one Prepared as a mixture of epimers at the piperidine 3-position using a method analogous to 9a, heating in the

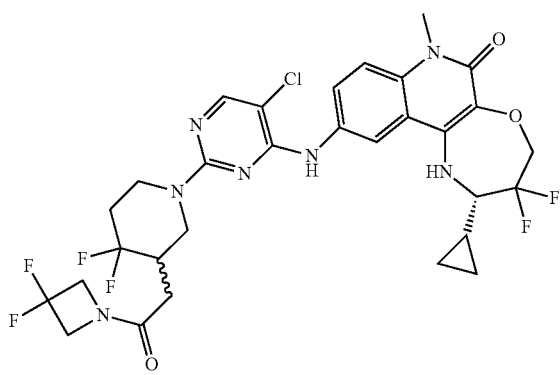 [SMILES: Cn1c(=O)c2c(c3cc(Nc4nc(N5CCC(F)(F)C(CC(=O)N6CC(F)(F)C6)C5)ncc4Cl)ccc31)N[C@@H](C1CC1)C(F)(F)CO2]

microwave at 140° C. for 4 h
LCMS (method X4) rt 3.42 min; m/z calculated 686.2081 for $C_{30}H_{31}ClF_6N_7O_3$, found 686.2072

Example 12x21: (2S)-10-((2-(3-(2-(azetidin-1-yl)-2-oxoethyl)-4,4-difluoropiperidin-1-yl)-5-chloropyrimidin-4-yl)amino)-2-cyclopropyl-3,3-difluoro-7-methyl-1,2,3,4-tetrahydro-[1,4]oxazepino[2,3-c]quinolin-6(7H)-one Prepared as a mixture of epimers at the piperidine 3-position using a method analogous to 9a, heating in the

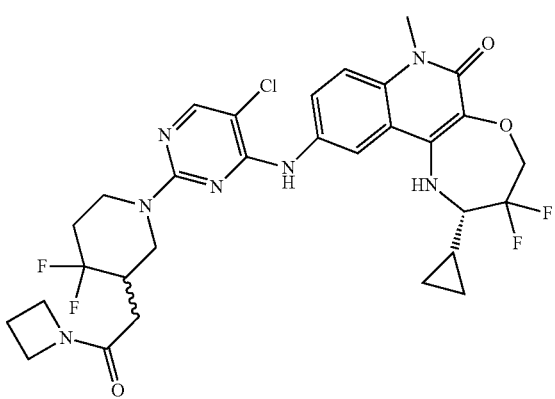 [SMILES: Cn1c(=O)c2c(c3cc(Nc4nc(N5CCC(F)(F)C(CC(=O)N6CCC6)C5)ncc4Cl)ccc31)N[C@@H](C1CC1)C(F)(F)CO2]

microwave at 140° C. for 4 h
LCMS (method X4) rt 3.39 min; m/z calculated 650.2269 for $C_{30}H_{33}ClF_4N_7O_3$, found 650.2280

Example 12x22: (2S)-10-((5-chloro-2-(3-ethynylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one Prepared as a 1:1 mixture of (3R) and (3S)-ethynyl epimers using a method analogous to 11a.

LCMS (method T4) rt 2.93min; m/z calculated 541.1925 for $C_{27}H_{28}ClF_2N_6O_2$, found 541.1919

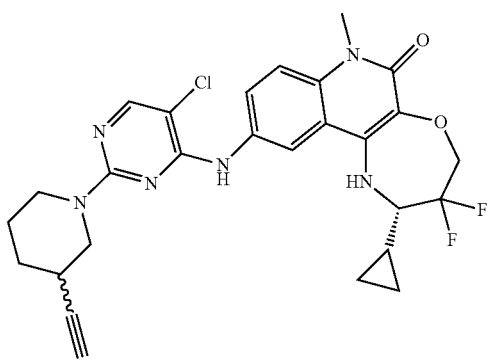 [SMILES: C#CC1CCCN(c2ncc(Cl)c(Nc3ccc4c(c3)c3c(c(=O)n4C)OCC(F)(F)[C@H](C4CC4)N3)n2)C1]

Example 12x23: 1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)-piperidine-3-carbonitrile Prepared using a method analogous to 9a.
LCMS (method T4) rt 2.67min; m/z calculated 542.1877 for

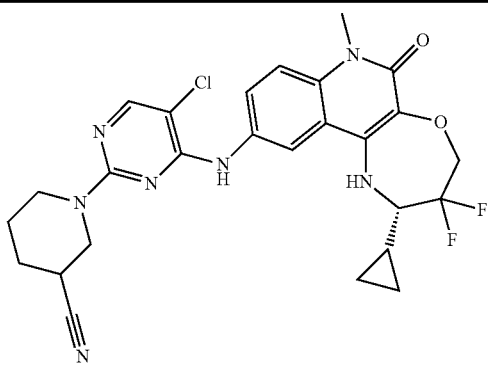

$C_{26}H_{26}ClF_2N_7O_2$ [M + H]$^+$, found 542.1875

Example 12x24: (S)-10-((5-chloro-2-((4,4-difluorocyclohexyl)amino)pyrimidin-4-yl)amino)-2-cyclopropyl-3,3-difluoro-7-methyl-1,2,3,4-tetrahydro-[1,4]oxazepino[2,3-c]quinolin-6(7H)-one Prepared using a method analogous to 11a, heated additionally to 160° C. for 4 h in the microwave, then for a

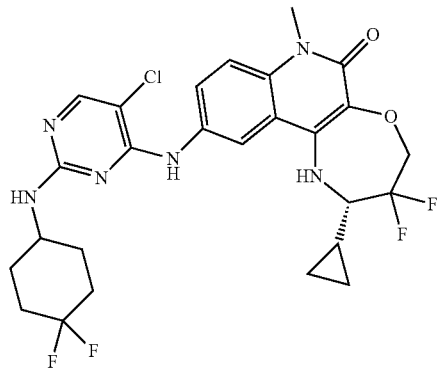 [SMILES: Cn1c(=O)c2c(c3cc(Nc4nc(NC5CCC(F)(F)CC5)ncc4Cl)ccc31)N[C@@H](C1CC1)C(F)(F)CO2]

further 4 h at 140° C. in presence of >10 eq amine.
LCMS (method X4) rt 2.72 min; m/z calculated 567.1898 for $C_{26}H_{28}ClF_4N_6O_2$ [M + H]$^+$, found 567.1898

Example 12x25: (2S)-10-((2-(2-azabicyclo[4.1.0]heptan-2-yl)-5-chloropyrimidin-4-yl)amino)-2-cyclopropyl-3,3-difluoro-7-methyl-1,2,3,4-tetrahydro-[1,4]oxazepino[2,3-c]quinolin-6(7H)-one Prepared as a mixture of diastereoisomers on fused piperidine ring, using a method analogous to 11a.

LCMS (method T4) rt 2.64 min; m/z calculated 529.1925 for $C_{26}H_{28}ClF_2N_6O_2$ [M + H]$^+$, found 529.1926

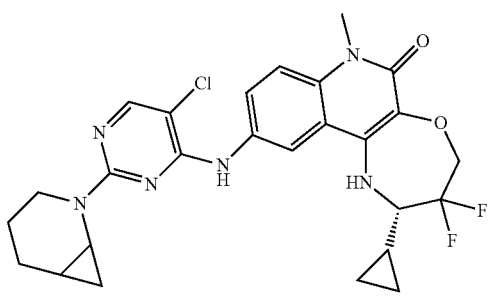 [SMILES: Cn1c(=O)c2c(c3cc(Nc4nc(N5CCCC6CC65)ncc4Cl)ccc31)N[C@@H](C1CC1)C(F)(F)CO2]

Example 12x26: (2S)-10-((5-chloro-2-(3-(difluoromethyl)piperazin-1-yl)pyrimidin-4-yl)amino)-2-cyclopropyl-3,3-difluoro-7-methyl-1,2,3,4-tetrahydro[1,4]oxazepino[2,3-c]quinolin-6(7H)-one Prepared as a mixture of (3R) and (3S)-difluoromethyl epimers using a method analogous to 11a, additionally heated in a 1:1 mixture of acetonitrile and NMP at 120° C. for 1 h then 160° C. for 4 h in the microwave.
LCMS (method T4) rt 2.49 min; m/z calculated 568.1845 for $C_{25}H_{27}ClF_4N_7O_2$ [M + H]$^+$, found 568.1849

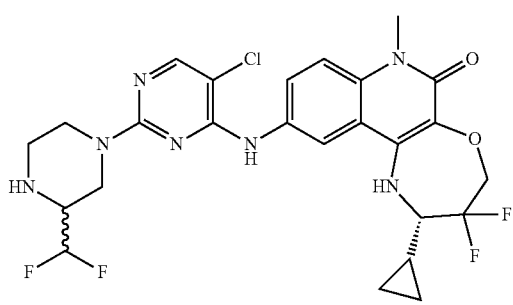 [SMILES: Cn1c(=O)c2c(c3cc(Nc4nc(N5CCNC(C(F)F)C5)ncc4Cl)ccc31)N[C@@H](C1CC1)C(F)(F)CO2]

Example 12x27: (2S)-10-((5-chloro-2-(3-methyl-5-oxopiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one

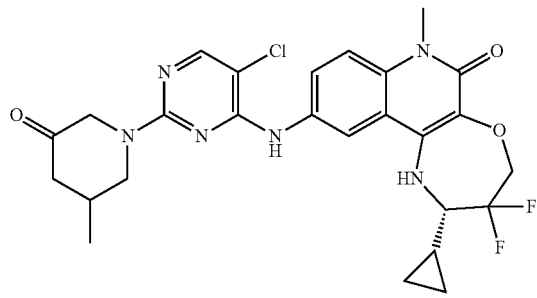 [SMILES: CC1CC(=O)CN(c2ncc(Cl)c(Nc3ccc4c(c3)c3c(c(=O)n4C)OCC(F)(F)[C@H](C4CC4)N3)n2)C1]

Example 12x28: (S)-10-((5-chloro-2-((3R,5S)-3-(2-(dimethylamino)ethoxy)-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one Prepared as a mixture of piperidine diastereoisomers using a method analogous to 9a, LCMS (method X4) rt 2.29 min; m/z expected 618.2771 for $C_{30}H_{39}ClF_2N_7O_3$ [M + H]+, found 618.2766

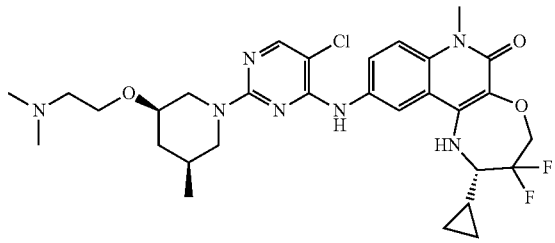 [SMILES: C[C@H]1C[C@@H](OCCN(C)C)CN(c2ncc(Cl)c(Nc3ccc4c(c3)c3c(c(=O)n4C)OCC(F)(F)[C@H](C4CC4)N3)n2)C1]

Example 12x29: (S)-10-((5-chloro-2-((3R,5S)-3-(3-(dimethylamino)propoxy)-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one

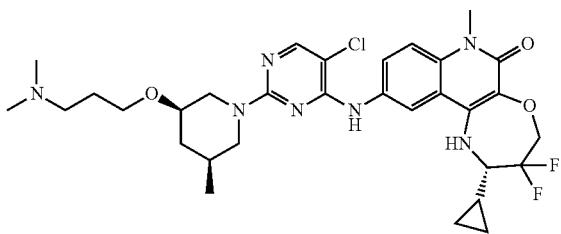 [SMILES: C[C@H]1C[C@@H](OCCCN(C)C)CN(c2ncc(Cl)c(Nc3ccc4c(c3)c3c(c(=O)n4C)OCC(F)(F)[C@H](C4CC4)N3)n2)C1]

Example 12x30: (2S)-10-((2-(3-(azetidine-1-carbonyl)-5-methylpiperidin-1-yl)-5-chloropyrimidin-4-yl)amino)-2-cyclopropyl-3,3-difluoro-7-methyl-1,2,3,4-tetrahydro-[1,4]oxazepino[2,3-c]quinolin-6(7H)-one Prepared as a mixture of (3S,5R) and (3R,5S)-piperidine diastereoisomers using a method analogous to 9a LCMS (method X4) rt 2.91 min; m/z calculated 614.2458 for $C_{30}H_{35}ClF_2N_7O_3$ [M + H]+, found 614.2452

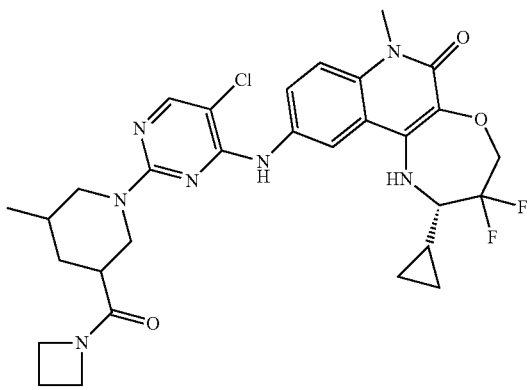 [SMILES: CC1CC(C(=O)N2CCC2)CN(c2ncc(Cl)c(Nc3ccc4c(c3)c3c(c(=O)n4C)OCC(F)(F)[C@H](C4CC4)N3)n2)C1]

Example 12x31: (2S)-10-((5-chloro-2-(3-(3,3-difluoroazetidine-1-carbonyl)-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one Prepared as a mixture of (3S,5R) and (3R,5S)-piperidine diastereoisomers using a method analogous to 9a, heating in the microwave at 160° C. for 1 h
LCMS (method X4) rt 3.05 min; m/z expected 650.2269 for $C_{30}H_{33}ClF_4N_7O_3$ [M + H]$^+$, found 650.2259

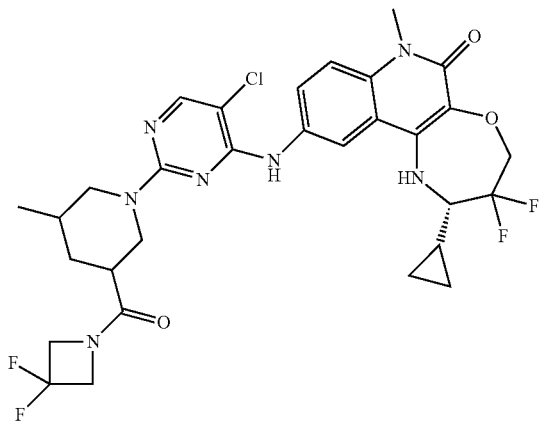 [SMILES: CC1CC(C(=O)N2CC(F)(F)C2)CN(c2ncc(Cl)c(Nc3ccc4c(c3)c3c(c(=O)n4C)OCC(F)(F)[C@H](C4CC4)N3)n2)C1]

Example 12x32: (S)-10-((5-chloro-2-(3-(hydroxymethyl)azetidin-1-yl)pyrimidin-4-yl)amino)-2-cyclopropyl-3,3-difluoro-7-methyl-1,2,3,4-tetrahydro[1,4]oxazepino[2,3-c]quinolin-6(7H)-one Prepared using a method analogous to 11a, heated to 80° C.for 90 mins.
LCMS (method X4) rt 2.31 min;

m/z calculated 519.1723 for $C_{24}H_{26}ClF_2N_6O_3$ [M + H]$^+$, found 519.1715

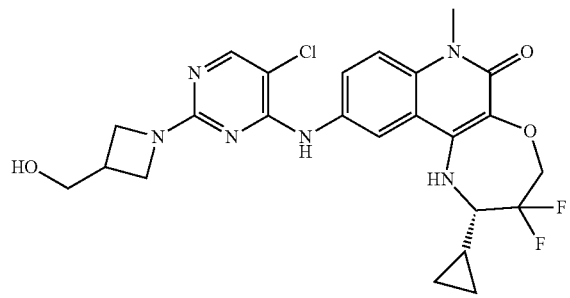 [SMILES: Cn1c(=O)c2c(c3cc(Nc4nc(N5CC(CO)C5)ncc4Cl)ccc31)N[C@@H](C1CC1)C(F)(F)CO2]

Example 12x33: (2S)-10-((5-chloro-2-(2-(hydroxymethyl)azetidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one Example 12x33a: (S)-10-((5-chloro-2-((S)-2-(hydroxymethyl)azetidin-1-yl)pyrimidin-4-yl)amino)-2-cyclopropyl-3,3-difluoro-7-methyl-1,2,3,4-tetrahydro[1,4]oxazepino[2,3-c]quinolin-6(7H)-one Prepared as single diastereoisomers, examples 12x33a and 12x33b, see below.

Prepared using a method analogous to 11a, heated to 80° C. for 90 mins.
LCMS (method X4) rt 2.50 min; m/z calculated 519.1723 for $C_{24}H_{26}ClF_2N_6O_3$ [M + H]$^+$, found 519.1723

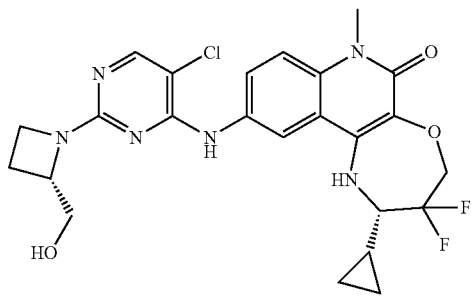 [SMILES: Cn1c(=O)c2c(c3cc(Nc4nc(N5CC[C@H]5CO)ncc4Cl)ccc31)N[C@@H](C1CC1)C(F)(F)CO2]

Example 12x33b: (S)-10-((5-chloro-2-((R)-2-(hydroxymethyl)azetidin-1-yl)pyrimidin-4-yl)amino)-2-cyclopropyl-3,3-difluoro-7-methyl-1,2,3,4-tetrahydro[1,4]oxazepino[2,3-c]quinolin-6(7H)-one Prepared using a method analogous to 11a, heated to 80° C. for 90 mins.
LCMS (method T4) rt 2.17 min;

-continued

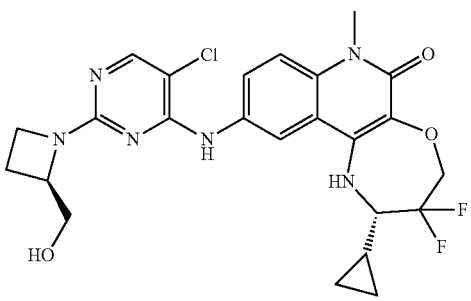 [SMILES: Cn1c(=O)c2c(c3cc(Nc4nc(N5CC[C@@H]5CO)ncc4Cl)ccc31)N[C@@H](C1CC1)C(F)(F)CO2]

Example 12x34: (2S)-10-((5-chloro-2-(2-(fluoromethyl)azetidin-1-yl)pyrimidin-4-yl)amino)-2-cyclopropyl-3,3-difluoro-7-methyl-1,2,3,4-tetrahydro[1,4]oxazepino[2,3-c]quinolin-6(7H)-one m/z calculated 519.1723 for $C_{24}H_{26}ClF_2N_6O_3$ [M + H]$^+$, found 519.1727

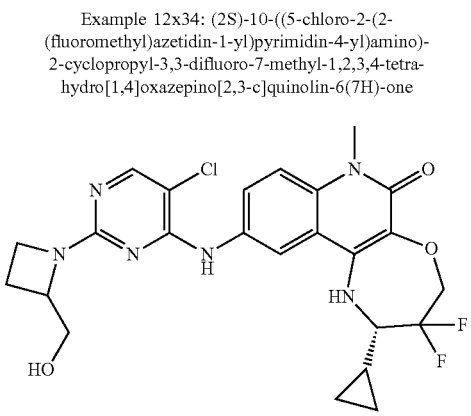

Example 12x35: (S)-10-((5-chloro-2-(3-(fluoromethyl)azetidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one Prepared using a method analogous to 11a, heated to 80° C. for 90 mins.
LCMS (method T4) rt 2.68 min;

m/z calculated 521.1680 for $C_{24}H_{25}ClF_3N_6O_2$ [M + H]$^+$, found 521.1668

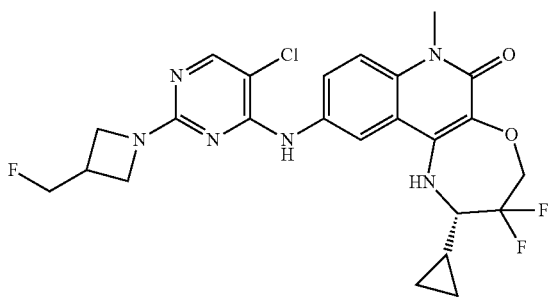 [SMILES: Cn1c(=O)c2c(c3cc(Nc4nc(N5CC(CF)C5)ncc4Cl)ccc31)N[C@@H](C1CC1)C(F)(F)CO2]

Example 12x36: (2S)-10-((5-chloro-2-(2-methylazetidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one Prepared as mixture of diastereoisomers using a method analogous to 11a, heated to 80° C. for 90 mins.
LCMS (method T4) rt 2.63 min:
m/z calculated 503.1774 for $C_{24}H_{26}ClF_2N_6O_2$ [M + H]$^+$, found 503.1772

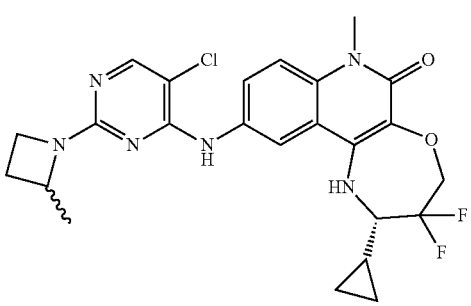 [SMILES: CC1CCN1c1ncc(Cl)c(Nc2ccc3c(c2)c2c(c(=O)n3C)OCC(F)(F)[C@H](C3CC3)N2)n1]

Example 12x37: (2S)-10-((5-chloro-2-(4,4-difluoro-3-methoxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one

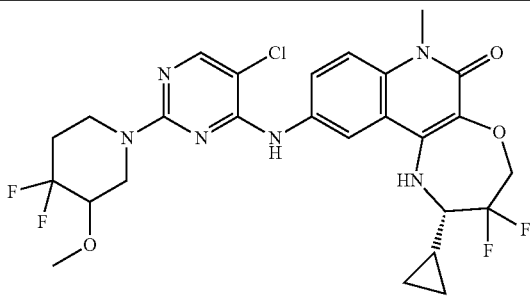

Example 12x38: (S)-1-(5-chloro-4-((2-cyclopropyl-3,3-difluoro-7-methyl-6-oxo-1,2,3,4,6,7-hexahydro-[1,4]oxazepino[2,3-c]-quinolin-10-yl)amino)pyrimidin-2-yl)piperidine-4-carbonitrile Prepared using a method analogous to 11a
LCMS (method T4) rt 2.79 min;

m/z calculated 542.1877 for $C_{26}H_{27}ClF_2N_7O_2^+$ [M + H]$^+$, found 542.1875

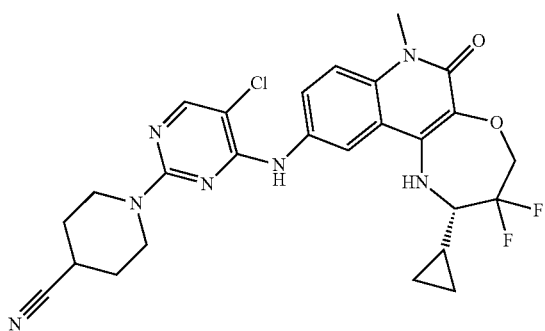 [SMILES: Cn1c(=O)c2c(c3cc(Nc4nc(N5CCC(C#N)CC5)ncc4Cl)ccc31)N[C@@H](C1CC1)C(F)(F)CO2]

Example 12x39: 1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)-5-fluoro-N,N-dimethylpiperidine-3-carboxamide Prepared as a mixture of piperidine diastereoisomers using a method analogous to 9a, heating in the microwave at 160° C. for 1 h
LCMS (method X4) rt 2.94 min; m/z calculated 606.2207 for $C_{28}H_{32}ClF_3N_7O_3$ [M + H]$^+$, found 606.2200

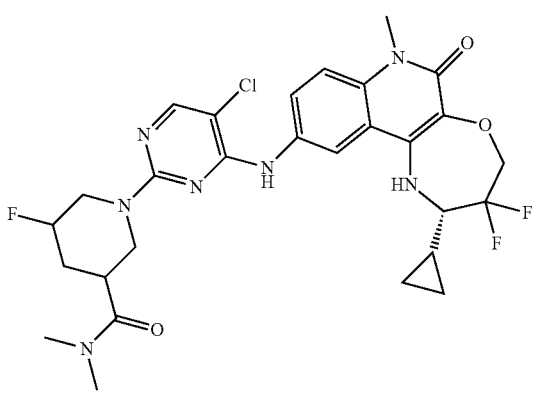 [SMILES: CN(C)C(=O)C1CC(F)CN(c2ncc(Cl)c(Nc3ccc4c(c3)c3c(c(=O)n4C)OCC(F)(F)[C@H](C4CC4)N3)n2)C1]

Example 12x40: (2S)-10-((5-chloro-2-(3-fluoropiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one Prepared as a mixture of (3S)- and (3R)-fluoropiperidine epimers using a method analogous to 9a, heating in the microwave at 140° C. for 4 h
LCMS (method X4) rt 3.06 and 3.11 min; m/z calculated 535.1836 for $C_{25}H_{27}ClF_3N_6O_2$ [M + H]$^+$, found 535.1836 and 535.1837

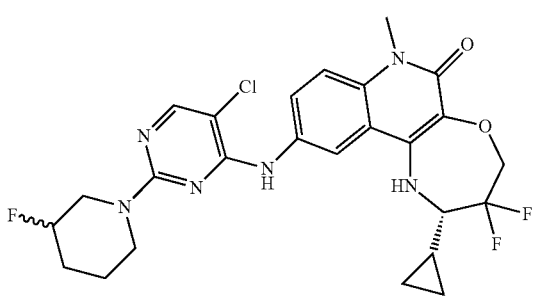

Example 12x41: (2S)-10-((5-chloro-2-(4,4-difluoro-3-hydroxy-5-methylpiperidin-1-yl)pyrimidin-4-yl)amino)-2-cyclopropyl- 3,3-difluoro-7-methyl-1,2,3,4-tetrahydro-[1,4]oxazepino[2,3-c]quinolin-6(7H)-one

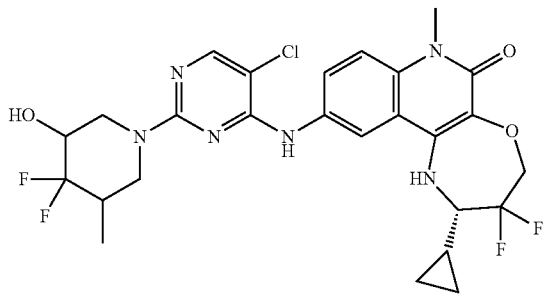 [SMILES: CC1CN(c2ncc(Cl)c(Nc3ccc4c(c3)c3c(c(=O)n4C)OCC(F)(F)[C@H](C4CC4)N3)n2)CC(O)C1(F)F]

Example 12x42: (S)-10-((5-chloro-2-(4-fluoropiperidin-1-yl)-pyrimidin-4-yl)amino)-2-cyclopropyl-3,3-difluoro-7-methyl-1,2,3,4-tetrahydro-[1,4]oxazepino[2,3-c]quinolin-6(7H)-one Prepared using a method analogous to 11a.
LCMS (method X4) rt 3.12 min;

m/z calculated 535.1836 for $C_{25}H_{27}ClF_3N_6O_2$ [M + H]$^+$, found 535.1836

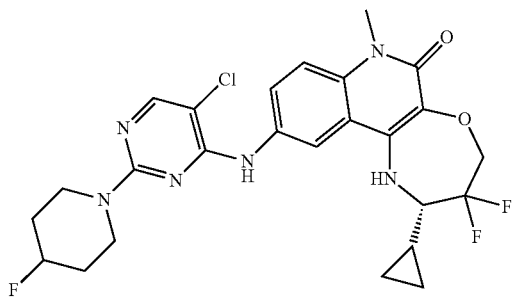 [SMILES: Cn1c(=O)c2c(c3cc(Nc4nc(N5CCC(F)CC5)ncc4Cl)ccc31)N[C@@H](C1CC1)C(F)(F)CO2]

Example 12x44: (S)-10-((5-chloro-2-((S)-2-(hydroxymethyl)pyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one Prepared using a method analogous to 11a.
LCMS (method X4) rt 2.46 min;
m/z calculated 533.1879 for $C_{25}H_{28}ClF_2N_6O_3$ [M + H]$^+$, found 533.1873

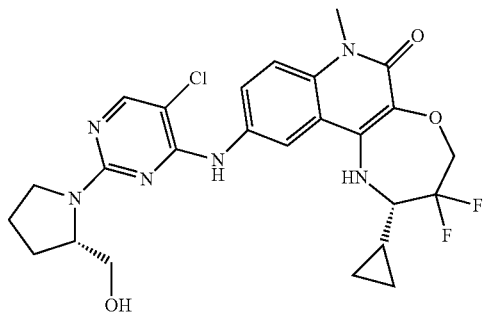 [SMILES: Cn1c(=O)c2c(c3cc(Nc4nc(N5CCC[C@H]5CO)ncc4Cl)ccc31)N[C@@H](C1CC1)C(F)(F)CO2]

Example 12x45: (2S)-10-((5-chloro-2-(2-(methoxymethyl)pyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one.
Example 12x45a: (S)-10-((5-chloro-2-((S)-2-(methoxymethyl)pyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one Prepared as single diastereoisomers example 12x45a and 12x45b, see below Prepared using a method analogous to 11a.
LCMS (method X4) rt 2.75 min;
m/z calculated 547.2036

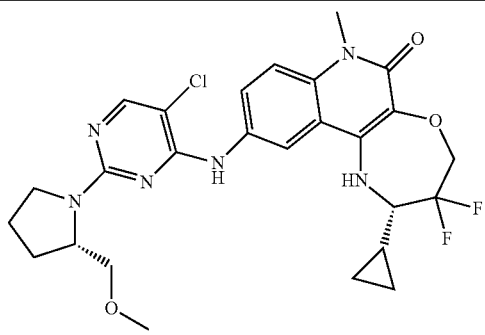

Example 12x45b: (S)-10-((5-chloro-2-((R)-2-(methoxymethyl)pyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one for $C_{26}H_{30}ClF_2N_6O_3$ [M + H]$^+$, found 547.2061

Prepared using a method analogous to 11a.
LCMS (method T4) rt 2.63 min; m/z calculated 547.2036 for $C_{26}H_{30}ClF_2N_6O_3$ [M + H]$^+$, found 547.2022

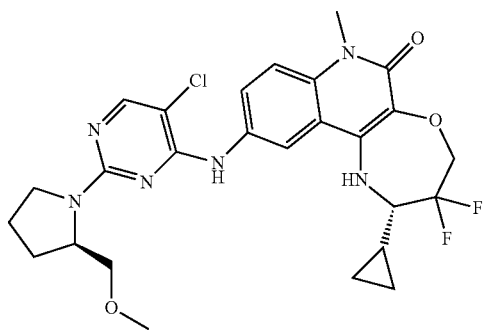 [SMILES: COC[C@H]1CCCN1c1ncc(Cl)c(Nc2ccc3c(c2)c2c(c(=O)n3C)OCC(F)(F)[C@H](C3CC3)N2)n1]

Example 12x46: (2S)-10-((5-chloro-2-(2-(hydroxymethyl)-3-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one Prepared as a mixture of piperidine diastereoisomers using a method analogous to 9a, heating in the microwave at 160° C. for 12 h.
LCMS (method X4) rt 2.83 and 2.87 min, ratio 2:3, m/z calculated 561.2192 for $C_{27}H_{32}ClF_2N_6O_3$ [M + H]$^+$, found 561.2200

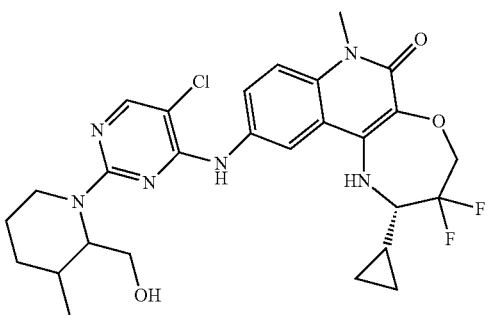 [SMILES: CC1CCCN(c2ncc(Cl)c(Nc3ccc4c(c3)c3c(c(=O)n4C)OCC(F)(F)[C@H](C4CC4)N3)n2)C1CO]

Example 12x47: (S)-10-((5-chloro-2-((S)-4,4-difluoro-2-(hydroxymethyl)pyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one Prepared using a method analogous to 9a. Additionally heated to 160° C. for 8 h in the microwave.

LCMS (method X4) rt 3.07 min, m/z calculated 569.1691 for $C_{25}H_{26}ClF_4N_6O_3$ [M + H]$^+$, found 569.1688

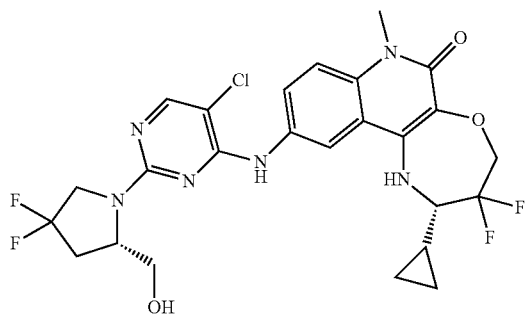 [SMILES: Cn1c(=O)c2c(c3cc(Nc4nc(N5CC(F)(F)C[C@H]5CO)ncc4Cl)ccc31)N[C@@H](C1CC1)C(F)(F)CO2]

Example 12x48: (2S)-10-((5-chloro-2-(4-fluoro-2-(hydroxymethyl)pyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one
Example 12x48a: (S)-10-((5-chloro-2-((2S,4S)-4-fluoro-2-(hydroxymethyl)pyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one Prepared as single diastereoisomers, examples 12x48a and 12x48b, see below.

Prepared using a method analogous to 11a.
LCMS (method X4) rt 2.64 min; m/z calculated 551.1785 for $C_{25}H_{27}ClF_3N_6O_3$ [M + H]+, found 551.1783

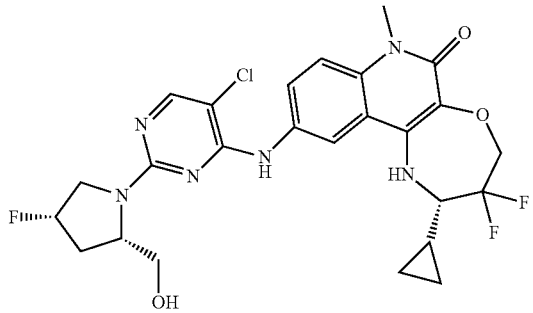 [SMILES: Cn1c(=O)c2c(c3cc(Nc4nc(N5C[C@@H](F)C[C@H]5CO)ncc4Cl)ccc31)N[C@@H](C1CC1)C(F)(F)CO2]

Example 12x48b: (S)-10-((5-chloro-2-((2S,4R)-4-fluoro-2-(hydroxymethyl)pyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one Prepared using a method analogous to 12a, heated in the microwave to 140° C. for 3 h then 160° C. for 90 mins LCMS (method T4) rt 2.44 min; m/z calculated 551.1785 for $C_{25}H_{27}ClF_3N_6O_3$ [M + H]+, found 551.1782

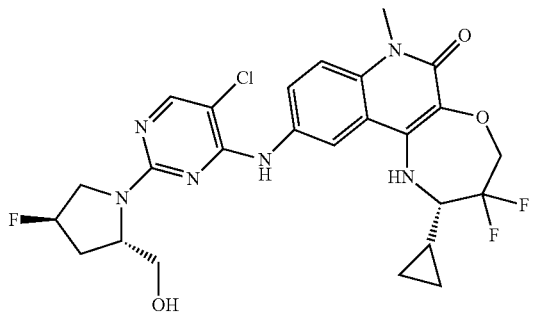 [SMILES: Cn1c(=O)c2c(c3cc(Nc4nc(N5C[C@H](F)C[C@H]5CO)ncc4Cl)ccc31)N[C@@H](C1CC1)C(F)(F)CO2]

Example 12x49: (2S)-10-((5-chloro-2-(2-(hydroxymethyl)-3-methylpyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one Prepared as a mixture of pyrrolidine diastereoisomers using a method analogous to 11a.

LCMS (method X4) rt 2.58 min; m/z calculated 547.2036 for $C_{26}H_{30}ClF_2N_6O_3$ [M + H]+ found 547.2042

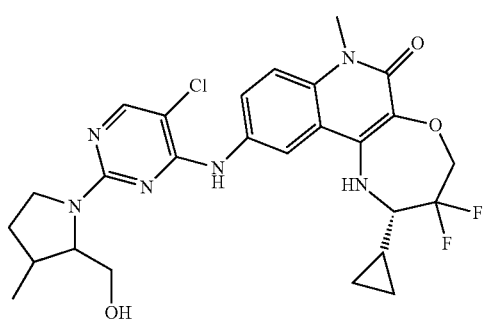 [SMILES: CC1CCN(c2ncc(Cl)c(Nc3ccc4c(c3)c3c(c(=O)n4C)OCC(F)(F)[C@H](C4CC4)N3)n2)C1CO]

Example 12x50: (2S)-10-((5-chloro-2-(4,4-difluoro-2-(hydroxymethyl)piperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one Prepared as a mixture of 2-piperidine epimers using a method analogous to 9a, heating in the microwave at 160°

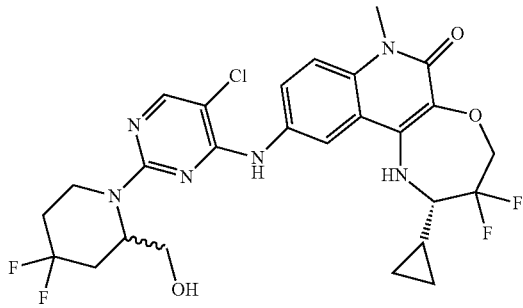 [SMILES: Cn1c(=O)c2c(c3cc(Nc4nc(N5CCC(F)(F)CC5CO)ncc4Cl)ccc31)N[C@@H](C1CC1)C(F)(F)CO2]

C. for 12 h then 180° C. for 12 h
LCMS (method X4) rt 3.07 min;
m/z calculated 583.1848 for
$C_{26}H_{28}ClF_4N_6O_3$ [M + H]+,
found 583.1846

Example 13a: (S)-10-((5-chloro-2-((3R,5S)-3-hydroxy-5-methylpiperidin-1-yl)pyridin-4-yl)amino)-2-cyclopropyl-3,3-difluoro-7-methyl-1,2,3,4-tetrahydro-[1,4]oxazepino[2,3-c]quinolin-6(7H)-one

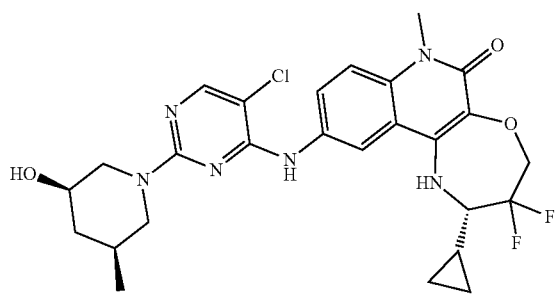 [SMILES: C[C@H]1C[C@@H](O)CN(c2ncc(Cl)c(Nc3ccc4c(c3)c3c(c(=O)n4C)OCC(F)(F)[C@H](C4CC4)N3)n2)C1]

Step 1: (3R,5S)-1-(5-chloro-4-iodopyridin-2-yl)-5-methylpiperidin-3-ol (3R,5S)-5-methylpiperidin-3-ol (Intermediate M2a, 8 mg, 0.097 mmol), 5-chloro-2-fluoro-4-iodopyridine (25 mg, 0.097 mmol), and potassium carbonate (26.8 mg, 0.19 mmol) were combined in MeCN (0.5 mL) and the reaction mixture was heated to 120° C. for 12 h. The reaction mixture was purified by reverse phase chromatography (50-100% MeOH in water, 0.1% formic acid), and fractions containing product were loaded onto an SCX-2 cartridge, washed with methanol, and eluted with 2M NH3 in MeOH to afford the title compound as a white solid (8.3 mg). LCMS (Method X2) RT 1.61 mins m/z 352.9928 [M+H]+

Step 2: (S)-10-((5-chloro-2-((3R,5S)-3-hydroxy-5-methylpiperidin-1-yl)pyridin-4-yl)amino)-2-cyclopropyl-3,3-difluoro-7-methyl-1,2,3,4-tetrahydro-[1,4]oxazepino[2,3-c]quinolin-6(7H)-one (3R,5S)-1-(5-chloro-4-iodopyridin-2-yl)-5-methylpiperidin-3-ol (Step 1, 8.3 mg, 0.023 mmol), (S)-10-amino-2-cyclopropyl-3,3-difluoro-7-methyl-1,2,3,4-tetrahydro-[1,4]oxazepino-[2,3-c]quinolin-6(7H)-one (Intermediate B1, 6 mg, 0.019 mmol), and trifluoroacetic acid (3.6 µL, 0.047 mmol) were combined in TFE (0.5 mL) and the reaction mixture was heated to 170° C. for 4 h. Reaction mixture loaded directly onto a reverse phase column and purified (30-60% MeOH in water, 0.1% formic acid), then further purified by flash column chromatography ((1-10% MeOH in DCM, 10 g KP Sil) to give the title compound (3 mg). $^1$H NMR (600 MHz, Methanol-d$_4$) δ 7.97 (d, J=2.3 Hz, 1H), 7.87 (d, J=1.4 Hz, 1H), 7.63 (d, J=9.0 Hz, 1H), 7.58 (dd, J=9.0, 2.3 Hz, 1H), 6.18 (s, 1H), 4.55-4.39 (m, 2H), 4.06-3.94 (m, 2H), 3.75 (s, 3H), 3.59-3.51 (m, 1H), 3.33-3.26 (m, 1H), 2.39 (dd, J=12.2, 10.4 Hz, 1H), 2.21 (dd, J=12.8, 11.3 Hz, 1H), 2.08-2.02 (m, 1H), 1.69-1.60 (m, 1H), 1.46-1.37 (m, 1H), 1.01 (q, J=11.8 Hz, 1H), 0.93 (d, J=6.6 Hz, 3H), 0.83-0.76 (m, 1H), 0.69-0.57 (m, 2H), 0.38-0.31 (m, 1H). HRMS (method X4) RT=2.38 mins m/z calc for $C_{27}H_{31}ClF_2N_5O_3$ [M+H]+=546.2083, found 546.2070.

Example 13b: ((S)-10-((5-chloro-2-(4,4-difluoropiperidin-1-yl)pyridin-4-yl)amino)-2-cyclopropyl-3,3-difluoro-7-methyl-1,2,3,4-tetrahydro-[1,4]oxazepino[2,3-c]quinolin-6(7H)-one

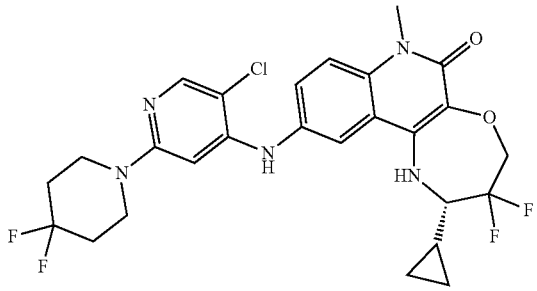 [SMILES: Cn1c(=O)c2c(c3cc(Nc4cc(N5CCC(F)(F)CC5)ncc4Cl)ccc31)N[C@@H](C1CC1)C(F)(F)CO2]

Example 13b was prepared by a two-step procedure analogous to that used to prepare example 12a. EH NMR (600 MHz, Methanol-d4) δ 7.97 (d, J=2.3 Hz, 1H), 7.91 (s, 1H), 7.62 (d, J=9.0 Hz, 1H), 7.57 (dd, J=8.9, 2.3 Hz, 1H), 6.24 (s, 1H), 4.54-4.38 (m, 2H), 3.74 (s, 3H), 3.56-3.46 (i, 4H), 3.33-13.26 (m, 1H), 1.95 (tt, J=13.6, 5.7 Hz, 4H), 1.45-1.36 (m, 1H), 0.83-0.76 (m, 1H), 0.68-0.57 (m, 2H), 0.36-0.29 (in, 1H). HRMS (method X4) RT=2.75 mins m/z calc for $C_{26}H_{27}ClF_4N_5O_2$ [M+H]+=552.1790, found 552.1780.

The following tabulated examples may be prepared by methods analogous to those previously described for examples 2a, 4a, 9a, 10a, 12a and 13a.

| | | | |
|---|---|---|---|
| ![piperidine with F,F,Me,Me] | Example 13p01: (2S)-2-cyclopropyl-10-((2-(4,4-difluoro-3,5-dimethylpiperidin-1-yl)-5-fluoropyrimidin-4-yl)amino)-3,3-difluoro-7-methyl-1,2,3,4-tetrahydro[1,4]oxazepino[2,3-c]quinolin-6(7H)-one | Example 13c01: (2S)-2-cyclopropyl-10-((2-(4,4-difluoro-3,5-dimethylpiperidin-1-yl)-5-chloropyridin-4-yl)amino)-3,3-difluoro-7-methyl-1,2,3,4-tetrahydro[1,4]oxazepino[2,3-c]quinolin-6(7H)-one | Example 13f01: (2S)-2-cyclopropyl-10-((2-(4,4-difluoro-3,5-dimethylpiperidin-1-yl)-5-fluoropyridin-4-yl)amino)-3,3-difluoro-7-methyl-1,2,3,4-tetrahydro[1,4]oxazepino[2,3-c]quinolin-6(7H)-one |
| ![piperidine with F,F,Me] | Example 13p02: (2S)-2-cyclopropyl-10-((2-(4,4-difluoro-3-methylpiperidin-1-yl)-5-fluoropyrimidin-4-yl)amino)-3,3-difluoro-7-methyl-1,2,3,4-tetrahydro-[1,4]oxazepino[2,3-c]-quinolin-6(7H)-one | Example 13c02: (2S)-2-cyclopropyl-10-((2-(4,4-difluoro-3-methylpiperidin-1-yl)-5-chloropyridin-4-yl)amino)-3,3-difluoro-7-methyl-1,2,3,4-tetrahydro-[1,4]oxazepino[2,3-c]-quinolin-6(7H)-one | Example 13f02: (2S)-2-cyclopropyl-10-((2-(4,4-difluoro-3-methylpiperidin-1-yl)-5-fluoropyridin-4-yl)amino)-3,3-difluoro-7-methyl-1,2,3,4-tetrahydro-[1,4]oxazepino[2,3-c]-quinolin-6(7H)-one |
| ![3,4-difluoropiperidine] | [Example 10d, described above] | Example 13c03: (2S)-2-cyclopropyl-10-((2-(3,4-difluoropiperidin-1-yl)-5-chloropyridin-4-yl)amino)-3,3-difluoro-7-methyl-1,2,3,4-tetrahydro[1,4]-oxazepino[2,3-c]quinolin-6(7H)-one | Example 13f03: (2S)-2-cyclopropyl-10-((2-(3,4-difluoropiperidin-1-yl)-5-fluoropyridin-4-yl)amino)-3,3-difluoro-7-methyl-1,2,3,4-tetrahydro[1,4]oxazepino[2,3-c]quinolin-6(7H)-one |
| ![4,4-difluoropiperidine] | [Example 2b, described above] | [Example 13b, described above] | Example 13f04: (S)-2-cyclopropyl-10-((2-(4,4-difluoropiperidin-1-yl)-5-fluoropyridin-4-yl)amino)-3,3-difluoro-7-methyl-1,2,3,4-tetrahydro[1,4]oxazepino[2,3-c]quinolin-6(7H)-one |
| ![hydroxy-methyl piperidine] | [Example 2a, described above] | [Example 13a, described above] | Example 13f05: (S)-2-cyclopropyl-3,3-difluoro-10-((5-fluoro-2-((3R,5S)-3-hydroxy-5-methylpiperidin-1-yl)pyridin-4-yl)amino)-7-methyl-1,2,3,4-tetrahydro-[1,4]oxazepino[2,3-c]quinolin-6(7H)-one |
| ![morpholine] | Example 13p06: (S)-2-cyclopropyl-3,3-difluoro-10-((5-fluoro-2-morpholinopyrimidin-4-yl)amino)-7-methyl-1,2,3,4-tetrahydro-[1,4]oxazepino[2,3-c]quinolin-6(7H)-one | Example 13c06: (S)-2-cyclopropyl-3,3-difluoro-10-((5-chloro-2-morpholinopyridin-4-yl)amino)-7-methyl-1,2,3,4-tetrahydro[1,4]oxazepino[2,3-c]quinolin-6(7H)-one | Example 13f06: (S)-2-cyclopropyl-3,3-difluoro-10-((5-fluoro-2-morpholinopyridin-4-yl)amino)-7-methyl-1,2,3,4-tetrahydro[1,4]oxazepino[2,3-c]quinolin-6(7H)-one |
| ![(R)-2-methylmorpholine] | Example 13p07: (S)-2-cyclopropyl-3,3-difluoro-10-((5-fluoro-2-((R)-2-methylmorpholino)-pyrimidin-4-yl)amino)-7-methyl-1,2,3,4-tetrahydro-[1,4]oxazepino[2,3-c]quinolin-6(7H)-one | Example 13c07: (S)-2-cyclopropyl-3,3-difluoro-10-((5-chloro-2-((R)-2-methylmorpholino)pyridin-4-yl)amino)-7-methyl-1,2,3,4-tetrahydro[1,4]-oxazepino[2,3-c]quinolin-6(7H)-one | Example 13f07: (S)-2-cyclopropyl-3,3-difluoro-10-((5-fluoro-2-((R)-2-methylmorpholino)pyridin-4-yl)amino)-7-methyl-1,2,3,4-tetrahydro[1,4]-oxazepino[2,3-c]quinolin-6(7H)-one |
| ![(S)-2-methylmorpholine] | Example 13p08: (S)-2-cyclopropyl-3,3-difluoro-10-((5-fluoro-2-((S)-2-methylmorpholino)-pyrimidin-4-yl)amino)-7-methyl-1,2,3,4-tetrahydro[1,4]oxazepino[2,3-c]quinolin-6(7H)-one | Example 13c08: (S)-2-cyclopropyl-3,3-difluoro-10-((5-chloro-2-((S)-2-methylmorpholino)pyridin-4-yl)amino)-7-methyl-1,2,3,4-tetrahydro[1,4]-oxazepino[2,3-c]quinolin-6(7H)-one | Example 13f08: (S)-2-cyclopropyl-3,3-difluoro-10-((5-fluoro-2-((S)-2-methylmorpholino)pyridin-4-yl)amino)-7-methyl-1,2,3,4-tetrahydro[1,4]-oxazepino[2,3-c]quinolin-6(7H)-one |

-continued

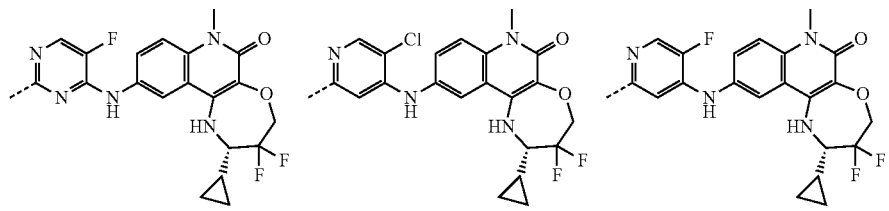

| | | | |
|---|---|---|---|
| 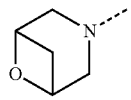 | Example 13p09: (2S)-10-((2-(6-oxa-3-azabicyclo[3.1.1]-heptan-3-yl)-5-fluoro-pyrimidin-4-yl)amino)-2-cyclopropyl-3,3-difluoro-7-methyl-1,2,3,4-tetrahydro[1,4]oxazepino[2,3-c]quinolin-6(7H)-one | Example 13c09: (2S)-10-((2-(6-oxa-3-azabicyclo[3.1.1]-heptan-3-yl)-5-chloropyridin-4-yl)amino)-2-cyclopropyl-3,3-difluoro-7-methyl-1,2,3,4-tetrahydro[1,4]-oxazepino[2,3-c]quinolin-6(7H)-one | Example 13f09: (2S)-10-((2-(6-oxa-3-azabicyclo-[3.1.1]heptan-3-yl)-5-fluoropyridin-4-yl)-amino)-2-cyclopropyl-3,3-difluoro-7-methyl-1,2,3,4-tetrahydro[1,4]oxazepino-[2,3-c]quinolin-6(7H)-one |
| 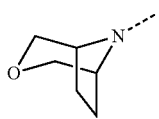 | | Example 13c10: (S)-10-((2-((1R,5S)-3-oxa-8-azabicyclo[3.2.1]octan-8-yl)-5-chloropyridin-4-yl)amino)-2-cyclopropyl-3,3-difluoro-7-methyl-1,2,3,4-tetrahydro-[1,4]oxazepino[2,3-c]-quinolin-6(7H)-one | Example 13f10: (S)-10-((2-((1R,5S)-3-oxa-8-azabicyclo[3.2.1]octan-8-yl)-5-fluoropyridin-4-yl)amino)-2-cyclopropyl-3,3-difluoro-7-methyl-1,2,3,4-tetrahydro-[1,4]oxazepino[2,3-c]-quinolin-6(7H)-one |
| 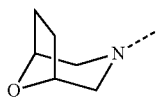 | Example 13p11: (S)-10-((2-((1R,5S)-8-oxa-3-azabicyclo[3.2.1]octan-3-yl)-5-fluoropyrimidin-4-yl)amino)-2-cyclopropyl-3,3-difluoro-7-methyl-1,2,3,4-tetrahydro[1,4]-oxazepino[2,3-c]quinolin-6(7H)-one | Example 13c11: (S)-10-((2-((1R,5S)-8-oxa-3-azabicyclo-[3.2.1]octan-3-yl)-5-chloro-pyridin-4-yl)amino)-2-cyclo-propyl-3,3-difluoro-7-methyl-1,2,3,4-tetrahydro[1,4]-oxazepino[2,3-c]quinolin-6(7H)-one | Example 13f11: (S)-10-((2-((1R,5S)-8-oxa-3-azabicyclo-[3.2.1]octan-3-yl)-5-fluoro-pyridin-4-yl)amino)-2-cyclo-propyl-3,3-difluoro-7-methyl-1,2,3,4-tetrahydro[1,4]-oxazepino[2,3-c]quinolin-6(7H)-one |
|  | Example 13p12: (S)-2-cyclopropyl-10-((2-(dimethylamino)-5-fluoropyrimidin-4-yl)amino)-3,3-difluoro-7-methyl-1,2,3,4-tetrahydro-[1,4]oxazepino[2,3-c]-quinolin-6(7H)-one | Example 13c12: (S)-2-cyclopropyl-10-((2-(dimethylamino)-5-chloro-pyridin-4-yl)amino)-3,3-difluoro-7-methyl-1,2,3,4-tetrahydro[1,4]oxazepino[2,3-c]quinolin-6(7H)-one | Example 13f12: (S)-2-cyclopropyl-10-((2-(dimethylamino)-5-fluoropyridin-4-yl)amino)-3,3-difluoro-7-methyl-1,2,3,4-tetrahydro[1,4]-oxazepino[2,3-c]quinolin-6(7H)-one |
| 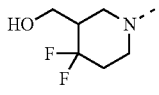 | Example 13p13: (2S)-2-cyclopropyl-10-((2-(4,4-difluoro-3-(hydroxymethyl)-piperidin-1-yl)-5-fluoro-pyrimidin-4-yl)amino)-3,3-difluoro-7-methyl-1,2,3,4-tetrahydro-[1,4]oxazepino-[2,3-c]quinolin-6(7H)-one | Example 13c13: (2S)-2-cyclopropyl-10-((2-(4,4-difluoro-3-(hydroxy-methyl)piperidin-1-yl)-5-chloropyridin-4-yl)-amino)-3,3-difluoro-7-methyl-1,2,3,4-tetrahydro-[1,4]oxazepino[2,3-c]quinolin-6(7H)-one | Example 13f13: (2S)-2-cyclopropyl-10-((2-(4,4-difluoro-3-(hydroxymethyl)-piperidin-1-yl)-5-fluoro-pyridin-4-yl)amino)-3,3-difluoro-7-methyl-1,2,3,4-tetrahydro[1,4]oxazepino-[2,3-c]quinolin-6(7H)-one |

For Example:

Example 13p01 was prepared by analogy to example 2a, with heating to 120° C. for 4 days. LCMS (method X4) rt 3.46 min, m/z calculated 565.2350 for $C_{27}H_{30}F_5N_6O_2$ [M+H]$^+$, found 565.2383.

Example 13p06 was prepared by analogy to example 2a, with heating to 120° C. for 4 days. LCMS (method T4) rt 2.37 min, m/z calculated 503.2013 for $C_{24}H_{26}F_3N_6O_3$ [M+H]$^+$, found 503.2014.

Example 13p08 was prepared by analogy to example 2a, with heating to 120° C. for 4 days. LCMS (method X4) rt 2.81 min, m/z calculated 517.2175 for $C_{25}H_{28}F_3N_6O_3$ [M+H]$^+$, found 517.2200.

Example 13p11 was prepared by analogy to example 9a, with additional heating to 160° C. for 8 h, then to 180° C. for 3 h. LCMS (method X4) rt 2.71 min; m/z calculated 529.2175 for $C_{26}H_{28}ClF_3N_6O_3$+[M+H]$^+$, found 529.2155.

Example 13p12 was prepared by analogy to example 9a. LCMS (method T4) rt 2.00 min; m/z calculated 461.1907 for $C_{22}H_{24}F_3N_6O_2$[M+H]$^+$, found 461.1909.

Example 13c06 was prepared by analogy to example 4a: To a mixture of (S)-10-amino-2-cyclopropyl-3,3-difluoro-7-methyl-1,2,3,4-tetrahydro-[1,4]oxazepino[2,3-c]quinolin-6 (7H)-one (Intermediate B1, 16.5 mg, 0.051 mmol), 4-(5-fluoro-4-iodopyridin-2-yl)morpholine (Intermediate C4, 24.5 mg, 0.076 mmol), dicesium carbonate (126 mg, 0.39 mmol), tris(dibenzylideneacetone)dipalladium(0) (4.7 mg, 0.005 mmol), and xantphos (18.7 mg, 0.032 mmol) under argon was added DMF (0.3 mL) and toluene (0.3 mL). The resulting mixture was heated to 80° C. for 18 h. The solvent was removed under reduced pressure and the residue was purified by column chromatography (0-10% MeOH in DCM). Fractions containing product were combined and the solvent removed under reduced pressure. The crude product was dissolved in DMSO (1.0 mL) and directly purified by reverse-phase chromatography (C-18; 40%-90% methanol in water (containing 0.1% formic acid)). The fractions containing product were loaded onto an Isolute SCX-2 column (2 g), and the column was washed with methanol and then flushed with 20% 1.4 M methanolic ammonia, the solvent was removed under reduced pressure to yield the title compound (16 mg) as a white solid. LCMS (method T4): Rt 1.95 min; m/z calculated 518.1765 for $C_{25}H_{27}ClF_2N_5O_2$ [M+H]$^+$: found: 518.1751.

Example 13c08 was prepared by analogy to example 4a: To a mixture of (S)-10-amino-2-cyclopropyl-3,3-difluoro-7-methyl-1,2,3,4-tetrahydro-[1,4]oxazepino[2,3-c]quinolin-6(7H)-one (Intermediate B1, 16.5 mg, 0.051 mmol), (S)-4-(5-fluoro-4-iodopyridin-2-yl)-2-methylmorpholine (Intermediate C5, 25.7 mg, 0.076 mmol), dicesium carbonate (126 mg, 0.39 mmol), tris(dibenzylideneacetone)dipalladium(0) (4.7 mg, 0.005 mmol), and xantphos (18.7 mg, 0.032 mmol) under argon was added DMF (0.3 mL) and toluene (0.3 mL). The resulting mixture was heated to 80° C. for 18 h. The solvent was removed under reduced pressure and the residue was purified by column chromatography (0-10% MeOH in DCM). Fractions containing product were combined and the solvent removed under reduced pressure. The crude product was dissolved in DMSO (1.0 mL) and directly purified by reverse-phase chromatography (C-18; 40%-90% methanol in water (containing 0.1% formic acid)). The fractions containing product were loaded onto an Isolute SCX-2 column (2 g), and the column was washed with methanol and then flushed with 20% 1.4 M methanolic ammonia, the solvent was removed under reduced pressure. The crude product was purified by column chromatography (20-100% EtOAc in hexane). Fractions containing product were combined and the solvent removed under reduced pressure to yield the title compound (4.8 mg) as a white solid. LCMS (method T4): Rt 2.08 min; m/z calculated 532.1921 for $C_{26}H_{29}ClF_2N_5O_3$ [M+H]$^+$: found: 532.1917.

Example 13c12 was prepared by analogy to example 4a: To a mixture of (S)-10-amino-2-cyclopropyl-3,3-difluoro-7-methyl-1,2,3,4-tetrahydro-[1,4]oxazepino[2,3-c]quinolin-6(7H)-one (Intermediate 1, 16.5 mg, 0.051 mmol), 5-chloro-4-iodo-N,N-dimethylpyridin-2-amine (Intermediate C3, 21.4 mg, 0.076 mmol), dicesium carbonate (126 mg, 0.39 mmol), tris(dibenzylideneacetone)dipalladium(0) (4.7 mg, 0.005 mmol), and xantphos (18.7 mg, 0.032 mmol) under argon was added DMF (0.3 mL) and toluene (0.3 mL). The resulting mixture was heated to 80° C. for 18 h, then further heated in the microwave to 140° C. for 20 h. The solvent was removed under reduced pressure and the residue was purified by column chromatography (0-10% MeOH in DCM). Fractions containing product were combined and the solvent removed under reduced pressure. The crude product was dissolved in DMSO (1.0 mL) and directly purified by reverse-phase chromatography (C-18; 40%-90% methanol in water (containing 0.1% formic acid)). The fractions containing product were loaded onto an Isolute SCX-2 column (2 g), and the column was washed with methanol and then flushed with 20% 1.4 M methanolic ammonia, the solvent was removed under reduced pressure to yield the title compound (13 mg, 53%, 0.0273 mmol) as a white solid. LCMS (method T4): Rt 1.90 min; m/z calculated 476.1659 for $C_{23}H_{25}ClF_2N_5O_2$ [M+H]$^+$: found: 476.1673.

Example 13f04 was prepared as mono-formic acid salt by analogy to example 4a: To a mixture of (S)-10-amino-2-cyclopropyl-3,3-difluoro-7-methyl-1,2,3,4-tetrahydro-[1,4]oxazepino[2,3-c]quinolin-6(7H)-one (Intermediate 1, 10 mg, 0.031 mmol), 2-(4,4-difluoropiperidin-1-yl)-5-fluoro-4-iodopyridine (Intermediate C2, 10.7 mg, 0.031 mmol), dicesium carbonate (41 mg, 0.125 mmol), tris(dibenzylideneacetone)dipalladium(0) (3.7 mg, 0.004 mmol), and xantphos (4.5 mg, 0.008 mmol) under argon was added DMF (0.3 mL) and Toluene (0.3 mL). The resulting mixture was heated to 90° C. for 1 h, then loaded onto silica gel and purified by flash column chromatography (25 g KP-Sil, 0-10% MeOH in DCM) to afford 27 mg of an orange oil. This was dissolved in methanol, 5 drops of formic acid were added, and the mixture loaded onto an SCX2 cartridge, washed with MeOH, and eluted with 2M NH3 in MeOH to afford 14 mg of a yellow oil which solidified on scratching. This was further purified by reverse phase flash chromatography (Biotage 12 g SNAP Ultra C18, 30-100% methanol in water, 0.1% formic acid modifier) to afford 8 mg of a white solid. $^1$H NMR (600 MHz, Methanol-d4) δ 7.91 (d, J=2.3 Hz, 1H), 7.83 (d, J=3.4 Hz, 1H), 7.59 (d, J=9.0 Hz, 1H), 7.55 (dd, J=9.0, 2.3 Hz, 1H), 6.40 (d, J=6.1 Hz, 1H), 4.54-4.38 (m, 2H), 3.72 (s, 3H), 3.55-3.44 (m, 4H), 3.35-3.26 (m, 1H), 1.97 (tt, J=13.8, 5.7 Hz, 4H), 1.46-1.37 (m, 1H), 0.83-0.76 (m, 1H), 0.68-0.57 (m, 2H), 0.38-0.31 (m, 1H). LCMS (method T4) rt 2.30 min, m/z calculated 536.2079 for $C_{26}H_{27}F_5N_5O_2$[M+H]$^+$ found 536.2058.

Example 13f05 was prepared by analogy to example 13f04 from (3R,5S)-1-(5-fluoro-4-iodopyridin-2-yl)-5-methylpiperidin-3-ol (prepared by analogy to intermediate C2). $^1$H NMR (600 MHz, Methanol-d4) δ 7.94 (d, J=2.3 Hz, 1H), 7.81 (d, J=3.7 Hz, 1H), 7.62 (d, J=9.0 Hz, 1H), 7.56 (dd, J=9.0, 2.3 Hz, 1H), 6.31 (d, J=6.2 Hz, 1H), 4.54-4.34 (m, 2H), 3.99 (ddt, J=12.2, 4.1, 1.7 Hz, 1H), 3.89 (ddt, J=12.7, 3.9, 1.6 Hz, 1H), 3.72 (s, 3H), 3.59 (tt, J=10.7, 4.5 Hz, 1H), 3.34-3.26 (m, 1H), 2.45 (dd, J=12.2, 10.4 Hz, 1H), 2.27 (dd, J=12.7, 11.2 Hz, 1H), 2.09-2.03 (m, 1H), 1.77-1.64 (m, 1H), 1.46-1.37 (m, 1H), 1.03 (q, J=11.9 Hz, 1H), 0.95 (d, J=6.6 Hz, 3H), 0.84-0.76 (m, 1H), 0.68-0.57 (m, 2H), 0.41-0.33 (m, 1H). LCMS (method T4) rt 1.99 min, m/z calculated 530.2374 for $C_{27}H_{30}F_3N_5O_3$, found 530.2375.

Examples 14a and 14b represent epimers at the 3-methylpiperidine centre. Each is a single compound, resulting from chiral separation of an intermediate at an earlier stage of the synthesis, but the stereochemistry of each has not been determined.

Example 14a: (S)-10-((5-chloro-2-((S)-4,4-difluoro-3-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one or (S)-10-((5-chloro-2-((R)-4,4-difluoro-3-methylpiperidin-1-yl)pyrimidin-4-yl)amino)-2-cyclopropyl-3,3-difluoro-7-methyl-1,2,3,4-tetrahydro-[1.4]oxazepino[2,3-c]quinolin-6(7H)-one

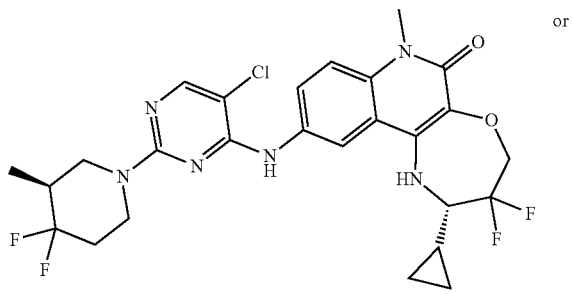

-continued

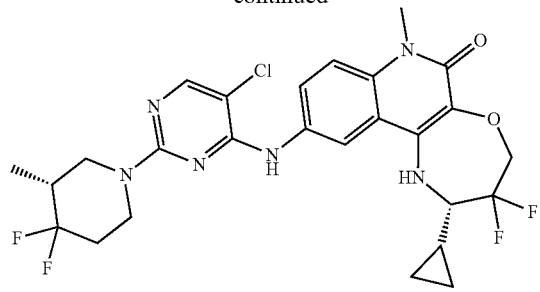

A vial containing (S)-4,5-dichloro-2-(4,4-difluoro-3-methylpiperidin-1-yl)pyrimidine or (R)-4,5-dichloro-2-(4,4-difluoro-3-methylpiperidin-1-yl)pyrimidine (Intermediate L2a; 7 mg, 0.025 mmol), DIPEA (30 uL, 0.17 mmol), and (S)-10-amino-2-cyclopropyl-3,3-difluoro-7-methyl-1,2,3,4-tetrahydro-[1,4]oxazepino[2,3-c]quinolin-6(7H)-one (Intermediate B1, 8 mg, 0.025 mmol) in NMP (2 mL) was heated at 140° C. under microwave irradiation for 5.5 h. The reaction mixture was directly purified by reverse-phase chromatography (Biotage reverse-phase 12 g Ultra C-18 column; 35-80% MeOH in $H_2O$ (containing 0.1% formic acid)) to give the title compound (0.3 mg). LCMS (Method T4) RT=3.17 min, m/z calculated 567.1893 for $C_{26}H_{28}ClF_4N_6O_2$ [M+H]$^+$; found 567.1898. $^1$H NMR (600 MHz, Methanol-d4) δ 8.08 (d, J=2.3 Hz, 1H), 8.00 (s, 1H), 7.90 (dd, J=9.1, 2.3 Hz, 1H), 7.58 (d, J=9.1 Hz, 1H), 4.55-4.36 (m, 3H), 4.33 (d, J=13.7 Hz, 1H), 3.75 (s, 3H), 3.38-3.24 (m, 1H), 3.03-2.95 (m, 1H), 2.11-1.95 (m, 1H), 1.92-1.79 (m, 1H), 1.46-1.37 (m, 1H), 1.31 (s, 2H), 1.01 (d, J=6.7 Hz, 3H), 0.84-0.77 (m, 1H), 0.71-0.59 (m, 2H), 0.40-0.32 (m, 1H).

The following tabulated examples were prepared by a method analogous to that used for the preparation of Example 14a, starting from the intermediate shown in the table.

| Example | Data and comments | Intermediate |
| --- | --- | --- |
| Example 14b: (S)-10-((5-chloro-2-((R)-4,4-difluoro-3-methyl-piperidin-1-yl)pyrimidin-4-yl)amino)-2-cyclopropyl-3,3-difluoro-7-methyl-1,2,3,4-tetrahydro[1,4]oxazepino[2,3-c]quinolin-6(7H)-one or (S)-10-((5-chloro-2-((S)-4,4-difluoro-3-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6(7H)-one | LCMS (Method T4) RT = 3.17 min m/z calcd for $C_{26}H_{28}ClF_4N_6O_2$ [M + H]$^+$ = 567.1893; found 567.1892. 1H NMR (600 MHz, Methanol-d4) δ 8.06 (d, J = 2.3 Hz, 1H), 8.00 (s, 1H), 7.92 (dd, J = 9.1, 2.3 Hz, 1H), 7.58 (d, J = 9.1 Hz, 1H), 4.55-4.36 (m, 3H), 4.30 (d, J = 13.8 Hz, 1H), 3.75 (s, 3H), 3.33-3.21 (m, 1H), 3.00 (dd, J = 13.5, 10.2 Hz, 1H), 2.12-1.95 (m, 1H), 1.92-1.77 (m, 1H), 1.46-1.39 (m, 1H), 1.35-1.30 (m, 2H), 1.00 (d, J = 6.8 Hz, 3H), 0.85-0.77 (m, 1H), 0.71-0.59 (m, 2H), 0.40-0.33 (m, 1H). | Intermediate L2b: (R)-4,5-dichloro-2-(4,4-difluoro-3-methyl-piperidin-1-yl)pyrimidine or (S)-4,5-dichloro-2-(4,4-difluoro-3-methyl-piperidin-1-yl)pyrimidine |

INTERMEDIATE COMPOUNDS

Intermediate A1: (S)-2-cyclopropyl-10-((2,5-dichloropyrimidin-4-yl)amino)-3,3-difluoro-7-methyl-1,2,3,4-tetrahydro-[1,4]oxazepino[2,3-c]quinolin-6(7H)-one

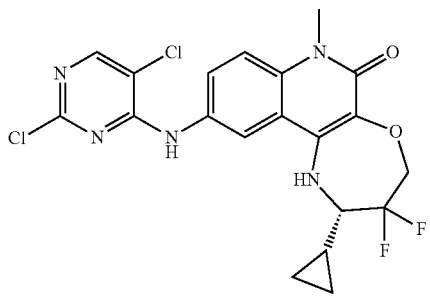 [SMILES: Cn1c(=O)c2c(c3cc(Nc4nc(Cl)ncc4Cl)ccc31)N[C@@H](C1CC1)C(F)(F)CO2]

To a mixture of (S)-10-amino-2-cyclopropyl-3,3-difluoro-7-methyl-1,2,3,4-tetrahydro-[1,4]oxazepino[2,3-c]quinolin-6(7H)-one (Intermediate 1; 1.7 g, 5.3 mmol) and 2,4,5-trichloropyrimidine (0.67 mL, 5.82 mmol) in NMP (5 mL) under argon was added DIPEA (3.7 mL, 21 mmol). The reaction mixture was heated at 140° C. under microwave irradiation for 1 h then cooled to rt. The reaction mixture was added to water (5 mL) and a beige precipitate formed. Additional water (10 mL) was added and the aq. mixture was stirred for 5 min. The precipitate was filtered, washed with water (100 mL) and dried, then purified by flash column chromatography (10 g KP-Sil, 0-10% methanol in DCM) affording the title compound (2.16 g, 88%) as a beige solid. $^1$H NMR (500 MHz, Chloroform-d) δ 8.39 (d, J=2.4 Hz, 1H), 8.26 (s, 1H), 7.48 (dd, J=9.1, 2.3 Hz, 1H), 7.41 (s, 1H), 7.36 (d, J=9.0 Hz, 1H), 4.70-4.58 (m, 1H), 4.49-4.29 (m, 2H), 3.71 (s, 3H), 3.42-3.32 (m, 1H), 1.41-1.31 (m, 1H), 0.90-0.82 (m, 1H), 0.81-0.74 (m, 1H), 0.73-0.66 (m, 1H), 0.42-0.27 (m, 1H); LCMS (Method X4); RT 3.19 min; m/z 468.0801 [M+H]$^+$.

Intermediate A2: (S)-10-((2-chloro-5-fluoropyrimidin-4-yl)amino)-2-cyclopropyl-3,3-difluoro-7-methyl-1,2,3,4-tetrahydro-[1,4]oxazepino[2,3-c]quinolin-6(7H)-one

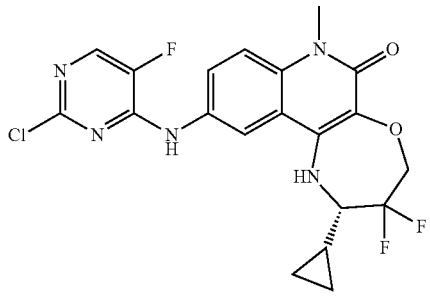 [SMILES: Cn1c(=O)c2c(c3cc(Nc4nc(Cl)ncc4F)ccc31)N[C@@H](C1CC1)C(F)(F)CO2]

Prepared by a method analogous to that used in the preparation of intermediate A1, using 2,4-dichloro-5-fluoropyrimidine. $^1$H NMR (500 MHz, DMSO-d$_6$) δ 10.12 (s, 1H), 8.32 (d, J=3.3 Hz, 1H), 8.20 (d, J=2.3 Hz, 1H), 7.66 (dd, J=9.0, 2.2 Hz, 1H), 7.50 (d, J=9.0 Hz, 1H), 6.12 (d, J=3.2 Hz, 1H), 4.53-4.43 (m, 1H), 4.43-4.32 (m, 1H), 3.57 (s, 3H), 3.32-3.22 (m, 1H), 1.38-1.25 (m, 1H), 0.75-0.67 (m, 1H), 0.58-0.48 (m, 2H), 0.38-0.32 (m, 1H); LCMS (Method X2); RT 1.52 min; m/z 452.1098 [M+H]$^+$.

Intermediate A3: (S)-2-cyclopropyl-10-((2,5-dichloropyrimidin-4-yl)amino)-3,3-difluoro-7-(methyl-d3)-1,2,3,4-tetrahydro-[1,4]oxazepino[2,3-c][1,8]naphthyridin-6(7H)-one

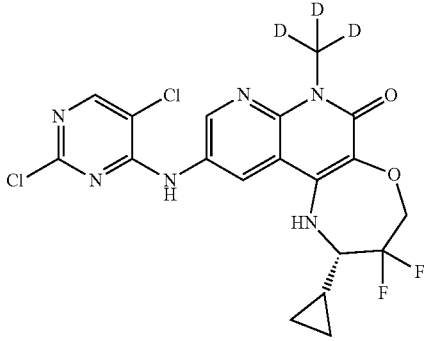 [SMILES: [2H]C([2H])([2H])n1c(=O)c2c(c3cc(Nc4nc(Cl)ncc4Cl)cnc31)N[C@@H](C1CC1)C(F)(F)CO2]

Prepared by a method analogous to that used in the preparation of intermediate A1, using (S)-10-amino-2-cyclopropyl-3,3-difluoro-7-(methyl-d3)-1,2,3,4-tetrahydro-[1,4]oxazepino[2,3-c][1,8]naphthyridin-6(7H)-one (Intermediate B2). LCMS (Method T2); RT 1.54 min; m/z 472.09 [M+H]$^+$.

Intermediate B1: (S)-10-amino-2-cyclopropyl-3,3-difluoro-7-methyl-1,2,3,4-tetrahydro-[1,4]oxazepino[2,3-c]quinolin-6(7H)-one

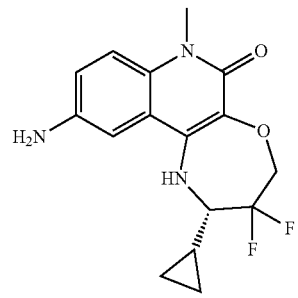

Three reactions were set up in parallel as follows: to (S)-2-cyclopropyl-3,3-difluoro-7-methyl-10-nitro-1,2,3,4-tetrahydro-[1,4]oxazepino[2,3-c]quinolin-6(7H)-one (Intermediate E1; 2.5 g, 7.1 mmol) and 10 wt % Pd/C (100 mg) under an argon atmosphere was added ethanol (50 mL). The reaction mixture was stirred at 60° C. under an atmosphere of hydrogen for 90 minutes then allowed to cool to rt. The three reaction mixtures were combined and filtered through a pad of celite, washing with EtOH (200 mL). The filtrate was concentrated in vacuo affording the title compound (6.78 g, 99%) as an orange solid which was used without further purification. LCMS (Method X4); RT 1.93 min; m/z 322.14 [M+H]$^+$.

Intermediate B2: (S)-10-amino-2-cyclopropyl-3,3-difluoro-7-(methyl-d3)-1,2,3,4-tetrahydro-[1,4]oxazepino[2,3-c][1,8]naphthyridin-6(7H)-one

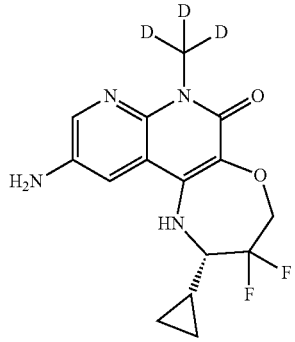 [SMILES: [2H]C([2H])([2H])n1c(=O)c2c(c3cc(N)cnc31)N[C@@H](C1CC1)C(F)(F)CO2]

A sealed vial containing (S)-10-chloro-2-cyclopropyl-3,3-difluoro-7-(methyl-d3)-1,2,3,4-tetrahydro-[1,4]oxazepino[2,3-c][1,8]naphthyridin-6(7H)-one (Intermediate E2, 20.3 mg, 0.059 mmol), sodium tert-butoxide (8.8 mg, 0.092 mmol), diphenylmethanimine (16 mg, 0.088 mmol), palladium(II) acetate (1.3 mg, 0.006 mmol) and Josiphos (3.2 mg, 0.006 mmol) in 1,2-dimethoxyethane (0.24 mL) under Ar was heated at 70° C. for 2 h. The reaction mixture was cooled to rt and 3 M HCl (0.5 mL) was added. The mixture was stirred at rt for 2 h, then filtered through a pad of Celite onto an SCX-2 (2 g) column, which was eluted with water (10 mL), MeOH (20 mL) and 2 N methanolic ammonia (20 mL). The basic fraction was concentrated under reduced pressure affording (2S)-10-amino-2-cyclopropyl-3,3-difluoro-7-(trideuteriomethyl)-2,4-dihydro-1H-[1,4]oxazepino[2,3-c][1,8]naphthyridin-6-one (18.5 mg) as a dark yellow solid. LCMS (Method T2); RT 1.20 min; m/z 326.1471 [M+H]$^+$.

Intermediate C1: 5-(4,5-dichloropyridin-2-yl)-3-methyl-1,2,4-oxadiazole

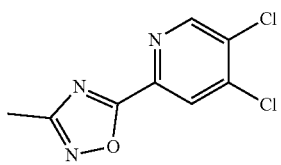

To 4,5-dichloropicolinic acid (80 mg, 0.42 mmol) in THF (2.7 mL) under Ar was added T3P (50 wt % in EtOAc, 0.34 g, 0.54 mmol), DIPEA (0.15 mL, 0.86 mmol) and acetamide oxime (31 mg, 0.42 mmol). The reaction mixture was sealed and stirred at rt for 3 h, then heated at 80° C. in a heating block for 15 h. Water (5 mL) was added and the aqueous mixture was extracted with EtOAc (2×10 mL). The organic extracts were combined, washed with saturated aq. NaHCO$_3$ (5 mL), brine (10 mL), dried (Na$_2$SO$_4$) and concentrated in vacuo affording the title compound (44 mg, 45%) as an off-white solid. $^1$H NMR (500 MHz, CDCl$_3$) δ 8.80 (s, 1H), 8.29 (s, 1H), 2.52 (s, 3H); LCMS (2 min); RT 1.32 min; m/z 229.9880 [M+H]$^+$

Intermediate C2: 2-(4,4-difluoropiperidin-1-yl)-5-fluoro-4-iodopyridine

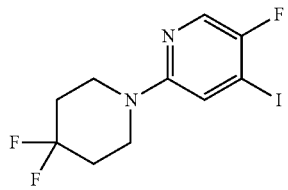 [SMILES: Fc1cnc(N2CCC(F)(F)CC2)cc1I]

4,4-Difluoropiperidine hydrochloride (63 mg, 0.40 mmol), 2,5-difluoro-4-iodo-pyridine (80 mg, 0.33 mmol), and potassium carbonate (153 mg, 1.11 mmol) were combined in MeCN (1.0 mL) and heated to 170° C. for 12 h in the microwave. The resulting mixture was loaded onto silica gel and purified by flash column chromatography (25 g KP-Sil, 0-5% MeOH in DCM) to give the title compound (10 mg) as a clear oil. LCMS (Method X2) rt 1.51 min; m/z 342.9942 [M+H]$^+$.

Intermediate C3: 5-chloro-4-iodo-N,N-dimethylpyridin-2-amine

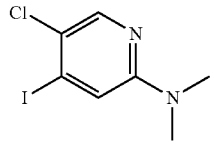

A mixture of dimethylamine hydrochloride (2 mg, 0.26 mmol), 5-chloro-2-fluoro-4-iodopyridine (60 mg, 0.23 mmol), and N,N-diisopropylethylamine (80 uL, 0.47 mmol) in NMP (0.5 mL) was heated to 140° C. for 1 h, then concentrated under reduced pressure and the residue purified by column chromatography (0-5% MeOH in DCM) to yield title compound as an off white solid (56 mg). $^1$H NMR (500 MHz, Chloroform-d) δ 8.07 (s, 1H), 6.99 (s, 1H), 3.05 (s, 6H).

Intermediate C4: 4-(5-fluoro-4-iodopyridin-2-yl)morpholine

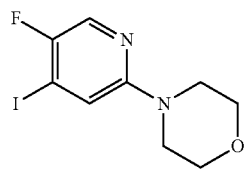 [SMILES: Fc1cnc(N2CCOCC2)cc1I]

A mixture of morpholine (18 uL, 0.21 mmol), 5-chloro-2-fluoro-4-iodopyridine (50 mg, 0.19 mmol), and N,N-diisopropylethylamine (67 uL, 0.38 mmol) in MeCN (0.5 mL) was heated to 80° C. for 18 h, then concentrated under reduced pressure and the residue purified by column chromatography (0-5% MeOH in DCM) to yield title compound as an off white solid (29 mg). $^1$H NMR (600 MHz, Chloroform-d) δ 8.12 (s, 1H), 7.13 (s, 1H), 3.84-3.79 (m, 4H), 3.50-3.45 (m, 4H).

Intermediate C5: (S)-4-(5-fluoro-4-iodopyridin-2-yl)-2-methylmorpholine

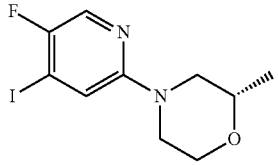

A mixture of (S)-2-Methylmorpholine hydrochloride (29 mg, 0.21 mmol), 5-chloro-2-fluoro-4-iodopyridine (50 mg, 0.19 mmol), and N,N-diisopropylethylamine (67 uL, 0.38 mmol) in MeCN (0.5 mL) was heated to 80° C. for 18 h, then concentrated under reduced pressure and the residue purified by column chromatography (0-5% MeOH in DCM) to yield title compound as an off white solid (27 mg). $^1$H NMR (600 MHz, Chloroform-d) δ 8.11 (s, 1H), 7.12 (s, 1H), 4.00 (tdd, J=12.6, 3.1, 1.5 Hz, 2H), 3.90 (ddt, J=12.7, 3.1, 1.6 Hz, 1H), 3.73-3.62 (m, 2H), 3.01-2.91 (m, 1H), 2.60 (dd, J=12.7, 10.4 Hz, 1H), 1.27 (d, J=6.3 Hz, 3H).

Intermediate E1: (S)-2-cyclopropyl-3,3-difluoro-7-methyl-10-nitro-1,2,3,4-tetrahydro-[1,4]oxazepino-[2,3-c]quinolin-6(7H)-one

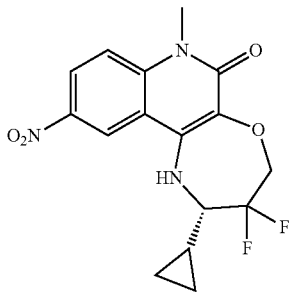 [SMILES: Cn1c(=O)c2c(c3cc([N+](=O)[O-])ccc31)N[C@@H](C1CC1)C(F)(F)CO2]

Step 1: (S)-4-((1-cyclopropyl-2,2-difluoro-3-hydroxypropyl)amino)-1-methyl-6-nitroquinolin-2(1H)-one An oven-dried microwave vial (10-20 mL volume) was charged with (S)-3-amino-3-cyclopropyl-2,2-difluoropropan-1-ol hydrochloride (3 g, 13.3 mmol) and ethyl 4-chloro-1-methyl-6-nitro-2-oxo-1,2-dihydroquinoline-3-carboxylate (Intermediate F1; 3 g, 9.7 mmol). The reaction vial was flushed with Ar and sealed with a cap. Anhydrous acetonitrile (15 mL) was added followed by DIPEA (4.2 mL). The reaction mixture was heated at 160° C. under microwave irradiation for 15 h. Four further batches were prepared by the same method. Batches were combined, 2M sodium hydroxide (150 mL) was added, and the reaction mixture was heated at 85° C. for 2 h. The reaction mixture was cooled to rt. Water (80 mL) was added and the reaction mixture was acidified to pH 5-6 with 3 M HCl. The resulting precipitate was filtered, washed with H$_2$O (500 mL) and dried affording the title compound (15.83 g, 93%) as a beige solid which was used without further purification. $^1$H NMR (500 MHz, DMSO-d$_6$) δ 9.31 (d, J=2.5 Hz, 1H), 8.40 (dd, J=9.4, 2.5 Hz, 1H), 7.62 (d, J=9.4 Hz, 1H), 7.47 (d, J=8.7 Hz, 1H), 5.72 (s, 1H), 5.60 (t, J=6.1 Hz, 1H), 3.90-3.71 (m, 2H), 3.57-3.45 (m, 1H) overlapping with 3.55 (s, 3H), 1.38-1.29 (m, 1H), 0.71-0.64 (m, 1H), 0.63-0.56 (m, 1H), 0.53-0.46 (m, 1H), 0.27-0.21 (m, 1H); LCMS (Method X2) RT 1.17 min; m/z 354.1264 [M+H]$^+$.

Step 2: (S)-3-bromo-4-((1-cyclopropyl-2,2-difluoro-3-hydroxypropyl)amino)-1-methyl-6-nitroquinolin-2(1H)-one Trifluoroacetic acid (8.83 mL) was added to a stirred mixture of (S)-4-((1-cyclopropyl-2,2-difluoro-3-hydroxypropyl)amino)-1-methyl-6-nitroquinolin-2(1H)-one (from step 1; 8.15 g, 23 mmol) and freshly recrystallised N-bromosuccinimide (4.1 g, 23 mmol) in anhydrous CH$_2$Cl$_2$ (150 mL) at 0° C. under Ar. The reaction mixture was stirred at 0° C. for 15 min. The reaction mixture was diluted with CH$_2$Cl$_2$ (100 mL) and washed with saturated aq. NaHCO$_3$ (3×100 mL). The aqueous washings were further extracted with CH$_2$Cl$_2$ (100 mL). The organic extracts were combined, washed with brine (100 mL), dried (Na$_2$SO$_4$) and concentrated. A second batch was prepared by an analogous method, starting from 7.69 g of the quinolinone from step 1. Batches of products were combined to give the title compound as a yellow solid (18.6 g, 96%). $^1$H NMR (500 MHz, DMSO-d$_6$) δ 8.95 (d, J=2.5 Hz, 1H), 8.43 (dd, J=9.4, 2.5 Hz, 1H), 7.75 (d, J=9.4 Hz, 1H), 5.85 (d, J=11.1 Hz, 1H), 5.63 (t, J=5.8 Hz, 1H), 4.05-3.95 (m, 1H), 3.88-3.73 (m, 2H), 3.71 (s, 3H), 1.29-1.21 (m, 1H), 0.68-0.62 (m, 1H), 0.62-0.51 (m, 2H), 0.50-0.44 (m, 1H); LCMS (Method T2) RT 1.45 min; m/z 432.0373 [M+H]$^+$.

Step 3: (S)-2-cyclopropyl-3,3-difluoro-7-methyl-10-nitro-1,2,3,4-tetrahydro-[1,4]oxazepino-[2,3-c]quinolin-6(7H)-one Lithium tert-butoxide (1 M in THF; 35 mL) was added to a stirred suspension of (S)-3-bromo-4-((1-cyclopropyl-2,2-difluoro-3-hydroxypropyl)amino)-1-methyl-6-nitro-quinolin-2(1H)-one (from step 2; 9.48 g, 22 mmol) in THF (220 mL) under Ar. A reflux condenser and Ar balloon were fitted and the reaction mixture was heated at 60° C. for 15 min. The reaction mixture was cooled to rt. Water (100 mL) was added and the aqueous mixture was extracted with CH$_2$Cl$_2$ (3×100 mL). The organic extracts were combined, washed with brine (2×100 mL), dried (Na$_2$SO$_4$) and concentrated under reduced pressure. A second batch was prepared by the same method using a further 9.17 g of compound from step 2. Batches were combined to give the title compound as a yellow solid (15.4 g, 100%). $^1$H NMR (500 MHz, DMSO-d$_6$) δ 9.12 (d, J=2.6 Hz, 1H), 8.35 (dd, J=9.3, 2.5 Hz, 1H), 7.66 (d, J=9.3 Hz, 1H), 7.01 (br d, J=5.0 Hz, 1H), 4.54-4.37 (m, 2H), 3.62 (s, 3H, NCH$_3$), 3.29-3.22 (m, 1H), 1.39-1.31 (m, 1H), 0.76-0.69 (m, 1H), 0.58-0.49 (m, 2H), 0.37-0.30 (m, 1H); LCMS (Method X2) RT 1.34 min; m/z 352.1105 [M+H]$^+$. The product was found to be −88% ee by chiral SFC [YMC Chiral ART Amylose-C, (4.6 mm×250 mm, 5 uM); 30:70 methanol:CO2 (isocratic, 0.2% v/v ammonia modifier); flowrate 4 mL/min; 40° C.; detection at 210-400 nm; 1 uL injection]. Rt of desired (S) enantiomer 2.06 min; (R) enantiomer 1.75 min. 10 g of material was therefore was dissolved in DCM:methanol (1:1 v/v, concentration 15 mg/mL) and purified by chiral SFC [Chiralpak SA (21.2 mm×250 mm, 5 um); 30:70 methanol:CO2 (isocratic, 0.2% v/v ammonia modifier); flowrate 21 mL/min; ambient temperature; detection at 229 nm; 2.5 mL per injection]. Combined fractions of the desired (S) enantiomer were then evaporated to near dryness using a rotary evaporator, transferred into final vessels with DCM, which was removed under a stream of compressed air at 35° C. before being stored in a vacuum oven at 35° C. and 5 mbar until constant weight to afford a beige solid (7.51 g). Chiral SFC [Amylose-C, as above] rt 2.09 min; no minor isomer observed.

Intermediate E2: (S)-10-chloro-2-cyclopropyl-3,3-difluoro-7-(methyl-d3)-1,2,3,4-tetrahydro-[1,4]oxazepino[2,3-c][1,8]naphthyridin-6(7H)-one

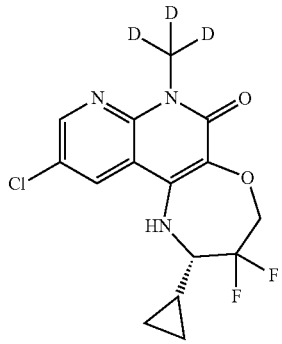 [SMILES: [2H]C([2H])([2H])n1c(=O)c2c(c3cc(Cl)cnc31)N[C@@H](C1CC1)C(F)(F)CO2]

Prepared by a three step method analogous to that used for the preparation of intermediate E1, starting from ethyl 4,6-dichloro-1-(methyl-d3)-2-oxo-1,2-dihydro-1,8-naphthyridine-3-carboxylate (Intermediate F2). Chiral SFC analysis/purification was not carried out. $^1$H NMR (500 MHz, DMSO-d6) δ 8.76 (d, J=2.4 Hz, 1H), 8.60 (d, J=2.4 Hz, 1H), 6.60-6.50 (m, 1H), 4.56-4.35 (m, 2H), 3.30-3.23 (m, 1H), 1.31-1.24 (m, 1H), 0.76-0.69 (m, 1H), 0.60-0.48 (m, 2H), 0.37-0.31 (m, 1H); LCMS (Method T2); RT 1.49 min; m/z 345.1034 [M+H]$^+$.

Intermediate F1: ethyl 4-chloro-1-methyl-6-nitro-2-oxo-1,2-dihydroquinoline-3-carboxylate

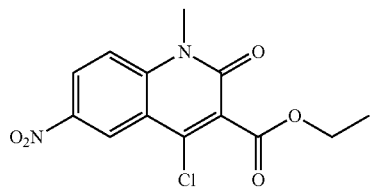 [SMILES: CCOC(=O)c1c(Cl)c2cc([N+](=O)[O-])ccc2n(C)c1=O]

Step 1: 1-methyl-6-nitro-2H-benzo[d][1,3]oxazine-2,4(1H)-dione

To a solution of 5-nitro-isatoic anhydride (25.1 g, 120.6 mmol) in DMF (241 mL) at rt was added sodium hydride (60% in mineral oil; 7.24 g, 180.9 mmol). The solution was allowed to stir for 15 min with warming to RT. Iodomethane (18.8 mL, 301.5 mmol) was added and the mixture was stirred at rt for 4 h. The reaction mixture was poured onto ice, the resulting precipitate filtered and washed with water (5 litres). The solid was collected and dried under vacuum overnight affording 1-methyl-6-nitro-2H-benzo[d][1,3]oxazine-2,4(1H)-dione (19.7 g, 73%) as an orange powder. LCMS (Method T2) RT 1.35 min, m/z 211.069 [M+MeOH–CO$_2$]$^+$.

Step 2: ethyl 4-hydroxy-1-methyl-6-nitro-2-oxo-1,2-dihydroquinoline-3-carboxylate To a solution of 1-methyl-6-nitro-2H-benzo[d][1,3]oxazine-2,4(1H)-dione (from step 1; 19.6 g, 88.2 mmol) in DMF (177 mL) was added diethyl malonate (40.4 mL, 264.7 mmol). The solution was cooled to 0° C., then Sodium hydride (60% in mineral oil) (7.06 g, 176.46 mmol) was added in 4 portions over 30 min. The solution was allowed to warm to rt and stirred at that temperature for 3 h. Water was added with care to the reaction mixture followed by 10% aq. HCl until the pH of the mixture was ~pH5. The resulting precipitate was filtered through a sinter funnel and washed with water (5 litres). The resulting solid was transferred to a round bottom flask and dried under vacuum affording ethyl 4-hydroxy-1-methyl-6-nitro-2-oxo-1,2-dihydroquinoline-3-carboxylate (24.2 g, 94%) as a pale yellow solid. LCMS (Method T2) RT 1.45 min; m/z 293.074 [M+H]$^+$.

Step 3: ethyl 4-chloro-1-methyl-6-nitro-2-oxo-1,2-dihydroquinoline-3-carboxylate Phosphorus oxychloride (250 mL, 2700 mmol) was added to a flask containing ethyl 4-hydroxy-1-methyl-6-nitro-2-oxo-1,2-dihydroquinoline-3-carboxylate (24.1 g, 82.5 mmol). The flask was fitted with a suba-seal and an argon balloon then heated to 80° C. with stirring for 2.5 h. The mixture was concentrated in vacuo. The residue was diluted with water and extracted with EtOAc. The combined organic extracts were washed with brine, dried (MgSO4) and concentrated in vacuo. Purification by flash chromatography (340 g KP-sil; 0% to 10% MeOH in CH$_2$Cl$_2$) afforded the title compound (14.5 g, 57%) as a dark orange solid. $^1$H NMR (500 MHz, CDCl$_3$) δ 8.95 (d, J=2.5 Hz, 1H), 8.50 (dd, J=9.3, 2.5 Hz, 1H), 7.53 (d, J=9.3 Hz, 1H), 4.48 (q, J=7.1 Hz, 2H), 3.78 (s, 3H), 1.42 (t, J=7.1 Hz, 3H); LCMS (Method T2) RT 1.42 min; m/z 311.043 [M+H]$^+$.

Intermediate F2: ethyl 4,6-dichloro-1-(methyl-d$_3$)-2-oxo-1,2-dihydro-1,8-naphthyridine-3-carboxylate

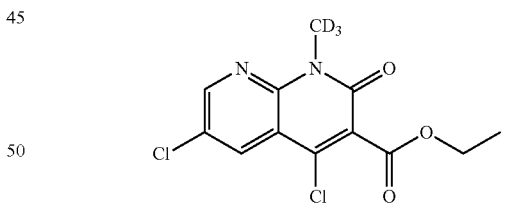

Step 1: methyl 5-chloro-2-((methyl-d$_3$)amino)nicotinate

A microwave vial (10-20 mL volume) was charged with methyl 5-chloro-2-fluoronicotinate (261 mg, 1.38 mmol) and methan-d$_3$-amine hydrochloride (192 mg, 2.73 mmol). The reaction vial was flushed with Ar, sealed with a cap and then further flushed with Ar. THF (4 mL) was added followed by DIPEA (0.71 mL, 4.11 mmol). The reaction mixture was stirred at 40° C. for 22 h then concentrated in vacuo. The residue was diluted with water (10 mL) and extracted with EtOAc (2×15 mL). The organic extracts were combined, washed with brine (10 mL), dried (Na$_2$SO$_4$) and concentrated in vacuo. Purification by flash chromatography (10 g KP-sil; 0% to 30% EtOAc in cyclohexane) afforded the title compound (239 mg, 85%) as a white solid. LCMS (Method T2) RT 1.43 min, m/z 204.06 [M+H]⁺

Step 2: ethyl 6-chloro-4-hydroxy-1-(methyl-d₃)-2-oxo-1,2-dihydro-1,8-naphthyridine-3-carboxylate A microwave vial (2.0-5.0 mL volume) was charged with methyl 5-chloro-2-((methyl-d₃)amino)nicotinate (from step 1; 239 mg, 1.17 mmol). The reaction vial was flushed with Ar, sealed with a cap and then further flushed with Ar. DCM (4.5 mL) was added followed by triethylamine (0.98 mL, 7.0 mmol) and ethyl 3-chloro-3-oxopropanoate (0.6 mL, 4.7 mmol). The reaction mixture was heated at 60° C. in a heating block for 2 h. Additional ethyl 3-chloro-3-oxopropanoate (0.6 mL, 4.7 mmol) and triethylamine (0.98 mL, 7.0 mmol) were added and the reaction mixture was stirred at 60° C. for a further 6 h. The reaction mixture was concentrated in vacuo. Water (20 mL) was added, followed by 10% aq. HCl (10 mL). The aqueous mixture was extracted with EtOAc (3×20 mL). The organic extracts were combined, washed with brine (10 mL), dried (Na₂SO₄) and concentrated in vacuo. Purification by flash chromatography (10 g KP-sil; 0% to 10% MeOH in DCM) afforded the title compound (335 mg, 100%) as an orange solid. LCMS (Method T2) RT 1.55 min; m/z 286.066 [M+H]⁺

Step 3: ethyl 4,6-dichloro-1-(methyl-d₃)-2-oxo-1,2-dihydro-1,8-naphthyridine-3-carboxylate Phosphorus oxychloride (3.5 mL, 37.4 mmol) was added to a flask containing ethyl 6-chloro-4-hydroxy-1-(methyl-d₃)-2-oxo-1,2-dihydro-1,8-naphthyridine-3-carboxylate (from step 2; 335 mg, 1.2 mmol). The flash was fitted with a reflux condenser with a suba-seal and an argon balloon then heated to 80° C. with stirring for 2.5 h. The reaction mixture was cooled to rt and concentrated in vacuo. The crude reaction mixture was dissolved in EtOAc (20 mL) and washed with water (2×10 mL) and saturated aq. NaHCO₃ (10 mL). The aqueous washings were combined and extracted with EtOAc (20 mL). The organic extracts were combined, washed with brine (10 mL), dried (Na₂SO₄) and concentrated in vacuo. Purification by flash chromatography (10 g KP-sil; 0-60% EtOAc in cyclohexane) afforded the title compound (52 mg, 15%) as a yellow solid. ¹H NMR (500 MHz, DMSO-d₆) δ 8.87 (d, J=2.4 Hz, 1H), 8.46 (d, J=2.4 Hz, 1H), 4.38 (q, J=7.1 Hz, 2H), 1.31 (t, J=7.1 Hz, 3H); LCMS (Method T2) RT 1.51 min; m/z 304.0287 [M+H]⁺

Intermediate L1a and Intermediate L1b represent a pair of enantiomers where one is the (R)- and the other is the (S)-methyl-piperidine. It has not been determined which is the (R)- and which is the (S)-enantiomer. The compounds were separated by preparative chiral SFC during Step 3 using the method described below.

Intermediate L1a and Intermediate L1b: (S)-5-chloro-2-(4,4-difluoro-3-methylpiperidin-1-yl)pyrimidin-4-ol and (R)-5-chloro-2-(4,4-difluoro-3-methylpiperidin-1-yl)pyrimidin-4-ol

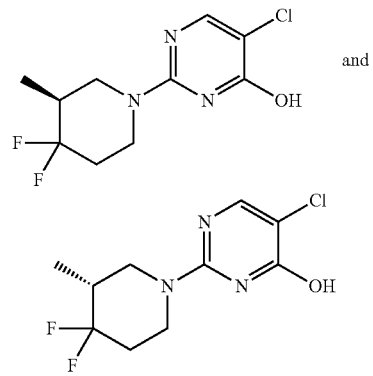

Step 1: 2,5-dichloropyrimidin-4-ol

2 M sodium hydroxide (6 mL, 12 mmol) was added to a stirred solution of 2,4,5-trichloropyrimidine (1.29 g, 7.0 mmol) in THF (4 mL). The reaction mixture was stirred at rt for 24 h. The reaction mixture was concentrated in vacuo and the aqueous mixture was neutralised with 3 M HCl. The aqueous mixture was extracted with Et₂O (2×10 mL) followed by EtOAc (2×10 mL). The organic extracts were combined, washed with brine (10 mL), dried (Na₂SO₄) and concentrated in vacuo affording 2,5-dichloropyrimidin-4-ol (923 mg, 80%) as a yellow solid which was used without further purification. ¹H NMR (500 MHz, DMSO-d₆) δ 8.26 (s, 1H); LCMS (Method T2) RT 0.19 min; m/z 164.9602 [M+H]⁺

Step 2: rac-5-chloro-2-(4,4-difluoro-3-methylpiperidin-1-yl)pyrimidin-4-ol

A microwave vial (10-20 mL volume) was charged with 2,5-dichloropyrimidin-4-ol (from step 1; 502 mg, 3.0 mmol) and rac-4,4-difluoro-3-methylpiperidine hydrochloride (522 mg, 3.0 mmol). The reaction vial was flushed with Ar, sealed with a cap and then further flushed with Ar. Ethanol (5 mL) was added followed by DIPEA (1.4 mL, 8.0 mmol). The reaction mixture was heated at 80° C. in a heating block for 10 h. The reaction mixture was concentrated in vacuo. The residue was dissolved in DMSO (1 mL) and directly purified by reverse-phase chromatography (Biotage reverse-phase 12 g C-18 column; 25-80% MeOH in H₂O (containing 0.1% formic acid)) affording rac-5-chloro-2-(4,4-difluoro-3-methylpiperidin-1-yl)pyrimidin-4-ol (264 mg, 33%) as an off-white solid. ¹H NMR (600 MHz, CDCl₃) δ 12.18 (br s, 1H), 7.89 (s, 1H), 4.49-4.41 (m, 1H), 4.34-4.27 (m, 1H), 3.37-3.30 (m, 1H), 3.08 (dd, J=13.8, 10.9 Hz, 1H), 2.26-2.17 (m, 1H), 2.17-2.08 (m, 1H), 2.02-1.89 (m, 1H), 1.16 (d, J=6.8 Hz, 3H); LCMS (Method T2) RT 1.21 min; m/z 264.0675 [M+H]⁺

Step 3: (S)-5-chloro-2-(4,4-difluoro-3-methylpiperidin-1-yl)pyrimidin-4-ol and (R)-5-chloro-2-(4,4-difluoro-3-methylpiperidin-1-yl)pyrimidin-4-ol rac-5-Chloro-2-(4,4-difluoro-3-methylpiperidin-1-yl)pyrimidin-4-ol (250 mg) was dissolved to 25 mg/mL in MeOH:

CH$_2$Cl$_2$ (4:1) (1% v/v NH$_3$) and was then purified by SFC (Amy-C (20 mm×250 mm, 5 μm), 10:90 MeOH:CO$_2$ (0.2% v/v NH$_3$); flow rate 50 mLmin$^{-1}$). The earlier eluting enantiomer was identified as Intermediate L1a and the later eluting enantiomer was identified as Intermediate L1b. Combined fractions of Intermediate L1a were concentrated in vacuo before being stored in a vacuum oven at 35° C. and 5 mbar affording Intermediate L1a (85 mg) as a white solid. Combined fractions of Intermediate L1b were concentrated in vacuo and re-purified and isolated as above to afford Intermediate L1b (68 mg) as a white solid.

Chiral purity analysis was determined by SFC (Amy-C (4.6 mm×250 mm, 5 m), 10:90 MeOH:CO$_2$ (0.2% v/v NH$_3$); flow rate 4 mLmin$^{-1}$). Intermediate L1a: ee=99.2%; RT 3.58 min. Intermediate L1b: ee=99.0%; RT 3.83 min.

Intermediate L2a: (S)-4,5-dichloro-2-(4,4-difluoro-3-methylpiperidin-1-yl)pyrimidine or (R)-4,5-dichloro-2-(4,4-difluoro-3-methylpiperidin-1-yl)pyrimidine

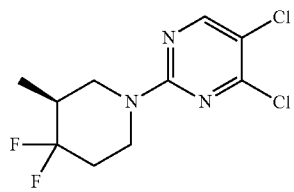

or

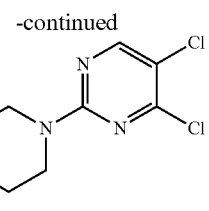

To a vial containing (S)-5-chloro-2-(4,4-difluoro-3-methylpiperidin-1-yl)pyrimidin-4-ol or (R)-5-chloro-2-(4,4-difluoro-3-methylpiperidin-1-yl)pyrimidin-4-ol (Intermediate L1a; 43 mg, 0.16 mmol) was added POCl$_3$ (0.6 mL, 6.4 mmol) and the vial was sealed and heated to 90° C. for 3 h. The excess POCl$_3$ was removed in vacuo, and the residue was partitioned between water and EtOAc. The layers were separated and the organic layer was dried (MgSO$_4$), and concentrated in vacuo to give the title compound (41 mg, 89%) as a colourless oil which was used without further purification. $^1$H NMR (500 MHz, CDCl$_3$) δ 8.22 (s, 1H), 4.56-4.50 (m, 1H), 4.47-4.41 (m, 1H), 3.40-3.33 (m, 1H), 3.11-3.04 (m, 1H), 2.21-2.11 (m, 1H), 2.11-1.98 (m, 1H), 1.96-1.82 (m, 1H), 1.09 (d, J=6.8 Hz, 3H); LCMS (Method T2); RT 1.71 min; m/z 282 [M+H]$^+$.

The following tabulated examples were prepared by a method analogous to that used for the preparation of Intermediate L2a, starting from the aryl sulfide shown in the table.

| Intermediate | Data and comments | Pyrimidin-4-ol |
|---|---|---|
| Intermediate L2b: (R)-4,5-dichloro-2-(4,4-difluoro-3-methylpiperidin-1-yl)pyrimidine or (S)-4,5-dichloro-2-(4,4-difluoro-3-methylpiperidin-1-yl)pyrimidine | LCMS (Method T2); RT 1.71 min; m/z 282 [M + H]$^+$. | Intermediate L1b: (R)-5-chloro-2-(4,4-difluoro-3-methylpiperidin-1-yl)-pyrimidin-4-ol or (S)-5-chloro-2-(4,4-difluoro-3-methylpiperidin-1-yl)pyrimidin-4-ol |

Intermediate M1a: (3R,5S)-1-benzyl-5-methylpiperidin-3-ol [and Intermediate M1b: (3S,5R)-1-benzyl-methylpiperidin-3-ol]

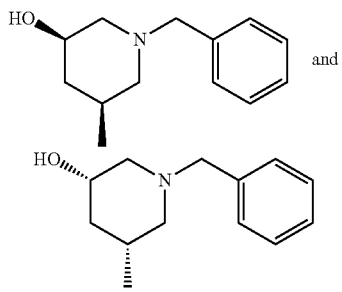

The commercially available rac-1-benzyl-5-methylpiperidin-3-ol. HCl (10 g) was dissolved to 66 mg/mL in 2:1 MeOH:DCM and was then purified by SFC (Phenomenex Lux Amylose-1 (30 mm×250 mm, 5 m), 10:90 MeOH:$CO_2$ (0.2% v/v DEA; flow rate 50 ml min$^{-1}$; 40° C.; 1.7 mL per injection). The earlier eluting enantiomer was assigned as Intermediate M1a and the later eluting enantiomer was assigned as Intermediate M1b. Combined fractions of Intermediate M1a were evaporated to dryness using a rotary evaporator, redissolved in DCM, precipitated with heptane and solvents removed using a rotary evaporator, before being stored in a vacuum oven at 35° C. and 5 mbar until constant weight. This gave Intermediate M1a (3.61 g) as a white solid. Combined fractions of Intermediate M1b were evaporated to dryness using a rotary evaporator, redissolved in DCM, washed with water, dried over magnesium sulfate, precipitated with heptane and solvents removed using a rotary evaporator, before being stored in a vacuum oven at 35° C. and 5 mbar until constant weight. This gave Intermediate M1b (3.26 g) as a white solid. Small molecule X-ray of intermediate M1b, recrystallized from ether/DCM gave an assignment of this isomer as (3S,5R)-1-benzyl-5-methylpiperidin-3-ol. Intermediate M1a was therefore assigned as the (3R,5S)-1-benzyl-5-methylpiperidin-3-ol isomer. Analysis of chiral purity was carried out using SFC [YMC Chiral ART Amylose-C, (4.6 mm×250 mm, 5 μm), 10:90 MeOH:$CO_2$ (0.2% v/v DEA); flow rate 4 mLmin$^{-1}$). Intermediate M1a: rt 2.19 min, other isomer not detected. Intermediate M1b: rt 3.00 min, ee=99%.

Intermediate M2a: (3R,5S)-5-methylpiperidin-3-ol

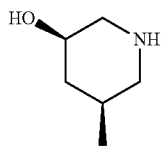

To a solution of (3R,5S)-1-benzyl-5-methylpiperidin-3-ol (Intermediate M1a, 1.5 g, 0.73 mmol) in ethanol (120 mL) under argon was added Pd/C (10 wt %; 778 mg). The flask was evacuated and back-filled with hydrogen twice before being stirred at room temperature under a hydrogen balloon for 1 h. The reaction was filtered through celite (eluent methanol) and the filtrate was concentrated in vacuo to give the title compound (814 mg, 97%) as a white solid which was used without further purification. $^1$H NMR (500 MHz, methanol-$d_4$) b 3.62-3.53 (m, 1H), 3.12-3.05 (m, 1H), 2.91-2.83 (m, 1H), 2.22 (dd, J=11.8, 10.5 Hz, 1H), 2.08-2.00 (m, 2H), 1.69-1.56 (m, 1H), 0.96 (td, J=12.1, 11.0 Hz, 1H), 0.91 (d, J=6.7 Hz, 3H); LCMS (Method T4) RT 0.14 min; m/z 116.1216 [M+H]$^+$.

Biological Assays
HTRF Assay

Assays were performed in a 384-well black Proxiplate (Perkin Elmer) containing 1 nM Trx-6×His-BCL6 (in house-produced, human BCL6 BTB domain covering amino-acid sequence 5-129), 300 nM BCOR-AF633 peptide (RSEII-STAPSSWVVPGP-Cys-AlexaFluor 633-amide, Cambridge Research Biochemical) and 0.5 nM anti-6×His-Terbium cryptate (CisBio Bioassays, France), in assay buffer (25 mM Hepes pH8, 100 mM NaCl, 0.05% Tween20, 0.5 mM TCEP, 0.05% bovine serum albumin). Test compounds in DMSO or DMSO alone were added to the wells using an ECHO550 acoustic dispenser (Labcyte Inc) to give the appropriate test concentration in 0.7% v/v DMSO final. After 2 hours incubation at room temperature the plate was read on a Pherastar FSX (BMG Labtech) plate reader equipped with 337 nm laser excitation filter, a first emission filter at 620 nm and a second emission filter at 665 nm. The % inhibition at each concentration was calculated by normalising FRET ratio to the appropriate high (DMSO with all reagents) and low (DMSO without BCL6) controls. The compound IC50s were determined using GraphPad Prism 6.0 or Dotmatics (Bishops Stortford, UK) software by fitting the normalised data to a sigmoidal four-parameter logistic fit equation.

The results of this assay are shown in Table 1 above.

Mesoscale Discovery (MSD) Degradation Assay

An MSD assay was developed for screening of compounds to determine the degradation of endogenous BCL6 in OCI-Ly1 cells. Briefly, test compounds in DMSO or DMSO alone to a total of 1332.5 nL/well were dispensed to a 96-well Nunc™ Edge 2 plate (ThermoFisher Scientific, 267544) using an Echo® 550 acoustic dispenser (Labcyte Inc) to give the appropriate test concentration in 0.67% v/v DMSO final. OCI-Ly1 passaged in Iscove's Modified Dulbecco's Medium (IMDM, ThermoFisher Scientific, 12440053) supplemented with 10% heat-inactivated fetal bovine serum (Sera Plus, PAN Biotech, P30-3702) were added to the compound/DMSO at a density of 2.5×105 cells/mL in 200 μL media/well. After 2 hours incubation at 37° C.+5% CO2 the plate was centrifuged at 300×g for 5 minutes. Using a BioTek 405TS plate washer for all wash and aspiration steps, media was removed and cells were rinsed with PBS, centrifuged as before and PBS removed. Cells were lysed in 50 μL ice-cold lysis buffer at pH 7.4 containing 50 mM Tris-HCl, 150 mM NaCl, 1% Triton X-100 (v/v), 1 mM PMSF, 1 mM activated sodium vanadate, 1 mM EDTA, phosphatase inhibitors 2 and 3 (1:50 dilution) and protease inhibitor cocktail (1:100 dilution). The plate was shaken briefly and incubated on ice for 5-10 minutes before being frozen overnight at −20° C. or continuing the assay. A 96-well MSD standard bind plate (MSD, L15XA-3) which was coated overnight with 1 μg/mL anti-human BCL6 goat antibody in PBS (R&D Systems, AF5046) was blocked in 3% BSA in TBS+0.1% Tween-20 for 1 hour with shaking. Wells were emptied thoroughly before 40 μL/well of lysate was transferred from the cell plate. The MSD plate was incubated at RT for 1 hour with shaking then washed three times with TBS+0.1% Tween-20. Antibodies were prepared in TBS+0.1% Tween-20+1% BSA. Anti-human BCL6 rabbit antibody (Cell Signalling Technology, 14895S) was added at 1:100 dilution at 25 μL/well. The plate was incubated and washed as before. MSD Sulfo-tag anti-rabbit detection antibody (MSD, R32AB-1) at 1:1000 dilution at 25 µL/well was added. The plate was incubated and washed as before and MSD Gold read buffer (MSD R92TG) at 1:1 dilution with water at 150 µL/well was added. The plate was read within 10 minutes on the MSD Quickplex reader. The % inhibition at each concentration was calculated by normalising the electrochemiluminescent signal to the appropriate high (DMSO) and low ((5-((5-chloro-2-((3R,5S)-4,4-difluoro-3,5-dimethylpiperidin-1-yl)pyrimidin-4-yl)amino)-3-(3-hydroxy-3-methylbutyl)-1-methyl-1,3-dihydro-2H-benzo[d]imidazol-2-one) at 2 µM) controls. DC50 values (compound concentration at which 50% of endogenous BCL6 protein is degraded) were determined using GraphPad Prism 6.0 or Dotmatics (Bishops Stortford, UK) software by fitting the normalised data to a sigmoidal four-parameter logistic fit equation.

The results obtained using this assay are shown in Table 2 above.

Mouse Splenocyte Flow Cytometry Immunology Experiments

Male C57BL/6 mice were immunised in both flanks subcutaneously with CFA (100 µl of 4 mg/ml CFA). On day 8 the animals were terminated, spleens harvested and processed to single cell suspensions.

Splenocytes were resuspended in complete media (RPMI 1640+10% foetal calf serum, supplemented with 4 mM L-glutamine, 100 U/ml-100 µg/ml) penicillin/streptomycin and 50 µM B-mercaptoethanol (Gibco)). The cells were activated for 48 hours with 2 µg/ml αCD40 (ThermoFisher)+0.002 g/ml IL-4 (Bio-techne) at 37° C. in a humidified $CO_2$ incubator. Example 4b was added at the same time as activation in an 8-point dose titration. Following the culture period, cells were collected, washed with PBS (Gibco) and selected wells were counted using a LUNA™ Counter (Logos Biosystems).

Harvested cells were washed in PBS (Gibco) and stained with Invitrogen™ eBioscience™ Fixable Viability Dye eFluor 780 (Fisher scientific), then FcR blocked (Miltenyi Biotec) and stained with surface receptor antibodies (see Table 3 below). Cells were then washed in flow cytometry buffer (PBS supplemented with 1% BSA and 0.05% azide) and the secondary streptavidin was added. Cells were then washed, fixed and permeabilised in Transcription factor staining buffer (Fisher scientific); according to the manufacturer's instructions. Intracellular antibodies were then added to the samples. Following final washes, cells were fixed in 1% PFA and acquired on a BD LSR Fortessa™ (BD Bioscience). All analysis was carried out using FlowJo software v10.

TABLE 3 surface receptor antibody stains

| Antibody | Fluorochrome | Clone | Supplier |
| --- | --- | --- | --- |
| CD19 | BV785 | 1D3 | BD |
| CD4 | BUV395 | GK1.5 | BD |
| Bcl6 | PEDazzle | K112-91 | BD |
| Blimp-1 | AF647 | 5 e 7 | BD |
| CD20 | Percpcy5.5 | SA275A11 | Biolegend |
| CD95 | BV605 | SA367H8 | Biolegend |
| GL7 | Biotin | GL7 | Biolegend |

In order to test the hypothesis that degradation or inhibition of Bcl6 may be able to modulate primary cells of the immune system, resulting in a decrease in their potential to generate autoantibodies, the above experiment was performed. Mice were immunised in order to drive the generation of germinal centre (GC) B cells. Spleens were then cultured in the presence or absence of a Bcl6 inhibitor (Example 4b) for 48 hours and non-GC B cells or GC B cells were identified using flow cytometry (FIG. 1).

Figure 2:
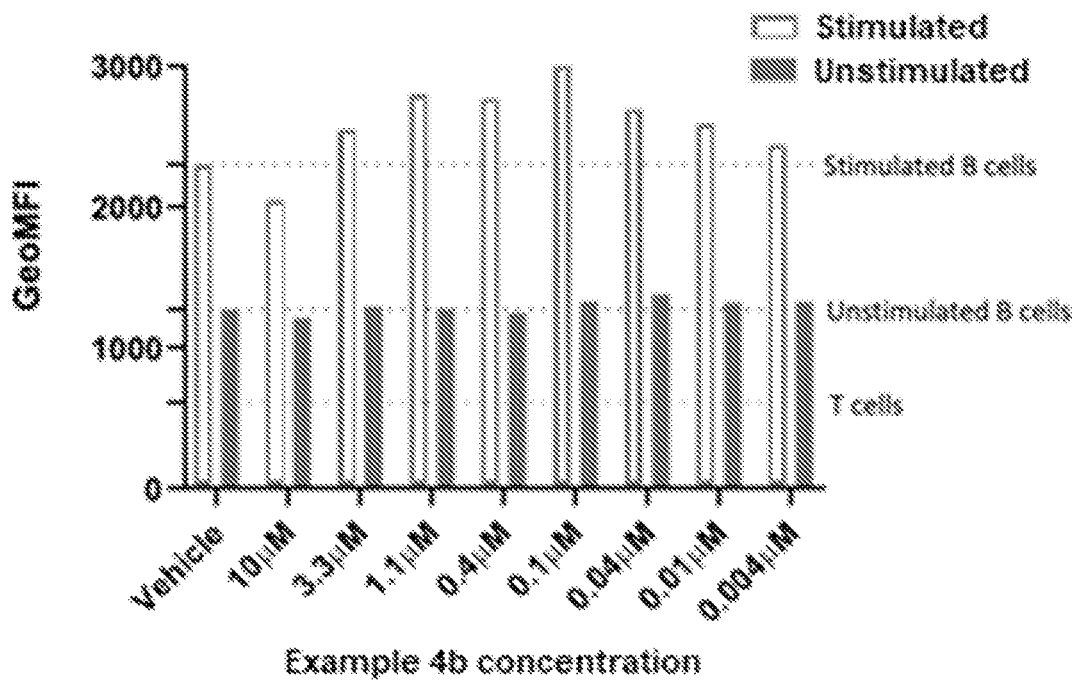
Figure 3:
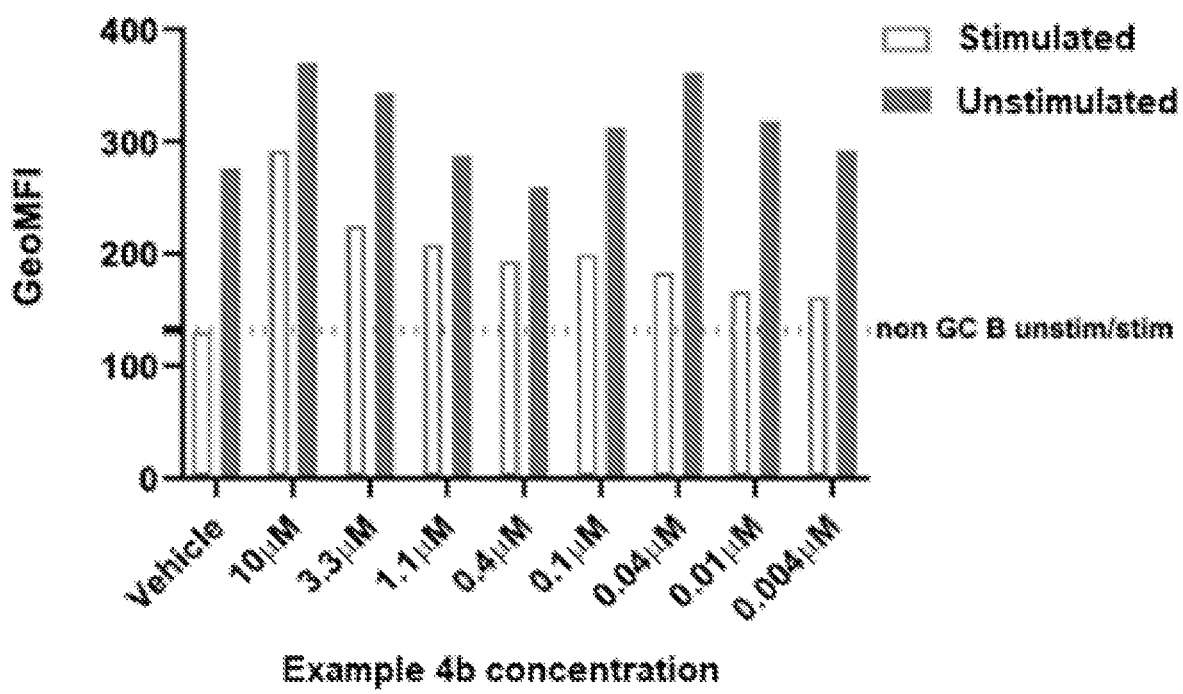
FIG. 3 shows the flow cytometry expression levels of Blimp (geometric mean fluorescence intensity—GeoMFI) in GC B cells, without (vehicle) or with Example 4b at various concentrations. Unstimulated and stimulated non-GC B cell Blimp expression is indicated with the dashed line.

As expected the addition of the Bcl6 inhibitor did not result in a reduction of BCL6 expression in non-GC B cells (FIG. 2), whereas it did result in an increase in Blimp expression by GC B cells (FIG. 3). Blimp is involved in the repression of B cell metabolism and GC B cell formation. It blocks antibody class switching and antigen presentation by B cells.

Figure 4:
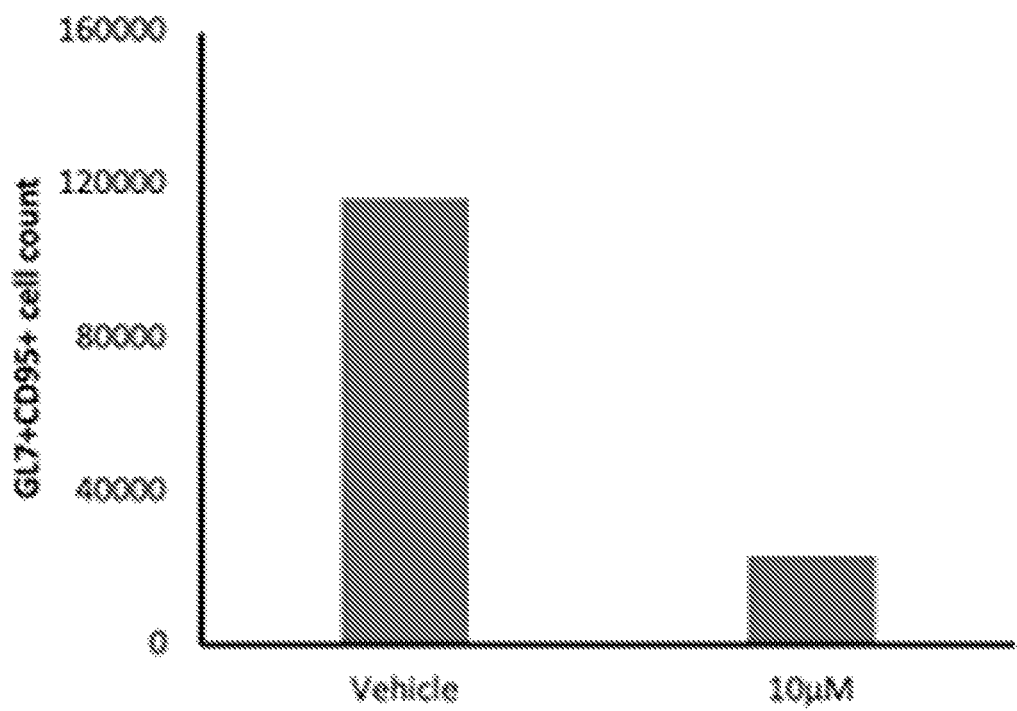
FIG. 4 shows the number of GC B cells as defined by the expression of the lineage markers GL7 and CD95 on CD19+ CD21+ spleen cells without (vehicle) or with Example 4b (at 10 µM).

The addition of the Bcl6 inhibitor to spleen cell cultures decreased the numbers of GC B cells as determined by expression of the lineage markers GL7 and CD95 (FIG. 4).

The invention claimed is:

1. A compound, or a pharmaceutically acceptable salt or solvate thereof, selected from:

(S)-10-((5-chloro-2-(3,3-difluoroazetidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-(4-cyclopropyl-3-oxopiperazin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((S)-3,4-dimethyl-5-oxopiperazin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((2-hydroxy-2-methylpropyl)amino)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((2-((1R,4R)-2-oxa-5-azabicyclo[2.2.1]heptan-5-yl)-5-chloropyrimidin-4-yl)amino)-2-cyclopropyl-3,3-difluoro-7-methyl-1,2,3,4-tetrahydro-[1,4]oxazepino[2,3-c]quinolin-6 (7H)-one;

N-((3S,5R)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)-5-methylpiperidin-3-yl) acetamide;

N-((3R,5S)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)-5-methylpiperidin-3-yl) acetamide;

(S)-10-((5-chloro-2-((3S,5R)-3-(dimethylamino)-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((S)-3-hydroxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((R)-3-hydroxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((S)-3-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((R)-3-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-(3-fluoro-3-methylazetidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-(3-hydroxy-3-methylazetidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-2-cyclopropyl-3,3-difluoro-10-((5-fluoro-2-((3R,5S)-3-hydroxy-5-methylpiperidin-1-yl)pyrimidin-4-yl)amino)-7-methyl-1,2,3,4-tetrahydro-[1,4]oxazepino[2,3-c]quinolin-6 (7H)-one;

(S)-2-cyclopropyl-10-((2-(4,4-difluoropiperidin-1-yl)-5-fluoropyrimidin-4-yl)amino)-3,3-difluoro-7-methyl-1,2,3,4-tetrahydro-[1,4]oxazepino[2,3-c]quinolin-6 (7H)-one;

(S)-10-((2-(3-oxa-8-azabicyclo[3.2.1]octan-8-yl)-5-chloropyrimidin-4-yl)amino)-2-cyclopropyl-3,3-difluoro-7-(methyl-d3)-1,2,3,4-tetrahydro-[1,4]oxazepino[2,3-c][1,8]naphthyridin-6 (7H)-one;

(S)-10-((5-chloro-2-(3-methyl-1,2,4-oxadiazol-5-yl)pyridin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((3-chloro-2-fluoropyridin-4-yl)amino)-2-cyclopropyl-3,3-difluoro-7-methyl-1,2,3,4-tetrahydro-[1,4]oxazepino[2,3-c]quinolin-6 (7H)-one;

(S)-2-cyclopropyl-10-((2,3-dichloropyridin-4-yl)amino)-3,3-difluoro-7-methyl-1,2,3,4-tetrahydro-[1,4]oxazepino[2,3-c]quinolin-6 (7H)-one;

(S)-10-((2-chloro-3-fluoropyridin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((3-chloro-2-methylpyridin-4-yl)amino)-2-cyclopropyl-3,3-difluoro-7-methyl-1,2,3,4-tetrahydro-[1,4]oxazepino[2,3-c]quinolin-6 (7H)-one;

(S)-2-cyclopropyl-3,3-difluoro-10-((5-fluoro-2-((1R,5S,7R)-7-hydroxy-3-oxa-9-azabicyclo[3.3.1]nonan-9-yl)pyrimidin-4-yl)amino)-7-methyl-1,2,3,4-tetrahydro-[1,4]oxazepino[2,3-c]quinolin-6 (7H)-one;

(S)-10-((5-chloropyrimidin-4-yl)amino)-2-cyclopropyl-3,3-difluoro-7-methyl-1,2,3,4-tetrahydro-[1,4]oxazepino[2,3-c]quinolin-6 (7H)-one;

(2S)-10-((2-(3-acetyl-3,8-diazabicyclo[3.2.1]octan-8-yl)-5-chloropyrimidin-4-yl)amino)-2-cyclopropyl-3,3-difluoro-7-methyl-1,2,3,4-tetrahydro-[1,4]oxazepino[2,3-c]quinolin-6 (7H)-one;

(2S)-10-((2-(8-acetyl-3,8-diazabicyclo[3.2.1]octan-3-yl)-5-chloropyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-(dimethylamino)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((3S,5R)-3-fluoro-5-hydroxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((3R,5S)-3-fluoro-5-hydroxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((S)-3-((dimethylamino)methyl)piperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(3R,5S)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)-N-ethyl-5-methylpiperidine-3-carboxamide;

(3S,5R)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)-N-ethyl-5-methylpiperidine-3-carboxamide;

(S)-10-((5-chloro-2-((3R,5S)-3-(hydroxymethyl)-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((3S,5R)-3-(hydroxymethyl)-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((R)-4,4-difluoro-3-hydroxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((S)-4,4-difluoro-3-hydroxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((R)-3-(fluoromethyl) piperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((S)-3-(fluoromethyl) piperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

2-((R)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl) piperidin-3-yl) acetamide;

2-((S)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl) piperidin-3-yl) acetamide;

(S)-10-((5-chloro-2-((S)-3-(dimethylamino) piperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((R)-3-(dimethylamino) piperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(R)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)-N-ethyl-4,4-difluoropiperidine-3-carboxamide;

(S)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)-N-ethyl-4,4-difluoropiperidine-3-carboxamide;

N-(((R)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)-4,4-difluoropiperidin-3-yl)methyl)-N-ethylacetamide;

N-(((S)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)-4,4-difluoropiperidin-3-yl)methyl)-N-ethylacetamide;

(S)-10-((5-chloro-2-((1R,4R)-5,5-difluoro-2-azabicyclo[2.2.1]heptan-2-yl)pyrimidin-4-yl)amino)-2-cyclopropyl-3,3-difluoro-7-methyl-1,2,3,4-tetrahydro-[1,4]
oxazepino[2,3-c]quinolin-6 (7H)-one;
(S)-10-((5-chloro-2-((1S,4S)-5,5-difluoro-2-azabicyclo
[2.2.1]heptan-2-yl)pyrimidin-4-yl)amino)-2-cyclopropyl-3,3-difluoro-7-methyl-1,2,3,4-tetrahydro-[1,4]
oxazepino[2,3-c]quinolin-6 (7H)-one;
N-((R)-1-(5-chloro-4-(((S)-2-cyclopropyl-3,3-difluoro-7-methyl-6-oxo-1,2,3,4,6,7-hexahydro-[1,4]oxazepino
[2,3-c]quinolin-10-yl)amino)pyrimidin-2-yl)-4,4-difluoropiperidin-3-yl)-N-methylacetamide;
N-((S)-1-(5-chloro-4-(((S)-2-cyclopropyl-3,3-difluoro-7-methyl-6-oxo-1,2,3,4,6,7-hexahydro-[1,4]oxazepino
[2,3-c]quinolin-10-yl)amino)pyrimidin-2-yl)-4,4-difluoropiperidin-3-yl)-N-methylacetamide;
(S)-10-((5-chloro-2-(4-fluoro-4-(hydroxymethyl) piperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;
(S)-10-((5-chloro-2-((R)-3-(hydroxymethyl) piperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;
(S)-10-((5-chloro-2-((S)-3-(hydroxymethyl) piperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;
(S)-10-((5-chloro-2-((1S,5R)-3-ethyl-2-oxo-3,8-diazabicyclo[3.2.1]octan-8-yl)pyrimidin-4-yl)amino)-2-cyclopropyl-3,3-difluoro-7-methyl-1,2,3,4-tetrahydro-[1,4]
oxazepino[2,3-c]quinolin-6 (7H)-one;
(S)-10-((5-chloro-2-((1R,5S)-3-ethyl-2-oxo-3,8-diazabicyclo[3.2.1]octan-8-yl)pyrimidin-4-yl)amino)-2-cyclopropyl-3,3-difluoro-7-methyl-1,2,3,4-tetrahydro-[1,4]
oxazepino[2,3-c]quinolin-6 (7H)-one;
(S)-10-((5-chloro-2-((3S,5R)-3,5-difluoropiperidin-1-yl)
pyrimidin-4-yl)amino)-2-cyclopropyl-3,3-difluoro-7-methyl-1,2,3,4-tetrahydro-[1,4]oxazepino[2,3-c]quinolin-6 (7H)-one;
(S)-10-((2-(6-acetyl-2,6-diazaspiro[3.3]heptan-2-yl)-5-chloropyrimidin-4-yl)amino)-2-cyclopropyl-3,3-difluoro-7-methyl-1,2,3,4-tetrahydro-[1,4]oxazepino[2,3-c]quinolin-6 (7H)-one;
(S)-10-((5-chloro-2-((2-hydroxy-2-methylpropyl)
(methyl)amino)pyrimidin-4-yl)amino)-2-cyclopropyl-3,3-difluoro-7-methyl-1,2,3,4-tetrahydro-[1,4]oxazepino[2,3-c]quinolin-6 (7H)-one;
(S)-10-((5-chloro-2-((3-hydroxy-3-methylbutyl)(methyl)
amino)pyrimidin-4-yl)amino)-2-cyclopropyl-3,3-difluoro-7-methyl-1,2,3,4-tetrahydro-[1,4]oxazepino[2,3-c]quinolin-6 (7H)-one;
(S)-10-((5-chloro-2-(6-(cyclopropylmethyl)-2,6-diazaspiro[3.3]heptan-2-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;
(2S)-10-((5-chloro-2-(6-((2,2-difluorocyclopropyl)
methyl)-2,6-diazaspiro[3.3]heptan-2-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;
(2S)-10-((5-chloro-2-(8-(cyclopropylmethyl)-3,8-diazabicyclo[3.2.1]octan-3-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;
(2S)-10-((5-chloro-2-(8-((2,2-difluorocyclopropyl)
methyl)-3,8-diazabicyclo[3.2.1]octan-3-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;
(S)-10-((5-chloro-2-((3R,5R)-3-hydroxy-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;
(S)-10-((5-chloro-2-((3S,4R)-3,4-difluoropiperidin-1-yl)
pyrimidin-4-yl)amino)-2-cyclopropyl-3,3-difluoro-7-methyl-1,2,3,4-tetrahydro-[1,4]oxazepino[2,3-c]quinolin-6 (7H)-one;
(S)-10-((5-chloro-2-((3R,4S)-3,4-difluoropiperidin-1-yl)
pyrimidin-4-yl)amino)-2-cyclopropyl-3,3-difluoro-7-methyl-1,2,3,4-tetrahydro-[1,4]oxazepino[2,3-c]quinolin-6 (7H)-one;
(S)-10-((5-chloro-2-((3S,4S)-3,4-difluoropiperidin-1-yl)
pyrimidin-4-yl)amino)-2-cyclopropyl-3,3-difluoro-7-methyl-1,2,3,4-tetrahydro-[1,4]oxazepino[2,3-c]quinolin-6 (7H)-one;
(S)-10-((5-chloro-2-((3R,4R)-3,4-difluoropiperidin-1-yl)
pyrimidin-4-yl)amino)-2-cyclopropyl-3,3-difluoro-7-methyl-1,2,3,4-tetrahydro-[1,4]oxazepino[2,3-c]quinolin-6 (7H)-one;
(S)-10-((5-chloro-2-((R)-3-methoxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;
(S)-10-((5-chloro-2-((S)-3-methoxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;
(S)-10-((5-fluoro-2-((3S,4R)-3,4-difluoropiperidin-1-yl)
pyrimidin-4-yl)amino)-2-cyclopropyl-3,3-difluoro-7-methyl-1,2,3,4-tetrahydro-[1,4]oxazepino[2,3-c]quinolin-6 (7H)-one;
(S)-10-((5-fluoro-2-((3R,4S)-3,4-difluoropiperidin-1-yl)
pyrimidin-4-yl)amino)-2-cyclopropyl-3,3-difluoro-7-methyl-1,2,3,4-tetrahydro-[1,4]oxazepino[2,3-c]quinolin-6 (7H)-one;
(2S)-10-[[5-chloro-2-(4-methyl-1,4-diazepan-1-yl)pyrimidin-4-yl]amino]-2-cyclopropyl-3,3-difluoro-7-methyl-2,4-dihydro-1H-[1,4]oxazepino[2,3-c]quinolin-6-one;
(S)-10-((5-chloro-2-((R)-3-ethylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;
(S)-10-((5-chloro-2-((S)-3-ethylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;
(S)-10-((5-chloro-2-((R)-3-methylazepan-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;
(S)-10-((5-chloro-2-((S)-3-methylazepan-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;
(S)-10-((5-chloro-2-((R)-4-methylazepan-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;
(S)-10-((5-chloro-2-((S)-4-methylazepan-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((3R,5S)-3,5-dihydroxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((1R,5R)-1-(hydroxymethyl)-5-methyl-3-azabicyclo[3.1.0]hexan-3-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((1S,5S)-1-(hydroxymethyl)-5-methyl-3-azabicyclo[3.1.0]hexan-3-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((3R,5R)-3-fluoro-5-hydroxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((3S,5S)-3-fluoro-5-hydroxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((R)-7-hydroxy-5-azaspiro[2.5]octan-5-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((S)-7-hydroxy-5-azaspiro[2.5]octan-5-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-(methyl(propyl)amino)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((3R,4S)-3-(hydroxymethyl)-4-methylpyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((3S,4R)-3-(hydroxymethyl)-4-methylpyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((2-hydroxyethyl)(propyl)amino)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-(5-azaspiro[2.5]octan-5-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-(((R)-3-methoxy-2-methylpropyl)amino)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-(((S)-3-methoxy-2-methylpropyl)amino)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-(3,3-dimethylazetidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-(3-methylazetidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-1-(5-chloro-4-((2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl) azetidine-3-carbonitrile;

(S)-10-((5-chloro-2-(3-fluoroazetidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((R)-3-(difluoromethyl) piperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((S)-3-(difluoromethyl) piperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-1-(5-chloro-4-((2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)-3-methylazetidine-3-carbonitrile;

(S)-2-(1-(5-chloro-4-((2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl) azetidin-3-yl) acetonitrile;

(S)-10-((5-chloro-2-(3-(difluoromethyl) azetidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((2-(azetidin-1-yl)-5-chloropyrimidin-4-yl) amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-(3-methoxyazetidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-(3-methoxy-3-methylazetidin-1-yl) pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((R)-3-ethylpyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((S)-3-ethylpyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((R)-3-fluoro-3-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((S)-3-fluoro-3-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((R)-3-hydroxy-3-methylpyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((S)-3-hydroxy-3-methylpyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((2-((3S,5R)-3-amino-5-methylpiperidin-1-yl)-5-chloropyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((2-((3R,5S)-3-amino-5-methylpiperidin-1-yl)-5-chloropyrimidin-4-yl)amino)-2-cyclopropyl-3,3-difluoro-7-methyl-1,2,3,4-tetrahydro-[1,4]oxazepino[2,3-c]quinolin-6 (7H)-one;

(2S)-10-((2-(6-oxa-3-azabicyclo[3.1.1]heptan-3-yl)-5-chloropyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((R)-3,3-difluoro-5-hydroxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((S)-3,3-difluoro-5-hydroxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((R)-2-methylthiomorpholino)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((S)-2-methylthiomorpholino)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((R)-4,6-dimethyl-1,4-diazepan-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((S)-4,6-dimethyl-1,4-diazepan-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((S)-hexahydropyrrolo[1,2-a]pyrazin-2 (1H)-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((R)-hexahydropyrrolo[1,2-a]pyrazin-2 (1H)-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((R)-6-oxohexahydropyrrolo[1,2-a]pyrazin-2 (1H)-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((S)-6-oxohexahydropyrrolo[1,2-a]pyrazin-2 (1H)-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((R)-8-hydroxy-6-azaspiro[3.5]nonan-6-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((S)-8-hydroxy-6-azaspiro[3.5]nonan-6-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((3R,5S)-3-hydroxy-5-methylpiperidin-1-yl) pyridin-4-yl)amino)-2-cyclopropyl-3,3-difluoro-7-methyl-1,2,3,4-tetrahydro-[1,4]oxazepino[2,3-c]quinolin-6 (7H)-one;

((S)-10-((5-chloro-2-(4,4-difluoropiperidin-1-yl) pyridin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((S)-4,4-difluoro-3-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((R)-4,4-difluoro-3-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((R)-4,4-difluoro-3-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((S)-4,4-difluoro-3-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((S)-3-methylpyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((R)-3-methylpyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((3R,5S)-3-fluoro-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((3R,5S)-3-methoxy-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(2S)-10-((5-chloro-2-(2,6-dimethylthiomorpholino)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(2S)-10-((5-chloro-2-(3,4-dimethylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(2S)-10-((5-chloro-2-(2,3-dimethylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(2S)-10-((5-chloro-2-(2,6-dimethyl-1-oxidothiomorpholino)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((2R,5S)-2-(hydroxymethyl)-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(2S)-10-((5-chloro-2-(2,6-dimethyl-1,1-dioxidothiomorpholino)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(2S)-10-((5-chloro-2-(2,5-dimethylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((3S,5S)-3-hydroxy-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(2S)-10-((5-chloro-2-(6-hydroxy-1,4-diazepan-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(2S)-10-((2-(3-(2-(azetidin-1-yl)-2-oxoethyl)-5-methylpiperidin-1-yl)-5-chloropyrimidin-4-yl)amino)-2-cyclopropyl-3,3-difluoro-7-methyl-1,2,3,4-tetrahydro-[1,4]oxazepino[2,3-c]quinolin-6 (7H)-one;

(2S)-10-((2-((3S,5R)-3-(2-(azetidin-1-yl)-2-oxoethyl)-5-methylpiperidin-1-yl)-5-chloropyrimidin-4-yl)amino)-2-cyclopropyl-3,3-difluoro-7-methyl-1,2,3,4-tetrahydro-[1,4]oxazepino[2,3-c]quinolin-6 (7H)-one;

(2S)-10-((2-((3R,5S)-3-(2-(azetidin-1-yl)-2-oxoethyl)-5-methylpiperidin-1-yl)-5-chloropyrimidin-4-yl)amino)-2-cyclopropyl-3,3-difluoro-7-methyl-1,2,3,4-tetrahydro-[1,4]oxazepino[2,3-c]quinolin-6 (7H)-one;

(2S)-10-((5-chloro-2-(3-(2-(3,3-difluoroazetidin-1-yl)-2-oxoethyl)-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(2S)-10-((5-chloro-2-((3R,5S)-3-(2-(3,3-difluoroazetidin-1-yl)-2-oxoethyl)-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(2S)-10-((5-chloro-2-((3S,5R)-3-(2-(3,3-difluoroazetidin-1-yl)-2-oxoethyl)-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(2S)-10-((2-(3-(azetidine-1-carbonyl)-4,4-difluoropiperidin-1-yl)-5-chloropyrimidin-4-yl)amino)-2-cyclopropyl-3,3-difluoro-7-methyl-1,2,3,4-tetrahydro-[1,4]oxazepino[2,3-c]quinolin-6 (7H)-one;

(2S)-10-((5-chloro-2-(3-(3,3-difluoroazetidine-1-carbonyl)-4,4-difluoropiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(2S)-10-((5-chloro-2-(3-(2-(3,3-difluoroazetidin-1-yl)-2-oxoethyl)-4,4-difluoropiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(2S)-10-((2-(3-(2-(azetidin-1-yl)-2-oxoethyl)-4,4-difluoropiperidin-1-yl)-5-chloropyrimidin-4-yl)amino)-2-cyclopropyl-3,3-difluoro-7-methyl-1,2,3,4-tetrahydro-[1,4]oxazepino[2,3-c]quinolin-6 (7H)-one;

(2S)-10-((5-chloro-2-(3-ethynylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl) piperidine-3-carbonitrile;

(S)-10-((5-chloro-2-((4,4-difluorocyclohexyl)amino)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(2S)-10-((2-(2-azabicyclo[4.1.0]heptan-2-yl)-5-chloropyrimidin-4-yl)amino)-2-cyclopropyl-3,3-difluoro-7-methyl-1,2,3,4-tetrahydro-[1,4]oxazepino[2,3-c]quinolin-6 (7H)-one;

(2S)-10-((5-chloro-2-(3-(difluoromethyl) piperazin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((3R,5S)-3-(2-(dimethylamino)ethoxy)-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(2S)-10-((2-(3-(azetidine-1-carbonyl)-5-methylpiperidin-1-yl)-5-chloropyrimidin-4-yl)amino)-2-cyclopropyl-3,3-difluoro-7-methyl-1,2,3,4-tetrahydro-[1,4]oxazepino[2,3-c]quinolin-6 (7H)-one;

(2S)-10-((5-chloro-2-(3-(3,3-difluoroazetidine-1-carbonyl)-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-(3-(hydroxymethyl) azetidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(2S)-10-((5-chloro-2-(2-(hydroxymethyl) azetidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((S)-2-(hydroxymethyl) azetidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((R)-2-(hydroxymethyl) azetidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-(3-(fluoromethyl) azetidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(2S)-10-((5-chloro-2-(2-methylazetidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-1-(5-chloro-4-((2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl) piperidine-4-carbonitrile;

1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)-5-fluoro-N,N-dimethylpiperidine-3-carboxamide;

(2S)-10-((5-chloro-2-(3-fluoropiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-(4-fluoropiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((S)-2-(hydroxymethyl) pyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(2S)-10-((5-chloro-2-(2-(methoxymethyl) pyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((S)-2-(methoxymethyl) pyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((R)-2-(methoxymethyl) pyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(2S)-10-((5-chloro-2-(2-(hydroxymethyl)-3-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((S)-4,4-difluoro-2-(hydroxymethyl) pyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(2S)-10-((5-chloro-2-(4-fluoro-2-(hydroxymethyl) pyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((2S,4S)-4-fluoro-2-(hydroxymethyl) pyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((2S,4R)-4-fluoro-2-(hydroxymethyl) pyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(2S)-10-((5-chloro-2-(2-(hydroxymethyl)-3-methylpyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(2S)-10-((5-chloro-2-(4,4-difluoro-2-(hydroxymethyl) piperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(2S)-2-cyclopropyl-10-((2-(4,4-difluoro-3,5-dimethylpiperidin-1-yl)-5-fluoropyrimidin-4-yl)amino)-3,3-difluoro-7-methyl-1,2,3,4-tetrahydro-[1,4]oxazepino[2,3-c]quinolin-6 (7H)-one;

(S)-2-cyclopropyl-3,3-difluoro-10-((5-fluoro-2-morpholinopyrimidin-4-yl)amino)-7-methyl-1,2,3,4-tetrahydro-[1,4]oxazepino[2,3-c]quinolin-6 (7H)-one;

(S)-2-cyclopropyl-3,3-difluoro-10-((5-fluoro-2-((S)-2-methylmorpholino)pyrimidin-4-yl)amino)-7-methyl-1,2,3,4-tetrahydro-[1,4]oxazepino[2,3-c]quinolin-6 (7H)-one;

(S)-10-((2-((1R,5S)-8-oxa-3-azabicyclo[3.2.1]octan-3-yl)-5-fluoropyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-2-cyclopropyl-10-((2-(dimethylamino)-5-fluoropyrimidin-4-yl)amino)-3,3-difluoro-7-methyl-1,2,3,4-tetrahydro-[1,4]oxazepino[2,3-c]quinolin-6 (7H)-one;

(S)-2-cyclopropyl-10-((2-(dimethylamino)-5-chloropyridin-4-yl)amino)-3,3-difluoro-7-methyl-1,2,3,4-tetrahydro-[1,4]oxazepino[2,3-c]quinolin-6 (7H)-one;

(S)-2-cyclopropyl-10-((2-(4,4-difluoropiperidin-1-yl)-5-fluoropyridin-4-yl)amino)-3,3-difluoro-7-methyl-1,2,3,4-tetrahydro-[1,4]oxazepino[2,3-c]quinolin-6 (7H)-one;

(S)-2-cyclopropyl-3,3-difluoro-10-((5-fluoro-2-((3R,5S)-3-hydroxy-5-methylpiperidin-1-yl) pyridin-4-yl)amino)-7-methyl-1,2,3,4-tetrahydro-[1,4]oxazepino[2,3-c]quinolin-6 (7H)-one;

(S)-10-((5-chloro-2-((3S,5R)-3-fluoro-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(2S)-10-((5-chloro-2-(6-hydroxy-4-methyl-1,4-diazepan-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(2S)-10-((5-chloro-2-(3-methyl-5-oxopiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((3R,5S)-3-(3-(dimethylamino) propoxy)-5-methylpiperidin-1-yl)pyrimidin-4-yl) amino)-2-cyclopropyl-3,3-difluoro-7-methyl-1,2,3,4-tetrahydro-[1,4]oxazepino[2,3-c]quinolin-6 (7H)-one;

(2S)-10-((5-chloro-2-(2-(fluoromethyl) azetidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(2S)-10-((5-chloro-2-(4,4-difluoro-3-methoxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(2S)-10-((5-chloro-2-(4,4-difluoro-3-hydroxy-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(2S)-2-cyclopropyl-10-((2-(4,4-difluoro-3-methylpiperidin-1-yl)-5-fluoropyrimidin-4-yl)amino)-3,3-difluoro-7-methyl-1,2,3,4-tetrahydro-[1,4]oxazepino[2,3-c]quinolin-6 (7H)-one;

(S)-2-cyclopropyl-3,3-difluoro-10-((5-fluoro-2-((R)-2-methylmorpholino)pyrimidin-4-yl)amino)-7-methyl-1,2,3,4-tetrahydro-[1,4]oxazepino[2,3-c]quinolin-6 (7H)-one;

(2S)-10-((2-(6-oxa-3-azabicyclo[3.1.1]heptan-3-yl)-5-fluoropyrimidin-4-yl)amino)-2-cyclopropyl-3,3-difluoro-7-methyl-1,2,3,4-tetrahydro-[1,4]oxazepino[2,3-c]quinolin-6 (7H)-one;

(2S)-2-cyclopropyl-10-((2-(4,4-difluoro-3-(hydroxymethyl) piperidin-1-yl)-5-fluoropyrimidin-4-yl)amino)-3,3-difluoro-7-methyl-1,2,3,4-tetrahydro-[1,4]oxazepino[2,3-c]quinolin-6 (7H)-one;

(2S)-2-cyclopropyl-10-((2-(4,4-difluoro-3,5-dimethylpiperidin-1-yl)-5-chloropyridin-4-yl)amino)-3,3-difluoro-7-methyl-1,2,3,4-tetrahydro-[1,4]oxazepino[2,3-c]quinolin-6 (7H)-one;

(2S)-2-cyclopropyl-10-((2-(4,4-difluoro-3-methylpiperidin-1-yl)-5-chloropyridin-4-yl)amino)-3,3-difluoro-7-methyl-1,2,3,4-tetrahydro-[1,4]oxazepino[2,3-c]quinolin-6 (7H)-one;

(2S)-2-cyclopropyl-10-((2-(3,4-difluoropiperidin-1-yl)-5-chloropyridin-4-yl)amino)-3,3-difluoro-7-methyl-1,2,3,4-tetrahydro-[1,4]oxazepino[2,3-c]quinolin-6 (7H)-one;

(S)-2-cyclopropyl-3,3-difluoro-10-((5-chloro-2-morpholinopyridin-4-yl)amino)-7-methyl-1,2,3,4-tetrahydro-[1,4]oxazepino[2,3-c]quinolin-6 (7H)-one;

(S)-2-cyclopropyl-3,3-difluoro-10-((5-chloro-2-((R)-2-methylmorpholino)pyridin-4-yl)amino)-7-methyl-1,2,3,4-tetrahydro-[1,4]oxazepino[2,3-c]quinolin-6 (7H)-one;

(S)-2-cyclopropyl-3,3-difluoro-10-((5-chloro-2-((S)-methylmorpholino)pyridin-4-yl)amino)-7-methyl-1,2,3,4-tetrahydro-[1,4]oxazepino[2,3-c]quinolin-6 (7H)-one;

(2S)-10-((2-(6-oxa-3-azabicyclo[3.1.1]heptan-3-yl)-5-chloropyridin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((2-((1R,5S)-3-oxa-8-azabicyclo[3.2.1]octan-8-yl)-5-chloropyridin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((2-((1R,5S)-8-oxa-3-azabicyclo[3.2.1]octan-3-yl)-5-chloropyridin-4-yl)amino)-2-cyclopropyl-3,3-difluoro-7-methyl-1,2,3,4-tetrahydro-[1,4]oxazepino[2,3-c]quinolin-6 (7H)-one;

(2S)-2-cyclopropyl-10-((2-(4,4-difluoro-3-(hydroxymethyl) piperidin-1-yl)-5-chloropyridin-4-yl)amino)-3,3-difluoro-7-methyl-1,2,3,4-tetrahydro-[1,4]oxazepino[2,3-c]quinolin-6 (7H)-one;

(2S)-2-cyclopropyl-10-((2-(4,4-difluoro-3,5-dimethylpiperidin-1-yl)-5-fluoropyridin-4-yl)amino)-3,3-difluoro-7-methyl-1,2,3,4-tetrahydro-[1,4]oxazepino[2,3-c]quinolin-6 (7H)-one;

(2S)-2-cyclopropyl-10-((2-(4,4-difluoro-3-methylpiperidin-1-yl)-5-fluoropyridin-4-yl)amino)-3,3-difluoro-7-methyl-1,2,3,4-tetrahydro-[1,4]oxazepino[2,3-c]quinolin-6 (7H)-one;

(2S)-2-cyclopropyl-10-((2-(3,4-difluoropiperidin-1-yl)-5-fluoropyridin-4-yl)amino)-3,3-difluoro-7-methyl-1,2,3,4-tetrahydro-[1,4]oxazepino[2,3-c]quinolin-6 (7H)-one;

(S)-2-cyclopropyl-3,3-difluoro-10-((5-fluoro-2-morpholinopyridin-4-yl)amino)-7-methyl-1,2,3,4-tetrahydro-[1,4]oxazepino[2,3-c]quinolin-6 (7H)-one;

(S)-2-cyclopropyl-3,3-difluoro-10-((5-fluoro-2-((R)-2-methylmorpholino)pyridin-4-yl)amino)-7-methyl-1,2,3,4-tetrahydro-[1,4]oxazepino[2,3-c]quinolin-6 (7H)-one;

(S)-2-cyclopropyl-3,3-difluoro-10-((5-fluoro-2-((S)-2-methylmorpholino)pyridin-4-yl)amino)-7-methyl-1,2,3,4-tetrahydro-[1,4]oxazepino[2,3-c]quinolin-6 (7H)-one;

(2S)-10-((2-(6-oxa-3-azabicyclo[3.1.1]heptan-3-yl)-5-fluoropyridin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((2-((1R,5S)-3-oxa-8-azabicyclo[3.2.1]octan-8-yl)-5-fluoropyridin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((2-((1R,5S)-8-oxa-3-azabicyclo[3.2.1]octan-3-yl)-5-fluoropyridin-4-yl)amino)-2-cyclopropyl-3,3-difluoro-7-methyl-1,2,3,4-tetrahydro-[1,4]oxazepino[2,3-c]quinolin-6 (7H)-one;

(S)-2-cyclopropyl-10-((2-(dimethylamino)-5-fluoropyridin-4-yl)amino)-3,3-difluoro-7-methyl-1,2,3,4-tetrahydro-[1,4]oxazepino[2,3-c]quinolin-6 (7H)-one; or (2S)-2-cyclopropyl-10-((2-(4,4-difluoro-3-(hydroxymethyl) piperidin-1-yl)-5-fluoropyridin-4-yl)amino)-3,3-difluoro-7-methyl-1,2,3,4-tetrahydro-[1,4]oxazepino[2,3-c]quinolin-6 (7H)-one.

2. A compound, or a pharmaceutically acceptable salt or solvate thereof, according to claim 1 selected from:

(S)-10-((5-chloro-2-(3,3-difluoroazetidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-(4-cyclopropyl-3-oxopiperazin-1-yl) pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((S)-3,4-dimethyl-5-oxopiperazin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((2-hydroxy-2-methylpropyl)amino) pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((2-((1R,4R)-2-oxa-5-azabicyclo[2.2.1]heptan-5-yl)-5-chloropyrimidin-4-yl)amino)-2-cyclopropyl-3,3-difluoro-7-methyl-1,2,3,4-tetrahydro-[1,4]oxazepino[2,3-c]quinolin-6 (7H)-one;

N-((3S,5R)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)-5-methylpiperidin-3-yl) acetamide;

N-((3R,5S)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)-5-methylpiperidin-3-yl) acetamide;

(S)-10-((5-chloro-2-((3S,5R)-3-(dimethylamino)-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((S)-3-hydroxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((R)-3-hydroxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((S)-3-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((R)-3-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-(3-fluoro-3-methylazetidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-(3-hydroxy-3-methylazetidin-1-yl) pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-2-cyclopropyl-3,3-difluoro-10-((5-fluoro-2-((3R,5S)-3-hydroxy-5-methylpiperidin-1-yl)pyrimidin-4-yl) amino)-7-methyl-1,2,3,4-tetrahydro-[1,4]oxazepino[2,3-c]quinolin-6 (7H)-one;

(S)-2-cyclopropyl-10-((2-(4,4-difluoropiperidin-1-yl)-5-fluoropyrimidin-4-yl)amino)-3,3-difluoro-7-methyl-1,2,3,4-tetrahydro-[1,4]oxazepino[2,3-c]quinolin-6 (7H)-one;

(S)-10-((2-(3-oxa-8-azabicyclo[3.2.1]octan-8-yl)-5-chloropyrimidin-4-yl)amino)-2-cyclopropyl-3,3-difluoro-7-(methyl-d3)-1,2,3,4-tetrahydro-[1,4]oxazepino[2,3-c][1,8]naphthyridin-6 (7H)-one;

(S)-10-((5-chloro-2-(3-methyl-1,2,4-oxadiazol-5-yl) pyridin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((3-chloro-2-fluoropyridin-4-yl)amino)-2-cyclopropyl-3,3-difluoro-7-methyl-1,2,3,4-tetrahydro-[1,4]oxazepino[2,3-c]quinolin-6 (7H)-one;

(S)-2-cyclopropyl-10-((2,3-dichloropyridin-4-yl)amino)-3,3-difluoro-7-methyl-1,2,3,4-tetrahydro-[1,4]oxazepino[2,3-c]quinolin-6 (7H)-one;

(S)-10-((2-chloro-3-fluoropyridin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((3-chloro-2-methylpyridin-4-yl)amino)-2-cyclopropyl-3,3-difluoro-7-methyl-1,2,3,4-tetrahydro-[1,4]oxazepino[2,3-c]quinolin-6 (7H)-one;

(S)-2-cyclopropyl-3,3-difluoro-10-((5-fluoro-2-((1R,5S,7R)-7-hydroxy-3-oxa-9-azabicyclo[3.3.1]nonan-9-yl)pyrimidin-4-yl)amino)-7-methyl-1,2,3,4-tetrahydro-[1,4]oxazepino[2,3-c]quinolin-6 (7H)-one;

(S)-10-((5-chloropyrimidin-4-yl)amino)-2-cyclopropyl-3,3-difluoro-7-methyl-1,2,3,4-tetrahydro-[1,4]oxazepino[2,3-c]quinolin-6 (7H)-one;

(2S)-10-((2-(3-acetyl-3,8-diazabicyclo[3.2.1]octan-8-yl)-5-chloropyrimidin-4-yl)amino)-2-cyclopropyl-3,3-difluoro-7-methyl-1,2,3,4-tetrahydro-[1,4]oxazepino[2,3-c]quinolin-6 (7H)-one;

(2S)-10-((2-(8-acetyl-3,8-diazabicyclo[3.2.1]octan-3-yl)-5-chloropyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-(dimethylamino)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((3S,5R)-3-fluoro-5-hydroxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((3R,5S)-3-fluoro-5-hydroxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((S)-3-((dimethylamino)methyl) piperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(3R,5S)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)-N-ethyl-5-methylpiperidine-3-carboxamide;

(3S,5R)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)-N-ethyl-5-methylpiperidine-3-carboxamide;

(S)-10-((5-chloro-2-((3R,5S)-3-(hydroxymethyl)-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((3S,5R)-3-(hydroxymethyl)-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((R)-4,4-difluoro-3-hydroxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((S)-4,4-difluoro-3-hydroxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((R)-3-(fluoromethyl) piperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((S)-3-(fluoromethyl) piperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

2-((R)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl) piperidin-3-yl) acetamide;

2-((S)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl) piperidin-3-yl) acetamide;

(S)-10-((5-chloro-2-((S)-3-(dimethylamino) piperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((R)-3-(dimethylamino) piperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(R)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)-N-ethyl-4,4-difluoropiperidine-3-carboxamide;

(S)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)-N-ethyl-4,4-difluoropiperidine-3-carboxamide;

N-(((R)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)-4,4-difluoropiperidin-3-yl)methyl)-N-ethylacetamide;

N-(((S)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)-4,4-difluoropiperidin-3-yl)methyl)-N-ethylacetamide;

(S)-10-((5-chloro-2-((1R,4R)-5,5-difluoro-2-azabicyclo[2.2.1]heptan-2-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((1S,4S)-5,5-difluoro-2-azabicyclo[2.2.1]heptan-2-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

N-((R)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)-4,4-difluoropiperidin-3-yl)-N-methylacetamide;

N-((S)-1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)-4,4-difluoropiperidin-3-yl)-N-methylacetamide;

(S)-10-((5-chloro-2-(4-fluoro-4-(hydroxymethyl) piperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((R)-3-(hydroxymethyl) piperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((S)-3-(hydroxymethyl) piperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((1S,5R)-3-ethyl-2-oxo-3,8-diazabicyclo[3.2.1]octan-8-yl)pyrimidin-4-yl)amino)-2-cyclopropyl-3,3-difluoro-7-methyl-1,2,3,4-tetrahydro-[1,4]
oxazepino[2,3-c]quinolin-6 (7H)-one;
(S)-10-((5-chloro-2-((1R,5S)-3-ethyl-2-oxo-3,8-diazabi-
cyclo[3.2.1]octan-8-yl)pyrimidin-4-yl)amino)-2-cyclo-
propyl-3,3-difluoro-7-methyl-1,2,3,4-tetrahydro-[1,4]
oxazepino[2,3-c]quinolin-6 (7H)-one;
(S)-10-((5-chloro-2-((3S,5R)-3,5-difluoropiperidin-1-yl)
pyrimidin-4-yl)amino)-2-cyclopropyl-3,3-difluoro-7-
methyl-1,2,3,4-tetrahydro-[1,4]oxazepino[2,3-c]quino-
lin-6 (7H)-one;
(S)-10-((2-(6-acetyl-2,6-diazaspiro[3.3]heptan-2-yl)-5-
chloropyrimidin-4-yl)amino)-2-cyclopropyl-3,3-dif-
luoro-7-methyl-1,2,3,4-tetrahydro-[1,4]oxazepino[2,3-
c]quinolin-6 (7H)-one;
(S)-10-((5-chloro-2-((2-hydroxy-2-methylpropyl)
(methyl)amino)pyrimidin-4-yl)amino)-2-cyclopropyl-
3,3-difluoro-7-methyl-1,2,3,4-tetrahydro-[1,4]oxaze-
pino[2,3-c]quinolin-6 (7H)-one;
(S)-10-((5-chloro-2-((3-hydroxy-3-methylbutyl)(methyl)
amino)pyrimidin-4-yl)amino)-2-cyclopropyl-3,3-dif-
luoro-7-methyl-1,2,3,4-tetrahydro-[1,4]oxazepino[2,3-
c]quinolin-6 (7H)-one;
(S)-10-((5-chloro-2-(6-(cyclopropylmethyl)-2,6-diaz-
aspiro[3.3]heptan-2-yl)pyrimidin-4-yl)amino)-2-cy-
clopropyl-3,3-difluoro-7-methyl-1,2,3,4-tetrahydro-[1,
4]oxazepino[2,3-c]quinolin-6 (7H)-one;
(2S)-10-((5-chloro-2-(6-((2,2-difluorocyclopropyl)
methyl)-2,6-diazaspiro[3.3]heptan-2-yl)pyrimidin-4-
yl)amino)-2-cyclopropyl-3,3-difluoro-7-methyl-1,2,3,
4-tetrahydro-[1,4]oxazepino[2,3-c]quinolin-6 (7H)-
one;
(2S)-10-((5-chloro-2-(8-(cyclopropylmethyl)-3,8-diaz-
abicyclo[3.2.1]octan-3-yl)pyrimidin-4-yl)amino)-2-cy-
clopropyl-3,3-difluoro-7-methyl-1,2,3,4-tetrahydro-[1,
4]oxazepino[2,3-c]quinolin-6 (7H)-one;
(2S)-10-((5-chloro-2-(8-((2,2-difluorocyclopropyl)
methyl)-3,8-diazabicyclo[3.2.1]octan-3-yl)pyrimidin-
4-yl)amino)-2-cyclopropyl-3,3-difluoro-7-methyl-1,2,
3,4-tetrahydro-[1,4]oxazepino[2,3-c]quinolin-6 (7H)-
one;
(S)-10-((5-chloro-2-((3R,5R)-3-hydroxy-5-methylpiperi-
din-1-yl)pyrimidin-4-yl)amino)-2-cyclopropyl-3,3-dif-
luoro-7-methyl-1,2,3,4-tetrahydro-[1,4]oxazepino[2,3-
c]quinolin-6 (7H)-one;
(S)-10-((5-chloro-2-((3S,4R)-3,4-difluoropiperidin-1-yl)
pyrimidin-4-yl)amino)-2-cyclopropyl-3,3-difluoro-7-
methyl-1,2,3,4-tetrahydro-[1,4]oxazepino[2,3-c]quino-
lin-6 (7H)-one;
(S)-10-((5-chloro-2-((3R,4S)-3,4-difluoropiperidin-1-yl)
pyrimidin-4-yl)amino)-2-cyclopropyl-3,3-difluoro-7-
methyl-1,2,3,4-tetrahydro-[1,4]oxazepino[2,3-c]quino-
lin-6 (7H)-one;
(S)-10-((5-chloro-2-((3S,4S)-3,4-difluoropiperidin-1-yl)
pyrimidin-4-yl)amino)-2-cyclopropyl-3,3-difluoro-7-
methyl-1,2,3,4-tetrahydro-[1,4]oxazepino[2,3-c]quino-
lin-6 (7H)-one;
(S)-10-((5-chloro-2-((3R,4R)-3,4-difluoropiperidin-1-yl)
pyrimidin-4-yl)amino)-2-cyclopropyl-3,3-difluoro-7-
methyl-1,2,3,4-tetrahydro-[1,4]oxazepino[2,3-c]quino-
lin-6 (7H)-one;
(S)-10-((5-chloro-2-((R)-3-methoxypiperidin-1-yl)py-
rimidin-4-yl)amino)-2-cyclopropyl-3,3-difluoro-7-
methyl-1,2,3,4-tetrahydro-[1,4]oxazepino[2,3-c]quino-
lin-6 (7H)-one;
(S)-10-((5-chloro-2-((S)-3-methoxypiperidin-1-yl)py-
rimidin-4-yl)amino)-2-cyclopropyl-3,3-difluoro-7-
methyl-1,2,3,4-tetrahydro-[1,4]oxazepino[2,3-c]quino-
lin-6 (7H)-one;
(S)-10-((5-fluoro-2-((3S,4R)-3,4-difluoropiperidin-1-yl)
pyrimidin-4-yl)amino)-2-cyclopropyl-3,3-difluoro-7-
methyl-1,2,3,4-tetrahydro-[1,4]oxazepino[2,3-c]quino-
lin-6 (7H)-one;
(S)-10-((5-fluoro-2-((3R,4S)-3,4-difluoropiperidin-1-yl)
pyrimidin-4-yl)amino)-2-cyclopropyl-3,3-difluoro-7-
methyl-1,2,3,4-tetrahydro-[1,4]oxazepino[2,3-c]quino-
lin-6 (7H)-one;
(2S)-10-[[5-chloro-2-(4-methyl-1,4-diazepan-1-yl)py-
rimidin-4-yl]amino]-2-cyclopropyl-3,3-difluoro-7-
methyl-2,4-dihydro-1H-[1,4]oxazepino[2,3-c]quino-
lin-6-one;
(S)-10-((5-chloro-2-((R)-3-ethylpiperidin-1-yl)pyrimi-
din-4-yl)amino)-2-cyclopropyl-3,3-difluoro-7-methyl-
1,2,3,4-tetrahydro-[1,4]oxazepino[2,3-c]quinolin-6
(7H)-one;
(S)-10-((5-chloro-2-((S)-3-ethylpiperidin-1-yl)pyrimidin-
4-yl)amino)-2-cyclopropyl-3,3-difluoro-7-methyl-1,2,
3,4-tetrahydro-[1,4]oxazepino[2,3-c]quinolin-6 (7H)-
one;
(S)-10-((5-chloro-2-((R)-3-methylazepan-1-yl)pyrimi-
din-4-yl)amino)-2-cyclopropyl-3,3-difluoro-7-methyl-
1,2,3,4-tetrahydro-[1,4]oxazepino[2,3-c]quinolin-6
(7H)-one;
(S)-10-((5-chloro-2-((S)-3-methylazepan-1-yl)pyrimidin-
4-yl)amino)-2-cyclopropyl-3,3-difluoro-7-methyl-1,2,
3,4-tetrahydro-[1,4]oxazepino[2,3-c]quinolin-6 (7H)-
one;
(S)-10-((5-chloro-2-((R)-4-methylazepan-1-yl)pyrimi-
din-4-yl)amino)-2-cyclopropyl-3,3-difluoro-7-methyl-
1,2,3,4-tetrahydro-[1,4]oxazepino[2,3-c]quinolin-6
(7H)-one;
(S)-10-((5-chloro-2-((S)-4-methylazepan-1-yl)pyrimidin-
4-yl)amino)-2-cyclopropyl-3,3-difluoro-7-methyl-1,2,
3,4-tetrahydro-[1,4]oxazepino[2,3-c]quinolin-6 (7H)-
one;
(S)-10-((5-chloro-2-((3R,5S)-3,5-dihydroxypiperidin-1-
yl)pyrimidin-4-yl)amino)-2-cyclopropyl-3,3-difluoro-
7-methyl-1,2,3,4-tetrahydro-[1,4]oxazepino[2,3-c]qui-
nolin-6 (7H)-one;
(S)-10-((5-chloro-2-((1R,5R)-1-(hydroxymethyl)-5-
methyl-3-azabicyclo[3.1.0]hexan-3-yl)pyrimidin-4-yl)
amino)-2-cyclopropyl-3,3-difluoro-7-methyl-1,2,3,4-
tetrahydro-[1,4]oxazepino[2,3-c]quinolin-6 (7H)-one;
(S)-10-((5-chloro-2-((1S,5S)-1-(hydroxymethyl)-5-
methyl-3-azabicyclo[3.1.0]hexan-3-yl)pyrimidin-4-yl)
amino)-2-cyclopropyl-3,3-difluoro-7-methyl-1,2,3,4-
tetrahydro-[1,4]oxazepino[2,3-c]quinolin-6 (7H)-one;
(S)-10-((5-chloro-2-((3R,5R)-3-fluoro-5-hydroxypiperi-
din-1-yl)pyrimidin-4-yl)amino)-2-cyclopropyl-3,3-dif-
luoro-7-methyl-1,2,3,4-tetrahydro-[1,4]oxazepino[2,3-
c]quinolin-6 (7H)-one;
(S)-10-((5-chloro-2-((3S,5S)-3-fluoro-5-hydroxypiperi-
din-1-yl)pyrimidin-4-yl)amino)-2-cyclopropyl-3,3-dif-
luoro-7-methyl-1,2,3,4-tetrahydro-[1,4]oxazepino[2,3-
c]quinolin-6 (7H)-one;
(S)-10-((5-chloro-2-((R)-7-hydroxy-5-azaspiro[2.5]oc-
tan-5-yl)pyrimidin-4-yl)amino)-2-cyclopropyl-3,3-dif-
luoro-7-methyl-1,2,3,4-tetrahydro-[1,4]oxazepino[2,3-
c]quinolin-6 (7H)-one;

(S)-10-((5-chloro-2-((S)-7-hydroxy-5-azaspiro[2.5]octan-5-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-(methyl(propyl)amino)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((3R,4S)-3-(hydroxymethyl)-4-methylpyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((3S,4R)-3-(hydroxymethyl)-4-methylpyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((2-hydroxyethyl) (propyl)amino)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-(5-azaspiro[2.5]octan-5-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-(((R)-3-methoxy-2-methylpropyl)amino)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-(((S)-3-methoxy-2-methylpropyl)amino)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-(3,3-dimethylazetidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-(3-methylazetidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-1-(5-chloro-4-((2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl) azetidine-3-carbonitrile;

(S)-10-((5-chloro-2-(3-fluoroazetidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((R)-3-(difluoromethyl) piperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((S)-3-(difluoromethyl) piperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-1-(5-chloro-4-((2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)-3-methylazetidine-3-carbonitrile;

(S)-2-(1-(5-chloro-4-((2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl) azetidin-3-yl) acetonitrile;

(S)-10-((5-chloro-2-(3-(difluoromethyl) azetidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((2-(azetidin-1-yl)-5-chloropyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-(3-methoxyazetidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-(3-methoxy-3-methylazetidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((R)-3-ethylpyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((S)-3-ethylpyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((R)-3-fluoro-3-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((S)-3-fluoro-3-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((R)-3-hydroxy-3-methylpyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((S)-3-hydroxy-3-methylpyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((2-((3S,5R)-3-amino-5-methylpiperidin-1-yl)-5-chloropyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((2-((3R,5S)-3-amino-5-methylpiperidin-1-yl)-5-chloropyrimidin-4-yl)amino)-2-cyclopropyl-3,3-difluoro-7-methyl-1,2,3,4-tetrahydro-[1,4]oxazepino[2,3-c]quinolin-6 (7H)-one;

(2S)-10-((2-(6-oxa-3-azabicyclo[3.1.1]heptan-3-yl)-5-chloropyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((R)-3,3-difluoro-5-hydroxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((S)-3,3-difluoro-5-hydroxypiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((R)-2-methylthiomorpholino)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((S)-2-methylthiomorpholino)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((R)-4,6-dimethyl-1,4-diazepan-1-yl) pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((S)-4,6-dimethyl-1,4-diazepan-1-yl) pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((S)-hexahydropyrrolo[1,2-a] pyrazin-2 (1H)-yl)pyrimidin-4-yl)amino)-2-cyclopropyl-3,3-difluoro-7-methyl-1,2,3,4-tetrahydro-[1,4] oxazepino[2,3-c]quinolin-6 (7H)-one;

(S)-10-((5-chloro-2-((R)-hexahydropyrrolo[1,2-a] pyrazin-2 (1H)-yl)pyrimidin-4-yl)amino)-2-cyclopropyl-3,3-difluoro-7-methyl-1,2,3,4-tetrahydro-[1,4] oxazepino[2,3-c]quinolin-6 (7H)-one;

(S)-10-((5-chloro-2-((R)-6-oxohexahydropyrrolo[1,2-a] pyrazin-2 (1H)-yl)pyrimidin-4-yl)amino)-2-cyclopropyl-3,3-difluoro-7-methyl-1,2,3,4-tetrahydro-[1,4] oxazepino[2,3-c]quinolin-6 (7H)-one;

(S)-10-((5-chloro-2-((S)-6-oxohexahydropyrrolo[1,2-a] pyrazin-2 (1H)-yl)pyrimidin-4-yl)amino)-2-cyclopropyl-3,3-difluoro-7-methyl-1,2,3,4-tetrahydro-[1,4] oxazepino[2,3-c]quinolin-6 (7H)-one;

(S)-10-((5-chloro-2-((R)-8-hydroxy-6-azaspiro[3.5] nonan-6-yl)pyrimidin-4-yl)amino)-2-cyclopropyl-3,3-difluoro-7-methyl-1,2,3,4-tetrahydro-[1,4]oxazepino [2,3-c]quinolin-6 (7H)-one;

(S)-10-((5-chloro-2-((S)-8-hydroxy-6-azaspiro[3.5] nonan-6-yl)pyrimidin-4-yl)amino)-2-cyclopropyl-3,3-difluoro-7-methyl-1,2,3,4-tetrahydro-[1,4]oxazepino [2,3-c]quinolin-6 (7H)-one;

(S)-10-((5-chloro-2-((3R,5S)-3-hydroxy-5-methylpiperidin-1-yl) pyridin-4-yl)amino)-2-cyclopropyl-3,3-difluoro-7-methyl-1,2,3,4-tetrahydro-[1,4]oxazepino[2,3-c]quinolin-6 (7H)-one;

((S)-10-((5-chloro-2-(4,4-difluoropiperidin-1-yl) pyridin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((S)-4,4-difluoro-3-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((R)-4,4-difluoro-3-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((R)-4,4-difluoro-3-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((S)-4,4-difluoro-3-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((S)-3-methylpyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((R)-3-methylpyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((3R,5S)-3-fluoro-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((3R,5S)-3-methoxy-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(2S)-10-((5-chloro-2-(2,6-dimethylthiomorpholino)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(2S)-10-((5-chloro-2-(3,4-dimethylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(2S)-10-((5-chloro-2-(2,3-dimethylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(2S)-10-((5-chloro-2-(2,6-dimethyl-1-oxidothiomorpholino)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((2R,5S)-2-(hydroxymethyl)-5-methylpiperidin-1-yl)pyrimidin-4-yl)amino)-2-cyclopropyl-3,3-difluoro-7-methyl-1,2,3,4-tetrahydro-[1,4] oxazepino[2,3-c]quinolin-6 (7H)-one;

(2S)-10-((5-chloro-2-(2,6-dimethyl-1,1-dioxidothiomorpholino)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(2S)-10-((5-chloro-2-(2,5-dimethylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((3S,5S)-3-hydroxy-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(2S)-10-((5-chloro-2-(6-hydroxy-1,4-diazepan-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(2S)-10-((2-(3-(2-(azetidin-1-yl)-2-oxoethyl)-5-methylpiperidin-1-yl)-5-chloropyrimidin-4-yl)amino)-2-cyclopropyl-3,3-difluoro-7-methyl-1,2,3,4-tetrahydro-[1,4]oxazepino[2,3-c]quinolin-6 (7H)-one;

(2S)-10-((2-((3S,5R)-3-(2-(azetidin-1-yl)-2-oxoethyl)-5-methylpiperidin-1-yl)-5-chloropyrimidin-4-yl)amino)-2-cyclopropyl-3,3-difluoro-7-methyl-1,2,3,4-tetrahydro-[1,4]oxazepino[2,3-c]quinolin-6 (7H)-one;

(2S)-10-((2-((3R,5S)-3-(2-(azetidin-1-yl)-2-oxoethyl)-5-methylpiperidin-1-yl)-5-chloropyrimidin-4-yl)amino)-2-cyclopropyl-3,3-difluoro-7-methyl-1,2,3,4-tetrahydro-[1,4]oxazepino[2,3-c]quinolin-6 (7H)-one;

(2S)-10-((5-chloro-2-(3-(2-(3,3-difluoroazetidin-1-yl)-2-oxoethyl)-5-methylpiperidin-1-yl)pyrimidin-4-yl) amino)-2-cyclopropyl-3,3-difluoro-7-methyl-1,2,3,4-tetrahydro-[1,4]oxazepino[2,3-c]quinolin-6 (7H)-one;

(2S)-10-((5-chloro-2-((3R,5S)-3-(2-(3,3-difluoroazetidin-1-yl)-2-oxoethyl)-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(2S)-10-((5-chloro-2-((3S,5R)-3-(2-(3,3-difluoroazetidin-1-yl)-2-oxoethyl)-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(2S)-10-((2-(3-(azetidine-1-carbonyl)-4,4-difluoropiperidin-1-yl)-5-chloropyrimidin-4-yl)amino)-2-cyclopropyl-3,3-difluoro-7-methyl-1,2,3,4-tetrahydro-[1,4]oxazepino[2,3-c]quinolin-6 (7H)-one;

(2S)-10-((5-chloro-2-(3-(3,3-difluoroazetidine-1-carbonyl)-4,4-difluoropiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(2S)-10-((5-chloro-2-(3-(2-(3,3-difluoroazetidin-1-yl)-2-oxoethyl)-4,4-difluoropiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(2S)-10-((2-(3-(2-(azetidin-1-yl)-2-oxoethyl)-4,4-difluoropiperidin-1-yl)-5-chloropyrimidin-4-yl)amino)-2-cyclopropyl-3,3-difluoro-7-methyl-1,2,3,4-tetrahydro-[1,4]oxazepino[2,3-c]quinolin-6 (7H)-one;

(2S)-10-((5-chloro-2-(3-ethynylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl) piperidine-3-carbonitrile;

(S)-10-((5-chloro-2-((4,4-difluorocyclohexyl)amino)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(2S)-10-((2-(2-azabicyclo[4.1.0]heptan-2-yl)-5-chloropyrimidin-4-yl)amino)-2-cyclopropyl-3,3-difluoro-7-methyl-1,2,3,4-tetrahydro-[1,4]oxazepino[2,3-c]quinolin-6 (7H)-one;

(2S)-10-((5-chloro-2-(3-(difluoromethyl) piperazin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((3R,5S)-3-(2-(dimethylamino)ethoxy)-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(2S)-10-((2-(3-(azetidine-1-carbonyl)-5-methylpiperidin-1-yl)-5-chloropyrimidin-4-yl)amino)-2-cyclopropyl-3,3-difluoro-7-methyl-1,2,3,4-tetrahydro-[1,4]oxazepino[2,3-c]quinolin-6 (7H)-one;

(2S)-10-((5-chloro-2-(3-(3,3-difluoroazetidine-1-carbonyl)-5-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-(3-(hydroxymethyl) azetidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(2S)-10-((5-chloro-2-(2-(hydroxymethyl) azetidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((S)-2-(hydroxymethyl) azetidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((R)-2-(hydroxymethyl) azetidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-(3-(fluoromethyl) azetidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(2S)-10-((5-chloro-2-(2-methylazetidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-1-(5-chloro-4-((2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl) piperidine-4-carbonitrile;

1-(5-chloro-4-(((S)-2-cyclopropyl-3,3-difluoro-7-methyl-6-oxo-1,2,3,4,6,7-hexahydro-[1,4]oxazepino[2,3-c]quinolin-10-yl)amino)pyrimidin-2-yl)-5-fluoro-N,N-dimethylpiperidine-3-carboxamide;

(2S)-10-((5-chloro-2-(3-fluoropiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-(4-fluoropiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((S)-2-(hydroxymethyl) pyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(2S)-10-((5-chloro-2-(2-(methoxymethyl) pyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((S)-2-(methoxymethyl) pyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((R)-2-(methoxymethyl) pyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(2S)-10-((5-chloro-2-(2-(hydroxymethyl)-3-methylpiperidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((S)-4,4-difluoro-2-(hydroxymethyl)pyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(2S)-10-((5-chloro-2-(4-fluoro-2-(hydroxymethyl) pyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((2S,4S)-4-fluoro-2-(hydroxymethyl)pyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(S)-10-((5-chloro-2-((2S,4R)-4-fluoro-2-(hydroxymethyl) pyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(2S)-10-((5-chloro-2-(2-(hydroxymethyl)-3-methylpyrrolidin-1-yl)pyrimidin-4-yl)amino)-2-cyclopropyl-3,3-difluoro-7-methyl-1,2,3,4-tetrahydro-[1,4]oxazepino[2,3-c]quinolin-6 (7H)-one;

(2S)-10-((5-chloro-2-(4,4-difluoro-2-(hydroxymethyl) piperidin-1-yl)pyrimidin-4-yl)amino)-2-cyclopropyl-3, 3-difluoro-7-methyl-1,2,3,4-tetrahydro-[1,4]oxazepino [2,3-c]quinolin-6 (7H)-one;

(2S)-2-cyclopropyl-10-((2-(4,4-difluoro-3,5-dimethylpiperidin-1-yl)-5-fluoropyrimidin-4-yl)amino)-3,3-difluoro-7-methyl-1,2,3,4-tetrahydro-[1,4]oxazepino[2,3-c]quinolin-6 (7H)-one;

(S)-2-cyclopropyl-3,3-difluoro-10-((5-fluoro-2-morpholinopyrimidin-4-yl)amino)-7-methyl-1,2,3,4-tetrahydro-[1,4]oxazepino[2,3-c]quinolin-6 (7H)-one;

(S)-2-cyclopropyl-3,3-difluoro-10-((5-fluoro-2-((S)-2-methylmorpholino)pyrimidin-4-yl)amino)-7-methyl-1,2,3,4-tetrahydro-[1,4]oxazepino[2,3-c]quinolin-6 (7H)-one;

(S)-10-((2-((1R,5S)-8-oxa-3-azabicyclo[3.2.1]octan-3-yl)-5-fluoropyrimidin-4-yl)amino)-2-cyclopropyl-3,3-difluoro-7-methyl-1,2,3,4-tetrahydro-[1,4]oxazepino [2,3-c]quinolin-6 (7H)-one;

(S)-2-cyclopropyl-10-((2-(dimethylamino)-5-fluoropyrimidin-4-yl)amino)-3,3-difluoro-7-methyl-1,2,3,4-tetrahydro-[1,4]oxazepino[2,3-c]quinolin-6 (7H)-one;

(S)-2-cyclopropyl-10-((2-(dimethylamino)-5-chloropyridin-4-yl)amino)-3,3-difluoro-7-methyl-1,2,3,4-tetrahydro-[1,4]oxazepino[2,3-c]quinolin-6 (7H)-one;

(S)-2-cyclopropyl-3,3-difluoro-10-((5-chloro-2-morpholinopyridin-4-yl)amino)-7-methyl-1,2,3,4-tetrahydro-[1,4]oxazepino[2,3-c]quinolin-6 (7H)-one;

(S)-2-cyclopropyl-3,3-difluoro-10-((5-chloro-2-((S)-methylmorpholino)pyridin-4-yl)amino)-7-methyl-1,2,3,4-tetrahydro-[1,4]oxazepino[2,3-c]quinolin-6 (7H)-one;

(S)-2-cyclopropyl-10-((2-(4,4-difluoropiperidin-1-yl)-5-fluoropyridin-4-yl)amino)-3,3-difluoro-7-methyl-1,2,3,4-tetrahydro-[1,4]oxazepino[2,3-c]quinolin-6 (7H)-one; or(S)-2-cyclopropyl-3,3-difluoro-10-((5-fluoro-2-((3R,5S)-3-hydroxy-5-methylpiperidin-1-yl) pyridin-4-yl)amino)-7-methyl-1,2,3,4-tetrahydro-[1,4] oxazepino[2,3-c]quinolin-6 (7H)-one.

3. A pharmaceutical composition comprising a compound according to claim 1, or a pharmaceutically acceptable salt or solvate thereof, and a pharmaceutically acceptable carrier or excipient.

4. A method of treating a disease comprising:
administering a therapeutically effective amount of a pharmaceutical according to claim 3 to a subject in need of such treatment.

5. The method according to claim 4, wherein the disease is selected from cancer, HIV, sepsis, graft-versus-host disease, non-alcoholic fatty liver disease, non-alcoholic steatohepatitis, or auto-immune diseases.

6. The method of claim 4, wherein the disease is cancer and further comprising administering an additional therapeutic agent.

7. The method of claim 6, wherein the additional therapeutic agent is selected from a BCL-2 family inhibitor, a BTK inhibitor, a TNF inhibitor, an EZH2 inhibitor, a HDAC inhibitor, an ATR kinase inhibitor, an ATM kinase inhibitor, an EGFR tyrosine kinase inhibitor, or a corticosteroid.

8. The method of claim 5, wherein the cancer is selected from diffuse large B-cell lymphoma (DLBCL), follicular lymphoma (FL), Burkitt lymphoma (BL), angioimmunoblastic T-cell lymphoma (AITL), acute lymphoblastic leukaemia (ALL), acute myeloid leukaemia (AML), chronic myeloid leukaemia (CML), multiple myeloma, breast cancer, non-small cell lung cancer (NSCLC) or squamous cell carcinomas (SCC) of the head and neck, oesophagus, lung or ovary.

9. A method of treating a subject having cancer comprising:
administering an effective amount of a compound according to claim 2, or a pharmaceutically acceptable salt or solvate thereof, and a pharmaceutically acceptable carrier or excipient.

10. The method of claim 9, wherein the cancer is selected from diffuse large B-cell lymphoma (DLBCL), follicular lymphoma (FL), Burkitt lymphoma (BL), angioimmunoblastic T-cell lymphoma (AITL), acute lymphoblastic leukaemia (ALL), acute myeloid leukaemia (AML), chronic myeloid leukaemia (CML), multiple myeloma, breast cancer, non-small cell lung cancer (NSCLC) or squamous cell carcinomas (SCC) of the head and neck, oesophagus, lung or ovary.

* * * * *